(12) United States Patent
Morita et al.

(10) Patent No.: US 7,804,645 B2
(45) Date of Patent: Sep. 28, 2010

(54) IMAGE STABILIZER

(75) Inventors: Tetsuya Morita, Osaka (JP); Hideaki Mukae, Hyogo (JP); Hironori Honsho, Hyogo (JP); Kenichi Honjo, Osaka (JP); Daisuke Ito, Osaka (JP); Tetsuya Kitagawa, Osaka (JP)

(73) Assignee: Panasonic Corporation, Osaka (JP)

( * ) Notice: Subject to any disclaimer, the term of this patent is extended or adjusted under 35 U.S.C. 154(b) by 467 days.

(21) Appl. No.: 11/813,709

(22) PCT Filed: Jan. 5, 2006

(86) PCT No.: PCT/JP2006/300027

§ 371 (c)(1),
(2), (4) Date: Jul. 11, 2007

(87) PCT Pub. No.: WO2006/075545

PCT Pub. Date: Jul. 20, 2006

(65) Prior Publication Data

US 2009/0002825 A1    Jan. 1, 2009

(30) Foreign Application Priority Data

Jan. 11, 2005    (JP)    ............................ 2005-004074
Feb. 7, 2005    (JP)    ............................ 2005-030812
Jun. 29, 2005    (JP)    ............................ 2005-189327

(51) Int. Cl.
  *G02B 27/64*    (2006.01)
(52) U.S. Cl. ........................ 359/554; 359/557; 396/52; 396/55; 348/208.2
(58) Field of Classification Search ......... 359/554–557, 359/819–830; 396/52–55; 310/328
See application file for complete search history.

(56) References Cited

U.S. PATENT DOCUMENTS

| | | | |
|---|---|---|---|
| 3,577,205 A * | 5/1971 | Hobrough | ............. 250/214 VT |
| 4,713,697 A | 12/1987 | Gotou et al. | |
| 4,780,739 A | 10/1988 | Kawakami et al. | |
| 5,502,598 A | 3/1996 | Kimura et al. | |
| 5,835,641 A | 11/1998 | Sotoda et al. | |
| 6,285,400 B1 | 9/2001 | Hokari | |

(Continued)

FOREIGN PATENT DOCUMENTS

JP    64-12586    1/1989

(Continued)

OTHER PUBLICATIONS

International Search Report from the corresponding PCT/JP2006/300027, mailed Feb. 21, 2006.

(Continued)

*Primary Examiner*—Thong Nguyen
(74) *Attorney, Agent, or Firm*—Hamre, Schumann, Mueller & Larson, P.C.

(57) ABSTRACT

An image stabilizer of the present invention is provided with a lens module 101 that holds a lens and an imaging element, an inner frame that turnably supports the lens module 101, and driving portion that turns the lens module 101 relative to the inner frame 11, with the driving portion including a bimorph 14. An image stabilizer thereby can be provided that allows the overall size and profile of an imaging apparatus to be reduced.

16 Claims, 93 Drawing Sheets

U.S. PATENT DOCUMENTS

| | | |
|---|---|---|
| 6,686,954 B1 | 2/2004 | Kitaguchi et al. |
| 7,349,625 B2 * | 3/2008 | Senba et al. ................... 396/55 |
| 2002/0163581 A1 | 11/2002 | Kitazawa et al. |
| 2004/0190863 A1 | 9/2004 | Nishimura et al. |
| 2004/0256956 A1 * | 12/2004 | Miyazawa .................. 310/328 |
| 2004/0256957 A1 * | 12/2004 | Miyazawa .................. 310/328 |
| 2005/0110873 A1 | 5/2005 | Enomoto |
| 2005/0225646 A1 | 10/2005 | Shintani |

FOREIGN PATENT DOCUMENTS

| | | |
|---|---|---|
| JP | 3-138629 A | 6/1991 |
| JP | 6-339050 A | 12/1994 |
| JP | 11-183951 | 7/1999 |
| JP | 2000-75338 | 3/2000 |
| JP | 2004-077712 A | 3/2004 |

OTHER PUBLICATIONS

English abstract of the Japanese reference No. 10-12586.
Machine translation of Japanese Patent Application No. 06-339050 dated Dec. 6, 1994, 21 pages.
Machine translation of Japanese Patent Application No. 2004-077712 dated Mar. 11, 2004, 18 pages.

* cited by examiner

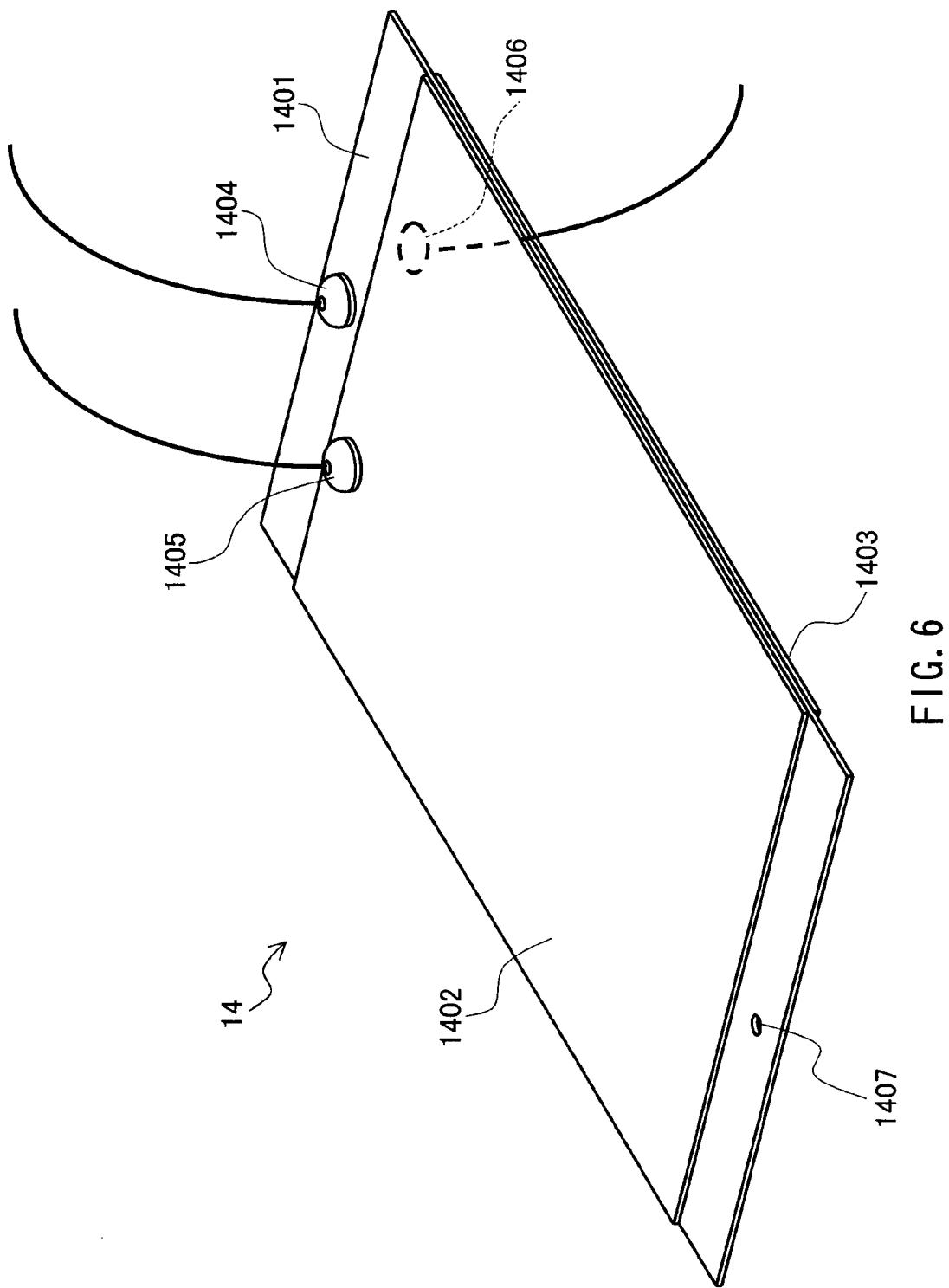

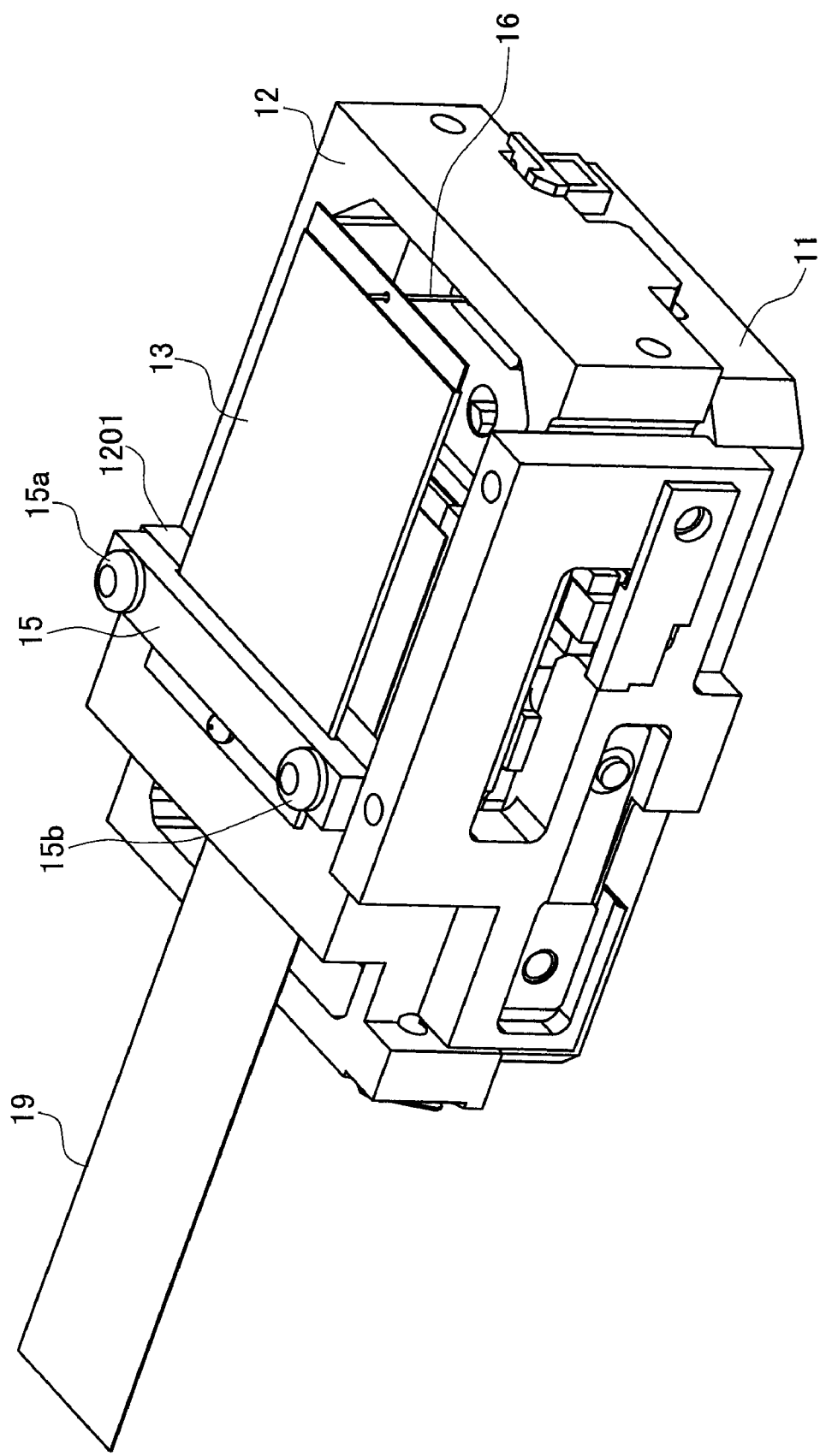
F I G. 31

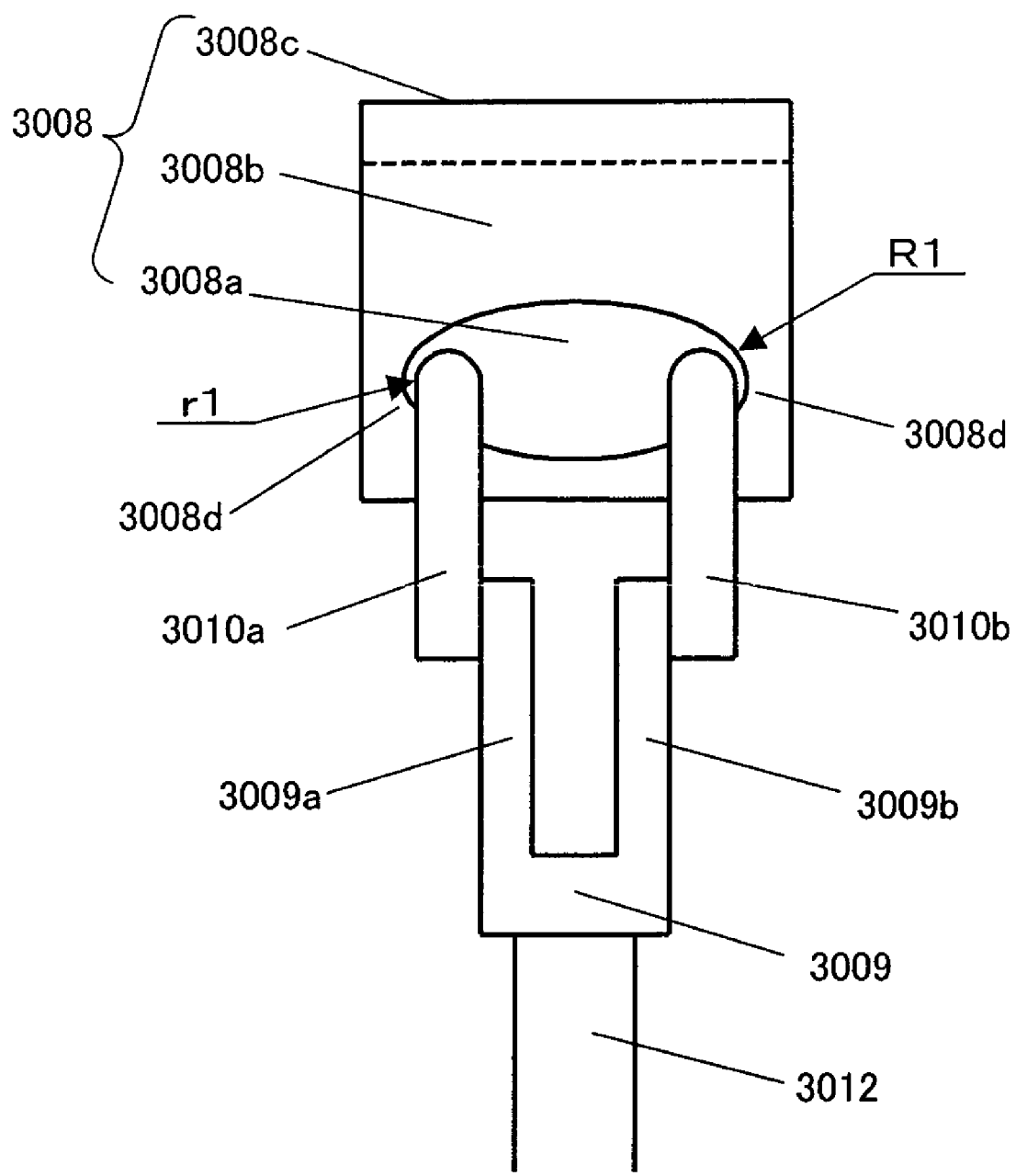
F I G. 61

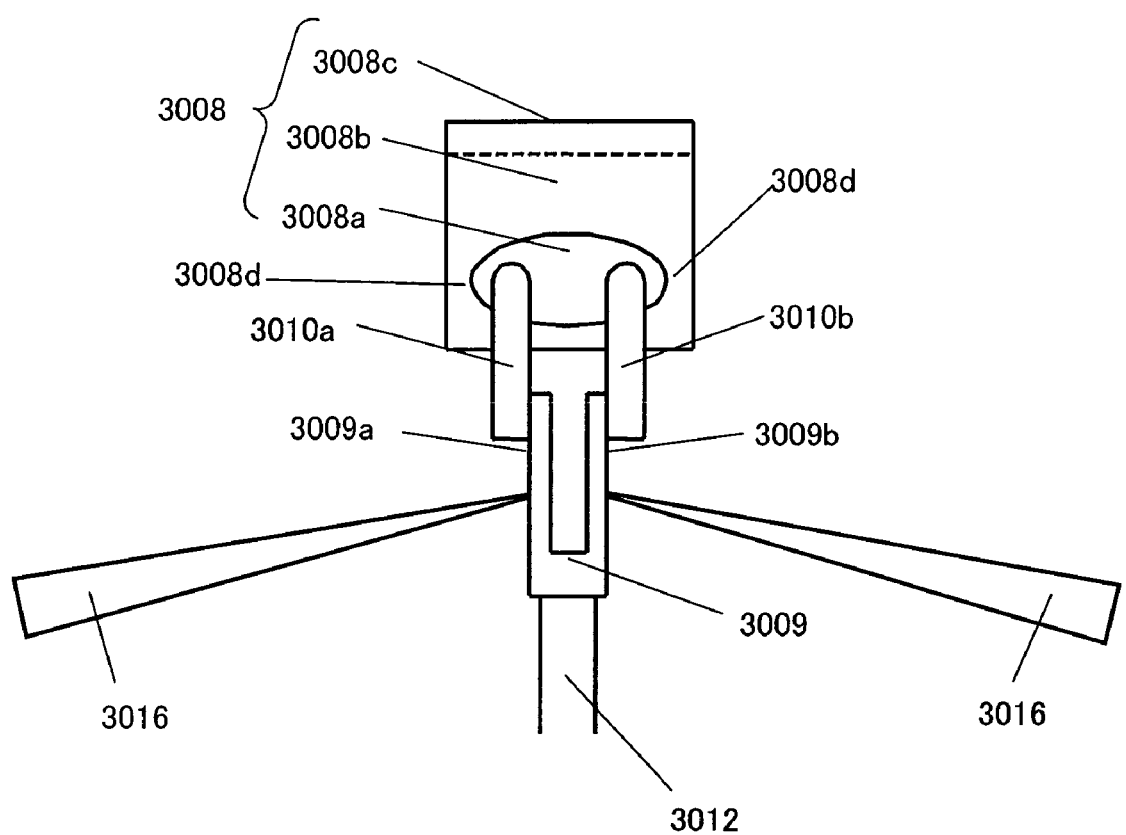
F I G. 62A

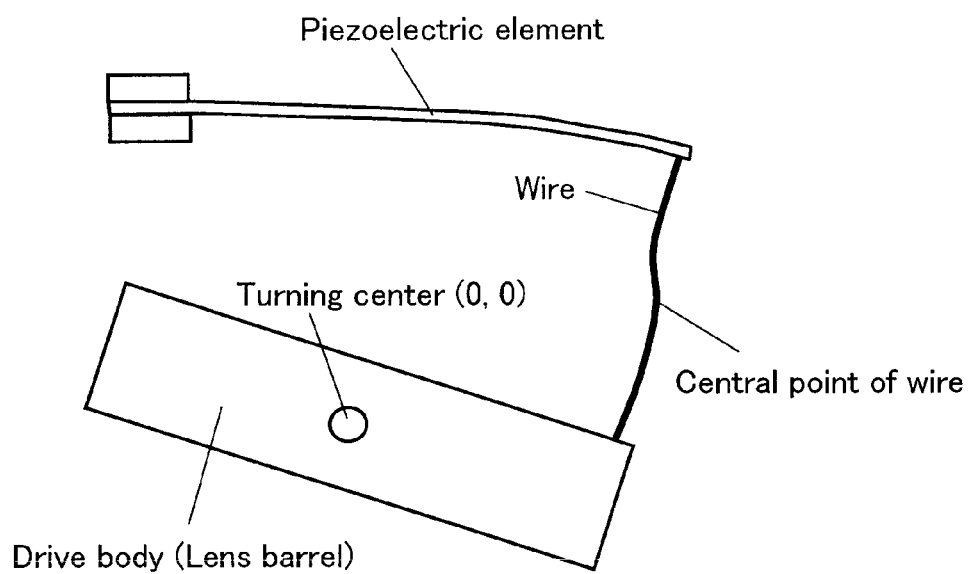
F I G. 67
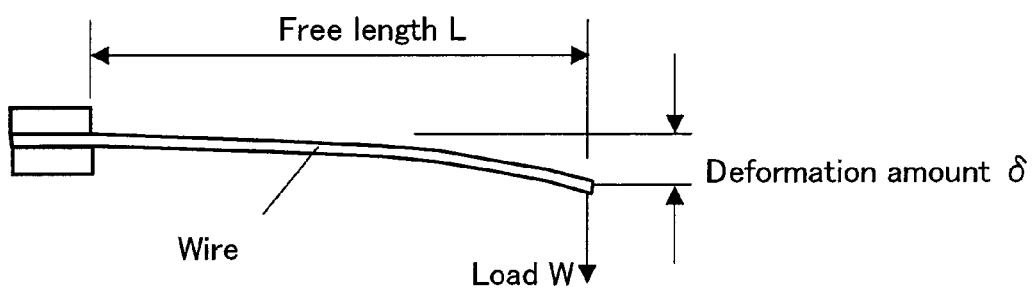
F I G. 68

IMAGE STABILIZER

TECHNICAL FIELD

The present invention relates to an image stabilizer for resolving the problem of camera shake in an imaging optical system.

BACKGROUND ART

These days, the blurring of captured images due to camera shake is an issue when shooting with the high-powered zoom of a movie and digital still camera or when shooting in dark places.

Heretofore, the following techniques are known for correcting camera shake when capturing images with a camera.

For example, patent document 1 discloses an image stabilizer that includes a lens barrel that holds a shooting lens, a correction lens that is part of the shooting lens and corrects camera shake by moving in a vertical plane to the optical axis, and first and second shake detection means for detecting the amount of shake of the lens barrel. This image stabilizer corrects camera shake by bidirectionally driving a holding frame that holds the correction lens orthogonally to the optical axis, according to the amount of shake of the lens barrel detected by the first and second shake detection means, to change the angle at which light rays are incident on the imaging element.

Patent document 2 discloses a vari-angle prism (VAP) image stabilizer. Specifically, with this image stabilizer, a VAP filled with a highly refractive liquid and composed of two glass plates connected by a concertina made from a special film is disposed in a group of imaging lenses. In this configuration, image stabilization is performed by respectively angling the two glass plates horizontally and vertically to change the angle of light rays incident on the imaging element.

Patent Document 1: JP 2000-75338A
Patent Document 2: JP H11-183951A

DISCLOSURE OF INVENTION

Problem to be Solved by the Invention

The blurring of captured images due to a small amount of camera shake was not noticeable when imaging elements had few pixels, but nowadays with the higher number of pixels in captured images following the increased pixilation of imaging elements, the blurring of captured images has become noticeable even with only a small amount of camera shake.

On the other hand, there has been a marked increase in the proportion of compact portable devices such as mobile telephones and mobile devices that come equipped with a camera, with there also being a demand for an image stabilization function in the cameras mounted in these devices.

While camcorders and digital still cameras with image stabilizers such as the above are now commercially available, these image stabilizers have an intricate structure and are mechanically large in size, making them unsuitable for miniaturization. Further miniaturization of these image stabilizers would result in an inability to obtain an adequate image stabilization effect. Consequently, conventional image stabilizers are impeding the further miniaturization of digital still cameras, and effectively cannot be mounted in compact portable devices such as mobile telephones and mobile devices.

The present invention, which solves the above problems, has as its object to provide an image stabilizer that makes it possible to reduce the overall size and profile of an imaging apparatus.

Means for Solving Problem

To solve the above problems, an image stabilizer of the present invention is provided with a lens module that holds a lens and an imaging element, a frame structure that turnably supports the lens module, and a driving portion that turns the lens module relative to the frame structure, with the driving portion including a piezoelectric element.

EFFECTS OF THE INVENTION

According to the present invention, an image stabilizer can be provided that makes it possible to reduce the overall size and profile of an imaging apparatus.

BRIEF DESCRIPTION OF DRAWINGS

FIG. 6 is a perspective view showing an exemplary configuration of a bimorph.

FIG. 31 is an external perspective view showing the pitch bimorph fixed to the outer frame.

FIG. 61 is a schematic diagram illustrating the positional relation between the connecting members when assembling the connecting portion according to embodiment 3.

FIG. 62A is a schematic diagram illustrating a method of adjusting the connecting portion when assembling the connecting portion according to embodiment 3.

FIG. 67 is a schematic view showing the piezoelectric element connected to the drive body.

FIG. 68 is a model diagram of a simple cantilever.

DESCRIPTION OF REFERENCE NUMERALS

Figure 1:
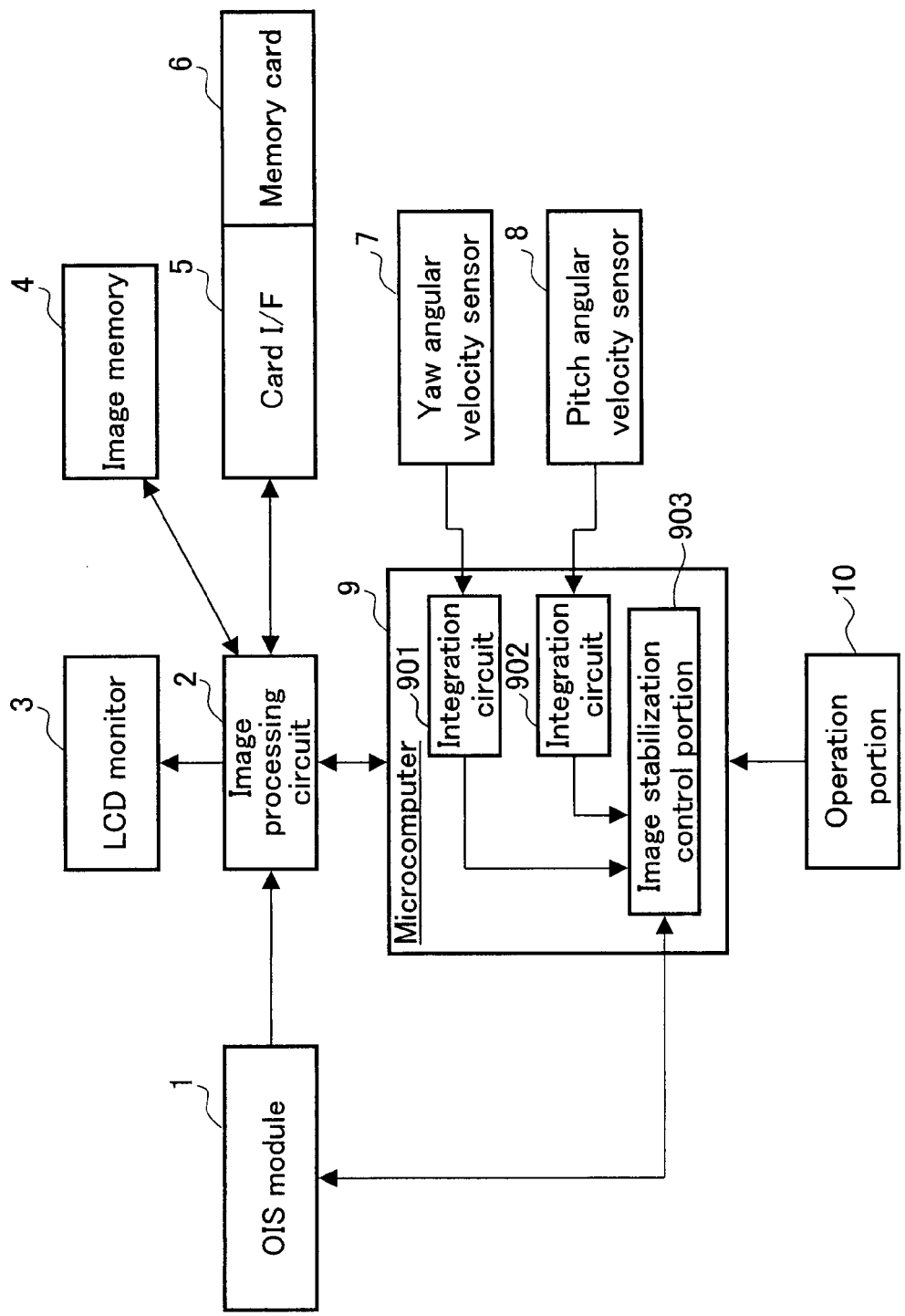
FIG. 1 is a block diagram showing the configuration of a digital camera according to an embodiment of the present invention.

1 module
2 image processing circuit
3 LCD monitor
4 image memory
5 card interface
6 memory card
7 yaw angular velocity sensor
8 pitch angular velocity sensor
9 microcomputer
   901 integration circuit
   902 integration circuit
   903 image stabilization control portion
10 operation portion
11 inner frame
   1101 yaw bearing
   1102 yaw pivot pin
   1103 leaf spring
   1104 yaw bimorph supporting portion
   1105 pitch pivot pin
   1106 pitch bearing
   1107 leaf spring fixing portion
   1108 yaw pivot pin insertion hole
   1109 magnet attachment portion
   1110 yaw pivot pin insertion groove
   1111 stopper receiver
   1120 hall element unit
      1120$a$ hall element base
      1120$b$ hall element
   1121 magnet
12 outer frame
   1201 pitch bimorph supporting portion
   1202 leaf spring
   1220 hall element unit
13 pitch bimorph
14 yaw bimorph
   1401 intermediate electrode plate
   1402 piezoelectric element
   1403 piezoelectric element
   1404 electrode (intermediate electrode plate)
   1405 electrode (piezoelectric element 1402)
   1406 electrode (piezoelectric element 1403)
   1407 connecting wire hole
15 fixing plate
   15$a$, 15$b$ fixing screw
16 connecting wire (pitch)
17 fixing plate
   17$a$, 17$b$ fixing screw
18 connecting wire (yaw)
19 flexible substrate
101 lens module
   1010 CCD image sensor
   1011 shutter unit
      1011$a$ shutter motor
      1011$b$ shutter aperture
   1012 lens holder
      1012$a$ detection fin
      1012$b$ guide hole
      1012$c$ U-shaped guide
   1013 photo sensor
      1013$a$ light receiving element
      1013$b$ light emitting element
   1014 focus motor
   1015 driving force transmission mechanism
      1015$a$ worm
      1015$b$ worm wheel
      1015$c$ end-face cam
   1016 yaw pivot pin
   1017 yaw bearing
   1018 base
      1018$a$ baffle
      1018$b$ guide pole
      1018$c$ stopper
   1019 magnet
102 pitch direction driving mechanism
103 pitch position sensor
104 yaw direction driving mechanism
105 yaw position sensor
106 drive control portion
   1061, 1062 comparison circuit
   1063, 1064 lead-lag filter
   1065, 1066 amplifier circuit
   1067, 1068 step-up circuit 1069 decoupling compensation circuit
1071, 1072 integration circuit

BEST MODE FOR CARRYING OUT THE INVENTION

With the image stabilizer of the present invention, the driving portion may apply a driving force to the lens module in an optical axis direction. Also, the driving portion may be disposed rearwardly of the imaging element.

Further, the frame structure may include an inner frame that turnably supports the lens module about a first turning axis, and an inner frame supporting body that turnably supports the inner frame about a second turning axis orthogonal to the first turning axis. The driving portion may include a first piezoelectric element that turns the lens module about the first turning axis and a second piezoelectric element that turns the inner frame about the second turning axis, and the first and second piezoelectric elements may be disposed so as to at least partially overlap when viewed in an optical axis direction.

Embodiment 1

1. Configuration of Digital Camera

The configuration of a digital camera according to the present embodiment will be described firstly.

1-1. Overall Configuration

FIG. 1 is a block diagram showing the configuration of a digital camera according to the present embodiment. The digital camera of the present embodiment includes an OIS (optical image stabilizer) module 1, an image processing circuit 2, an LCD (liquid crystal display) monitor 3, an image memory 4, a card interface 5, a memory card 6, a yaw angular velocity sensor 7, a pitch angular velocity sensor 8, a microcomputer 9, and an operation portion 10.

The OIS module 1 includes a CCD image sensor (described later). The image processing circuit 2 performs image processing such YC conversion, resolution conversion, and compression conversion on image data generated by the CCD image sensor. The LCD monitor 3 displays image data processed by the image processing circuit 2. The image memory 4 functions as a buffer memory during image processing by the image processing circuit 2. The card interface 5 allows removable insertion of the memory card 6. The memory card 6 records image data processed by the image processing circuit 2 and outputs image data stored therein to the image processing circuit 2 via the card interface 5.

The yaw angular velocity sensor 7 and the pitch angular velocity sensor 8, which are gyro sensors, for example, respectively measure the angular velocity in the yaw and pitch rotational directions of the digital camera. The yaw rotational direction of the digital camera is in the horizontal plane of the digital camera, while the pitch rotational direction of the digital camera is in the vertical plane of the digital camera.

The microcomputer 9 controls the overall operations of the digital camera including the OIS module 1. The microcomputer 9 includes integration circuits 901 and 902. The integration circuits 901 and 902 integrate the AC component of the angular velocity data measured respectively by the yaw angular velocity sensor 7 and the pitch angular velocity sensor 8. The microcomputer 9 thereby recognizes the output of the integration circuits 901 and 902 as the angle to which the digital camera has moved. This movement angle equates to the amount of camera shake. An image stabilization control portion 903 controls the OIS module 1, based on the output of the integration circuits 901 and 902.

Specifically, the image stabilization control portion 903 controls the OIS module 1 to rotate in the opposite direction so as to cancel out the angle to which the digital camera has moved. The distortion of light rays from the subject incident on the OIS module 1 thereby can be suppressed even if there is camera shake, since the OIS module 1 rotates to cancel out the camera shake. Blurring of images captured by the OIS module 1 can thus be reduced. The operation portion 10 is an interface that receives instructions given to the digital camera from a user.

1-2. Configuration of OIS Module

The configuration of the OIS module 1 will be described next.

Figure 2:
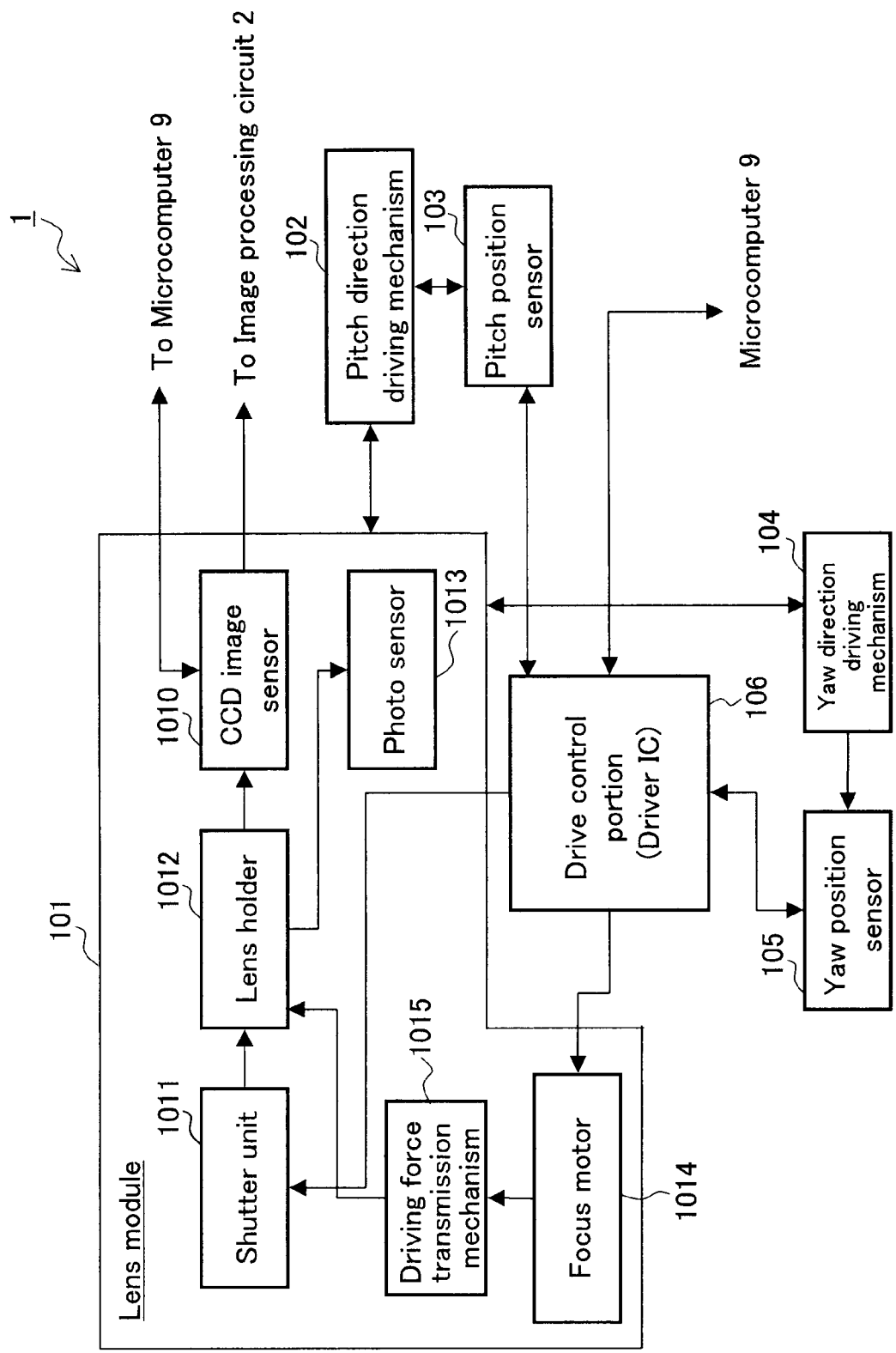
FIG. 2 is a block diagram showing the configuration of an OIS module provided in a digital camera according to an embodiment of the present invention.

FIG. 2 is a block diagram showing the configuration of the OIS module 1. The OIS module 1 includes a lens module 101, a pitch direction driving mechanism 102 for rotating the lens module 101 in the pitch direction, a pitch position sensor 103 for detecting the position in the pitch direction of an inner frame (described later) that supports the lens module 101, a yaw direction driving mechanism 104 for rotating the lens module 101 in the yaw direction, a yaw position sensor 105 for detecting the position of the lens module 101 in the yaw direction, and a drive control portion 106 for controlling the operations of the OIS module 1.

The lens module 101 includes a CCD image sensor 1010, a shutter unit 1011, a lens holder 1012, a photo sensor 1013, a focus motor 1014, and a driving force transmission mechanism 1015. These constituent elements are integrated as the lens module 101, which is rotatable in the pitch and yaw directions. Note that while a digital camera that includes a shutter unit and a focus motor is illustrated in the present embodiment, the shutter unit and the focus motor may not be required if the present invention is implemented as a mobile telephone with built-in camera, for example.

The shutter unit 1011 includes a mechanical shutter, and opens/closes the shutter under the control of the drive control portion 106. The lens holder 1012 holds the lens. An optical signal from the subject incident via the shutter unit 1011 is collected on the CCD image sensor 1010 by the lens held by the lens holder 1012. The CCD image sensor 1010 converts the optical signal from the subject collected by the lens to an electrical signal and generates image data. The focus motor 1014 moves the lens holder 1012 in the optical axis direction via the driving force transmission mechanism 1015. The distance between the CCD image sensor 1010 and the lens held by the lens holder 1012 thereby can be adjusted, enabling the optical signal collected by the CCD image sensor 1010 to be focused. The photo sensor 1013 detects whether the lens holder 1012 is in a reference position in the optical axis direction, and notifies the drive control portion 106.

The pitch direction driving mechanism 102 includes a holding mechanism for holding the lens module 101, and an actuator for driving the holding mechanism in order to rotate the lens module 101 in the pitch direction. The yaw direction driving mechanism 104 includes a holding mechanism for holding the lens module 101, and an actuator for driving the holding mechanism in order to rotate the lens module 101 in the yaw direction.

The drive control portion 106 controls the electronic components in the lens module 101 other than the CCD image sensor 1010 by receiving control signals from the microcomputer 9, and receives data from these electronic components and transmits the received data to the microcomputer 9. Note that the drive control portion 106 can be realized as an IC chip, and preferably is provided externally relative to the lens module 101, such as on the surface of a flexible substrate (described later) that connects the lens module 101 with the microcomputer 9, for example.

Figure 3:
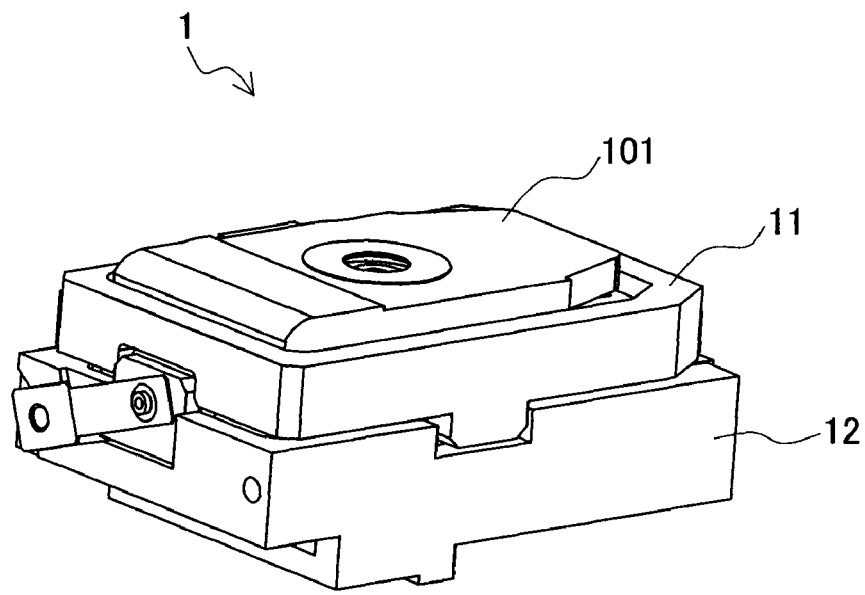
FIG. 3 is a perspective view showing the external appearance of the OIS module.
Figure 4:
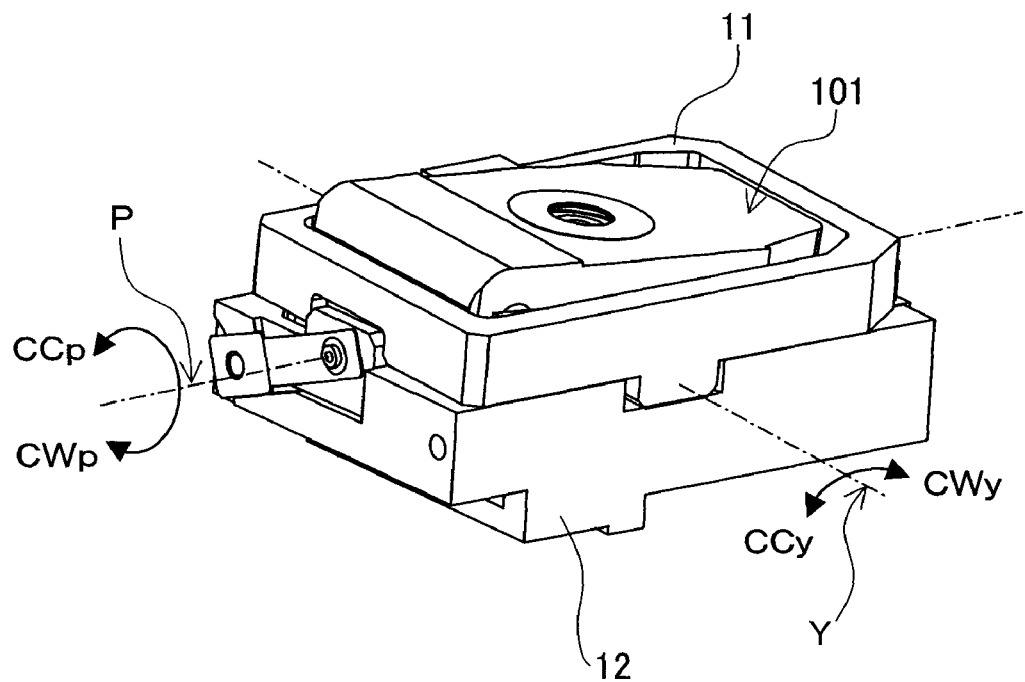
FIG. 4 is a perspective view showing the external appearance of the OIS module.

FIG. 3 is an external perspective view of the OIS module 1 as seen from the subject. The lens module 101 is held in an inner frame 11 so as to be rotatable in the yaw rotational direction (see FIG. 4). Specifically, the inner frame 11 is a frame structure having a larger opening than the outer shape of the lens module 101 which is pivotally supported turnably within the opening in the inner frame 11. The inner frame 11 is held in an outer frame 12 so as to be rotatable in the pitch rotational direction (FIG. 4). The outer frame 12 is a frame structure whose outer shape is substantially the same size as the inner frame 11, and is disposed rearwardly of the inner frame 11. The outer frame 12 is fixed to the casing of the digital camera. The inner frame 11 constitutes part of the yaw direction driving mechanism 104, and the outer frame 12 constitutes part of the pitch direction driving mechanism 102. The OIS module 1 is fixed so that the yaw axis is aligned with the vertical axis of the camera and the pitch axis is aligned with the horizontal axis of the camera.

FIG. 4 is an external perspective view showing the lens module 101 rotated relative to the inner frame 11, and the inner frame 11 turned relative to the outer frame 12 from the state shown in FIG. 3. In FIG. 4, the lens module 101 rotates on the yaw turning axis Y in the CWy direction in FIG. 4 relative to the inner frame 11. The inner frame 11 rotates on the pitch turning axis P in the CWp direction in the figure relative to the outer frame 12, while supporting the lens module 101.

Rotating the lens module 101 about the yaw turning axis Y relative to the inner frame 11, and rotating the inner frame 11 together with the lens module 101 about the pitch turning axis P relative to the outer frame 12 has the following advantages. Specifically, in the case of the lens module 101 of the present embodiment, the yaw turning axis Y is parallel with the short side of the lens module 101, and the pitch turning axis P is parallel with the long side of the lens module 101. Consequently, the inertia moment about the yaw turning axis Y of the lens module 101 is greater than the inertia moment about the pitch turning axis P. Therefore, rotating only the lens module 101 about the yaw turning axis Y, and rotating both the inner frame 11 and the lens module 101 about the pitch turning axis P enables the difference in the inertia moments about the yaw turning axis Y and the pitch turning axis P to be reduced. Driving forces thereby are provided about two axes, enabling the overall driving force required for the apparatus to be reduced as a result. Furthermore, the driving forces about the two axes can be equalized by designing the lens module 101, the inner frame 11, and the outer frame 12 so that the inertia moment about the yaw turning axis Y and the inertia moment about the pitch turning axis P are equal, which is more preferable. For example, the lens module 101, the inner frame 11, and the outer frame 12 more preferably are designed so that the difference in the inertia moments about the yaw turning axis Y and the pitch turning axis P falls within 10% of one of the inertia moments.

Figure 5:
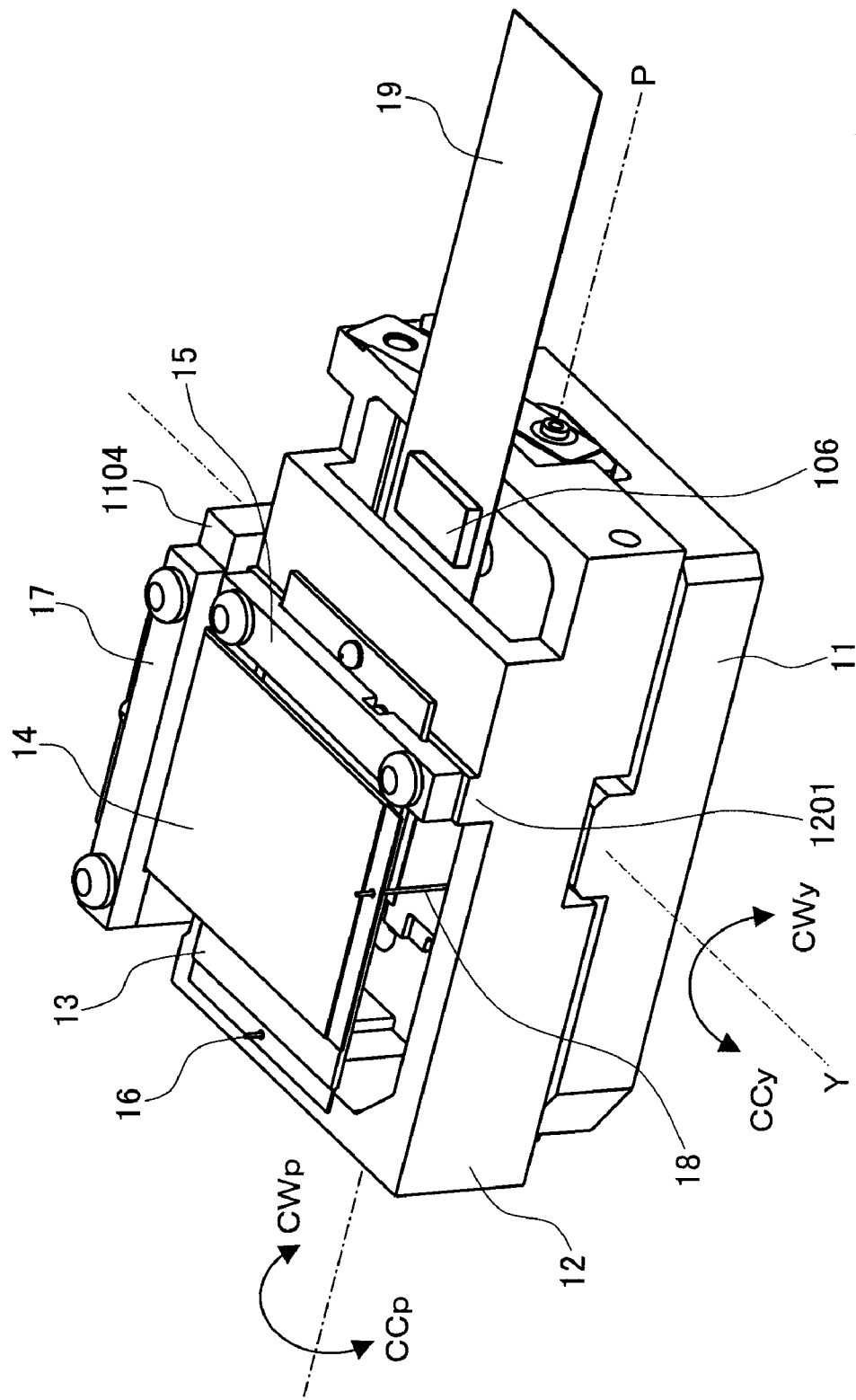
FIG. 5 is a perspective view of the OIS module as seen from the rear.

FIG. 5 is an external perspective view of the OIS module 1 as seen from the rear. The OIS module 1 includes a pitch bimorph 13 that together with the outer frame 12 constitutes the pitch direction driving mechanism 102, and a yaw bimorph 14 that together with the inner frame 11 constitutes the yaw direction driving mechanism 104. Note that the CCD image sensor 1010 (not shown in FIG. 5) is the most rearwardly positioned component in the lens module 101, and is disposed inwardly of the pitch bimorph 13 and the yaw bimorph 14 (see FIG. 10).

The pitch bimorph 13 is fixed to the outer frame 12 by a fixing plate 15 on one side, and coupled to the inner frame 11 via a connecting wire 16 on the opposite side. A driving force can thereby be applied that rotates the inner frame 11 in the pitch direction relative to the outer frame 12.

In contrast, the yaw bimorph 14 is fixed to the inner frame 11 by a fixing plate 17 on one side, and coupled to the lens module 101 via a connecting wire 18 on the opposite side. A driving force can thereby be applied for rotating the lens module 101 in the yaw direction relative to the outer frame 12 and the inner frame 11.

In the present embodiment, the same size bimorphs are used for the pitch bimorph 13 and the yaw bimorph 14. Members thereby can be shared, enabling cost reductions to be achieved. Note that while the yaw bimorph 14 is fixed to a yaw bimorph supporting portion 1104 formed on the outermost frame of the inner frame 11, the pitch bimorph 13 is fixed to a pitch bimorph supporting portion 1201 formed in a beam shape inwardly of the outermost frame of the outer frame 12. Fixing the pitch bimorph 13 to the beam-shaped pitch bimorph supporting portion 1201 thus allows the same sized bimorphs to be used for the pitch bimorph 13 and the yaw bimorph 14. Further, the rigidity of the outer frame 12 also is improved as a result of the pitch bimorph supporting portion 1201 for fixing the pitch bimorph 13 functioning as a beam relative to the outer frame 12.

A flexible substrate 19 has the CCD image sensor 1010 and the drive control portion 106 mounted thereon, and is connected electrically to the photo sensor 107 and the focus motor 1014. The flexible substrate 19 is routed from the OIS module 1 as shown in FIG. 5, and the end of the routed portion (not shown) is connected to the body of the digital camera. Consequently, the OIS module 1 is connected electrically to the digital camera body via the flexible substrate 19. The flexible substrate 19 is fixed to the lens module 101 so that at least the CCD image sensor 1010 is fixed to the lens holder 1012.

Preferably the surface of the flexible substrate 19 is horizontal to the two turning axes (pitch turning axis P, yaw turning axis Y) in proximity to the OIS module 1 (portion routed from the OIS module 1), as shown in FIG. 5. This is to reduce the load exerted by the flexible substrate 19 when the lens module 101 and the inner frame 11 turn about these axes. The flexible substrate 19 is run parallel to the pitch turning axis P and parallel to the yaw turning axis Y. However, the flexible substrate 19, not being limited to this, may be run at 45 degrees to the pitch turning axis P and the yaw turning axis Y, for example. This is preferable because the torque resistance exerted by the flexible substrate 19 when run in this direction can be equalized about the pitch turning axis P and the yaw turning axis Y.

As shown in FIG. 5, the drive control portion 106 preferably is external to the lens module 101, and preferably is disposed in proximity to the lens module 101 (surface of the flexible substrate 19 in proximity to the lens module 101 in FIG. 5 example). Providing the drive control portion 106 externally to the lens module 101 enables the number of lines run from the lens module 101 to be reduced. That is, it is possible to prevent the turning of the lens module 101 from being inhibited due to an increase in the thickness of the flexible substrate 19 run from the lens module 101.

The yaw bimorph 14 and the pitch bimorph 13 will be described here. FIG. 6 is a perspective view showing an exemplary configuration of the yaw bimorph 14. Since the pitch bimorph 13 of the present embodiment is the same shape as the yaw bimorph 14 as aforementioned, only the yaw bimorph 14 will be described here.

The yaw bimorph 14, as shown in FIG. 6, is an electronic component in which two piezoelectric elements 1402 and 1403 (first and second driving portion) sandwich an intermediate electrode plate 1401. The piezoelectric elements 1402 and 1403 are ceramic plates. The short side of the intermediate electrode plate 1401 is equal in length to the piezoelectric elements 1402 and 1403, while the long side is longer than the piezoelectric elements 1402 and 1403. The intermediate electrode plate 1401 and the piezoelectric elements 1402 and 1403 are laminated together so that both ends of the intermediate electrode plate 1401 in the long direction are exposed. An electrode 1404 is provided on one of the exposed ends of the intermediate electrode plate 1401, while a hole 1407 is formed in the other end for passing through a connecting wire 18. Electrodes 1405 and 1406 are provided respectively on the piezoelectric elements 1402 and 1403.

Figure 7A:
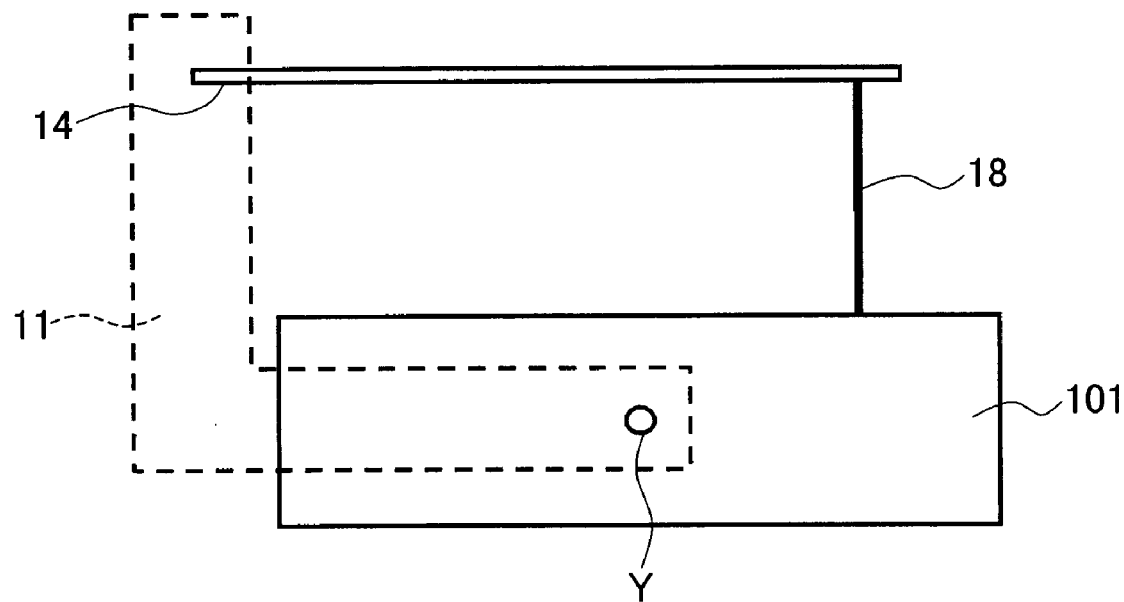
FIG. 7A is a schematic view showing the inner frame or the lens module having been rotated by a bimorph.

When a prescribed voltage is applied to the electrode 1404 of the intermediate electrode plate 1401 with the electrodes 1405 and 1406 of the piezoelectric elements 1402 and 1403 grounded, one of the piezoelectric elements 1402 and 1403 expands while the other one contracts, warping the yaw bimorph 14 along its entirety. As shown in FIG. 7A, the yaw bimorph 14 is fixed to the inner frame 11 at one end in the long direction (end at which the electrode 1404 is provided), while at the other end in the long direction, one end of the connecting wire 18 is soldered into the hole 1407, and the other end of the connecting wire 18 is fixed to the lens module 101, thereby coupling the yaw bimorph 14 to the lens module 101.

In terms of the connecting wire 18, a wire rod having a certain amount of rigidity and flexibility (springiness) needs to be used to produce the rotational force of the lens module 101 from the warpage of the yaw bimorph 14. Specifically, a crank structure composed of the inner frame 11, the yaw bimorph 14, the connecting wire 18 and the lens module 101 can be constituted as a result of the connecting wire 18 bending and being displaced relative to the yaw bimorph 14 and the lens module 101 when the yaw bimorph 14 warps. This configuration does not require the provision of a rotation mechanism between the connecting wire 18 and the yaw bimorph 14 or between the connecting wire 18 and the lens module 101, thereby enabling the configuration to be simplified.

For the above reasons, preferably stainless steel (SUS) or phosphor bronze is used for the connecting wire 18. Note that it is also possible to use a plate-like member instead of the connecting wire 18. A wire, however, is preferable to a plate-like member in terms of not requiring an installation area. Also, when soldering the connecting wire 18 to the yaw bimorph 14 and the lens module 101, the surface of the connecting wire 18 preferably is plated (solder plating, gold plating, silver plating) to improve the wettability of the solder.

Figure 7B:
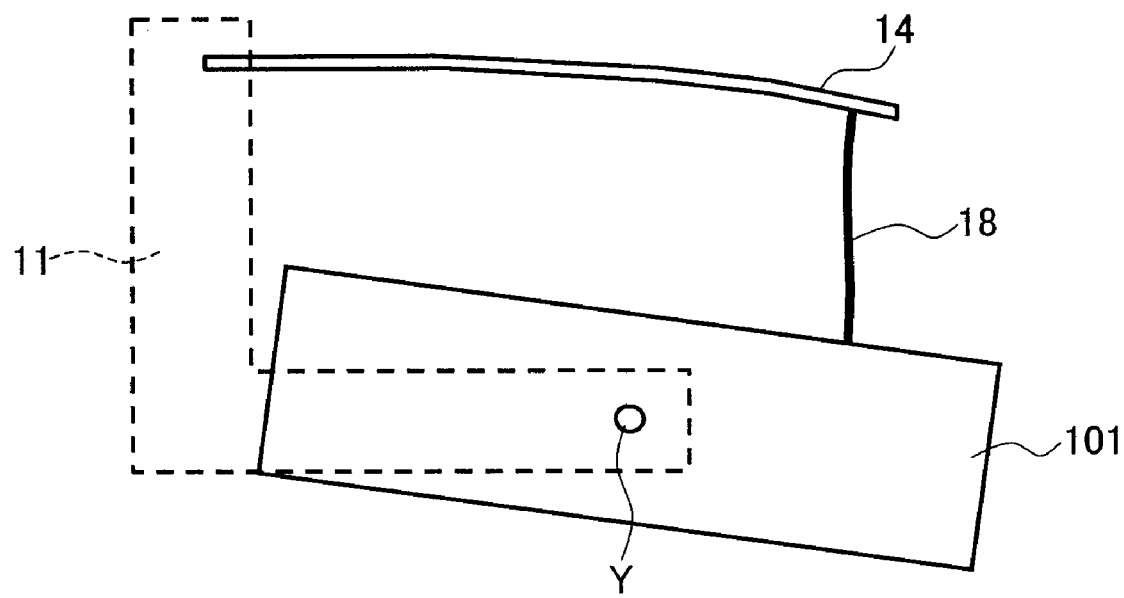
FIG. 7B is a schematic view showing the inner frame or the lens module having been rotated by a bimorph.

With the above configuration, the warpage of the yaw bimorph 14 that occurs as a result of applying a prescribed voltage to the electrode 1404 is utilized to enable the lens module 101 to be rotated about the yaw turning axis Y, as shown in FIG. 7B. The bimorph is advantageous in terms of being able to produce sufficient driving power for rotating the lens module or the like of a digital camera or mobile telephone with built-in camera without enlarging the device, due to the bimorph being lamellar.

Although a specific example of the pitch bimorph 13 and the yaw bimorph 14 has been described above, the configuration for producing driving force in the pitch direction driving mechanism 102 and the yaw direction driving mechanism 104 is not limited only to the aforementioned specific example. For example, while bimorphs with a rectangular planar shape were illustrated in the above embodiment, the shape does not necessarily need to be rectangular. It is also possible to use bimorphs with a triangular planar shape or a trapezoidal planar shape. Generally, the driving force increases with increases in the surface area of the bimorph, although because weight and occupied area also increase, the appropriate bimorph for use can be determined with emphasis given to either driving power or device weight/size.

Bimorphs having an intermediate electrode and two piezoelectric elements were illustrated in the above description, although the bimorphs may have a single piezoelectric element or four piezoelectric elements. Also, electronic components other than bimorphs may be employed as long as a driving force is obtained using piezoelectric elements. Further, a driving portion other than piezoelectric elements (e.g., motors or electrostatic actuators) may be employed.

Figure 8:
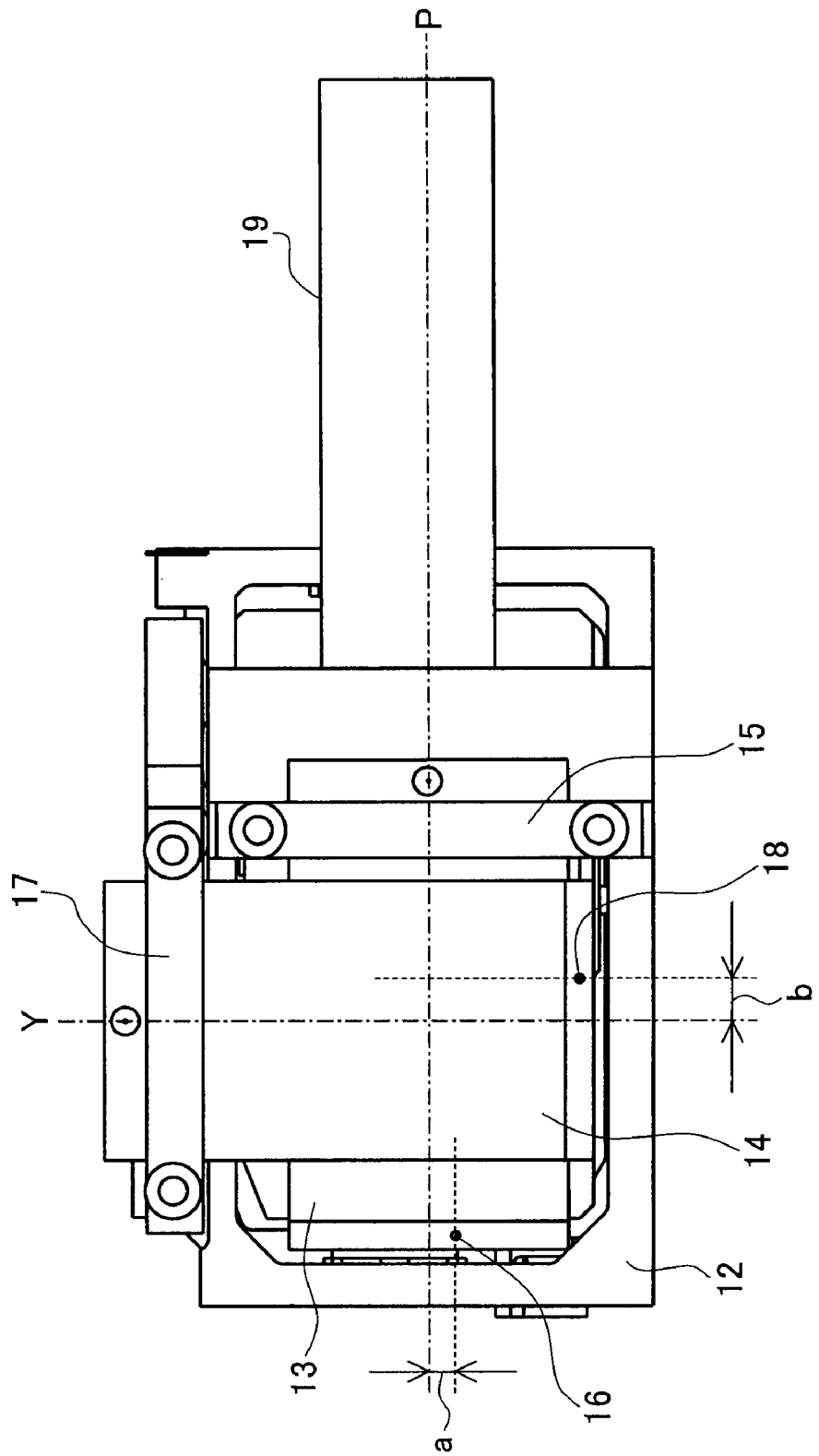
FIG. 8 is a plan view showing positions at which connecting wires are connected to the bimorphs.

FIG. 8 is a plan view of the OIS module 1 as seen from the rear. As shown in FIG. 8, the pitch bimorph 13 and the yaw bimorph 14 are disposed to at least partially overlap when viewed from the optical axis direction of the lens holder 1012, so that their respective long sides are orthogonal. Thus disposing the pitch bimorph 13 and the yaw bimorph 14 enables the area of the digital camera when viewed from the optical axis direction of the lens holder 1012 to be reduced. The pitch bimorph 13 and the yaw bimorph 14 are disposed so that the center of the yaw bimorph 14 in the short direction is aligned with the yaw turning axis Y, while the center of the pitch bimorph 13 in the short direction is aligned with the pitch turning axis P.

The connecting wire 16 coupling the pitch bimorph 13 and the inner frame 11 is fixed in a position removed from the pitch turning axis P by a distance a in the short direction of the pitch bimorph 13. The connecting wire 18 coupling the yaw bimorph 14 and the lens module 101 is fixed in a position removed from the yaw turning axis Y by a distance b in the short direction of the yaw bimorph 14. Note that where the pitch bimorph 13 and the yaw bimorph 14 have a small amplitude, the distances a and b preferably are reduced in order to secure the rotation angle. Note also that the distances a and b may be different or may be equal.

In other words, the distance a is set so that the rotation angle of the inner frame 11 arising from the amplitude of the pitch bimorph 13 satisfies the angle range required by image stabilization when the inner frame 11 is rotated about the pitch turning axis P with the position of the distance a from the pitch turning axis P as the point of action. Specifically, the distance a is set so that the pitch rotation angle of the inner frame 11 when the amplitude of the pitch bimorph 13 is greatest is around 0.5° to 1.50. The distance b is set so that the rotation angle of the lens module 101 arising from the amplitude of the yaw bimorph 14 satisfies the angle range required by image stabilization when the lens module 101 is rotated about the yaw turning axis Y with the position of the distance b from the yaw turning axis Y as the point of action. Specifically, the distance b is set so that the yaw rotation angle of the lens module 101 when the amplitude of the yaw bimorph 14 is greatest is around 0.5° to 1.5°.

Figure 9:
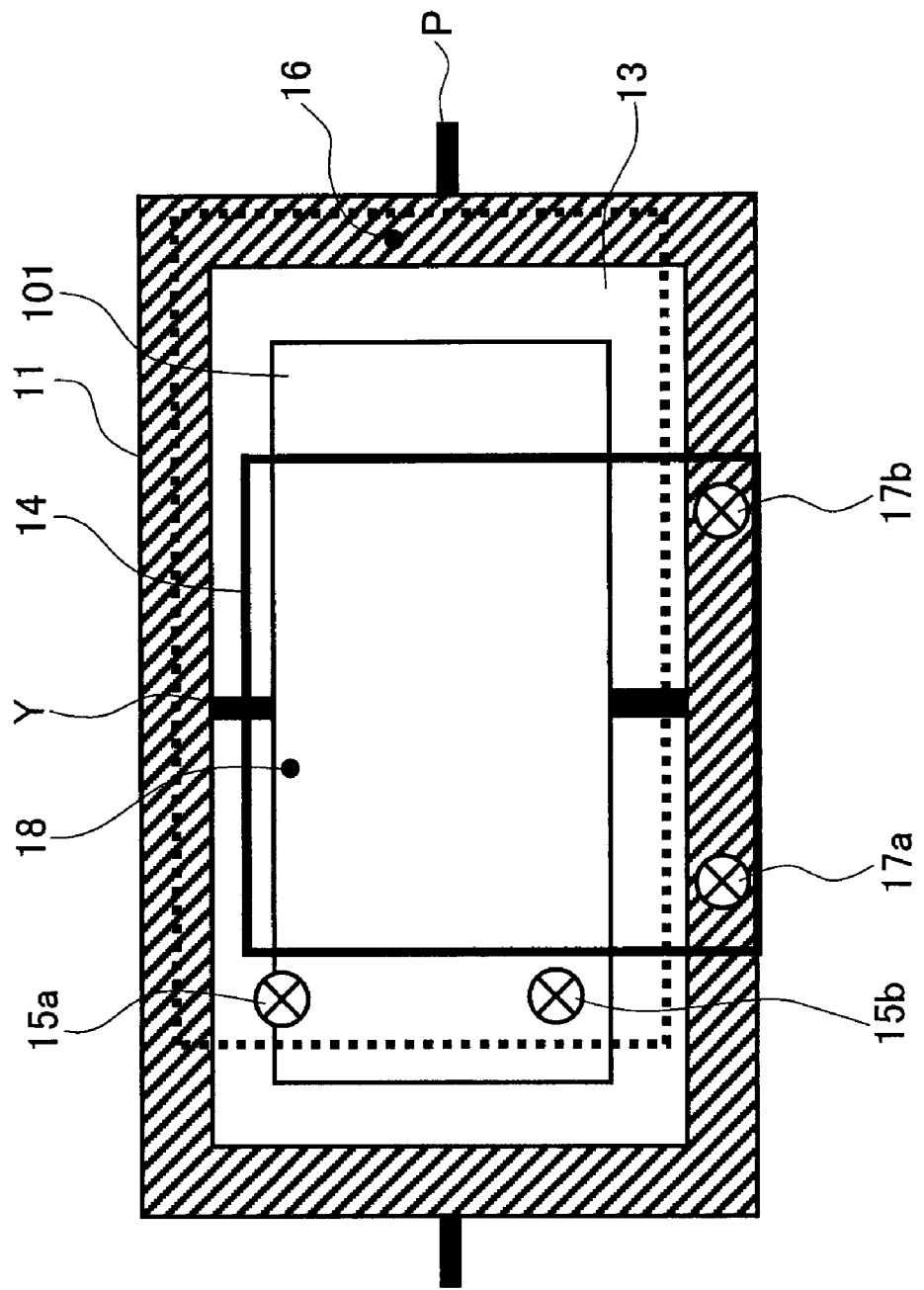
FIG. 9 is a schematic view showing the connection between the lens module and the yaw bimorph, and between the inner frame and the pitch bimorph.

FIG. 9 is a schematic view showing the connection between the lens module 101 and the yaw bimorph 14, and between the inner frame 11 and the pitch bimorph 13. As shown in FIG. 9, the position at which the connecting wire 16 is fixed to the pitch bimorph 13 preferably allows for the largest possible amplitude to be obtained in the pitch bimorph 13. Consequently, the connecting wire 16 is fixed slightly inwardly of the end of the pitch bimorph 13 that is not fixed by the fixing plate 15. The other end of the connecting wire 16 is fixed to the inner frame 11.

Note that logically the largest amplitude in the pitch bimorph 13 is obtained on the short side of the end that is not fixed by the fixing plate 15. In the present embodiment, a through hole is provided slightly inwardly of the short side end, and the connecting wire 16 is passed through this through hole and soldered thereto, in order to secure the fixation strength of the connecting wire 16 to the pitch bimorph 13. Note that in FIGS. 9, 15a and 15b are fixing screws that are fastened to the outer frame 12 (not shown in FIG. 9) via the fixing plate 15.

Similarly, the position at which the connecting wire 18 is fixed to the yaw bimorph 14 preferably allows for the largest possible amplitude to be obtained in the yaw bimorph 14. Consequently, one end of the connecting wire 18 is fixed slightly inwardly of the end of the yaw bimorph 14 that is not fixed by the fixing plate 17. The other end of the connecting wire 18 is fixed to the lens module 101. Similarly to the above, the largest amplitude in the yaw bimorph 14 logically is obtained on the short side of the end that is not fixed by the fixing plate 17. In the present embodiment, a through hole is provided slightly inwardly of the short side end, and the connecting wire 18 is passed through this through hole and soldered thereto, in order to secure the fixation strength of the connecting wire 18 to the yaw bimorph 14. Note that in FIG. 9, fixing screws 17a and 17b are fastened to the inner frame 11 via the fixing plate 17.

Figure 10:
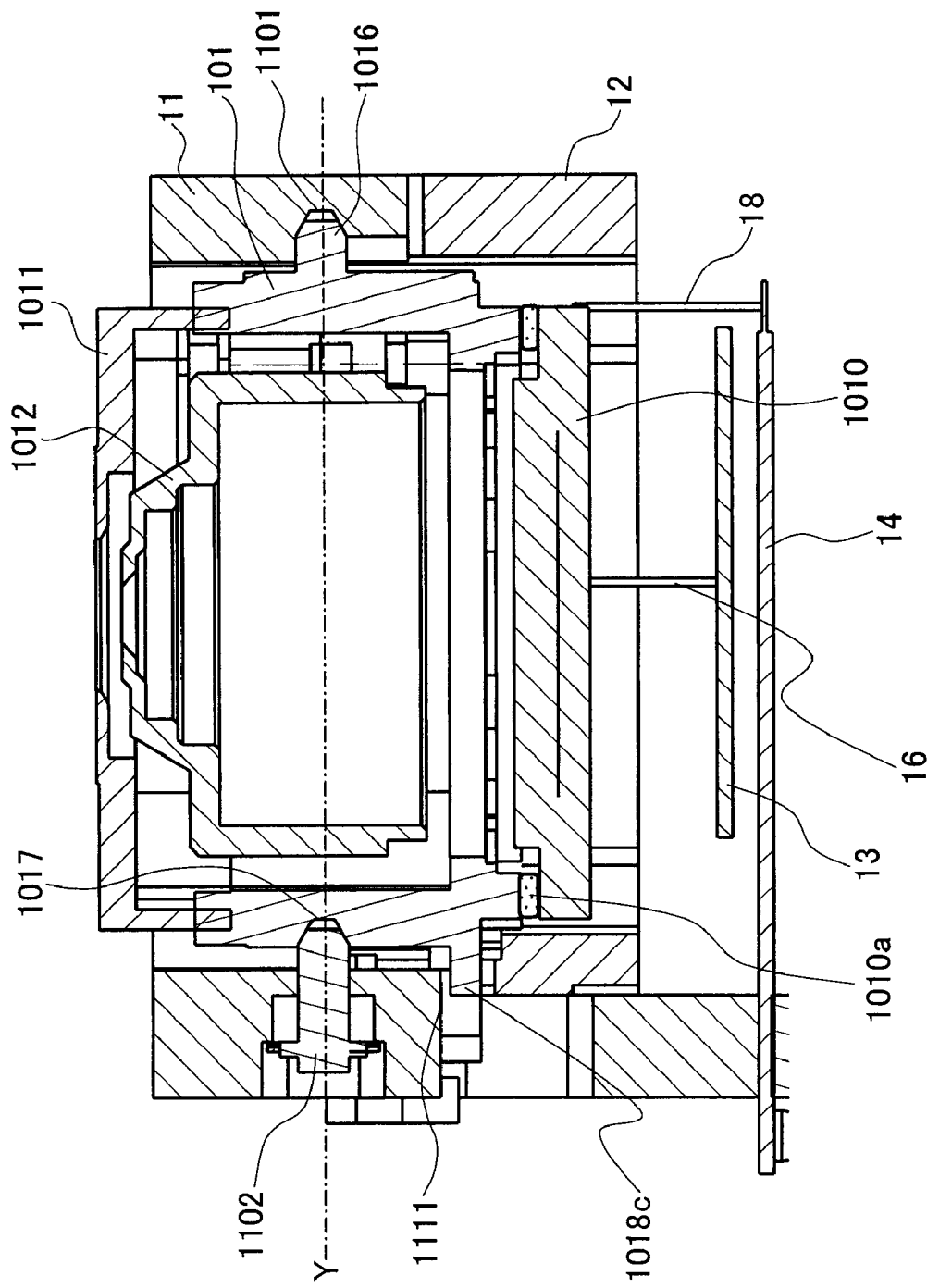
FIG. 10 is a vertical sectional view of the OIS module along the yaw turning axis.
Figure 11:
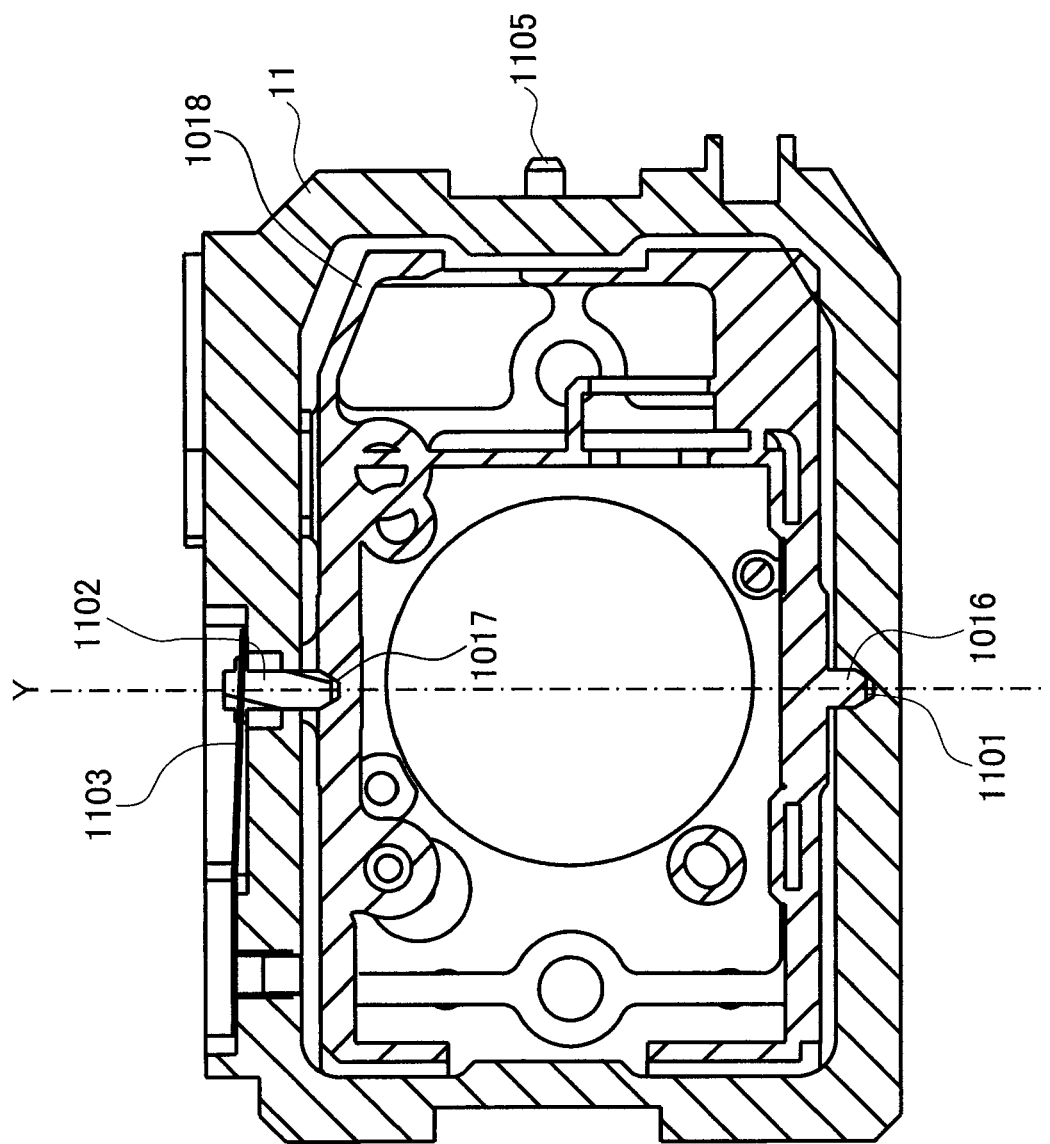
FIG. 11 is a horizontal sectional view of the OIS module along the yaw turning axis.

FIG. 10 is a vertical sectional view of the OIS module 1 along the yaw turning axis Y FIG. 11 is a horizontal sectional view of the OIS module 1 along the yaw turning axis Y. The shutter unit 1011 is held so as to cover the uppermost portion of the OIS lens module 101. The lens holder 1012 is movably held in the vertical direction relative to the lens module 101. As described above, the CCD image sensor 1010 is mounted on the flexible substrate 19 (not shown in FIG. 10) and fixed to the lens holder 1012 by an adhesive 1010a.

A yaw pivot pin 1016 is formed at one end and a yaw bearing 1017 is formed at the other end of the yaw axial portion on the exterior side of the lens module 101. A yaw bearing 1101 is formed at one end and a hole for inserting a yaw pivot pin 1102 is provided at the other end of the yaw axial portion of the inner wall of the inner frame 11. The yaw pivot pin 1016 of the lens module 101 contacts the yaw bearing 1101 of the inner frame 11. The yaw pivot pin 1102 is inserted into the yaw bearing 1017 of the lens module 101, and is biased towards the lens module 101 by a leaf spring 1103 (exemplary biasing means; see FIG. 11). The lens module 101 is thus biased towards the yaw bearing 1101 of the inner frame 11. Play between the lens module 101 and the inner frame 11 thereby can be prevented.

2. Manufacturing Method for OIS Module

A manufacturing method for the OIS module 1 according to the above configuration will be described below.

Figure 12:
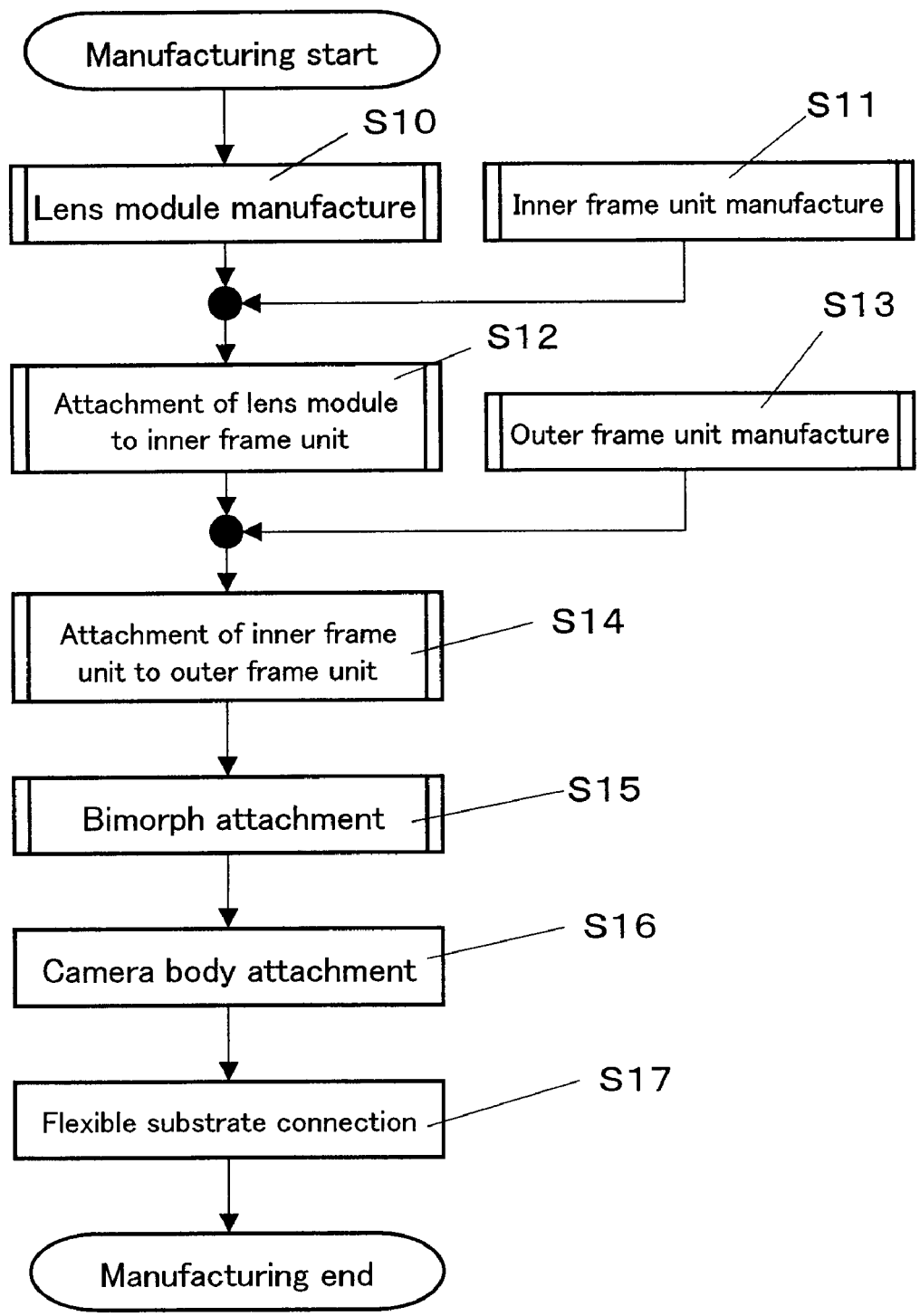
FIG. 12 is a flowchart showing processes for manufacturing the OIS module.

Firstly, the outline of the manufacturing method for the OIS module 1 is described with reference to FIG. 12. FIG. 12 is a flowchart showing the processes for manufacturing the OIS module 1. Firstly, the lens module 101 is manufactured (S10). The inner frame unit is manufactured in parallel with this (S11). Next, the lens module 101 is attached to the inner frame unit (S12). The outer frame unit is manufactured in parallel with this (S13). The outer frame unit is manufactured in a substantially similar manner as the inner frame unit. Next, the inner frame unit is attached to the outer frame unit (S14).

The bimorphs 13 and 14 then are attached to complete the OIS module 1 (S15). Next, the OIS module is fixed to the digital camera body (S16). Finally, the flexible substrate 19 is connected electrically to the digital camera body (S17).

The above processes will be described in detail below.

2-1. Processes for Manufacturing Lens Module.

Figure 13:
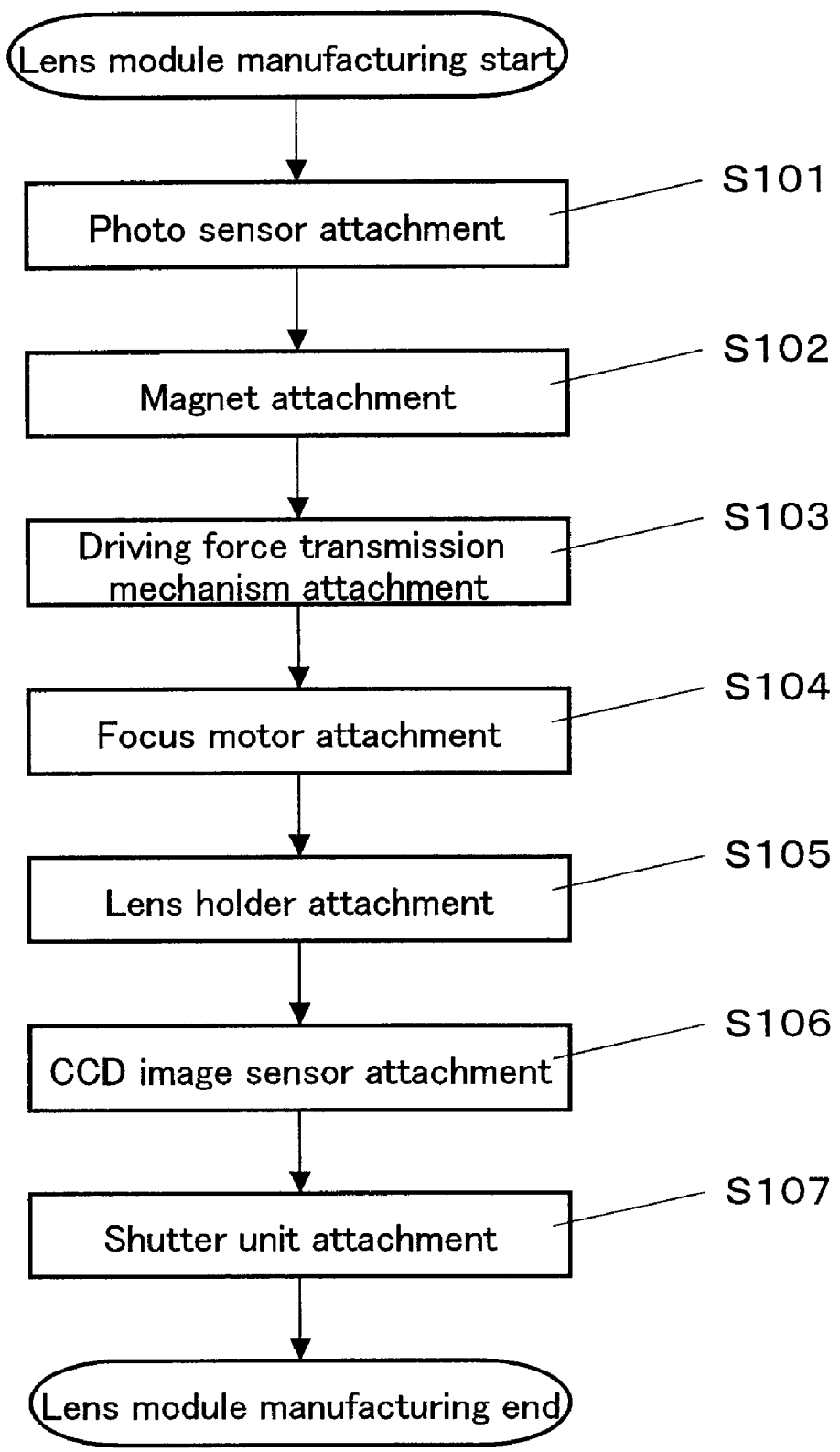
FIG. 13 is a flowchart showing processes for manufacturing the lens module.
Figure 14:
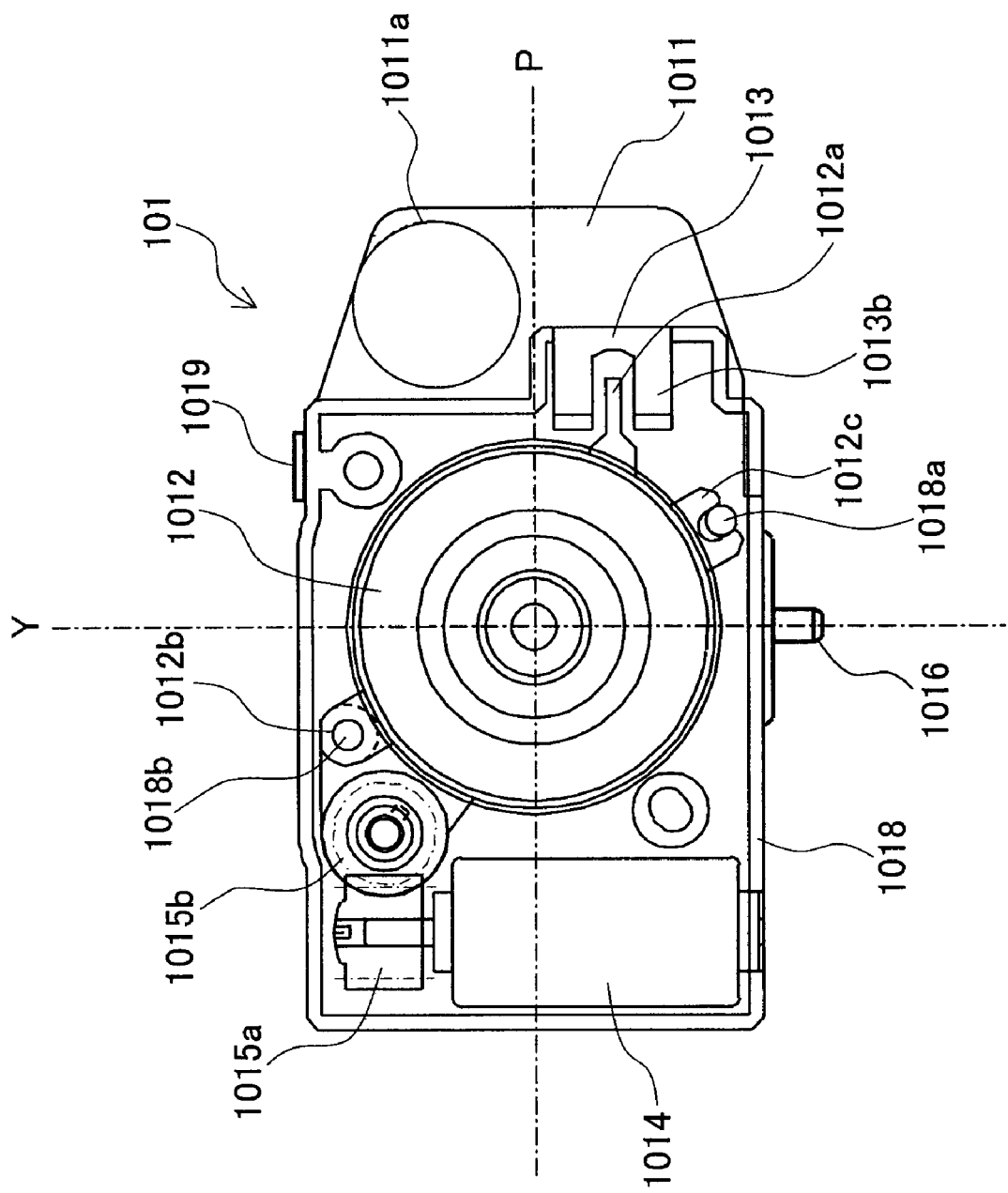
FIG. 14 is a plan view showing the inside of the lens module.
Figure 15:
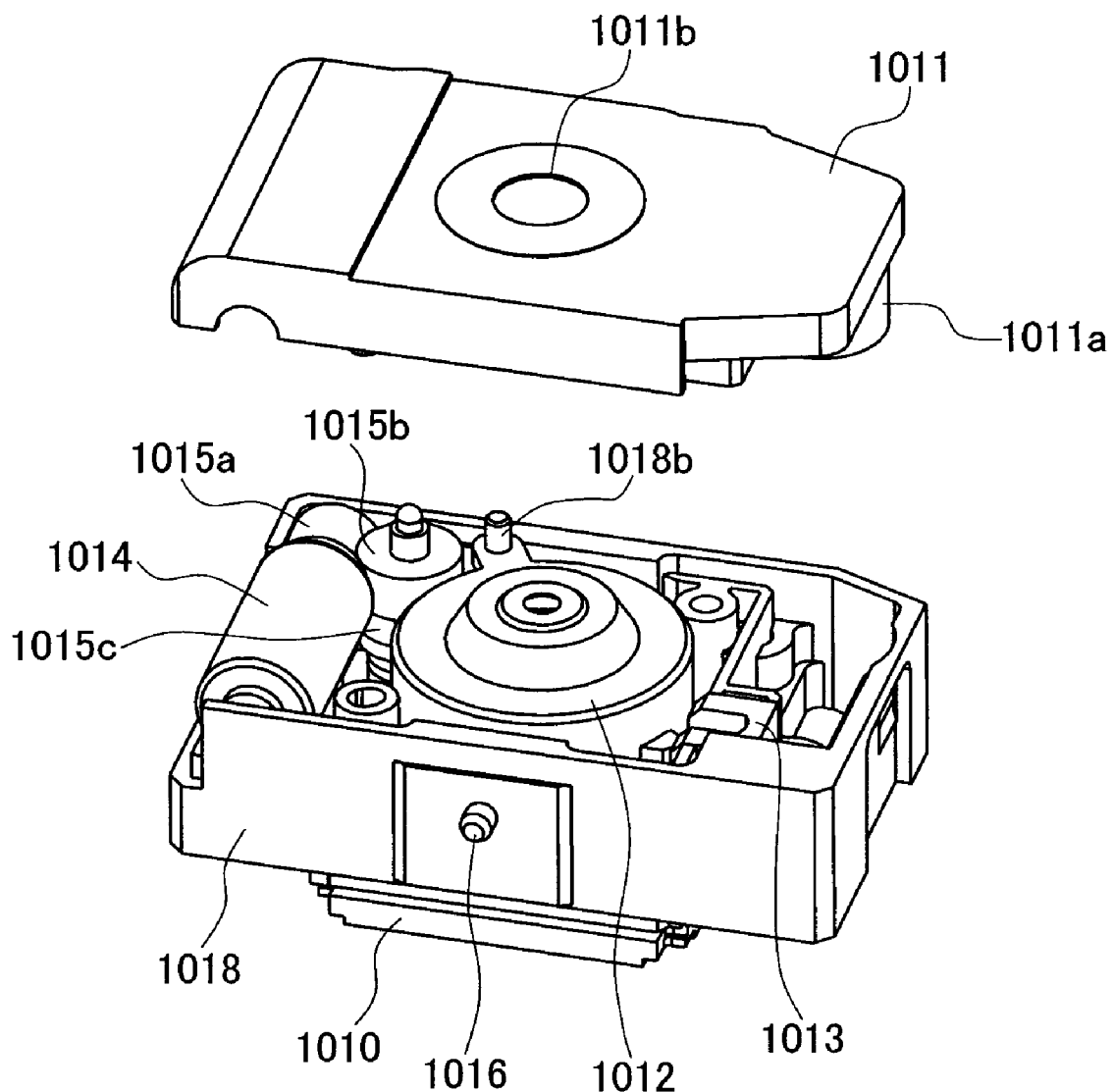
FIG. 15 is an exploded perspective view showing the shutter portion being attached to the lens module.
Figure 16:
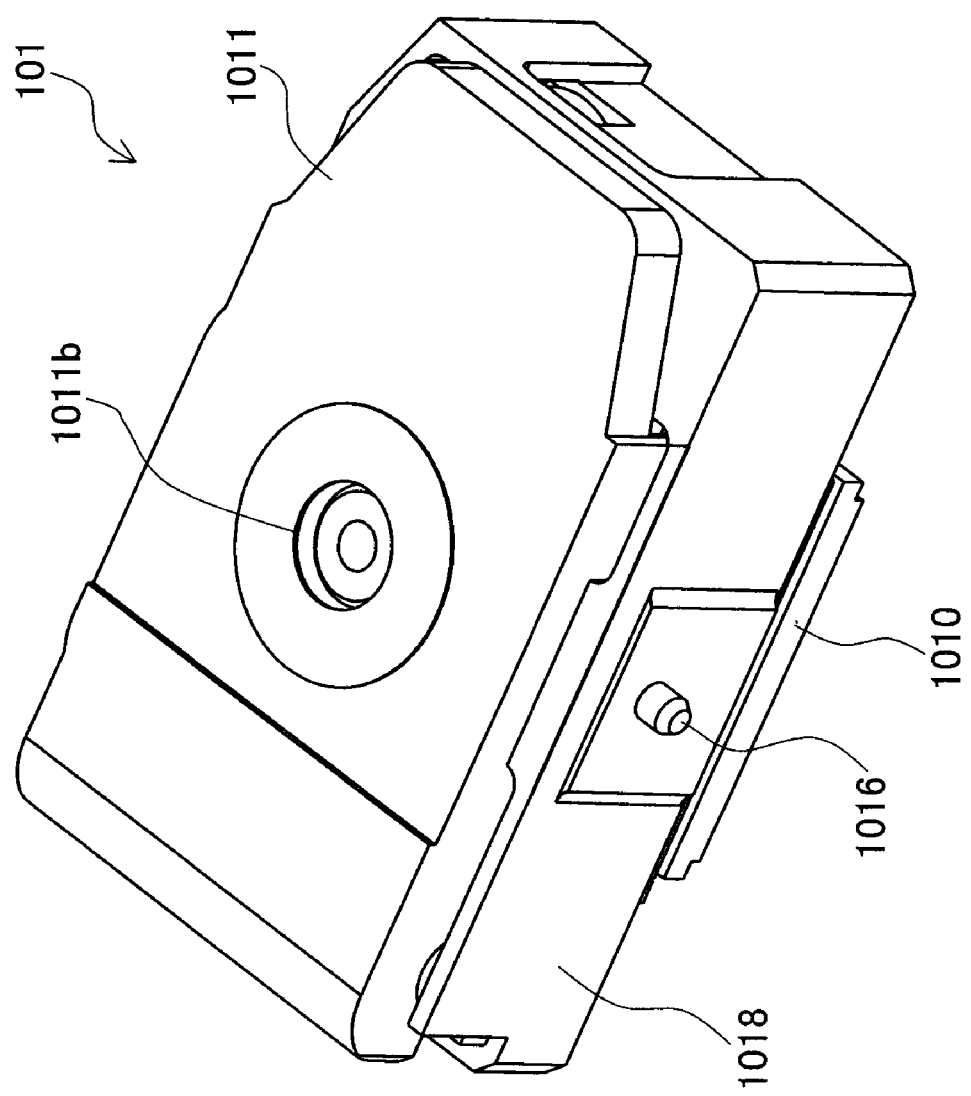
FIG. 16 is a perspective view showing the external appearance of the lens module after completion.

The processes for manufacturing the lens module 101 will be described here, with reference to FIGS. 13 to 16. FIG. 13 is a flowchart showing the manufacturing process for the lens module 101. FIG. 14 is a plan view showing the inside of the lens module 101. FIG. 15 is an exploded perspective view showing the shutter unit 1011 being attached to the lens module 1. FIG. 16 is a perspective view showing the external appearance of the lens module 101 after completion. FIGS. 14 to 16, however, omit description of the flexible substrate 19 on which the CCD image sensor 1010 is mounted.

Firstly, the photo sensor 1013 is attached to a base 1018 of the lens module 101 (S101). The photo sensor 1013 is constituted by a light receiving element 1013a and a light emitting element 1013b. While the lens module 101 is operational, the light emitting element 1013b continues to emit light, and the light receiving element 1013a continues to detect. A detection fin 1012a is able to block the light receiving element 1013a from the light emitting element 1013b. The detection fin 1012a is fixed to the lens holder 1012.

According to this configuration, the detection fin 1012a blocks the light receiving element 1013a from the light emitting element 1013b when the lens holder 1012 is positioned in a reference position, preventing the light receiving element 1013a from detecting the signal light from the light emitting element 1013b. On the other hand, when the lens holder 101 moves upward, the blockage by the detection fin 1012a is removed, allowing the light receiving element 1013a to detect signal light from the light emitting element 1013b. The detection result is transmitted to the microcomputer 9. The microcomputer 9 thus recognizes the state in which the photo sensor 1013 is ON (when the light receiving element 1013a receives signal light from the light emitting element 1013b) as being when the lens holder 1012 is in the reference position.

Note that instead of the photo sensor 1013, a sensor may be used for recognizing the reference position of the lens holder 1012 by mechanically sensing the contact of the detection fin 1012a. This configuration enables the device to be constituted at low cost, since a photo sensor need not be used.

Next, the magnet 1019 is attached to the base 1018 (S102).

Next, driving force transmission means such as a worm wheel 1015b that includes an end-face cam 1015c (see FIG. 15) is attached (S103). These driving force transmission means operate to transmit the driving force of the focus motor 1014 to the lens holder 1012. At this time, the end-face cam 1015c operates to convert the rotational force of the focus motor 1014 to a vertical force, and transfer the vertical force to the lens holder 1012.

Next, the focus motor 1014 is attached (S104). The focus motor 1014 is a driving portion that supplies driving force for moving the lens holder 1012 up and down. A worm 1015a is attached to the rotational axis of the focus motor 1014, and engages the worm wheel 1015b. The lens holder 1012 is driven up and down by the driving force transmitted via the worm 1015a and the worm wheel 1015b.

Next, the lens holder 1012 is attached. A guide hole 1012b and a U-shaped guide 1012c are provided in the lens holder 1012. A guide pole 1018b is inserted into the guide hole 1012b, and at the same time a baffle 1018a is sandwiched in the U-shaped guide 1012c. The guide pole 1018b and the baffle 1018a are fixed to the base 1018. The lens holder 1012 is thereby movable up and down relative to the base 1018, but immovably held at a surface parallel with the bottom face of the base 1018.

Next, the CCD image sensor 1010 is fixed to the base 1018 (S106). The CCD image sensor 1010 is mounted on the flexible substrate 19 (not shown in FIGS. 14 to 16) in advance. The flexible substrate 19 is thus also fixed to the base 1018 at the same time as the CCD image sensor 1010.

Finally, the shutter unit 1011 is attached to the base 1018 (see S107 and FIG. 15) to complete the lens module 101 (FIG. 16). A shutter motor 1011a is attached to the shutter unit 1011 in advance, and a shutter aperture 1011b is formed in the shutter unit 1011.

Note that in relation to attaching the lens holder 1012 to the lens module 101, the lens module 101 preferably is designed so that the optical axis Op of the lens is substantially aligned with the intersection of the yaw turning axis Y and the pitch turning axis P, as shown in FIG. 14. This facilitates auto-focus control because the distance to the subject does not change during image stabilization. Aligning the optical axis Op with the intersection of the turning axes is particularly preferable with image capture in macro mode used to capture close-in subjects. This is because in macro mode, any change in distance to the subject during image stabilization will greatly affect auto-focus control. Note that while the tolerance in terms of displacement between the optical axis Op and the intersection of the turning axes differs depending the distance between the camera and the subject, a displacement within approximately 5 mm is preferable, and within approximately 2 mm is more preferable. 5 mm equates to approximately 20% of the major axis of the lens module 101, while 2 mm similarly equates to approximately 8% of the major axis.

Also, the lens module 101 preferably is designed so that the center of gravity of the lens module 101 is aligned with the intersection of the yaw turning axis Y and the pitch turning axis P. This has the advantage of reducing the inertial moment during image stabilization.

Note that in order to align the center of gravity of the lens module 101 with the intersection of the yaw turning axis Y and the pitch turning axis P, the shutter motor 1011a and the focus motor 1014 preferably are disposed so as to oppose each other with at least one of the pitch turning axis P and the yaw turning axis Y sandwiched therebetween, as shown in FIG. 14. This is because the shutter motor 1011a and the focus motor 1014 are components with a relatively large mass among the constituent components of the lens module 101, so disposing these components to oppose each other with at least one of the pitch turning axis P and the yaw turning axis Y sandwiched therebetween makes it easier to balance the weight of the lens module 101.

2-2. Process for Manufacturing Inner Frame Unit

Figure 17:
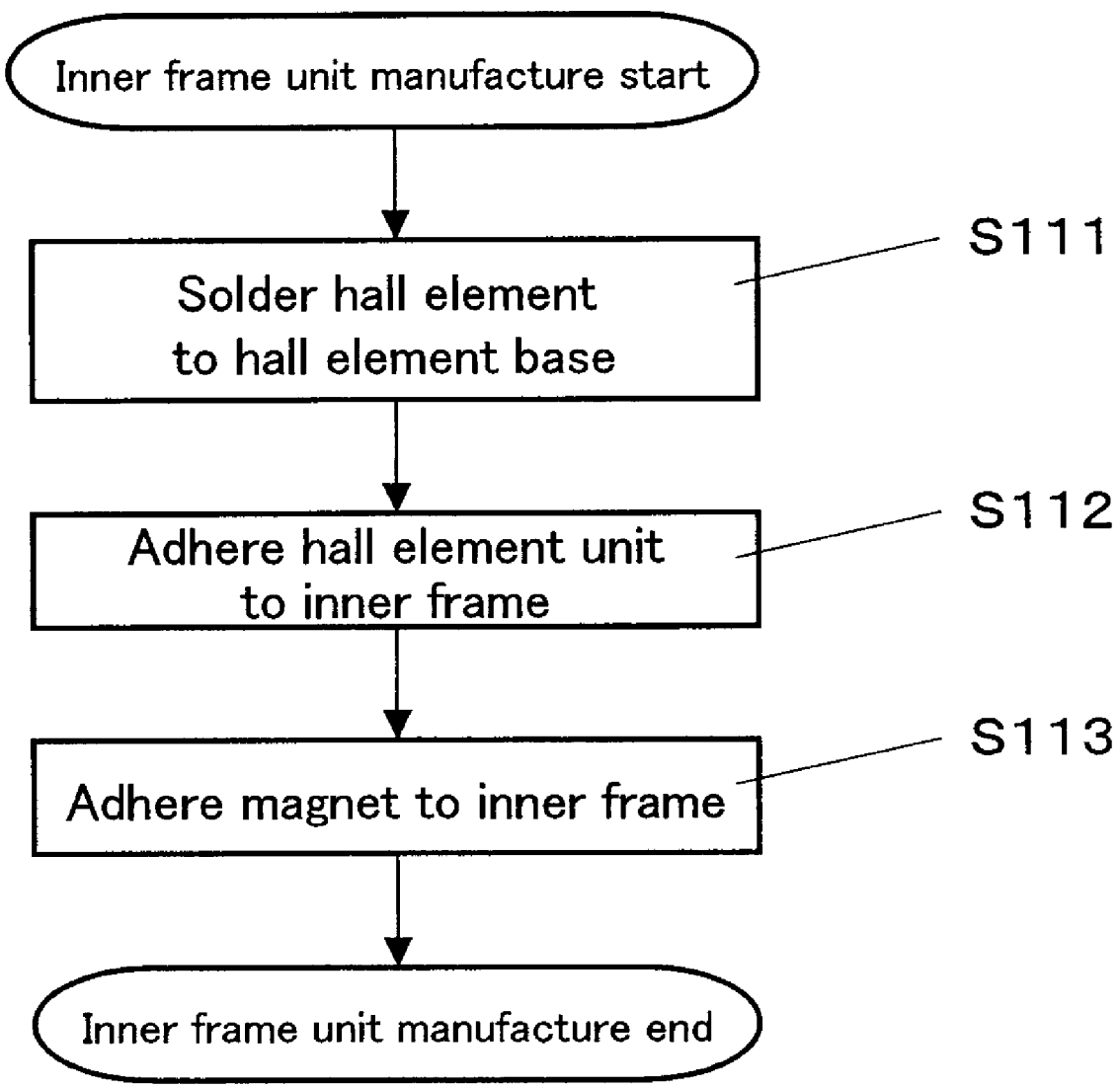
FIG. 17 is a flowchart showing the manufacturing flow for the inner frame unit.
Figure 18:
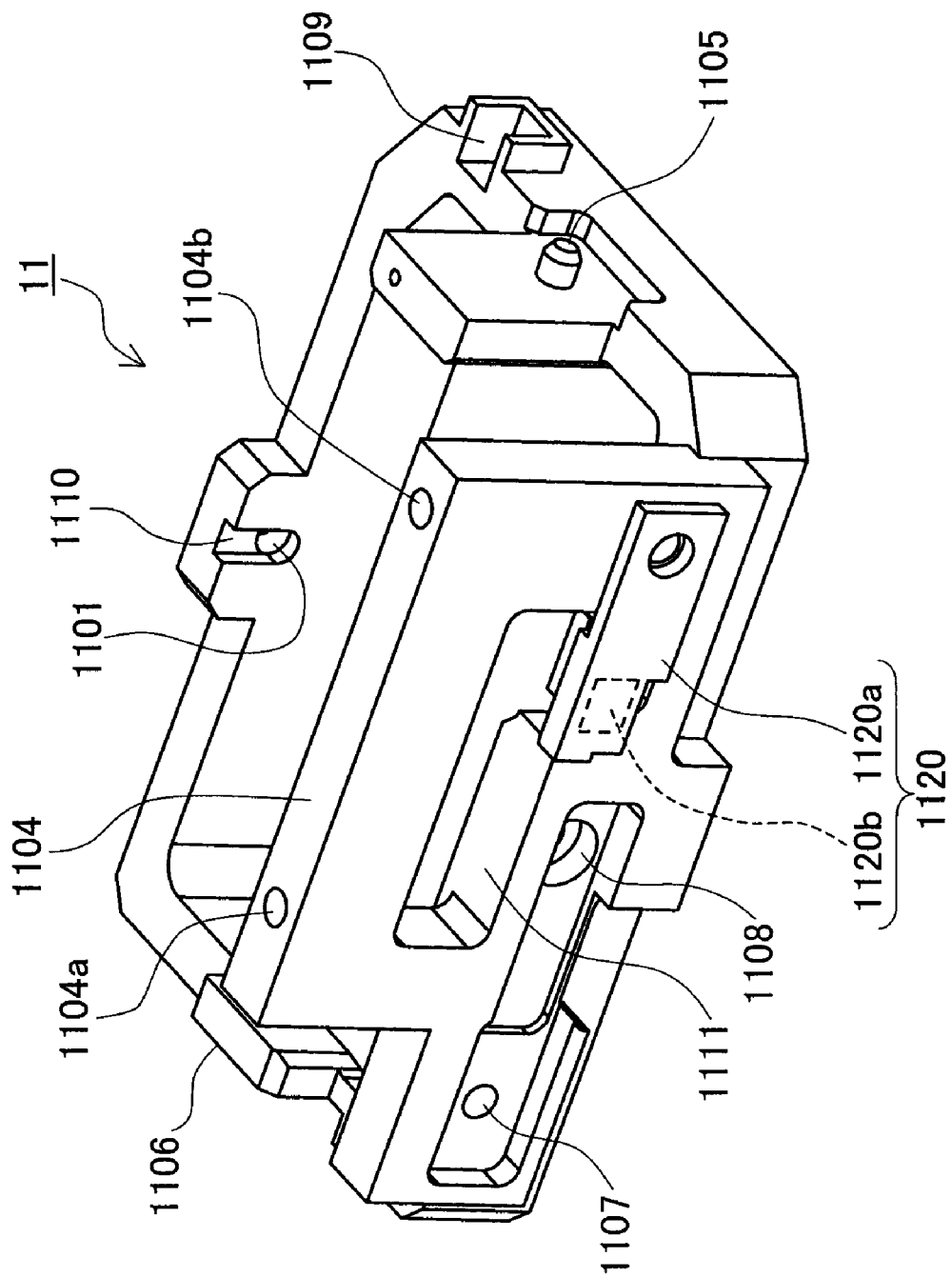
FIG. 18 is an external perspective view of the inner frame unit.

The process for manufacturing the inner frame unit is described next with reference to FIGS. 17 and 18. FIG. 17 is a flowchart showing the manufacturing flow for the inner frame. FIG. 18 is an external perspective view of the inner frame unit.

The inner frame unit is constituted by the inner frame 11, a hall element, and a magnet. The inner frame 11 is molded with resin, and has a yaw bimorph supporting portion 1104, a pitch pivot pin 1105, a pitch bearing 1106, a leaf spring fixing portion 1107, a yaw pivot pin insertion hole 1108, a magnet attachment portion 1109, a yaw pivot pin insertion groove 1110, and a stopper receiver 1111, as shown in FIG. 18.

Note that where a hall element and a magnet are used as a position sensor as aforementioned, a nonmagnetic material such as resin preferably is used for the inner frame 11, the pivot pin and the bearing, in order to improve the detection precision of the sensor. The same applies to the outer frame described later.

The yaw bimorph supporting portion 1104 has screw holes 1104a and 1104b for fastening the fixing screws 17a and 17b to the top thereof. The yaw bimorph supporting portion 1104 is designed so that the surface of the lens module 101 is lower than the height of the yaw bimorph supporting portion 1104 when the lens module 101 is supported by the yaw axis defined by the yaw bearing 1102 and the yaw pivot pin insertion hole 1108.

The leaf spring fixing portion 1107 for fixing the leaf spring 1103 and the yaw pivot pin insertion hole 1108 for inserting the yaw pivot pin 1102 are formed below the yaw bimorph supporting portion 1104.

When creating the inner frame unit, a hall element 1120b (not shown in FIG. 18) firstly is soldered to a hall element base 1120a to make a hall element unit 1120 (S111). Next, the hall element unit 1120 is adhered to a lower portion of the yaw bimorph supporting portion 1104 of the inner frame 11, as shown in FIG. 18 (S112). The hall element 1120b of the hall element unit 1120 (not shown in FIG. 18) opposes the magnet 1019 of the lens module 101 when the lens module 101 later is attached to the inner frame unit, and outputs a position detection signal in accordance with the displacement of the magnet 1019. Specifically, the hall element 1120b equates to the yaw position sensor 105 (see FIG. 2).

Finally, a magnet 1121 (not shown in FIG. 18; see FIG. 27) is adhered to the magnet attachment portion 1109 of the inner frame 11 (S113). The magnet 1121 opposes the hall element of a hall element unit 1220 (not shown in FIG. 18; see FIG. 27) attached to the outer frame 12 when the inner frame unit is later attached to the outer frame 12. The hall element attached to the outer frame 12 thereby outputs a position detection signal in accordance with the displacement of the magnet 1121 of the inner frame 11. Specifically, the hall element of the hall element unit 1220 attached to the outer frame 12 equates to the pitch position sensor 103 (see FIG. 2).

Attaching magnets to the position detection objects (lens module 101, inner frame 11) and providing hall elements as position sensors on members opposed thereto, as aforementioned, enables the routing of wiring necessary for the extraction of detection results from the position sensors to be simplified. Specifically, not providing position sensors on the movable lens module 101 or inner frame 11 prevents any decease in driving force caused by wiring from the position sensors getting in the way.

Note that the hall elements as the yaw position sensor 105 and the pitch position sensor 103 preferably are disposed in positions that do not overlap on a plane with the shutter motor 1011a and the focus motor 1014. This is to prevent magnetic field interference.

2-3. Attachment Process for Lens Module

Figure 19:
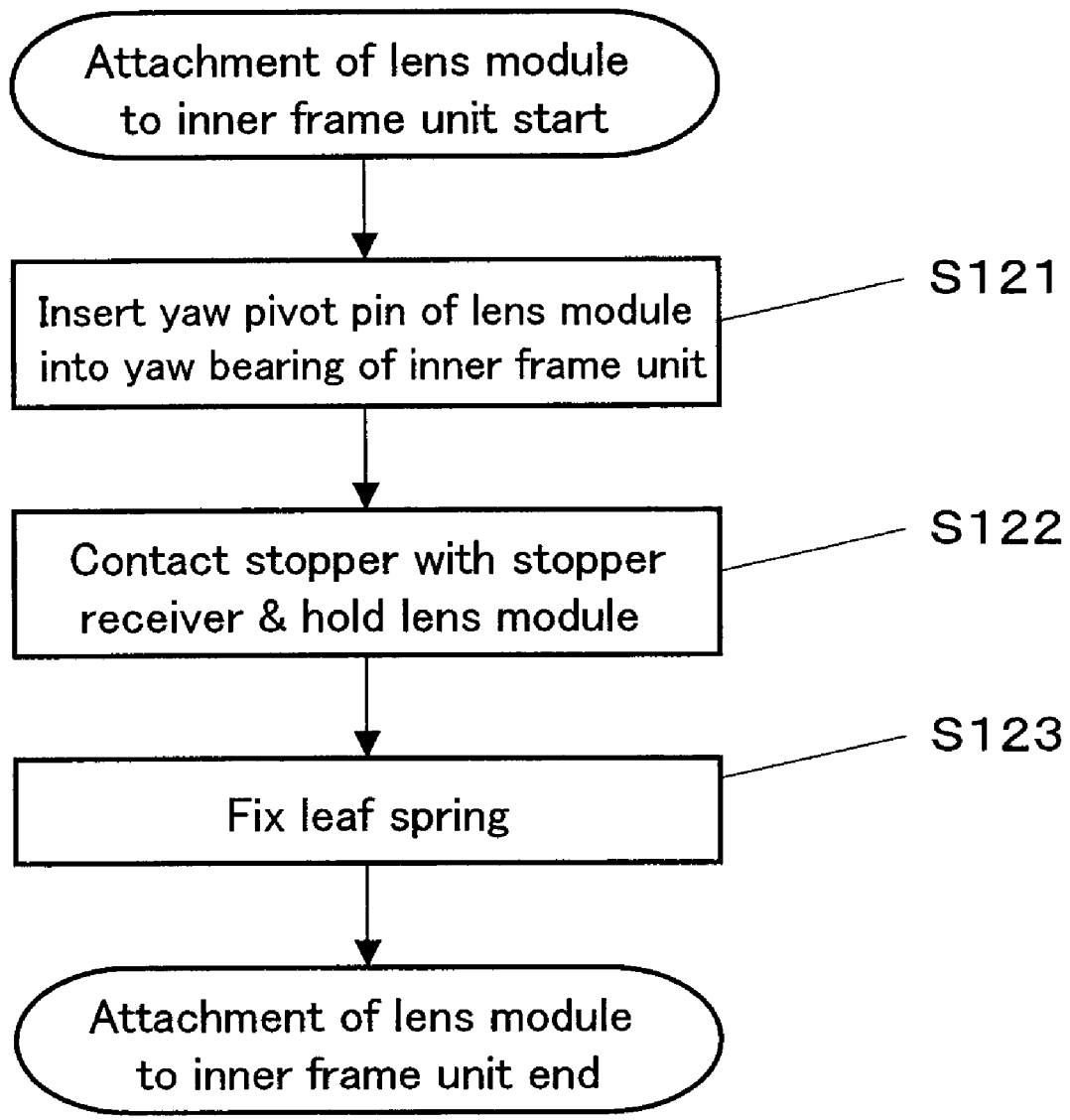
FIG. 19 is a flowchart showing the process flow for attaching the lens module to the inner frame unit.
Figure 20:
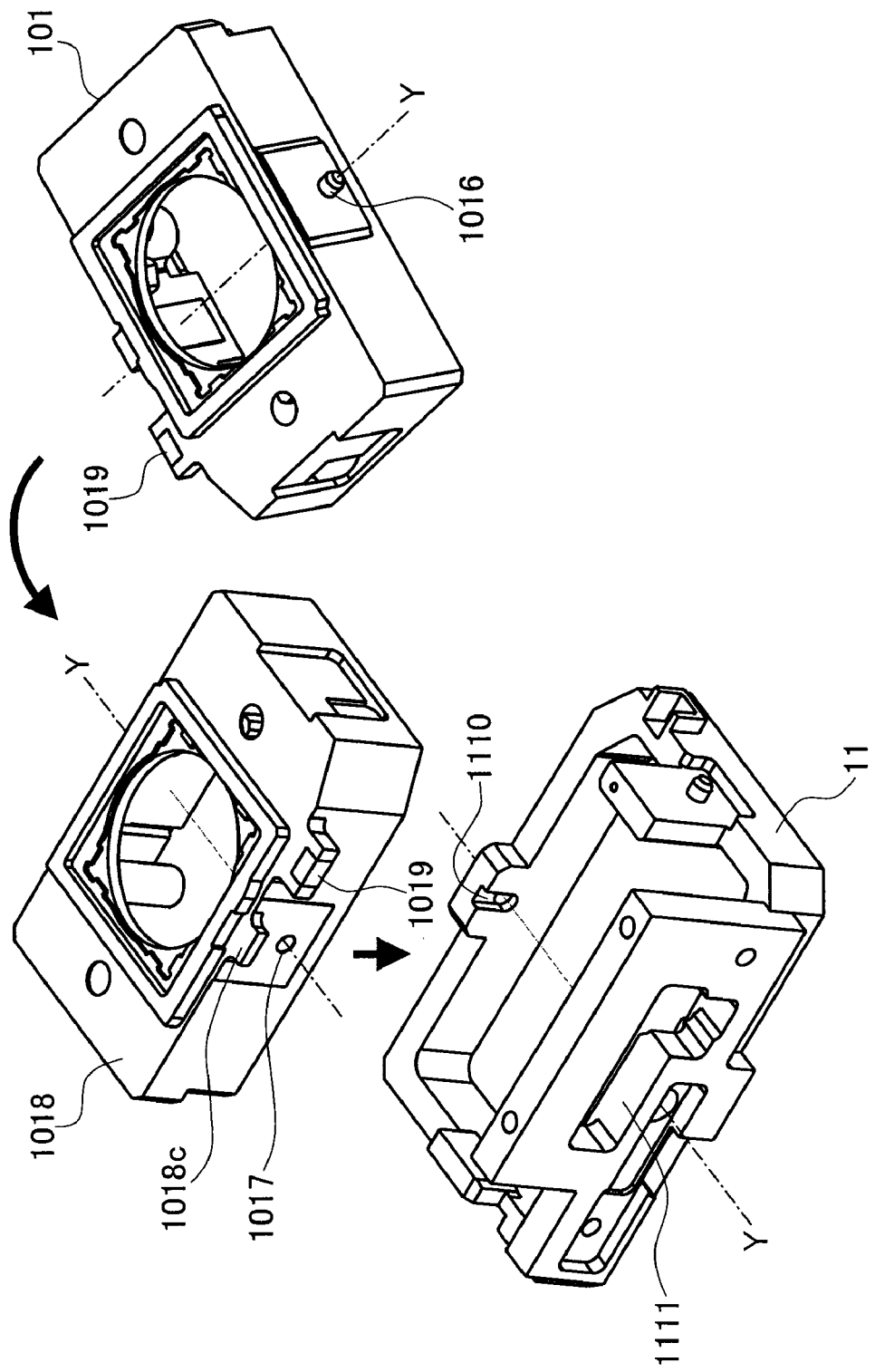
FIG. 20 is an external perspective view schematically showing the operations involved in attaching the lens module to the inner frame unit.
Figure 21:
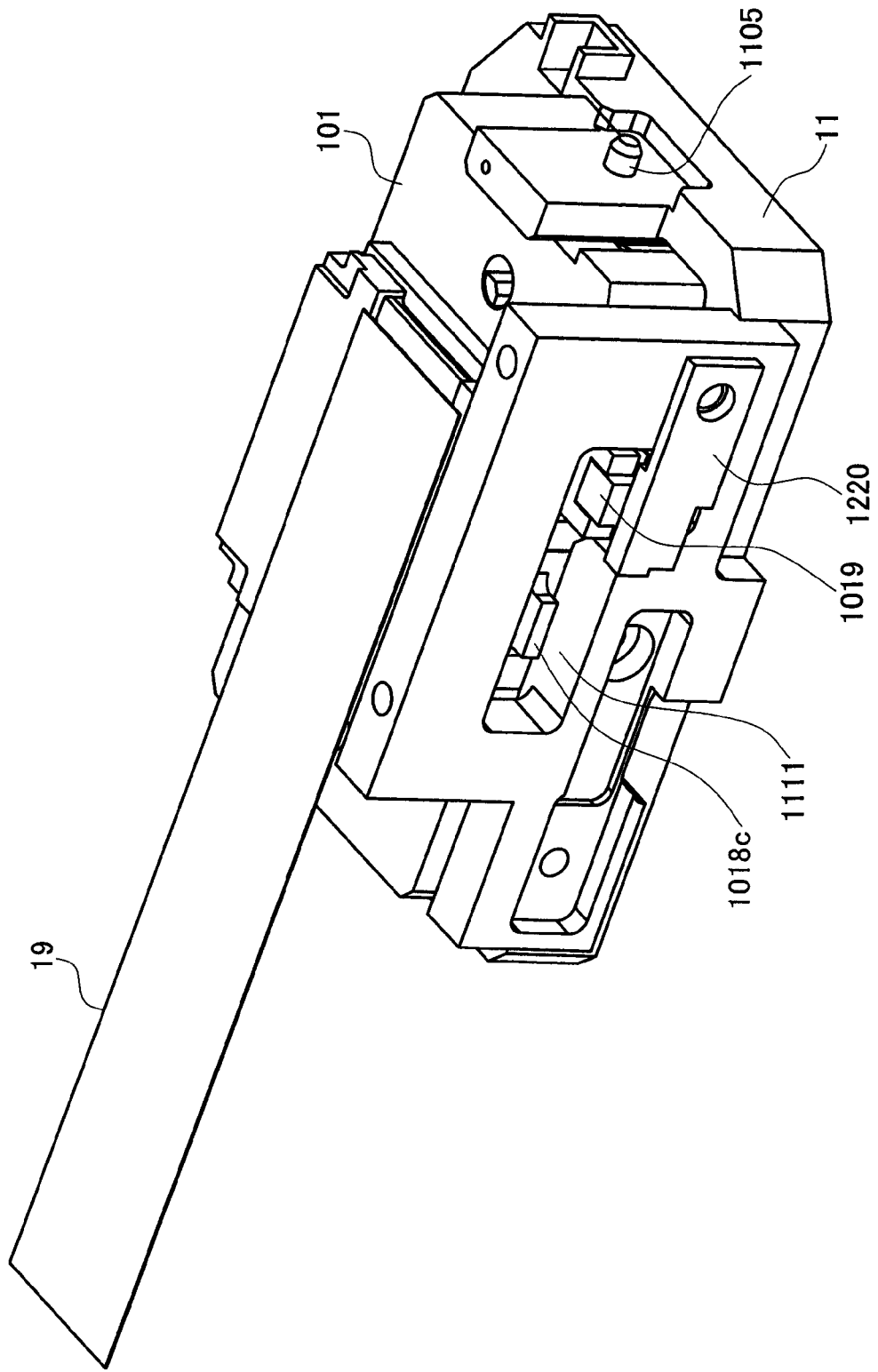
FIG. 21 is an external perspective view of the lens module installed in the inner frame unit.
Figure 22:
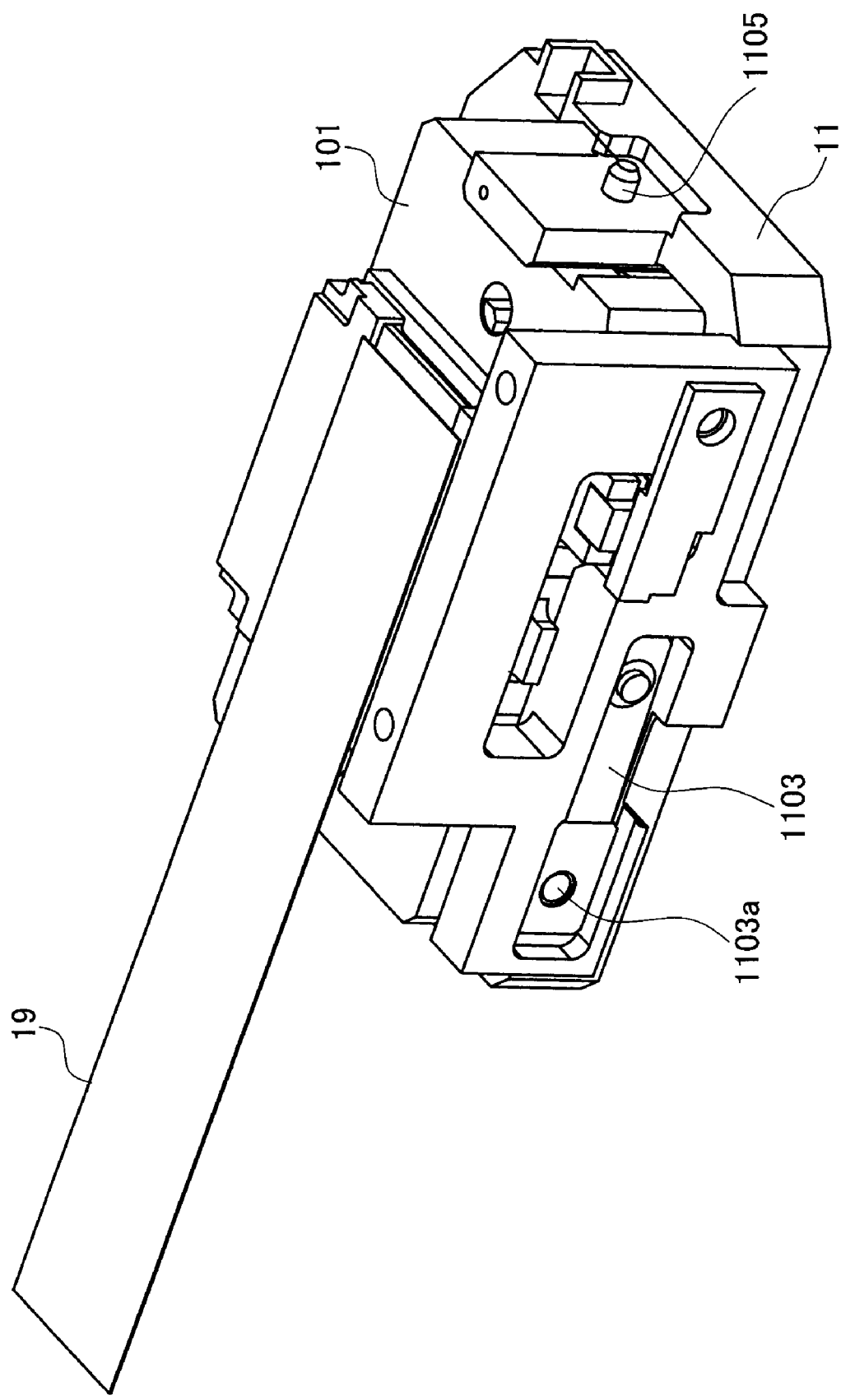
FIG. 22 is an external perspective view of when a leaf spring has been attached after inserting a yaw pivot pin.
Figure 23:
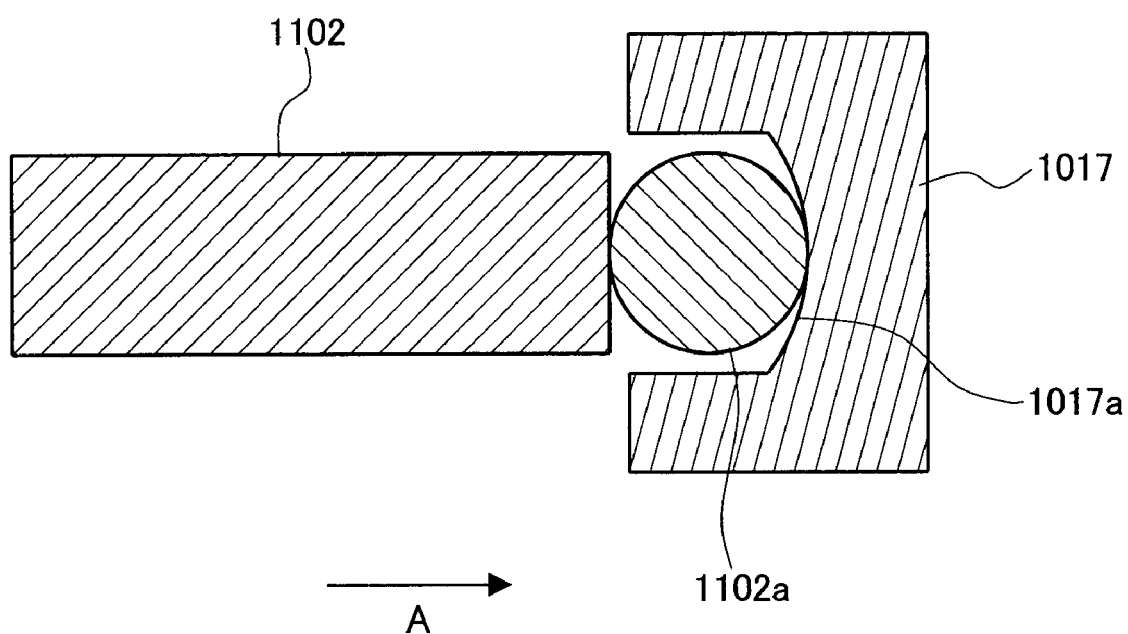
FIG. 23 is a cross-sectional schematic view showing the point at which contact is made between the yaw pivot pin and the yaw bearing.

The process for attaching the lens module 101 to the inner frame unit is described next with reference to FIGS. 19 to 23. FIG. 19 is a flowchart showing the process flow for attaching the lens module 101 to the inner frame unit. FIG. 20 is an external perspective view schematically showing the operations involved in attaching the lens module 101 to the inner frame unit. FIG. 21 is an external perspective view of the lens module 101 installed in the inner frame unit. FIG. 22 is an external perspective view of when the leaf spring 1103 has been attached after inserting the yaw pivot pin 1016. FIG. 23 is a cross-sectional schematic view showing the point at which contact is made between the yaw pivot pin 1016 and the yaw bearing 1101.

Firstly, the yaw pivot pin 1016 of the lens module 101 is inserted into the yaw bearing 1101 of the inner frame 11 (S121). The lens module 101 has the yaw pivot pin 1016 at one end of the yaw axis portion and the yaw bearing 1017 at the opposite end of the yaw axis portion as shown in FIG. 10. That is, only the yaw pivot pin 1016 protrudes from the lens module 101 in the yaw axis portion. Note that the magnet 1019 has been attached to the lens module 101 at this time.

Consequently, when installing the lens module 101 in the inner frame unit, the yaw pivot pin 1016 of the lens module 101 is aligned with the yaw pivot pin insertion groove 1110 of the inner frame 11, and the lens module 101 is fitted into the inner frame unit from above, as shown in FIG. 20. Installing the lens module 101 in the inner frame unit is extremely easy at this time, since the yaw pivot pin 1102 is yet to be inserted into the inner frame 11, and only the yaw pivot pin 1016 protrudes from the lens module 101 in the yaw axis portion.

The base 1018 of the lens module 101 has a stopper 1018c positioned above the yaw bearing 1017 during installation, as shown in FIG. 20. A stopper receiver 1111 is provided on the inner frame 11 in a position corresponding to the stopper 1018c. The lens module 101 thereby can be prevented from falling below the inner frame 11 when being installed in the inner frame 11 prior to the yaw pivot pin 1102 being inserted in the yaw bearing 1017 of the lens module 101. Manufacture can be further facilitated thereby. Note that the shutter unit 1011 and the lens holder 1012 of the lens module 101 and the flexible substrate 19 have been omitted from FIG. 20 to make the description easier to understand.

As aforementioned, FIG. 21 shows the lens module 101 after having been installed in the inner frame unit. As is clear from FIG. 21, the lens module 101 is supported as a result of the stopper 1018c being supported by the stopper receiver 1111. The magnet 1019 of the lens module 101 opposes the hall element unit 1120. A hall element 1120b (not shown) is disposed at the rear of the hall element unit 1120 (surface opposing the magnet 1019) so as to face the magnet 1019.

The yaw pivot pin 1102 is attached in the next procedure to the apparatus in this state. One end of the leaf spring 1103 is crimped onto the head of the yaw pivot pin 1102 in advance (see FIG. 11). The yaw pivot pin 1102 with the leaf spring 1103 attached is inserted into the yaw bearing 1017 of the lens module 101 via the yaw pivot pin insertion hole 1108 of the inner frame 11 (S122). The other end of the leaf spring 1103 is then fixed to the leaf spring fixing portion 1107 of the inner frame 11 by a screw 1103a, as shown in FIG. 22 (S123).

This configuration enables the positioning of the lens module 101 and the inner frame 11 in relation to the insertion direction (thrust direction) of the yaw pivot pin 1102 to be determined at the same time as the positioning of the lens module 101 and the inner frame 11 in relation to a direction perpendicular to the insertion direction of the yaw pivot pin 1102 (radial direction).

Note that a head 1102a of the yaw pivot pin 1102 may be spherical, and a receiving surface 1017a of the yaw bearing 1017 may be concave, as shown in FIG. 23. In this case, the radius of curvature of the receiving surface 1017a of the yaw bearing 1017 is set to be greater than the radius of curvature of the head 1102a of the yaw pivot pin 1102. The yaw pivot pin 1102 thereby is fixed so that the head 1102a contacts the bottommost portion of the receiving surface 1017a of the yaw bearing 1017 when the yaw pivot pin 1102 is biased in the direction of arrow A in FIG. 23. Play between the yaw pivot pin 1102 and the yaw bearing 1017 thus can be eliminated even if the yaw pivot pin 1102 is not fitted into the yaw bearing 1017. Also, contact friction can be reduced because of being able to reduce the contact surface between the yaw pivot pin 1102 and the yaw bearing 1017.

2-4. Process for Manufacturing Outer Frame Unit

Figure 24:
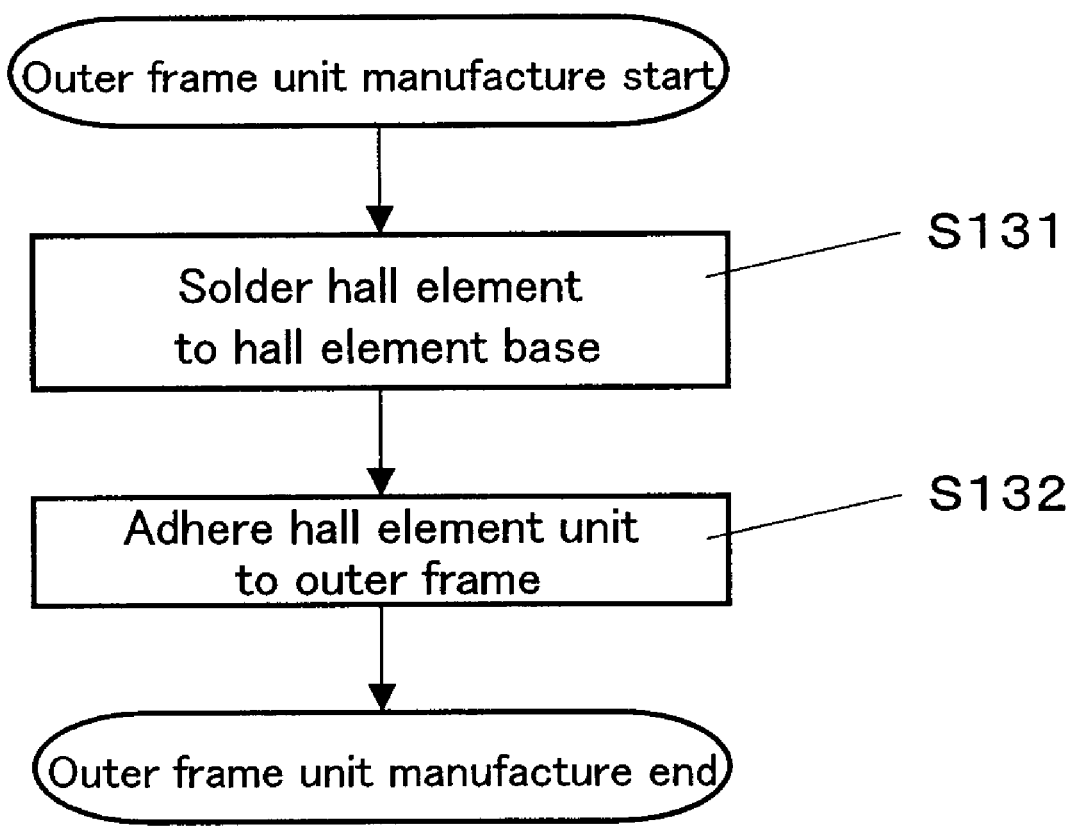
FIG. 24 is a flowchart showing processes for manufacturing the outer frame unit.
Figure 25:
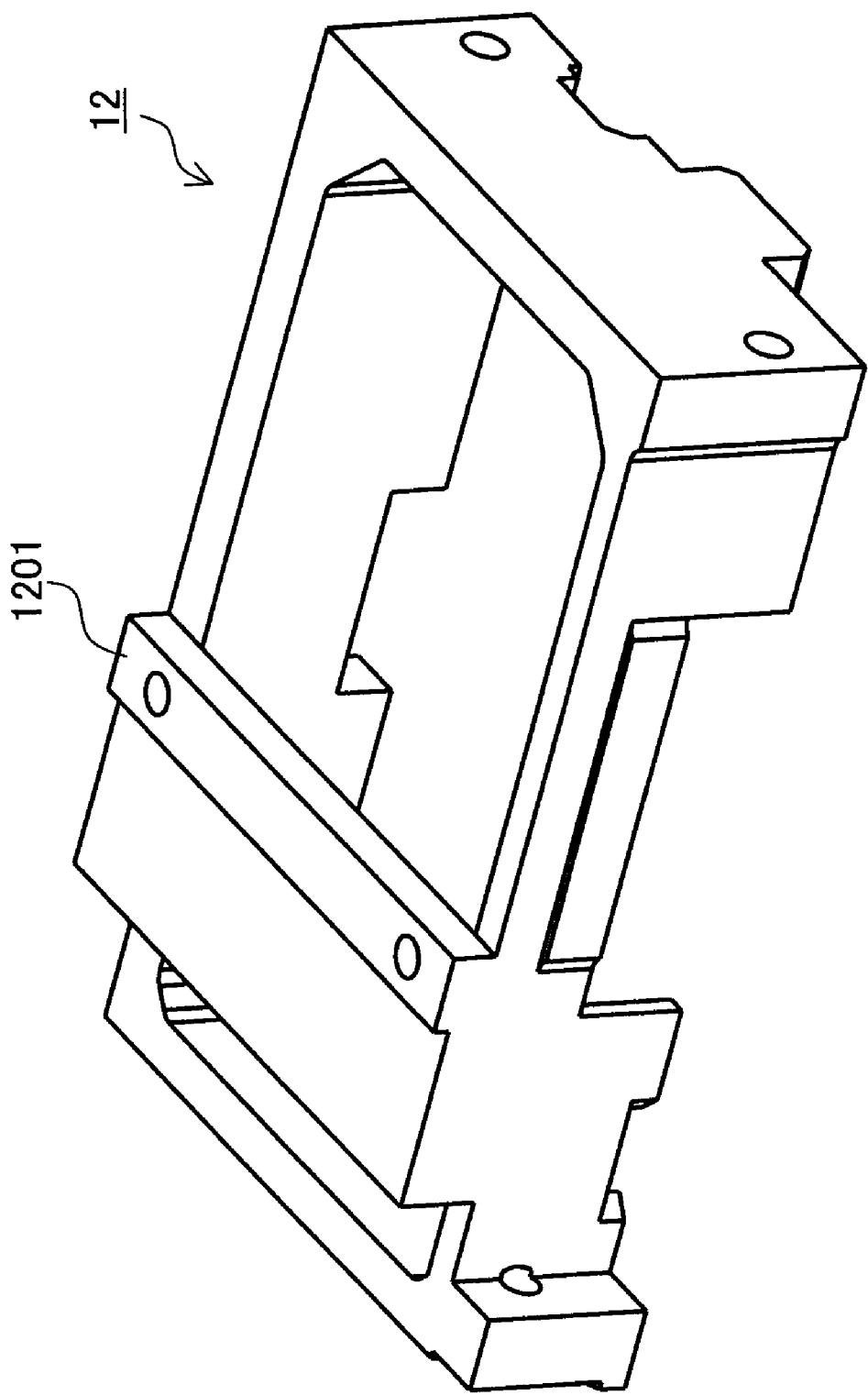
FIG. 25 is an external perspective view showing the structure of the outer frame unit.

FIG. 24 is a flowchart showing the process for manufacturing the outer frame unit. FIG. 25 is an external perspective view showing the structure of the outer frame unit.

Firstly, the hall element unit 1220 is manufactured by soldering a hall element to a hall element base (S131). Next, the hall element unit 1220 is adhered in proximity to the pitch axis (S132).

2-5. Process for Attaching Inner Frame Unit

Figure 26:
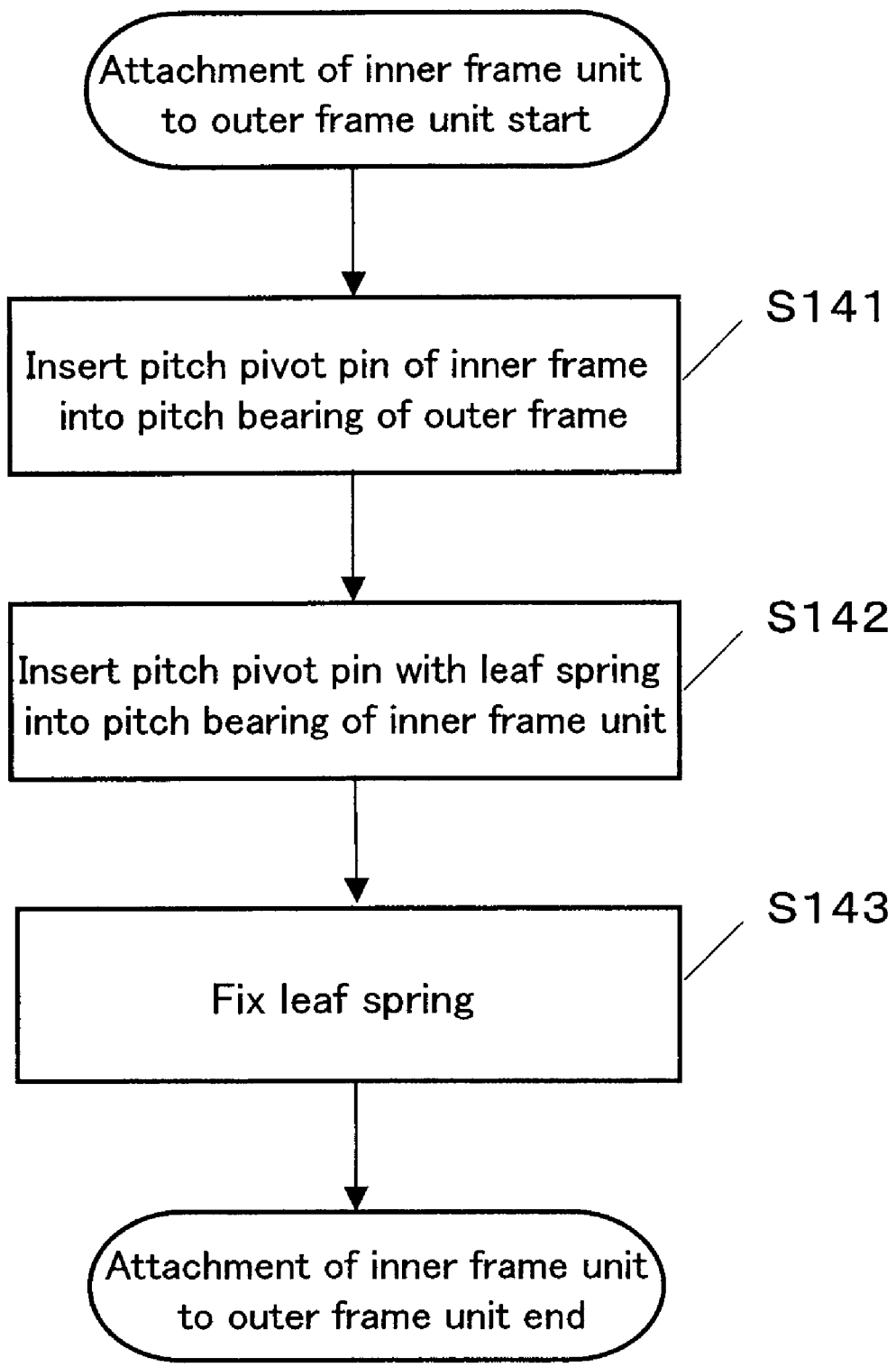
FIG. 26 is a flowchart showing the process for attaching the inner frame unit to the output frame unit.
Figure 27:
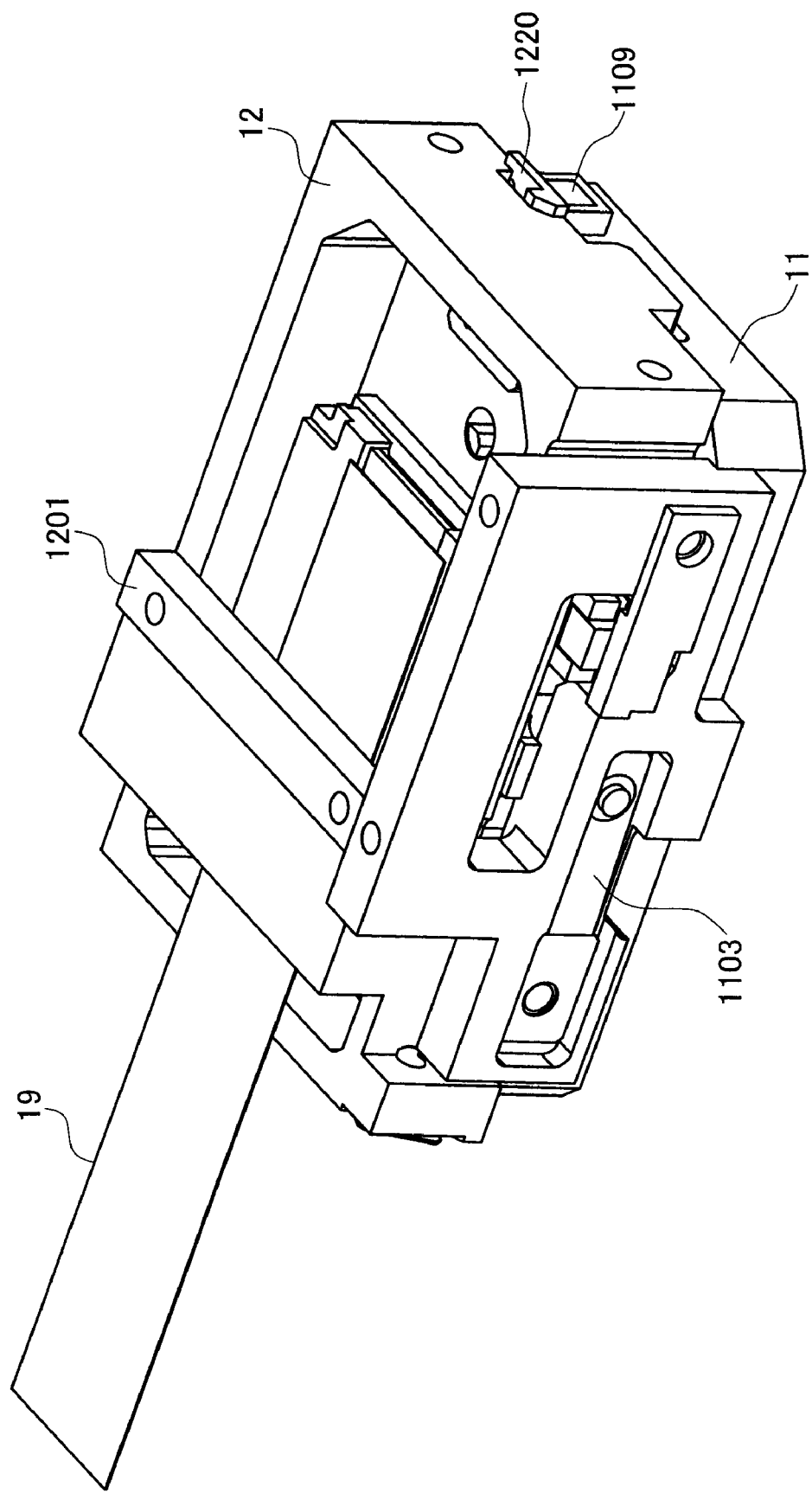
FIG. 27 is an external perspective view of when the inner frame unit is installed in the outer frame unit.
Figure 28:
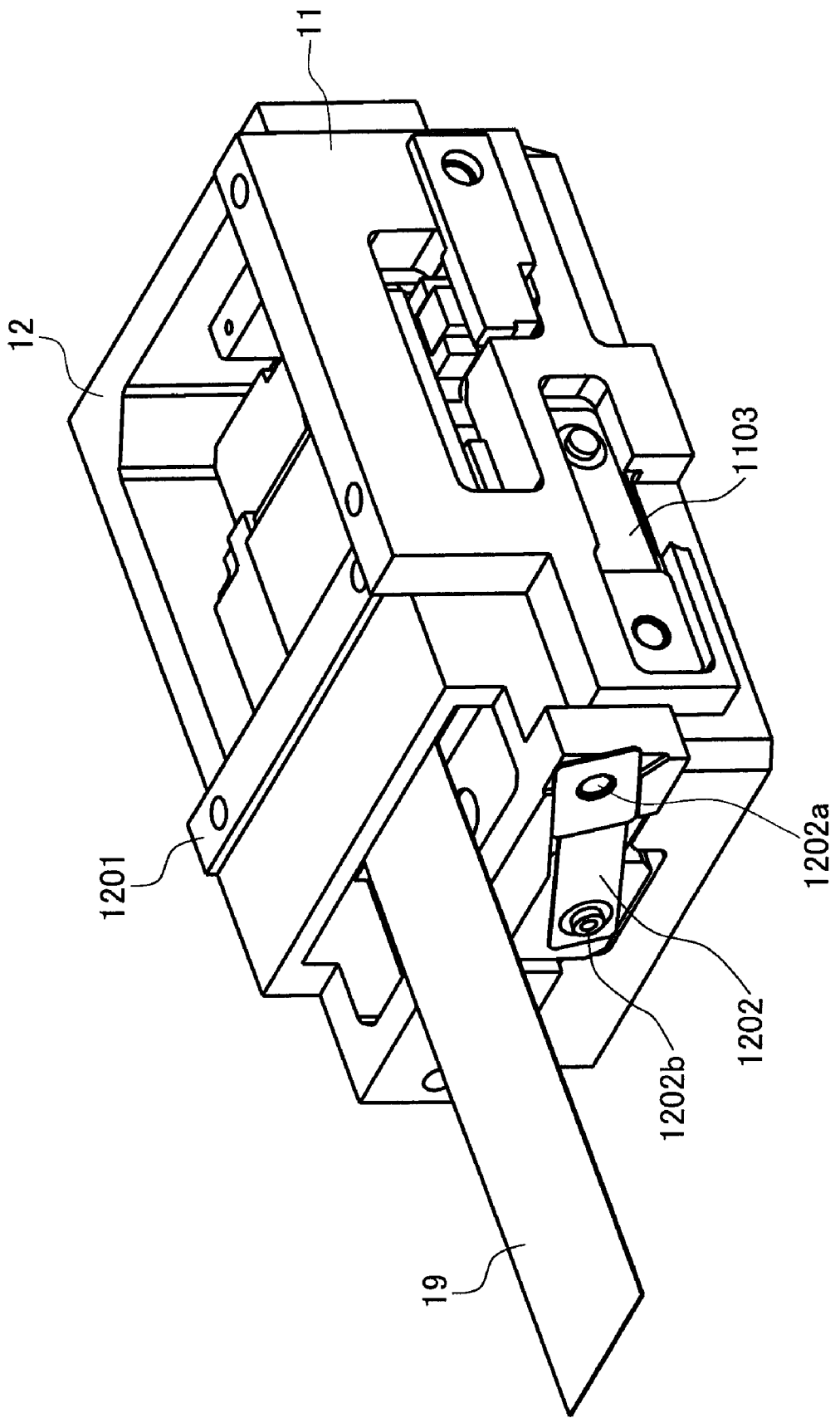
FIG. 28 is an external perspective view of when the inner frame unit is installed in the outer frame unit.

Next, the process for attaching the inner frame unit to the outer frame unit is described with reference to FIGS. 26 and 27. FIG. 26 is a flowchart showing the process for attaching the inner frame unit to the output frame unit. FIG. 27 is an external perspective view of when the inner frame unit is installed in the outer frame unit. FIG. 28 is an external perspective view of the inner frame unit installed in the outer frame unit viewed from a different direction to FIG. 27.

Firstly, the pitch pivot pin 1105 of the inner frame unit is inserted in the pitch bearing (not shown) of the outer frame 12 (S141). Next, the head of the pitch pivot pin (not shown) is fixed by being crimped onto one end of the leaf spring 1202 (example of crimping means). 1202b shown in FIG. 28 is the portion of the head of the pitch pivot pin onto which the leaf spring 1202 is crimped. The pitch pivot pin with leaf spring attached is inserted into the pitch bearing 1106 (S142). The other end of the leaf spring 1202 is fixed to the outer frame 12 by a screw 1202a (S143).

2-6. Process for Attaching Bimorphs

Figure 29:
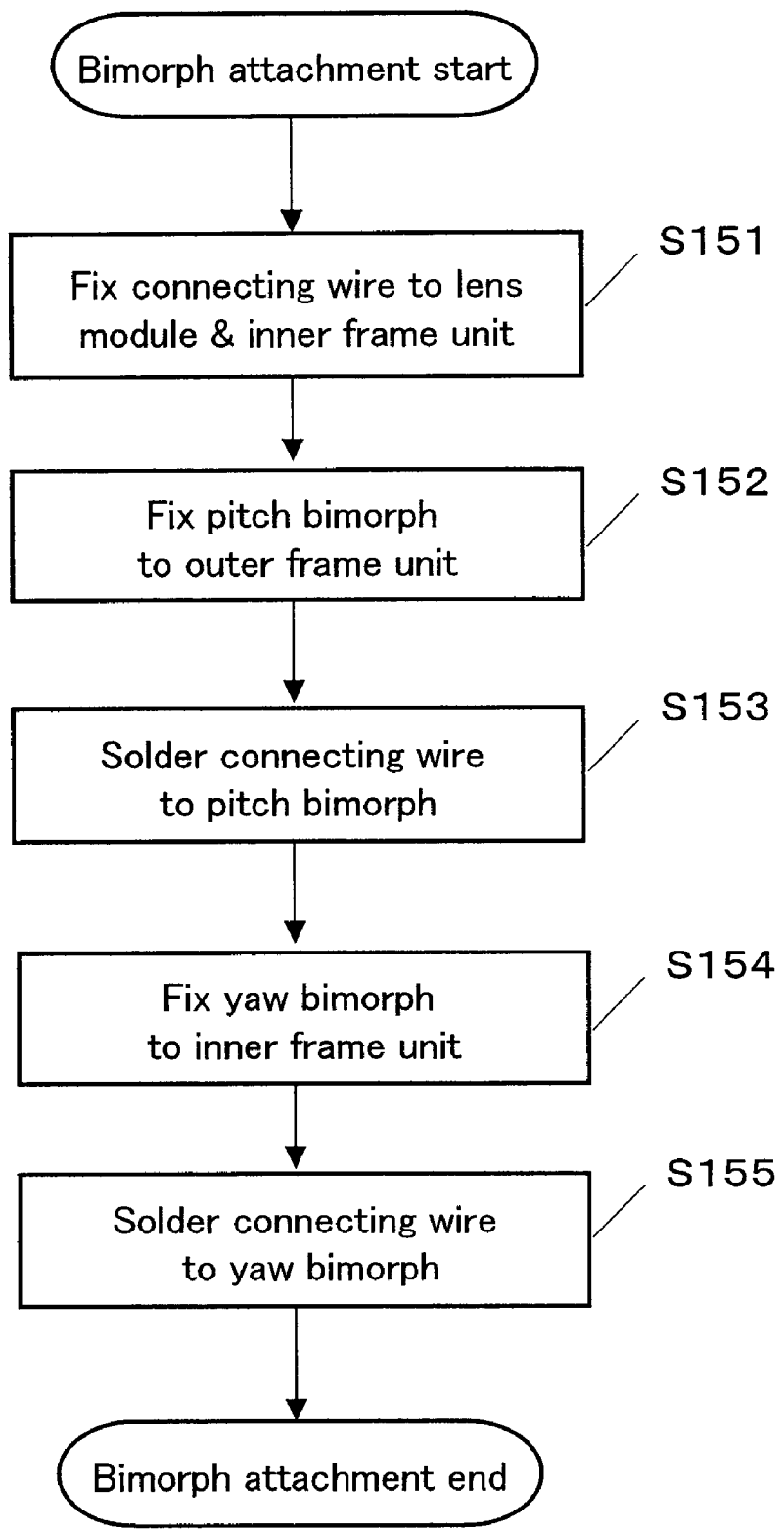
FIG. 29 is a flowchart showing the process for attaching the bimorphs.
Figure 30:
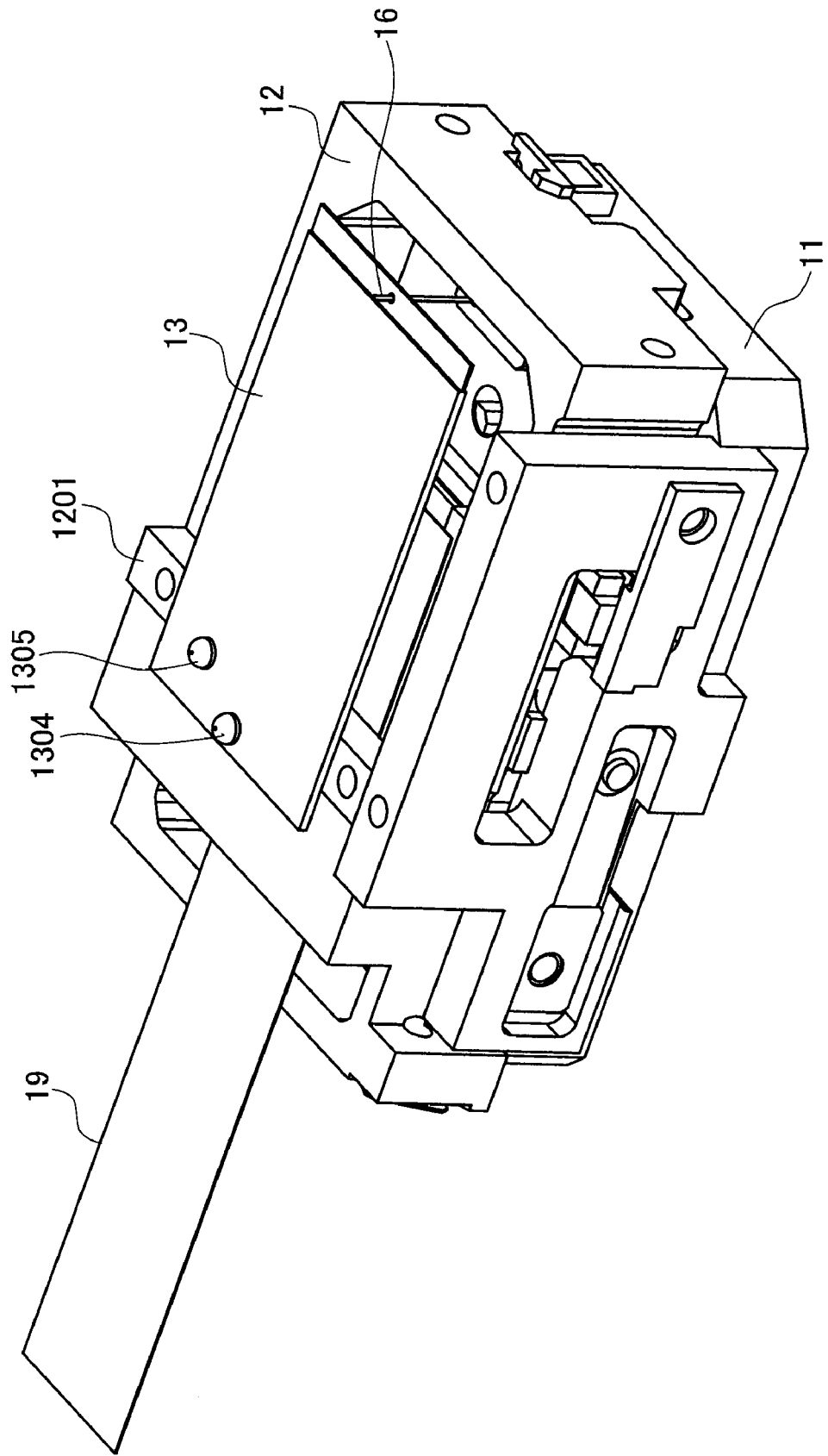
FIG. 30 is an external perspective view showing the pitch bimorph mounted on the outer frame.
Figure 32:
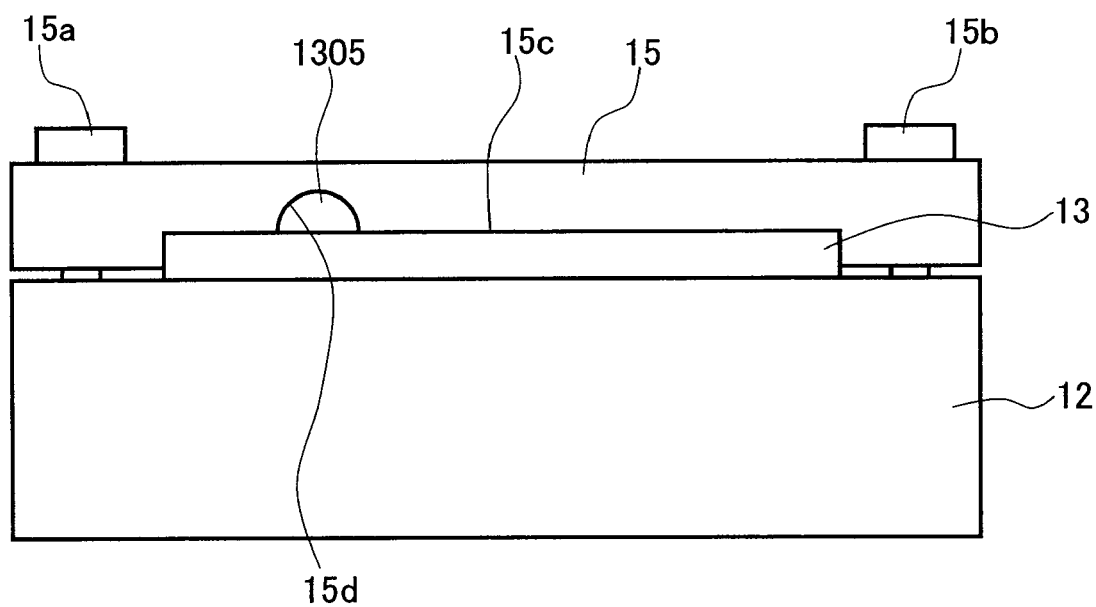
FIG. 32 is a cross-sectional view showing the structure of a fixing plate of the pitch bimorph.
Figure 33:
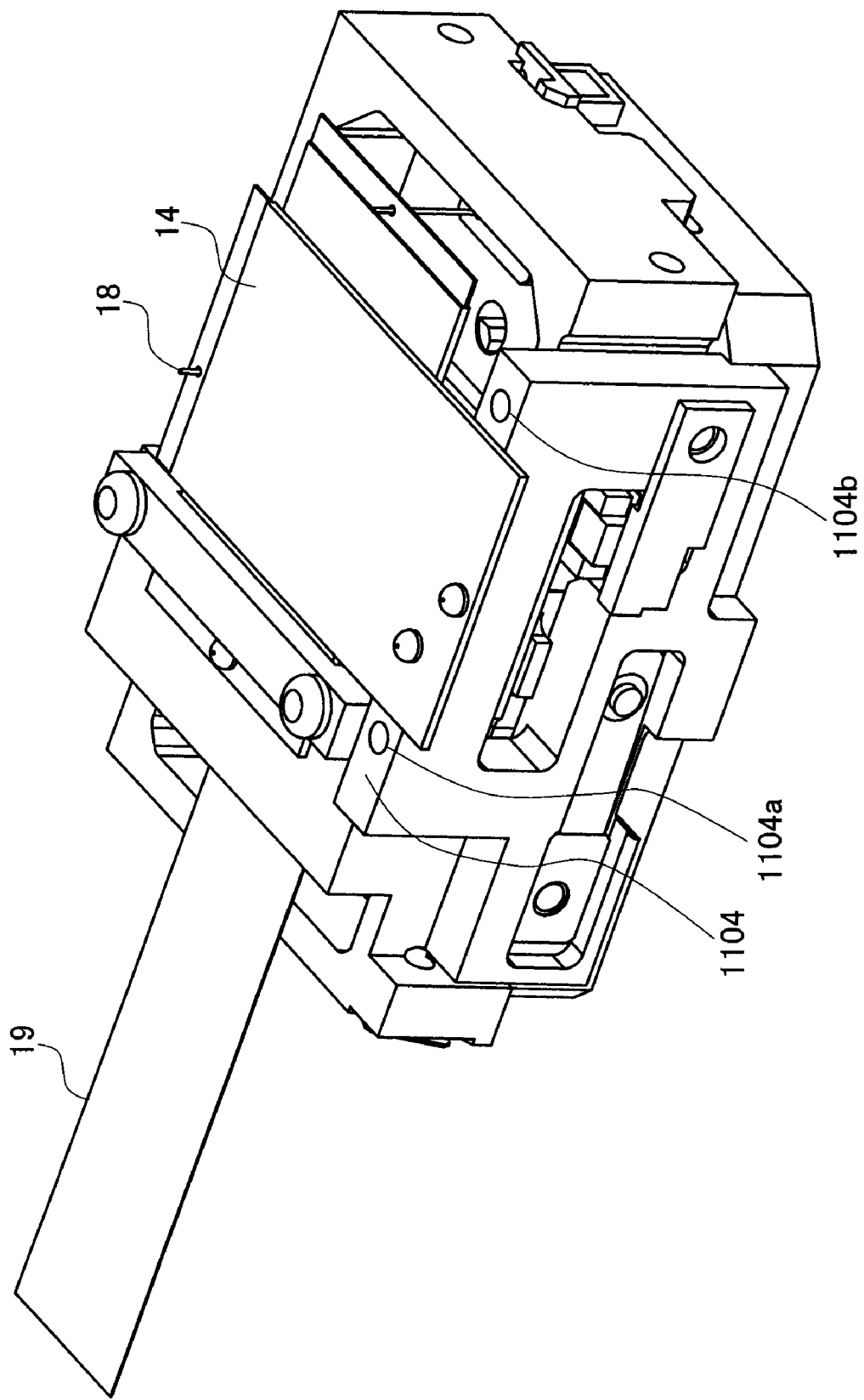
FIG. 33 is an external perspective view showing the yaw bimorph mounted on the inner frame.
Figure 34:
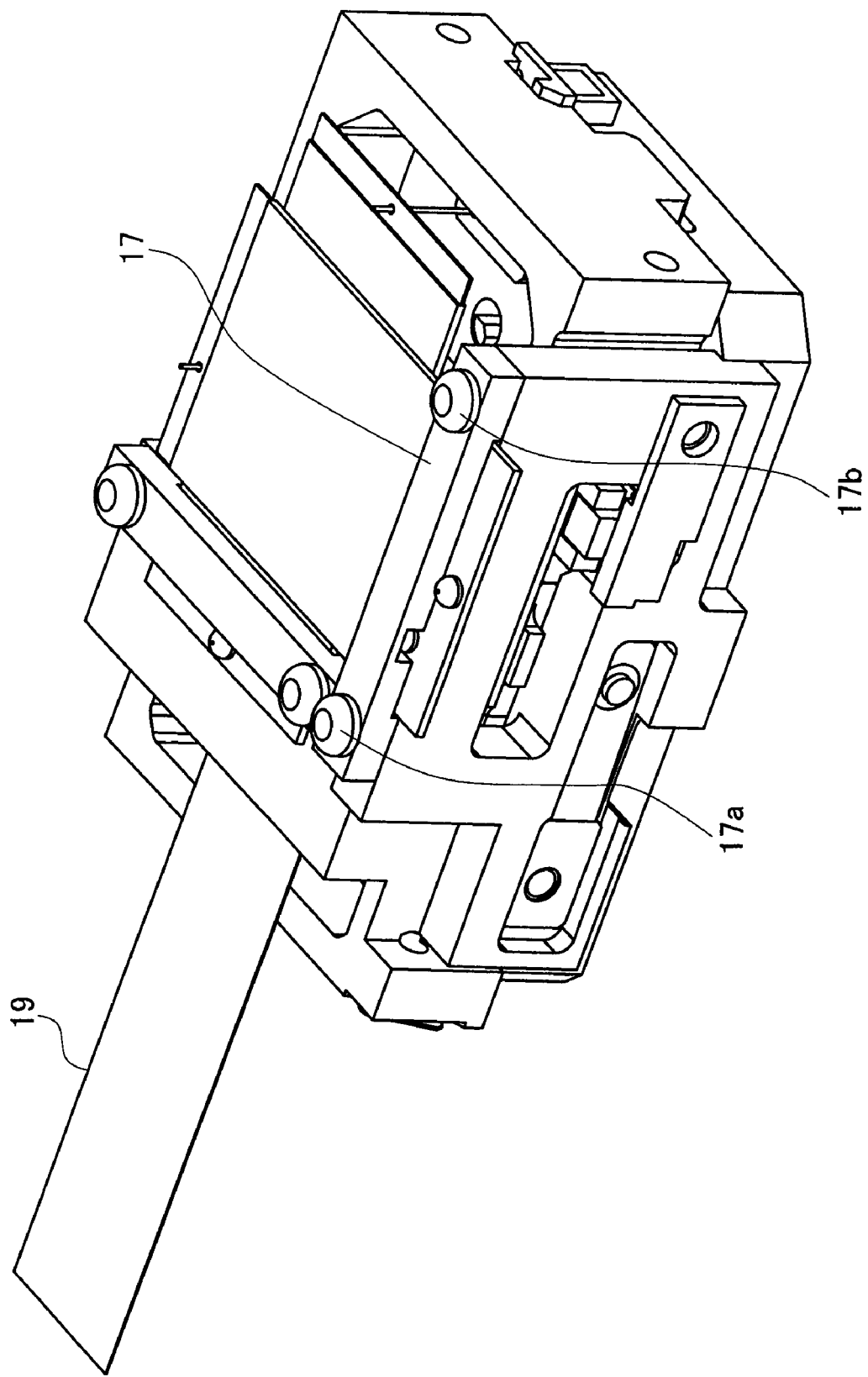
FIG. 34 is an external perspective view showing the yaw bimorph fixed to the inner frame.

The process for attaching the bimorphs will be described next with reference to FIGS. 29 to 34. FIG. 29 is a flowchart showing the process for attaching the bimorphs. FIG. 30 is an external perspective view showing the pitch bimorph 13 mounted on the outer frame 12. FIG. 31 is an external perspective view showing the pitch bimorph 13 fixed to the outer frame 12. FIG. 32 is a cross-sectional view showing the structure of the fixing plate 15 of the pitch bimorph 13. FIG. 33 is an external perspective view showing the yaw bimorph 14 mounted on the inner frame 11. FIG. 34 is an external perspective view showing the yaw bimorph 14 fixed to the inner frame 11.

Firstly, one end of the connecting wire 16 is fixed to the inner frame 11, and one end of the connecting wire 18 is fixed to the lens module 101 (S151). Next, the pitch bimorph 13 is mounted on the pitch bimorph supporting portion 1201 of the outer frame 12 as shown in FIG. 30, and fixed by the fixing plate 15 and fixing screws 15a and 15b as shown in FIG. 31 (S152).

FIG. 32 is a vertical cross-sectional view in the longitudinal direction of the fixing plate 15 (i.e., along the short side of the pitch bimorph 13). As shown in FIG. 32, the fixing plate 15 of the pitch bimorph 13 has a cutout portion 15c formed on the underside thereof that is equal to or slightly wider than the short side length of the pitch bimorph 13. Providing this cutout portion 15c facilitates the alignment of the fixing plate 15 in the short direction of the pitch bimorph 13.

Further, in part of the cutout portion 15c that corresponds positionally to an electrode 1305 of the pitch bimorph 13 a concave portion 15d is formed for accommodating the electrode 1305. The fixing screws 15a and 15b are screwed into the outer frame 12 on both sides of the pitch bimorph 13. Thus, the pitch bimorph 13 is fixed firmly to the outer frame 12 by the fixing plate 15 and the fixing screws 15a and 15b. Note that screwing the fixing screws 15a and 15b to the outer frame 12 on both sides of the pitch bimorph 13 makes it unnecessary to put holes in the pitch bimorph 13. Also, by using the angular fixing frame 15 to hold down the pitch bimorph 13, the fixing frame 15 functions also as a beam structure of the outer frame 12 together with the pitch bimorph supporting portion 1201 of the outer frame 12, improving the strength of the outer frame 12.

Next, the other end of the connecting wire 16 is fixed to the pitch bimorph 13 by soldering around the hole in the pitch bimorph 13 through which the connecting wire 16 passes (S153). At this time, the inner frame 11 needs to be held horizontal to the outer frame 12 with a jig (not shown) in order to adjust the length of the connecting wire 16 correctly.

Next, the yaw bimorph 14 is mounted on the yaw bimorph supporting portion 1104 of the inner frame 11 as shown in FIG. 33, and fixed with the fixing plate 17 and the fixing screws 17a and 17b as shown in FIG. 34 (S154). Note that the structure of the fixing plate 17 and the method of fixing the fixing plate 17 to the inner frame 11 are similar to the fixing plate 15.

Next, the other end of the connecting wire 18 is fixed to the yaw bimorph 14 by soldering around the hole in the yaw bimorph 14 through which the connecting wire 18 passes (S155). At this time, the lens module 101 needs to be held horizontal to the inner frame 11 with a jig (not shown) in order to adjust the length of the connecting wire 18 correctly.

The OIS module 1 is completed as a result of the above processes.

The digital camera is completed by attaching the outer frame 12 of this OIS module 1 to the casing (not shown) of the digital camera.

3. Digital Camera Controls

Next, the controls of a digital camera according to the present embodiment will be described.

Figure 35:
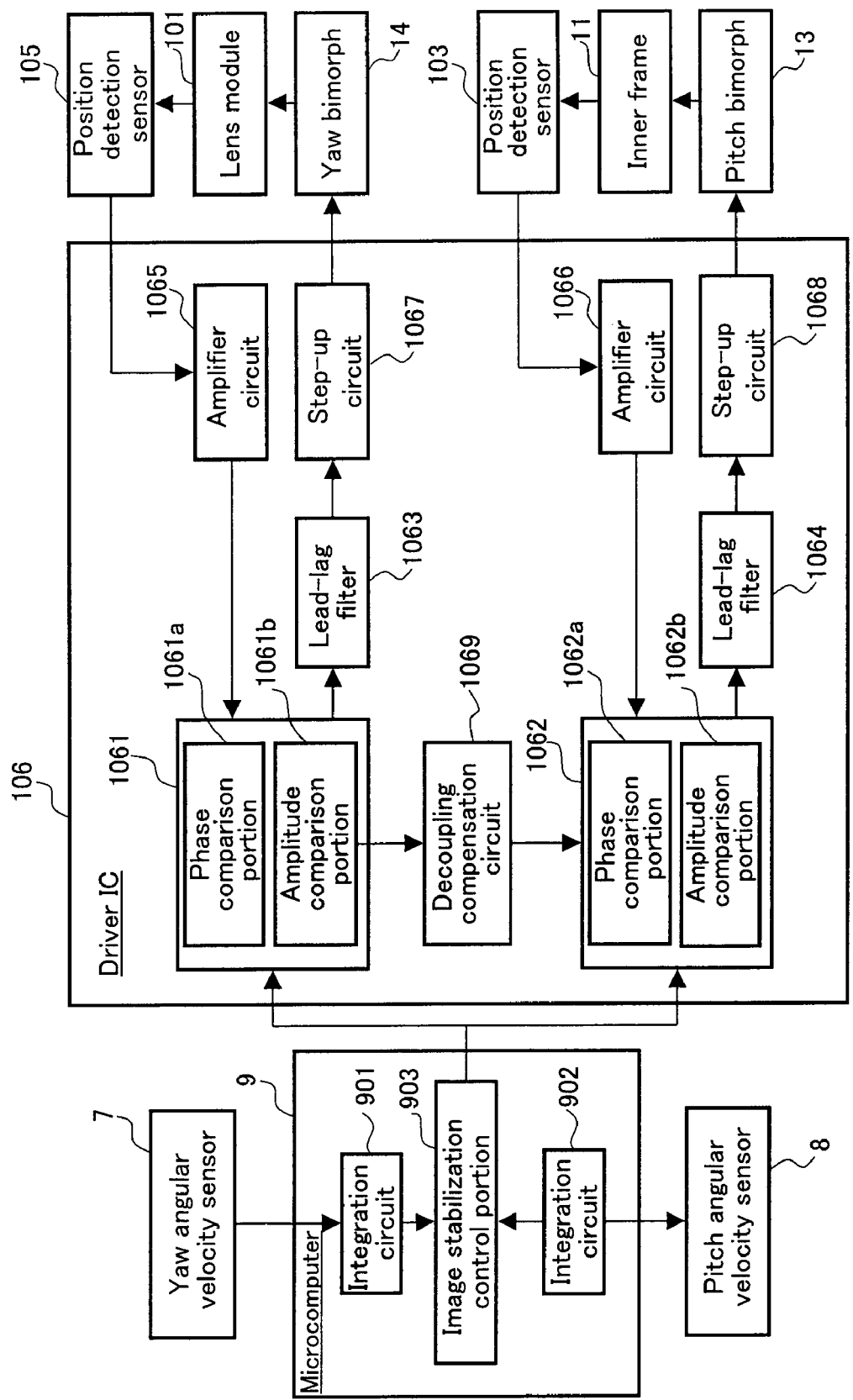
FIG. 35 is a block diagram showing a schematic configuration of the control system of a digital camera according to the present embodiment.

FIG. 35 is a block diagram showing a schematic configuration of the control system of a digital camera according to the present embodiment. As shown in FIG. 35, the drive control portion 106 of the OIS module 1 includes a comparison circuit 1061, a lead-lag filter 1063, an amplifier circuit 1065, and a step-up circuit 1067 for position control about the yaw turning axis Y, and a comparison circuit 1062, a lead-lag filter 1064, an amplifier circuit 1066, and a step-up circuit 1068 for position control about the pitch turning axis P. The comparison circuit 1061 is constituted by a phase comparison portion 1061a and an amplitude comparison portion 1061b, and the comparison circuit 1062 is constituted by a phase comparison portion 1062a and an amplitude comparison portion 1062b. A decoupling compensation circuit 1069 is provided between the comparison circuit 1061 and the comparison circuit 1062 in order to compensate for the effects caused by recoil on the inner frame 11 when the lens module 101 turns.

The yaw angular velocity sensor 7 measures the angular velocity of the digital camera in the yaw rotational direction caused by camera shake, and outputs the result to the microcomputer 9. The integration circuit 901 of the microcomputer 9 integrates the angular velocity and outputs the result to the image stabilization control portion 903. The pitch angular velocity sensor 8 measures the angular velocity of the digital camera in the pitch rotational direction caused by camera shake, and outputs the result to the microcomputer 9. The integration circuit 902 of the microcomputer 9 integrates the angular velocity and outputs the result to the image stabilization control portion 903. The image stabilization control portion 903 respectively calculates a correction target value in the yaw direction and a correction target value in the pitch direction based on the outputs from the integration circuits 901 and 902, and outputs the respective correction target values to the comparison circuits 1061 and 1062.

The yaw position sensor 105 detects the current position of the lens module 101 in the yaw direction, and outputs the result to the amplifier circuit 1065. The detected current position of the lens module 101 amplified by the amplifier circuit 1065 is provided to the comparison circuit 1061. The comparison circuit 1061 compares the detected current position of the lens module 101 with the correction target value in the yaw direction provided from the image stabilization control portion 903 of the microcomputer 9, and outputs the comparison result to the step-up circuit 1067 via the lead-lag filter 1063. The step-up circuit 1067 turns the lens module 101 about the yaw turning axis Y by driving the yaw bimorph 14 with a voltage that depends on the comparison result.

Similarly, the pitch position sensor 103 detects the current position of the inner frame 11 in the pitch direction, and outputs the result to the amplifier circuit 1066. The detected current position of the inner frame 11 amplified by the amplifier circuit 1066 is provided to the comparison circuit 1062. The comparison circuit 1062 compares the detected current position of the inner frame 11 with the correction target value in the pitch direction provided from the image stabilization control portion 903 of the microcomputer 9, and outputs the comparison result to the step-up circuit 1068 via the lead-lag filter 1064. The step-up circuit 1068 turns the inner frame 11 about the pitch turning axis P by driving the pitch bimorph 13 with a voltage that depends on the comparison result.

Noise can be reduced by providing the amplifier circuits 1065 and 1066 for the yaw position sensor 105 and the pitch position sensor 103 in the drive control portion 106 that is disposed close to these sensors, rather than in the microcomputer 9.

Figure 36:
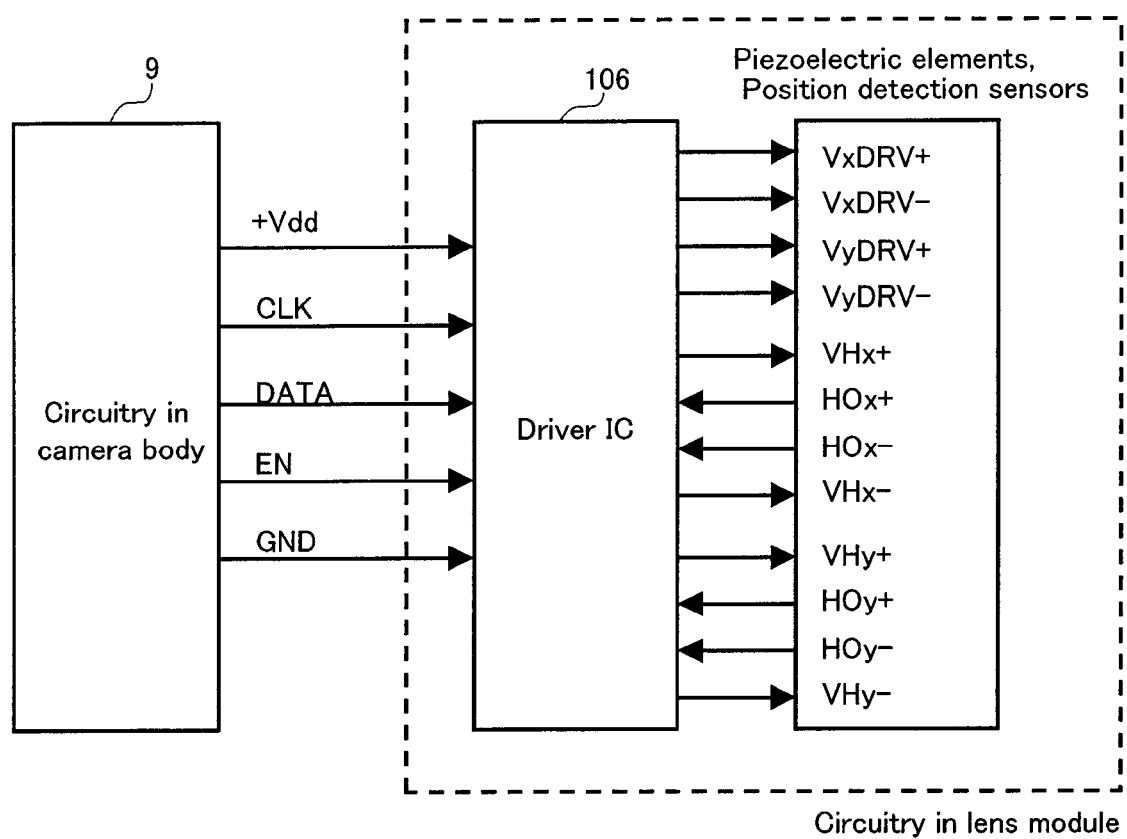
FIG. 36 is a block diagram showing the connection between a microcomputer and a drive control portion.

FIG. 36 is a block diagram showing the connection between the microcomputer 9 and the drive control portion 106. As shown in FIG. 36, twelve signal lines are needed from the drive control portion 106 to the bimorphs 13 and 14 and the sensors 103 and 105. VxDRV+ is the voltage applied to the intermediate electrode plate 1401 in the yaw bimorph 14. VxDRV− is the voltage applied to the two piezoelectric elements 1402 and 1403 in the yaw bimorph 14. VyDRV+ is the voltage applied to the intermediate electrode plate in the pitch bimorph 13. VyDRV− is the voltage applied to the two piezoelectric elements in the pitch bimorph 13.

VHx+ and VHx− are the voltages applied to the yaw hall element 1120b, VHx− being GND and VHx+ being about 3V, for example. HOx+ and HOx− are the outputs from the yaw position sensor 105 (hall element 1120b). VHy+ and VHy− are the voltages applied to the hall element in the pitch hall element unit 1220, VHy− being GND and VHy+ being about 3V, for example. HOy+ and HOy− are the outputs from the hall element in the hall element unit 1220 as the pitch position sensor 103.

As mentioned above, twelve signal lines are needed from the drive control portion 106 to the bimorphs 13 and 14 and the position detection sensors 103 and 105, whereas five signal lines +Vdd, CLK, DATA, EN and GND are sufficient between the drive control portion 106 and the microcomputer 9. This allows the flexible cable connecting the drive control portion 106 and the microcomputer 9 of the camera body to be reduced in thickness. Note that a plurality of DATA lines may be provided. In this case, the drive signal may be sent from the microcomputer 9 with a pulse wave modulation (PWM) signal. This allows the speed at which data is passed between the microcomputer 9 of the camera body and the lens module 101 to be increased.

Note that the above +Vdd is the power supply of the lens module 101. CLK is the SYNC signal for data transmission between the lens module 101 and the camera body. DATA is the transmission path used for data communication between the lens module 101 and the camera body. This data includes correction angle information instructed from the camera body, and the detection information of the position sensors 103 and 105 returned from the lens module 101. EN (Enable) is a communication permission signal provided to the drive control portion 106 from the microcomputer 9 of the camera body. By receiving the communication permission signal, the drive control portion 106 is capable of differentiating between information flowing on the bus from the microcomputer 9 directed to the drive control portion 106 and information directed to other electronic components. GND is the ground of the lens module 101.

Figure 37A:
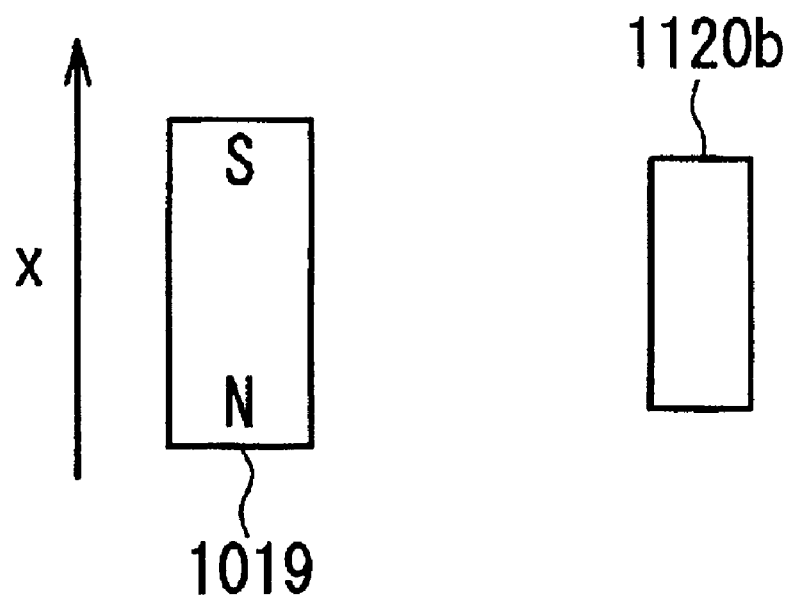
FIG. 37A is a schematic view showing an exemplary positional relation between a magnet and a hall element.
Figure 37B:
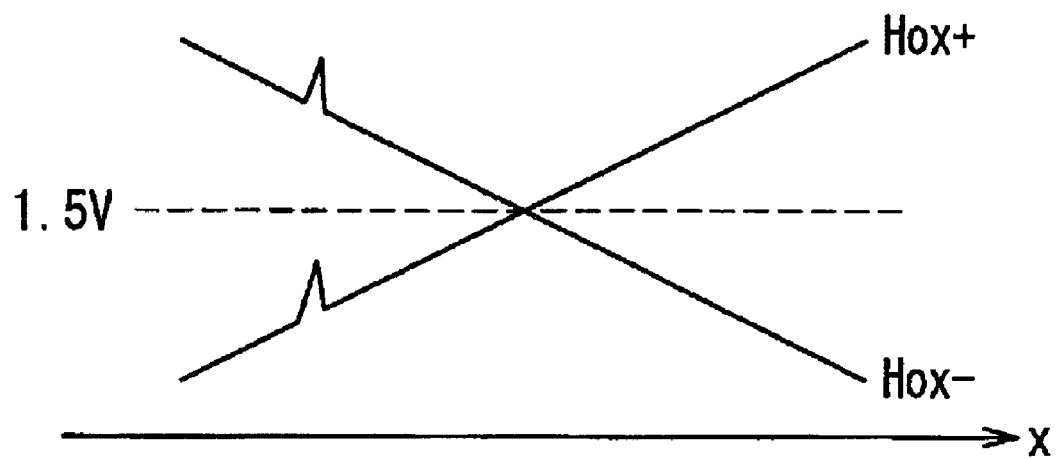
FIG. 37B is a graph showing the hall element output in the case of FIG. 37A.

The positional relation between the magnet 1019 and the hall element 1120b as the yaw position sensor 105 as well as the relation with the output of the hall element 1120b is described here, with reference to FIGS. 37A and 37B. The magnet 1019 of the present embodiment is, as shown in FIG. 37A, disposed so as to be horizontally (x direction in FIG. 37A) displaced relative to the detection surface of the hall element 1120b. Consequently, the output HOx+ and HOx− of the hall element 1120b is as shown in FIG. 37B. While it is not impossible to derive the displacement x based only on one of HOx+ and HOx−, these outputs in actual fact often contain spike noise, as shown in FIG. 37B. Since this spike noise is produced simultaneously in the outputs HOx+ and HOx−, a position detection result unaffected by noise can be obtained by taking the difference between the outputs HOx+ and HOx−. Note that the same applies to the position detection result of the pitch position sensor 103.

Figure 37C:
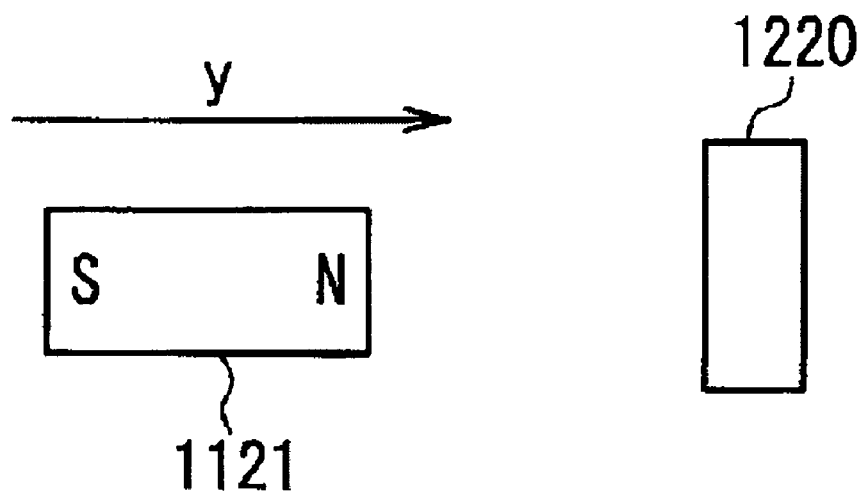
FIG. 37C is a schematic view showing another exemplary positional relation between a magnet and a hall element.

The hall element of the hall element unit 1220 as the pitch position sensor 103 is, as shown in FIG. 37C, disposed so that the magnet 1121 is displaced in the direction of the normal (y direction in the figure) of the detection surface of the hall element.

Figure 37D:
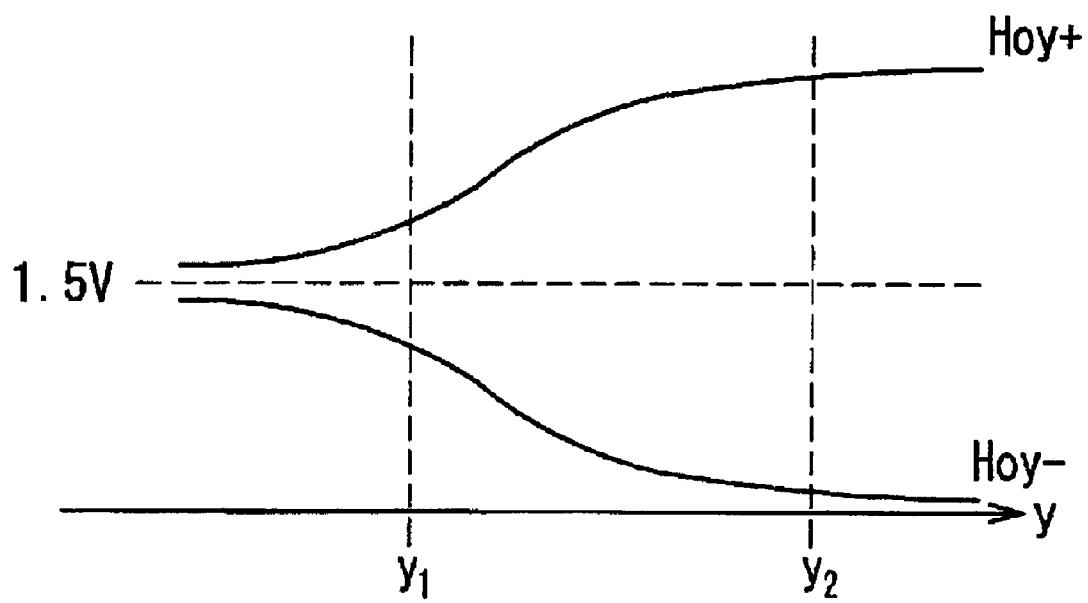
FIG. 37D is a graph showing the hall element output in the case of FIG. 37C.

Consequently, the outputs HOy+ and HOy− of the hall element of the hall element unit 1220 are as shown in FIG. 37D. In this case, the displacement y can be derived from the respective values of the outputs HOy+ and HOy− where the slopes are from y1 to y2.

Figure 38:
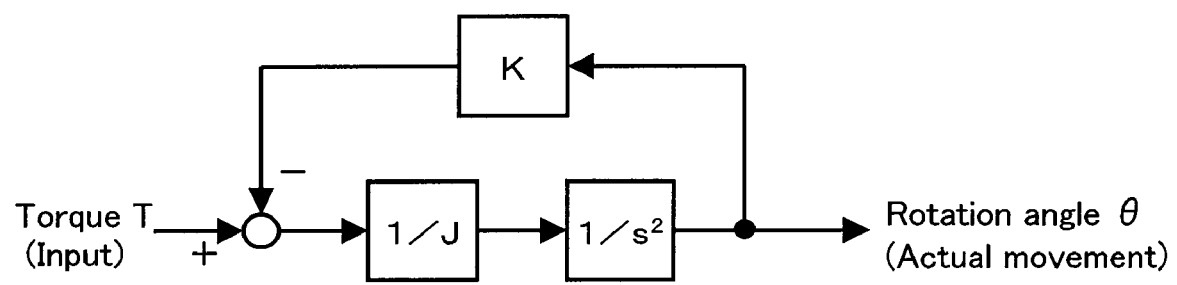
FIG. 38 is a block diagram of a bimorph.

The transfer function Gs of the bimorphs 13 and 14 is as shown by the following equation 1 based on the block diagram shown in FIG. 38. Note that T=J·α, where J[kg·m$^2$] is an inertia moment of the drive target, α[rad/s$^2$] is the angular velocity, T[N·m] is the drive torque, and θ[rad] is the rotation angle of the drive target (actual movement).

$$\text{Transfer function of the bimorphs } Gs(s) = \frac{1}{Js^2 + K} \quad \text{Equation 1}$$

Figure 39:
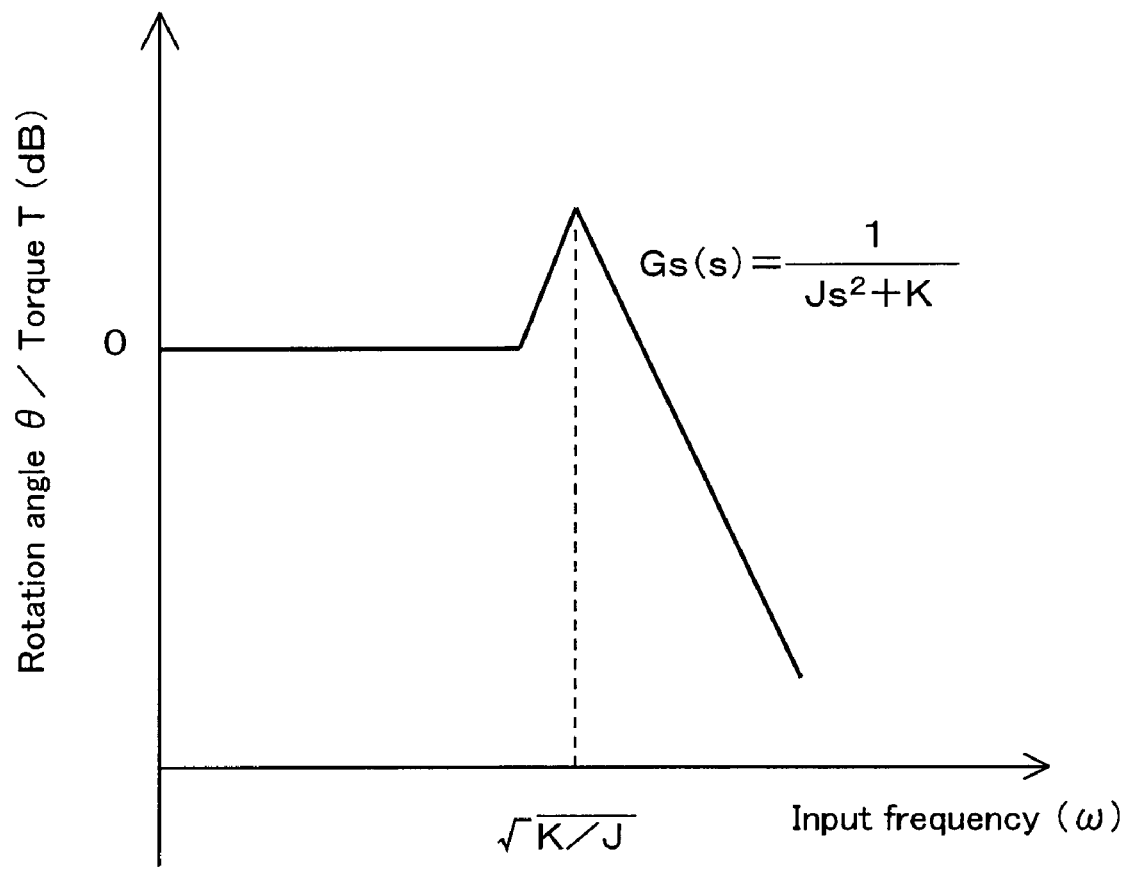
FIG. 39 is a graph showing the frequency characteristics of the bimorph.
Figure 40:
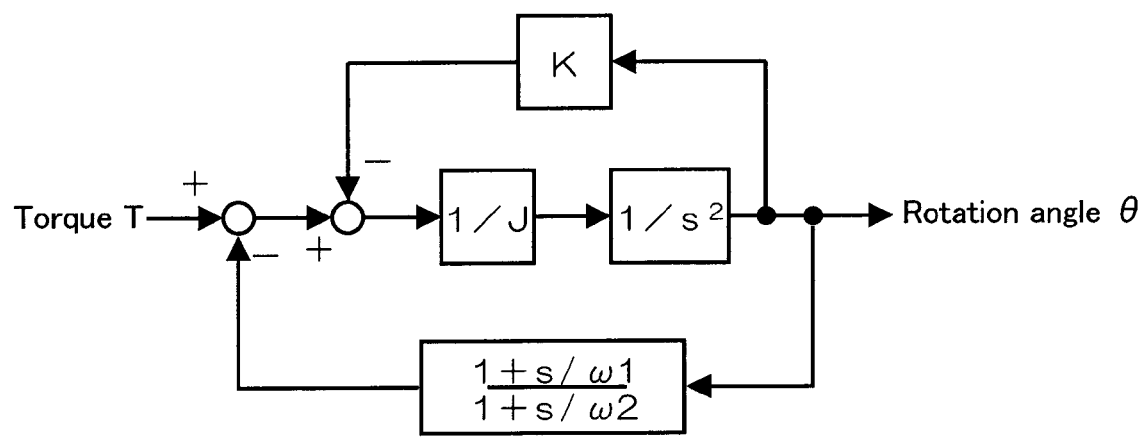
FIG. 40 is a block diagram of the bimorph when a lead-lag filter is included.

The image stabilization characteristics based on the transfer function of equation 1 are as shown in FIG. 39. Specifically, the resonance point exists in the vicinity of camera shake frequency=$(K/J)^{1/2}$, with the gain diverging when frequency noise is added. In view of this, the drive control portion 106 according to the present embodiment includes the lead-lag filters 1063 and 1064 in order to suppress the gain at the resonance point. The transfer function Gs (S) that includes the lead-lag filters 1063 and 1064 is as shown by the following equation 2 based on the block diagram shown in FIG. 40.

$$Gs(s) = \frac{1}{Js^2 + \frac{1+s/\omega 1}{1+s/\omega 2} + K} \quad \text{Equation 2}$$

Figure 41:
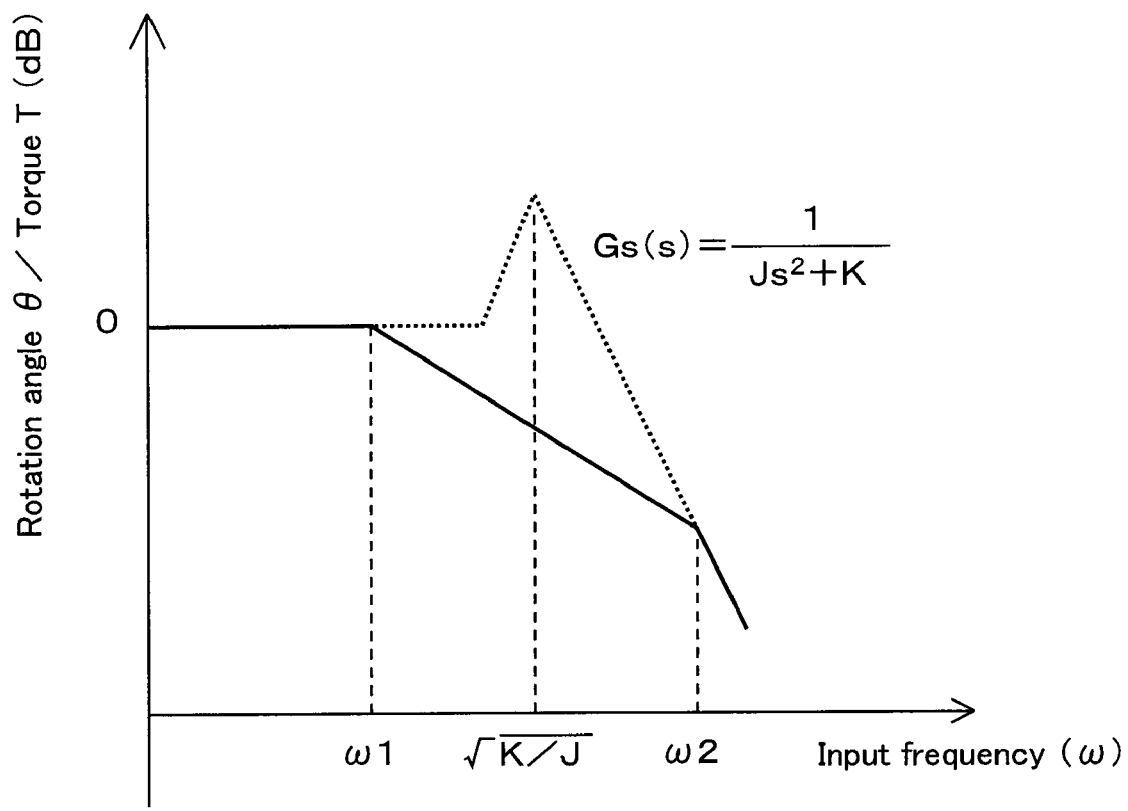
FIG. 41 is a graph showing the frequency characteristics of the bimorph when a lead-lag filter is included.

The image stabilization characteristics based on the transfer function of equation 2 are as shown in FIG. 41. Specifically, the resonance point can be eliminated by suppressing the gain with a range ω1 to ω2. Consequently, the values of ω1 and ω2 can be adjusted so that $(K/J)^{1/2}$ falls with the range ω1 to ω2, as shown in FIG. 41.

Figure 43:
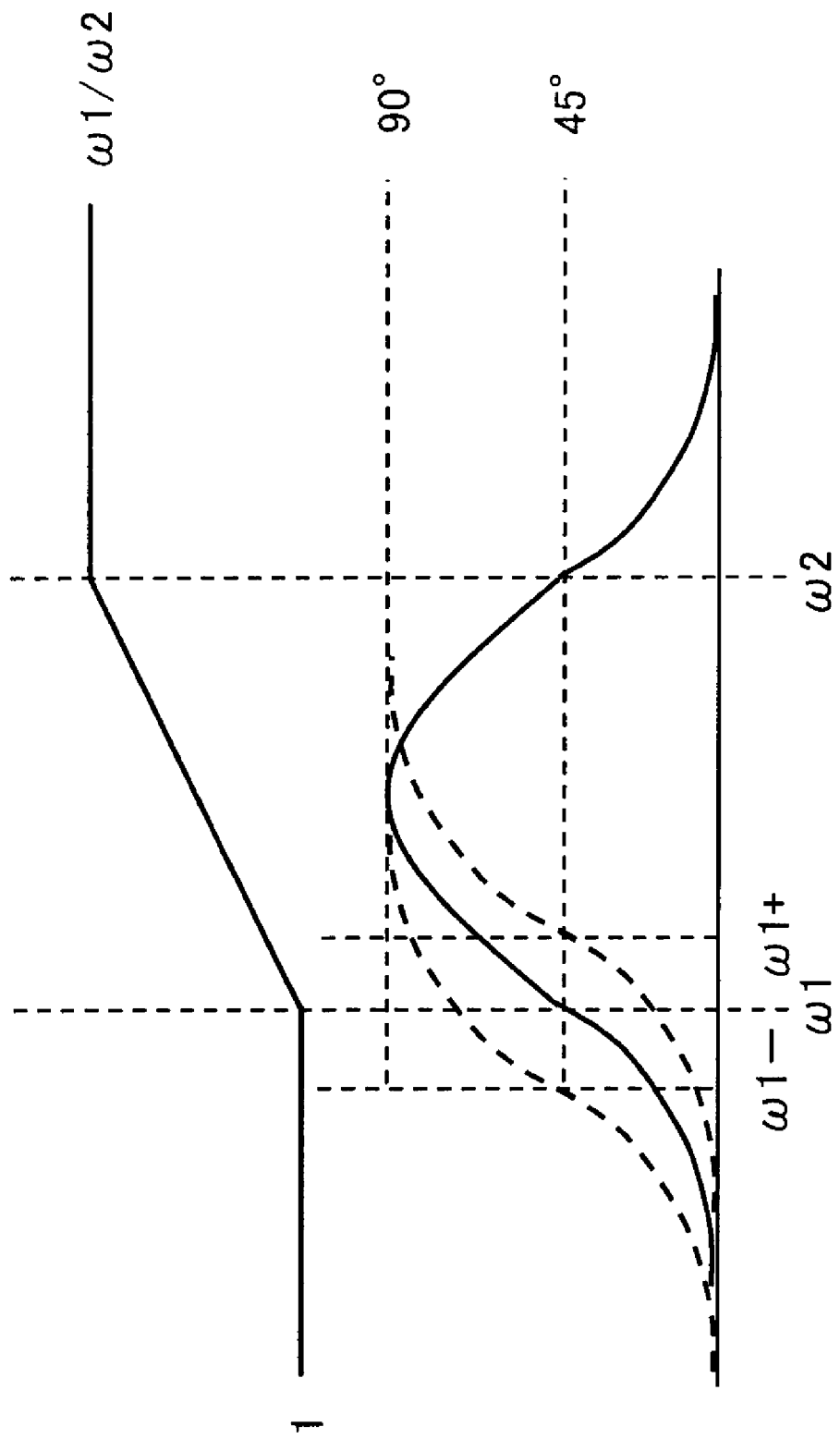
FIG. 43 is a graph showing the frequency characteristics of the lead-lag filter.

In view of this, filters having the frequency characteristics shown in FIG. 43 are used as the lead-lag filters 1063 and 1064. In FIG. 43, the gain is (1+s/ω1)/(1+s/ω2). The characteristics shown in FIG. 41 are obtained by combining the characteristics shown in FIGS. 39 and 43. Note that ω1 can be adjusted based on the result of a phase comparison by the phase comparison portion 1061a when the digital camera is shipped or whenever the digital camera is turned on for use, for example. As shown in FIG. 43, the phase can be compensated by adjusting ω1 to ω1− or ω1+. For example, it is conceivable to output a signal from the microcomputer 9 that changes stepwise from a low frequency to a high frequency, detect the extent of the phase delay using the phase comparison portion 1061a, and adjust ω1 based on the detection result.

Figure 42:
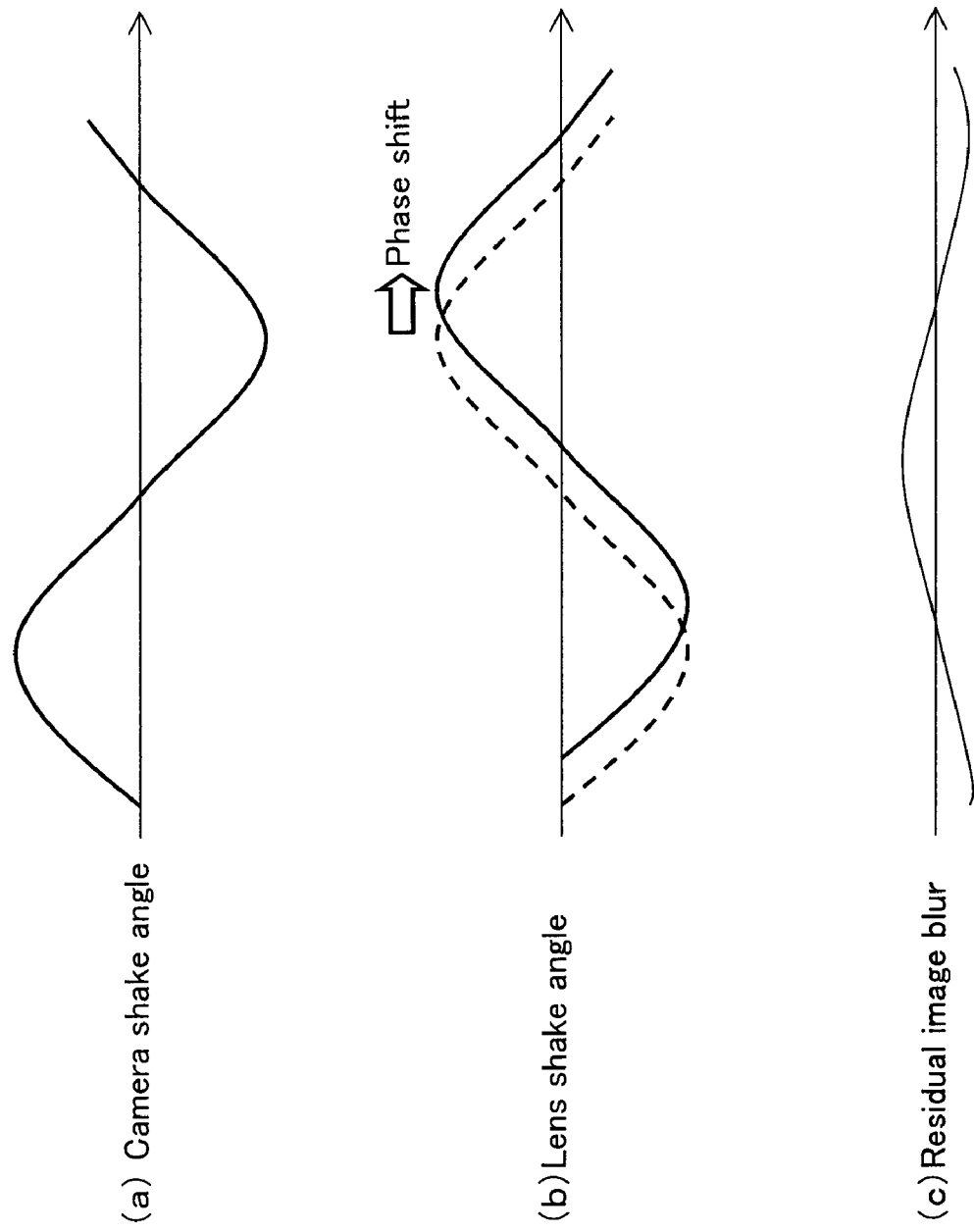
FIG. 42 is a waveform diagram showing the relation between a camera shake angle (a), a lens shake angle (b) and residual image blur (c).

The lead-lag filters 1063 and 1064 are also able to compensate for phase shift originating in the characteristics of the bimorphs 13 and 14. For example, residual image blur as shown in FIG. 42(c) occurs when the phase of the swing angle of the lens module 101 driven by the bimorphs 13 and 14 relative to the camera shake angle shown in FIG. 42(a) is as shown in FIG. 42(b).

A working example of the adjustment of ω1 in the camera manufacturing process will be described next. The manufacturing process has been set up so that the manufacturer can monitor the output of the phase comparison portions 1061a and 1062a shown in FIG. 35. In this state the signal shown in FIG. 42(a) is output to the image stabilization control portion 903. This causes feedback circuitry on the yaw and pitch sides to respectively operate, and the amplifier circuits 1065 and 1066 respectively output the actual position information of the yaw bimorph 14 and the pitch bimorph 13 to the phase comparison portions 1061a and 1062a. If there is a deviation between the output of the image stabilization control portion 903 and the outputs of the yaw and pitch bimorphs 14 and 13, the phase comparison portions 1061a and 1062a output a signal such as shown in FIG. 43(c) as a signal expressing this deviation. The manufacturer monitors the signal from the phase comparison portions 1061a and 1062a, and adjusts the value of C1 and R1 shown in FIG. 44 so that this signal equals zero. This enables the deviation between the output of the image stabilization control portion 903 and the actual position information of the yaw and pitch bimorphs 14 and 13 to be eliminated.

Figure 44:
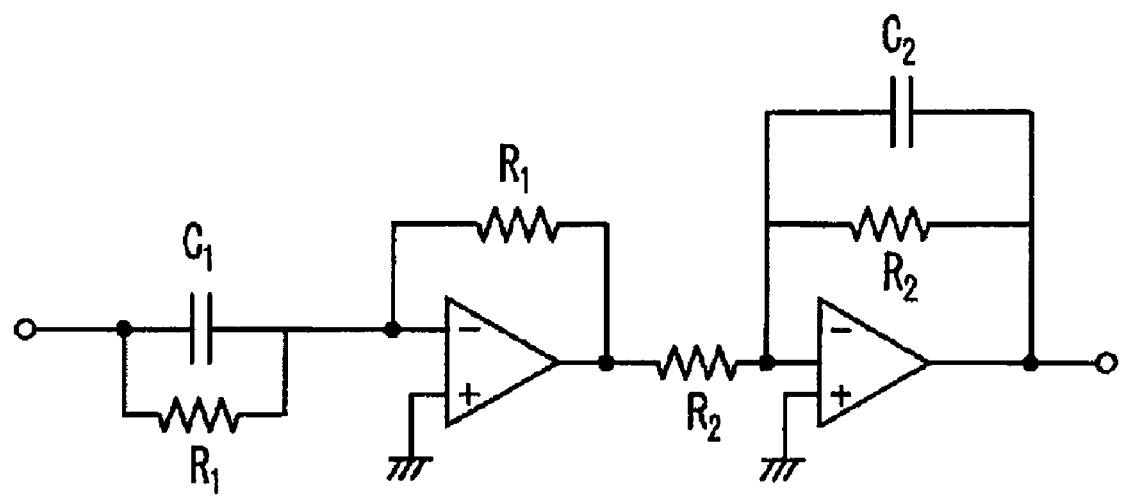
FIG. 44 is a circuit diagram showing an exemplary circuitry configuration of the lead-lag filter.

A detailed exemplary configuration of the lead-lag filters 1063 and 1064 for realizing the frequency characteristics shown in FIG. 43 is as shown in FIG. 44, for example. Note that with the circuitry shown in FIG. 44, $\omega 1 = 1/C_1 R_1$, and $\omega 2 = 1/C_2 R_2$.

Figure 45A:
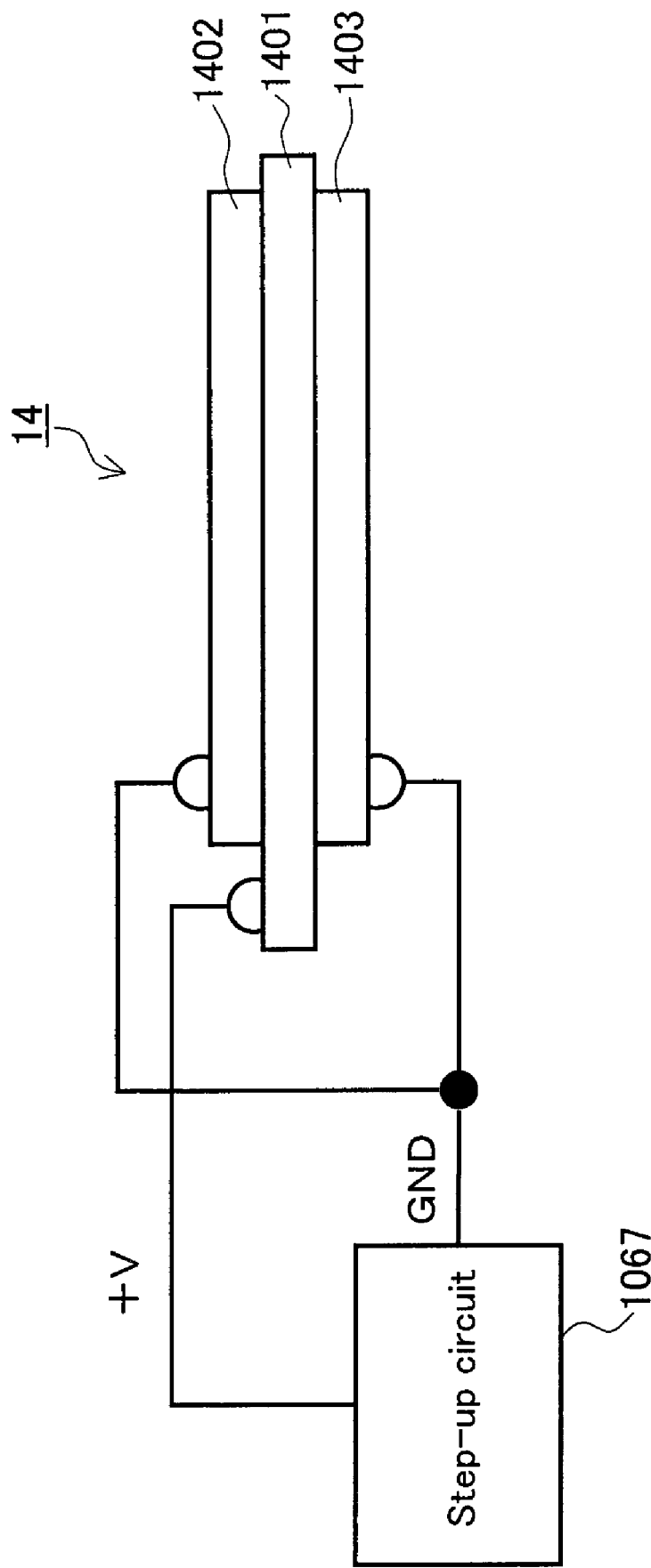
FIG. 45A is a block diagram showing an exemplary drive voltage to the bimorph.
Figure 45B:
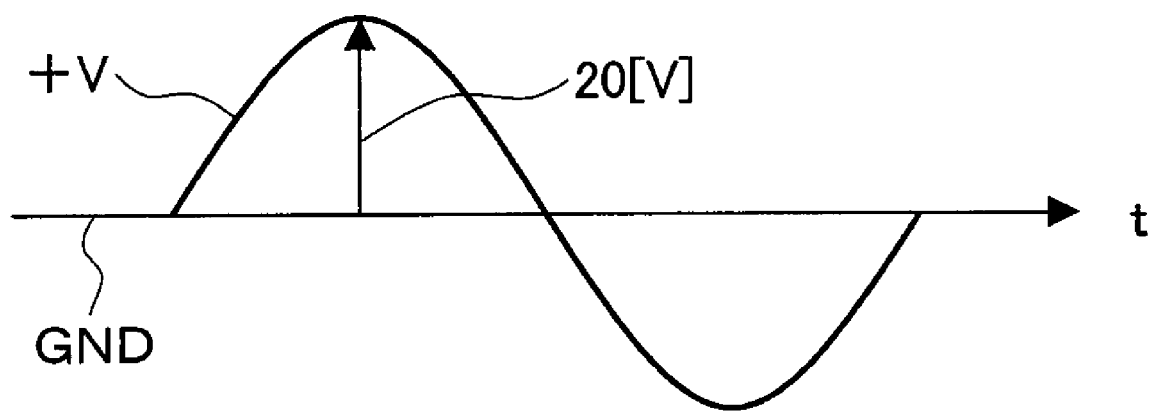
FIG. 45B is a waveform diagram showing an exemplary drive voltage of the bimorph.
Figure 46A:
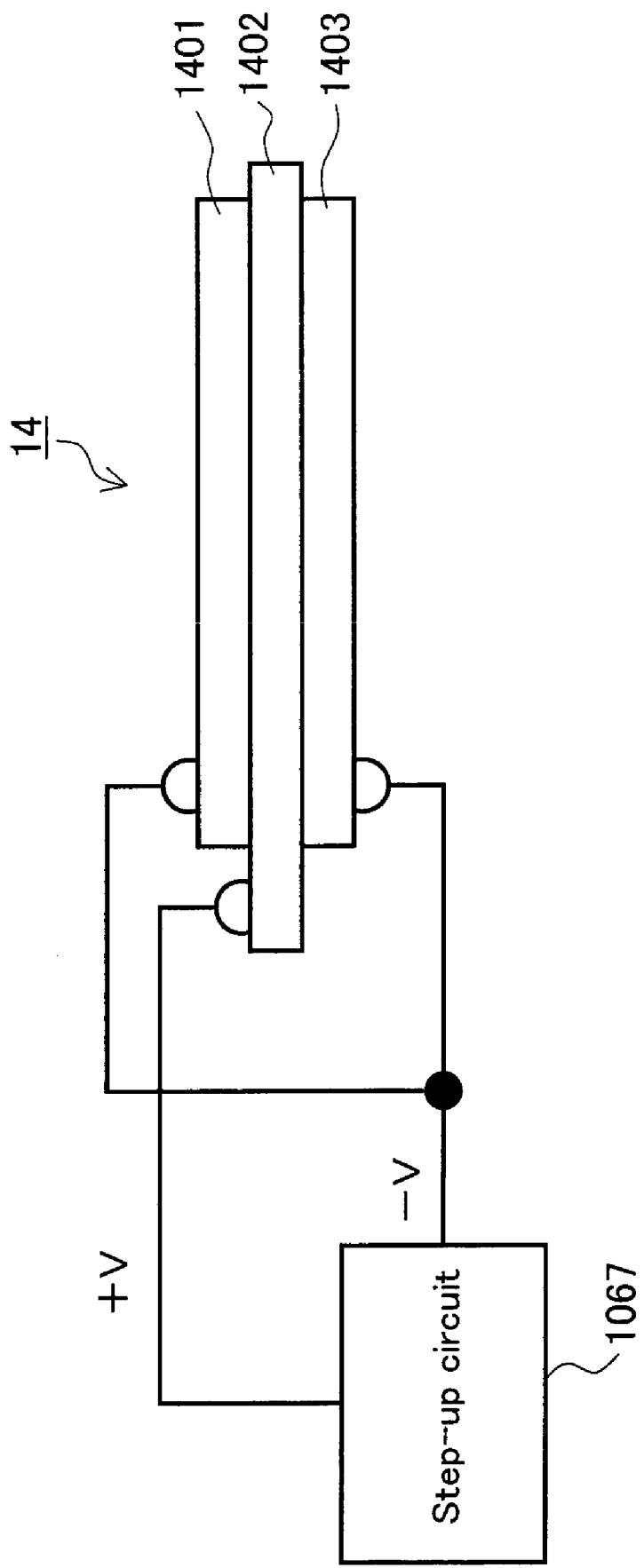
FIG. 46A is a block diagram showing another exemplary drive voltage to the bimorph.
Figure 46B:
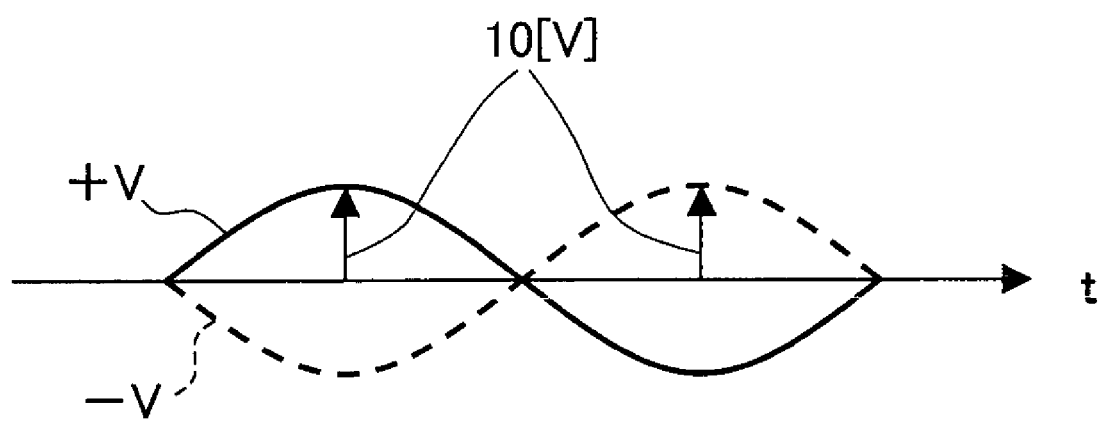
FIG. 46B is a waveform diagram showing another exemplary drive voltage of the bimorph.

FIGS. 45A, 45B, 46A and 46B illustrate the driving of the yaw bimorph 14. As aforementioned, the voltage VxDRV+ is applied to the intermediate electrode plate 1401 of the yaw bimorph 14 by the step-up circuit 1067 of the drive control portion 106, and the voltage VxDRV− is applied respectively to the two piezoelectric elements 1402 and 1403 of the yaw bimorph 14. In this case, a constant voltage (GND) may be applied as VxDRV−, and an alternating voltage (+V) of amplitude 20V, for example, may be applied as VxDRV+, as shown in FIGS. 45A and 45B. Alternatively, an alternating voltage (−V) of amplitude 10V, for example, may be applied as VxDRV−, and an alternating voltage (+V) of opposite polarity to −V may be applied as VxDRV+, as shown in FIGS. 46A and 46B (so-called BTL (differential) system). On comparing the drive method in FIGS. 45A and 45B with the drive method in FIGS. 46A and 46B, the latter method is advantageous in that the supply voltage of the step-up circuit 1067 is small, resulting in a small load. Note that the above also applies to the driving of the pitch bimorph 13.

Figure 47:
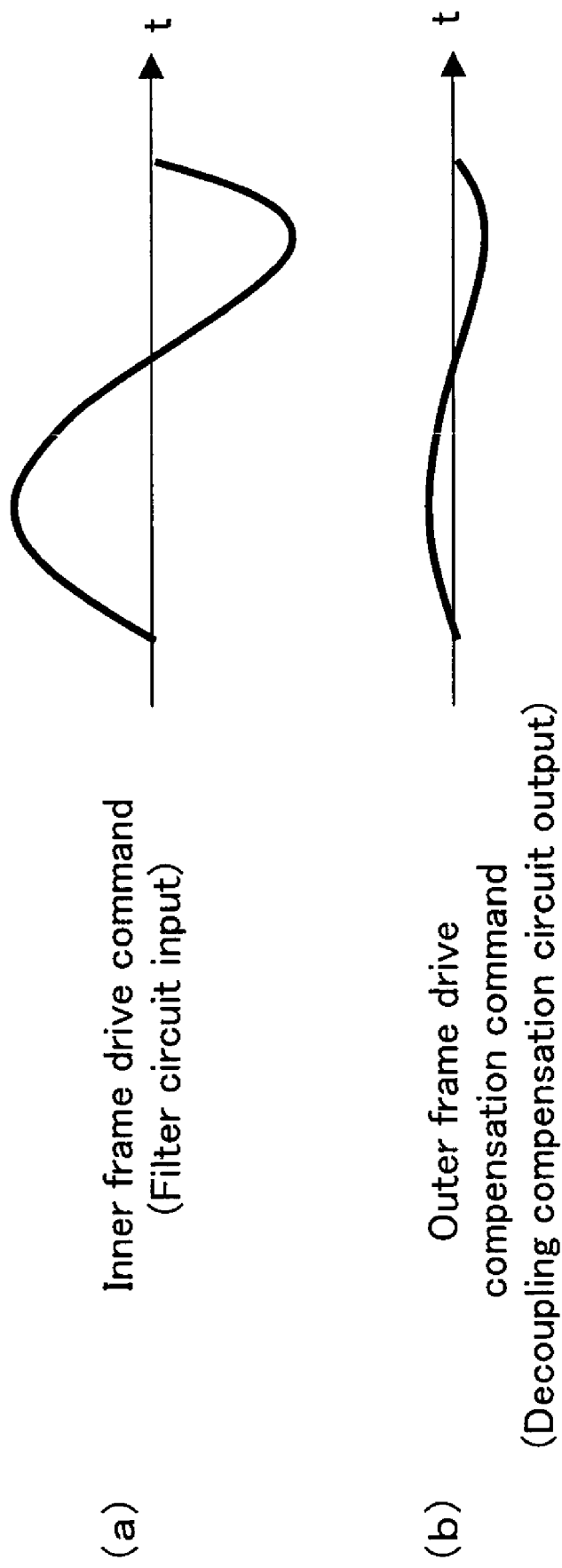
FIG. 47(*a*) is a waveform diagram showing the relation between an inner frame drive command, and FIG. 47(*b*) an outer drive compensation command (b).

The decoupling compensation circuit 1069 will be described next. FIG. 47(a) is a waveform diagram of an inner frame drive command output to the decoupling compensation circuit 1069 from the comparison circuit 1061. FIG. 47(b) is a waveform diagram of an outer frame drive command output to the comparison circuit 1062 from the decoupling compensation circuit 1069.

The decoupling compensation circuit 1069 instructs the circuitry on the pitch side for driving the inner frame 11, based on a signal from the circuitry on the yaw side for driving the lens module 101. The instruction is to turn the inner frame 11 in a direction that prevents the inner frame 11 from recoiling about the pitch turning axis following the turning of the lens module 101 about the yaw turning axis.

Here, the inner frame 11 recoils following the turning of the lens module 101 because the inner frame 11 is coupled to the lens module 101 via the yaw bimorph 14, which forms the drive body. More specifically, the inner frame 11 recoils following the turning of the lens module 101 because the respective rotational motions of the lens module 101 and the inner frame 11 interfere with each other. The mutual interference of the rotational motions arises because the inner frame 11 is coupled to the lens module 101 via the yaw bimorph 14, which forms the drive body. Such mutual interference of the rotational motions easily can be comprehended where two bodies sharing the same axis are coupled together with a drive body, although a similar phenomenon also occurs where the turning axes of two bodies are orthogonal as in the present embodiment. Consequently, the recoiling of the inner frame 11 can be attributed to the inner frame 11 being coupled to the lens module 101 via the yaw bimorph 14 forming the drive body.

The reason for being able to prevent the recoiling of the inner frame 11 as a result of the decoupling compensation circuit 1069 instructing the circuitry on the pitch side based on the signal output from the circuitry on the yaw side is discussed next in relation to the function of the decoupling compensation circuit 1069.

As aforementioned, the inner frame 11 recoils following the turning of the lens module 101 about the yaw turning axis. The lens module 101 turns following the driving of the yaw bimorph 14. The driving of the yaw bimorph 14 is correlated with the drive signal input to the yaw bimorph 14. Consequently, the recoiling of the inner frame 11 is correlated with the drive signal input to the yaw bimorph 14. In view of this, if the drive signal input to the yaw bimorph 14 can detected in advance, the recoiling of the inner frame 11 can be predicted based on this signal. The recoiling of the inner frame 11 then can be prevented if the pitch bimorph 13 is driven in the opposite direction to the recoil. Thus, if the signal from the circuitry on the yaw side is detected, the recoiling of the inner frame 11 can be prevented by predicting the recoil of the inner frame 11 based on the signal from the circuitry on the yaw side, and instructing the circuitry on the pitch side based on the prediction result. Detecting the signal from the circuitry on the yaw side, predicting the recoil of the inner frame 11, and instructing the driving of the pitch bimorph 13 is the function of the decoupling compensation circuit 1069.

Described in detail, the operations of the decoupling compensation circuit 1069 involve detecting in advance the signal input to the lead-lag filter 1063 (i.e., output of the comparison circuit 1061), predicting the recoil of the inner frame 11 based on this signal, and instructing the comparison circuit 1062 to drive the pitch bimorph 13 in the opposite direction to the recoil. The comparison circuit 1062 generates the drive signal for the pitch bimorph 13 based also on the instruction from the decoupling compensation circuit 1069, in addition to the result of comparing the signal from the image stabilization control portion 903 with the signal from the drive control portion 106.

The inner frame 11 recoils in proportion to the output from the comparison circuit 1061. The size of the output from the decoupling compensation circuit 1069 for preventing this recoil needs to be proportionate to the recoil of the inner frame 11. Consequently, the size of the output from the decoupling compensation circuit 1069 is proportionate to the output from the comparison circuit 1061. As for the phase, on the other hand, the phase between the output from the comparison circuit 1061 and the recoiling of the inner frame, which changes according to the positional relation between the yaw bimorph 14 and the pitch bimorph 16 and the relation between the applied signal and the warping, is 0 degrees or 180 degrees. The decoupling compensation circuit 1069 predicts the recoil and generates a control signal to prevent the recoil. The phase of the control signal for preventing the recoil deviates 180 degrees from the recoil. Consequently, the phase of the control signal generated by the decoupling compensation circuit 1069 deviates 180 degrees from the output from the comparison circuit 1061 if the phase between the output from the comparison circuit 1061 and the recoil of the inner frame is 0 degrees, and if the phase is 180 degrees, the phase of the control signal matches the output from the comparison circuit 1061. The size of the output from the decoupling compensation circuit 1069 is proportionate to the output from the comparison circuit 1061, and the phase either matches or deviates 180 degrees from the output of the comparison circuit 1061.

If the output from the comparison circuit 1061 is the waveform signal shown in FIG. 47(a), for example, the output of the decoupling compensation circuit 1069 will be the waveform of FIG. 47(b) or a waveform deviating 180 degrees from this.

The comparison circuit 1061, having received the output from the decoupling compensation circuit 1069, generates a drive signal for offsetting the camera shake based on the output of the image stabilization control portion 903 and the output of the amplifier circuit 1066, and changes this drive signal to a direction that prevents the recoiling of the inner frame based on the output from the decoupling compensation circuit 1069. The changed drive signal then is input to the pitch bimorph 13 via the lead-lag filter 1064 and the step-up circuit 1068. The pitch bimorph 13 drives the inner frame 11 based on this drive signal.

This enables the recoiling about the pitch rotational axis following the turning of the lens module 101 about the yaw turning axis to be prevented while offsetting camera shake about the pitch turning axis, as a result of providing the decoupling compensation circuit 1069.

Note that in the present embodiment the output of the comparison circuit 1062 is changed based on the output of the comparison circuit 1061 in order to prevent the recoiling of the inner frame 11, although the present invention is not limited to this. For example, the signal input to the pitch bimorph 13 may be changed based on the signal input to the yaw bimorph 14.

Also, the output of the lead-lag filter 1064 may be changed based on the output of the lead-lag filter 1063, or the input to the lead-lag filter 1064 may be changed based on the output of the lead-lag filter 1063. If, however, the signal prior to the lead-lag filter 1064 is changed based on the signal prior to the lead-lag filter 1063, as in the present invention, the operation of the yaw bimorph 14 and the pitch bimorph 13 can be stabilized since any noise occurring in the input or output of the decoupling compensation circuit 1069 can be effectively removed with the lead-lag filters 1063 and 1064.

In the present embodiment, an instruction is given to the circuitry on the pitch side based on the signal from the circuitry on the yaw side, although an instruction conversely may be given to the circuitry on the yaw side based on the signal from the circuitry on the pitch side. Also, an instruction may be given to the circuitry on the pitch side based on the signal from the circuitry on the yaw side, and an instruction may be given to the circuitry on the yaw side based on the signal from the circuitry on the pitch side.

Note that the above embodiment does not limit the present invention, and various changes are possible within the scope of the invention.

For example, although in the above embodiment an OIS module 1 is mounted in a digital camera, a component having an imaging function is sufficient, and also may be mounted in electronic devices such as a mobile telephone terminal with built-in camera or a personal digital assistance (PDA), these electronic devices also being embodiments of the present invention.

In the above embodiment the imaging element was described as being a CCD image sensor, although other imaging elements may be used. A CMOS image sensor, for example, may be used. In the above embodiment hall elements are used as position sensors, although other position sensors may be used. Optical sensors, for example, may be used.

Further, in the above embodiment, the OIS module 1 is configured with the inner frame 11 held by the outer frame 12, and the OIS module 1 is mounted in the digital camera by fixing the outer frame 12 to the casing of the digital camera (fixing frame). Specifically, a configuration is illustrated that includes the outer frame 12 as an inner frame supporting body. However, the inner frame 11 may be supported directly with the casing of the digital camera. Providing the OIS module 1 with the outer frame 12 as in the above embodiment enables the process of attaching the bimorphs to be facilitated. On the other hand, if the inner frame 11 is directly supported with the casing of the digital camera without using the outer frame 12, the number of members can be reduced since the outer frame is not needed.

In the above embodiment, a member for provisionally fixing the inner frame 11 to the outer frame 12 when installing the inner frame 11 in the outer frame 12 is not provided, although such a member may be provided. As for the provisional fixing method, a similar member to the stopper 1018c of the lens module 101 may be provided on the inner frame 11.

In the above embodiment, an example is given in which the inner frame 11 and the yaw bimorph supporting portion 1104 are integrated (molded), although they may be fixed together after being formed separately. The former enables the number of processes to be reduced because of being able to eliminate the fixing process. The same applies to the outer frame 12 and the pitch bimorph supporting portion 1201.

In the above embodiment, a configuration is illustrated in which the bimorphs are fixed using fixing plates and fixing screws, although the method of fixing the bimorphs is not limited to this. The direction in which the driving force is applied to the lens module 101 and the inner frame 11 by the bimorphs 13 and 14 need not be in the optical axis direction. If, however, the driving force is applied in the optical axis direction, the area occupied inside the camera when viewed from the subject side of the OIS module 1 can be reduced, since the bimorphs 13 and 14 can be disposed on the back surface of the lens module 101, as per the above embodiment.

Although in the above embodiment an example is given in which a connecting wire is passed through a through hole formed in the intermediate electrode plate of a bimorph and fixed to the bimorph by soldering around the hole, the place in the bimorph where the connecting wire is held may be a cutout portion. The process of passing the connecting wire through the holding position in the bimorph is facilitated thereby.

Figure 48:
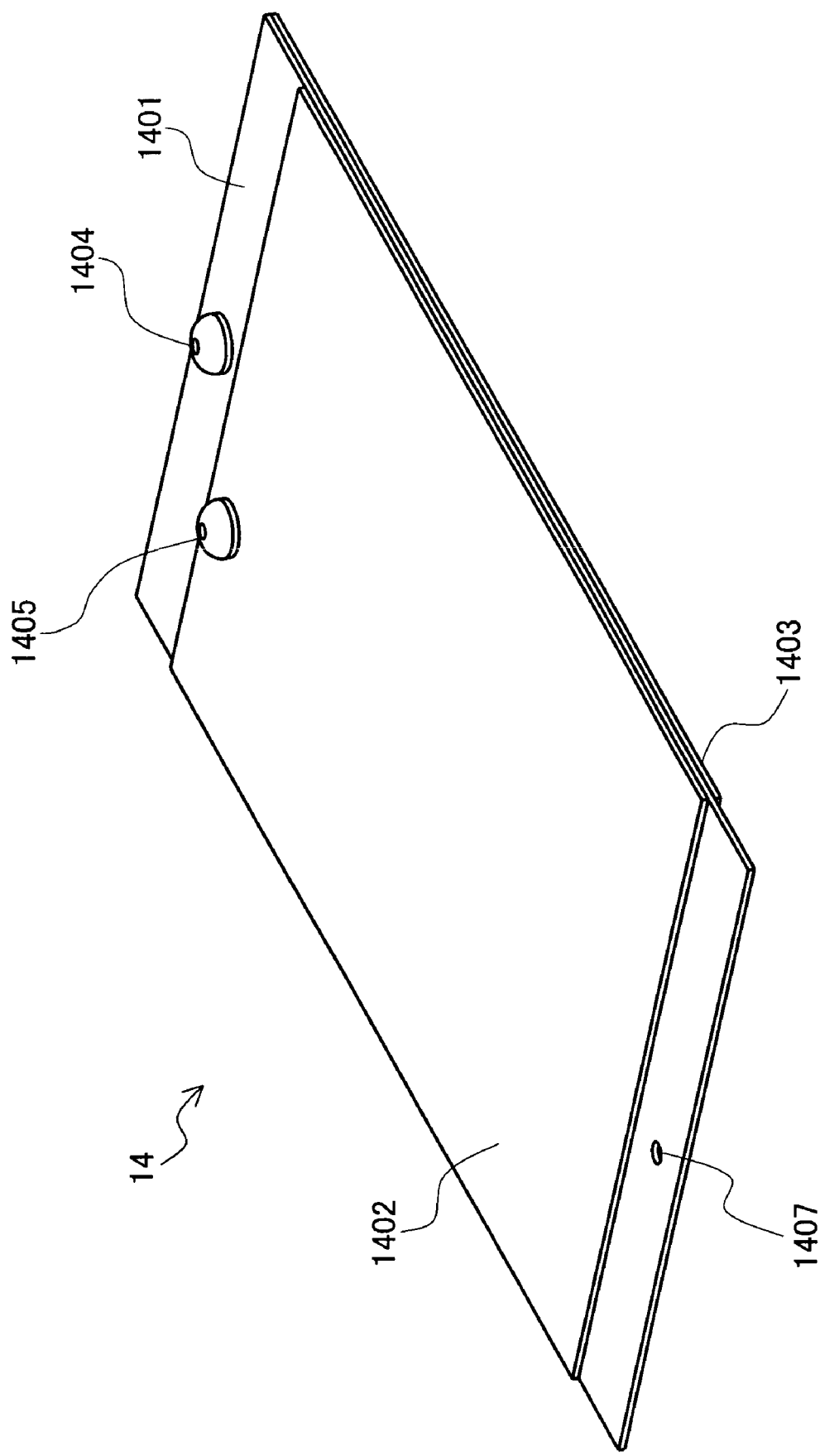
FIG. 48 is a perspective view showing an exemplary configuration of a bimorph.

As shown in FIG. 48, one of the piezoelectric elements (the bottom piezoelectric element 1403 in the given example) may extend at one end to the end of the intermediate electrode plate 1401, and an electrode may be provided on that end. This configuration makes it unnecessary to provide a hole for the electrode valve in the yaw bimorph supporting portion 1104 or the pitch bimorph supporting portion 1201 when fixing the bimorph to the inner frame 11 or the outer frame 12, as shown in FIG. 33.

In the above embodiment, electronic components in the lens module 101 other than the CCD image sensor 1010 are wired to the drive control portion 106 (driver IC) and then connected to the microcomputer 9 of the digital camera body, although some of these components may be wired directly to the microcomputer 9. Also, in the above embodiment, an example was described in which the microcomputer 9 is provided externally to the lens module 101 (i.e., in the digital camera body), although the microcomputer 9 may be provided in the lens module 101.

In the above embodiment, the pitch bimorph 13 and the yaw bimorph 14 are layered orthogonally to each other, although the bimorphs may be arranged in a plane rather than being layered. While this increases the area of the OIS module 1, the thickness thereby can be reduced.

In the above embodiment, an example is given in which the inner frame 11 and the outer frame 12 are rectangular frames, although the frames may be circular or elliptical in shape. The inertia moment thereby can be reduced.

In the above embodiment, the displacement of the lens module 101 in the yaw direction is detected with the yaw position sensor 105 provided in the inner frame 11 (hall element 1120b), and the displacement of the inner frame 11 in the pitch direction is detected with the pitch position sensor 103 provided in the outer frame 12 (hall element). However, magnets may be provided respectively in the lens module 101 and the inner frame 11, and hall elements provided in the outer frame 12. The running of wiring thereby is facilitated because position sensors (hall elements) are disposed only on the fixed outer frame 12 and the movement of movable portions is not constrained by the wiring run from the position sensors. In this case, however, the detection result of the position sensor also reflects movement in the pitch direction, the effect of which needs to be eliminated. Specifically, the result of detecting the relative positions of the inner frame 11 and the outer frame 12 can be subtracted from the result of detecting the relative positions of the lens module 101 and the outer frame 12.

In the above embodiment, the lead-lag filters 1063 and 1064 are used in order to adjust the phase by suppressing the gain at the resonance point, although notch filters or high order filters may be used instead. Using lead-lag filters, however, enables the gain at the resonance point to the suppressed with a simple configuration. Also, lead-lag filters, being feedback circuits, are resistant to disturbance. On the other hand, with notch filters it is necessary to align the resonance points, and with high order filters the size of the circuitry increases.

Note that the configuration included in the content disclosed in the present embodiment may be constituted as follows. The actuators are an exemplary driving portion of the present invention. The shake sensors are exemplary shake detection means. The piezoelectric elements are exemplary first and second driving portions. The leaf springs are exemplary biasing means of the present invention.

(1) A first image stabilizer according to the present invention has a lens module for holding a lens and an imaging element, a frame structure that turnably supports the lens module, and a driving portion that turns the lens module relative to the frame structure. The center of gravity of the lens module is substantially aligned with the turning center of the lens module.

This configuration allows an efficient image stabilization effect to be obtained by substantially aligning the center of gravity of the lens module with the turning center of the lens module, since the center of gravity of the lens module does not move during image stabilization.

(2) A second image stabilizer according to the present invention has a lens module that holds a lens and an imaging element, a frame structure that turnably supports the lens module, and driving portion that turns the lens module relative to the frame structure. The optical axis of the lens is substantially aligned with the turning center of the lens module.

This configuration allows an efficient image stabilization effect to be obtained by substantially aligning the center of gravity of the lens module with the turning center of the lens module, since the center of gravity of the lens module does not move during image stabilization.

(3) A third image stabilizer according to the present invention has a lens module that holds a lens and an imaging element, a frame structure that turnably supports the lens module, and driving portion that turns the lens module relative to the frame structure. The frame structure has an inner frame that turnably supports the lens module about a first turning axis, and an inner frame supporting body that turnably supports the inner frame about a second turning axis orthogonal to the first turning axis. The inertia moment of the lens module about the first turning axis is greater than the inertia moment about the second turning axis.

This configuration enables the difference in inertia moments between the first and second turning axes to be reduced by rotating the lens module about the first turning axis, and rotating both the inner frame and the lens module about the second turning axis. The driving forces about the two axes are thereby aligned, enabling the overall driving force required for the apparatus to be reduced.

(4) In the third image stabilizer according to the present invention, preferably the inertia moment of the lens module about the first turning axis is substantially equal to the inertia moment of the lens module and the inner frame about the second turning axis. The overall driving force required for the apparatus can thereby be reduced.

(5) A fourth image stabilizer according to the present invention has a lens module for holding a lens, an imaging element, a shutter unit, a focus motor for driving the lens in the optical axis direction, and a shutter motor that drives the shutter unit, a frame structure that turnably supports the lens module on one or two or more turning axes, and driving portion that turns the lens module relative to the frame structure. The focus motor and the shutter motor are disposed in the lens module so as to oppose each other with one of the turning axes sandwiched therebetween.

This configuration enables the inertia moment of the lens module about the turning axis to be reduced, and makes it possible to reduce the device size and profile by disposing a shutter motor and a focus motor, which are relatively heavy constituent members of the lens module, in the lens module so as to oppose each other with a turning axis disposed therebetween.

(6) A fifth image stabilizer according to the present invention has a lens module that holds a lens and an imaging element, a frame structure that turnably supports the lens module, and driving portion that turns the lens module relative to the frame structure. The frame structure has an inner frame that turnably supports the lens module about a first turning axis, and an inner frame supporting body that turnably supports the inner frame about a second turning axis orthogonal to the first turning axis. The inner frame and the inner frame supporting body at least partially overlap in the thickness direction.

This configuration makes device miniaturization possible by providing the frame structure with an inner frame that turnably supports the lens module about a first turning axis and an inner frame supporting body that turnably supports the inner frame about a second turning axis orthogonal to the first turning axis, and having the inner frame and the inner frame supporting body at least partially overlap in the thickness direction.

(7) In the first to fifth image stabilizers, preferably the lens module further includes a shutter unit.

(8) A sixth image stabilizer according to the present invention has a lens module that holds a lens and an imaging element, a frame structure that turnably supports the lens module on one or two or more turning axes, and driving portion that turns the lens module relative to the frame structure. At one end of one of the turning axes a pivot pin is provided on the lens module and a bearing on the frame structure, and at the other end of the turning axis a bearing is provided on the lens module and a pivot pin on the frame structure. The lens module is supported relative to the frame structure via the pivot pins and the bearings.

This configuration facilitates the process of attaching the lens module to the frame structure by providing a pivot pin on the lens module and a bearing on the frame structure at one end of one of the turning axes, and a bearing on the lens module and a pivot pin on the frame structure at the other end of the turning axis, and supporting the lens module relative to the frame structure via the pivot pins and the bearings.

(9) A seventh image stabilizer according to the present invention has a lens module that holds a lens and an imaging element, a frame structure that turnably supports the lens module, and driving portion that turns the lens module relative to the frame structure. The frame structure has an inner frame that turnably supports the lens module about a first turning axis, and an inner frame supporting body that turnably supports the inner frame about a second turning axis orthogonal to the first turning axis. At one end of the first turning axes a pivot pin is provided on the lens module and a bearing on the inner frame, and at the other end of the first turning axis a bearing is provided on the lens module and a pivot pin on the inner frame. The lens module is supported relative to the inner frame via the pivot pins and the bearings.

This configuration facilitates the process of attaching the lens module to the inner frame by providing a pivot pin on the lens module and a bearing on the inner frame at one end of the first turning axes, and a bearing on the lens module and a pivot pin on the inner frame at the other end of the first turning axis, and supporting the lens module relative to the inner frame via the pivot pins and the bearings.

(10) An eighth image stabilizer according to the present invention has a lens module that holds a lens and an imaging element, a frame structure that turnably supports the lens module, and driving portion that turns the lens module relative to the frame structure. The frame structure has an inner frame that turnably supports the lens module about a first turning axis, and an inner frame supporting body that turnably supports the inner frame about a second turning axis orthogonal to the first turning axis. At one end of the second turning axes a pivot pin is provided on the inner frame and a bearing on the inner frame supporting body, and at the other end of the second turning axis a bearing is provided on the inner frame and a pivot pin on the inner frame supporting body. The inner frame is supported relative to the inner frame supporting body via the pivot pins and the bearings.

This configuration facilitates the process of attaching the inner frame to the inner frame supporting body by providing a pivot pin on the inner frame and a bearing on the inner frame supporting body at one end of the second turning axes, and a bearing on the inner frame and a pivot pin on the inner frame supporting body at the other end of the second turning axis, and supporting the inner frame relative to the inner frame supporting body via the pivot pins and the bearings.

(11) In the sixth to eighth image stabilizers, the pivot pins preferably are biased in the bearing direction. This configuration enables play in both the thrust and radial directions when the lens module or the inner frame turns about the axes to be prevented.

(12) In the sixth to eighth image stabilizers, guide grooves preferably are formed adjacent to the bearings that guides the pivot pins to the bearings. This configuration facilitates the process of inserting the pivot pins into the bearings when attaching the lens module to the frame structure, or when attaching the lens module to the inner frame, or when attaching the inner frame to the inner frame supporting body.

(13) In the sixth image stabilizers, a stopper preferably is included in the frame structure that provisionally fixes the frame structure and the lens module prior to the frame structure and the lens module being fixed with the pivot pins. This configuration facilitates the process of attaching the lens module to the frame structure.

(14) In the sixth to eighth image stabilizers, preferably the tip of each pivot pin is spherical, the surface of the bearing that contacts the pivot pin is concave, and the radius of curvature of the concave surface of the bearing is greater than the radius of curvature of the surface of the tip of the pivot pin.

This configuration enables friction to be reduced because of the point contact of the contact position of the pivot pin with the bearing, and also enables positional deviation in both the radial and thrust directions to be regulated.

(15) A ninth image stabilizer according to the present invention has a lens module that holds a lens and an imaging element, a frame structure that turnably supports the lens module, and driving portion that turns the lens module relative to the frame structure. The driving portion includes a piezoelectric element.

This configuration enables device size and profile to be reduced in comparison to where a motor or the like is used as the driving portion.

(16) In the ninth image stabilizer, preferably the driving portion applies a driving force to the lens module in the optical axis direction. This configuration enables device size when viewed from the optical axis direction to be reduced, since the space required for the lens module to oscillate can be secured in a direction parallel to the optical axis.

(17) In the ninth image stabilizer, preferably the driving portion is disposed rearwardly of the imaging element. This configuration enables device size when viewed from the optical axis direction to be reduced.

(18) In the ninth image stabilizer, preferably the frame structure has an inner frame that turnably supports the lens module about a first turning axis, and an inner frame supporting body that turnably supports the inner frame about a second turning axis orthogonal to the first turning axis, the driving portion includes a first piezoelectric element that turns the lens module about the first turning axis, and a second piezoelectric element that turns the inner frame about the second turning axis, and the first and second piezoelectric elements are disposed to at least partially overlap when viewed from the optical axis direction. This configuration enables device size when viewed from the optical axis direction to be reduced.

(19) In the ninth image stabilizer, preferably the piezoelectric elements are rectangular in shape. This configuration enables a large driving force to be obtained in comparison to where piezoelectric elements having the same lengthwise and widthwise size are triangular or trapezoidal in shape.

(20) In the ninth image stabilizer, preferably the frame structure has an inner frame that turnably supports the lens module about a first turning axis, and an inner frame supporting body that turnably supports the inner frame about a second turning axis orthogonal to the first turning axis, the driving portion includes a first piezoelectric element that turns the lens module about the first turning axis, and a second piezoelectric element that turns the inner frame about the second turning axis, and the first and second piezoelectric elements are the same shape. This configuration enables component procurement costs to be cut because of being able to use the same components.

(21) In the ninth image stabilizer, preferably the piezoelectric elements each are composed of at least one ceramic plate stuck to an electrode plate that is longer than the at least one ceramic plate. This configuration enables the space that attaches an electrode to the electrode plate to be secured.

(22) In the ninth image stabilizer, preferably the piezoelectric elements each are composed of two ceramic plates sandwiching an electrode plate, and the ceramic plates are of different lengths. This configuration enables space that attaches an electrode to the electrode plate to be secured.

(23) In the ninth image stabilizer, preferably the driving portion includes a coupling member that couples the piezoelectric element to the lens module, and the piezoelectric element has a hole or a cutout portion that connects the coupling member.

(24) In the ninth image stabilizer, preferably the driving portion includes a coupling member that couples the piezoelectric element to the lens module, and the coupling member is flexible.

(25) In the ninth image stabilizer, preferably the coupling member is fixed to the piezoelectric element by soldering.

(26) In the ninth image stabilizer, preferably the coupling member includes SUS or a material whose base material has had one of solder plating, gold plating and silver plating performed thereon.

(27) In the ninth image stabilizer, preferably the driving portion includes a coupling member that couples the piezoelectric element to the lens module, and the coupling member is fixed in proximity to the turning axis of the lens module.

This configuration enables a large rotation angle of the lens module to be secured even if the amplitude of the piezoelectric elements is small.

(28) In the ninth image stabilizer, preferably the driving portion includes a coupling member that couples the piezoelectric element to the lens module, the lens module has a substantially rectangular parallelepiped body and is pivotally supported on two opposing surfaces by the frame structure, and the coupling member is fixed to a rear surface of the lens module on a side adjacent to the pivotally supported surfaces or in proximity thereto.

(29) In the ninth image stabilizer, preferably one side of the piezoelectric element is fixed to the frame structure by a rod-like fixing member. This configuration enables the piezoelectric element to be fixed securely.

(30) In the ninth image stabilizer, preferably the fixing member has a depressed portion that is longer than the width of the piezoelectric element and shallower than the thickness of the piezoelectric element, and fixes the piezoelectric element by pressing down thereon using the depressed portion. This configuration facilitates positioning and enables the fixing strength to be increased.

(31) In the ninth image stabilizer, preferably the piezoelectric element is a bimorph.

(32) A tenth image stabilizer according to the present invention has a lens module that holds a lens and an imaging element, a frame structure that turnably supports the lens module, and driving portion that turns the lens module relative to the frame structure. The frame structure has an inner frame that turnably supports the lens module about a first turning axis, and an inner frame supporting body that turnably supports the inner frame about a second turning axis orthogonal to the first turning axis. The inner frame supporting body is provided with a beam structure, and the driving portion is attached to the beam structure.

This configuration enables the inner frame supporting body to be strengthened because the portion to which the driving portion is attached doubles as the beam structure of the inner frame supporting body.

(33) An eleventh image stabilizer according to the present invention has a lens module that holds a lens and an imaging element, a frame structure that turnably supports the lens module, driving portion that turns the lens module relative to the frame structure, and a magnetic sensor that detects the position of the lens module. The frame structure is composed of a nonmagnetic body.

According to this configuration, the frame structure does not readily affect the magnetic sensor that detects the position of the lens module as a result of being composed of a nonmagnetic body.

(34) A twelfth image stabilizer according to the present invention has a lens module that holds a lens and an imaging element, a frame structure that turnably supports the lens module, and driving portion that turns the lens module relative to the frame structure. The frame structure has an inner frame that turnably supports the lens module about a first turning axis, and an inner frame supporting body that turnably supports the inner frame about a second turning axis orthogonal to the first turning axis. The twelfth image stabilizer further includes a first position sensor that detects the position of the lens module relative to the inner frame, and a second position sensor that detects the position of the inner frame relative to the inner frame supporting body. The first position sensor is provided in the inner frame and the second position sensor is provided in the inner frame supporting body.

This configuration enables the routing of wiring that extracts detection results from the position sensors to be simplified by providing position sensors externally to the detection object.

(35) The twelfth image stabilizer preferably further includes first and second amplifiers that respectively amplify the output of the first and second position sensors, and are provided in the lens module. This configuration enables the effect of noise on the output of the position sensors to be reduced.

(36) In the twelfth image stabilizer, preferably magnetic sensors are used as the first and second position sensors, the lens module has a shutter motor, and the magnetic sensors are disposed in a position that does not overlap in a plane with the shutter motor. Magnetic field interference thereby can be prevented.

(37) A thirteenth image stabilizer according to the present invention has a lens module that holds a lens, an imaging element, a focus motor that drives the lens in the optical axis direction, and a reference position detection sensor that detects the reference position of the lens in the optical axis direction, a frame structure that turnably supports the lens module, and driving portion that turns the lens module relative to the frame structure. A mechanical sensor that performs position detection though contact with a contact terminal is used as the reference position detection sensor.

This configuration enables a low cost device to be provided because of being able to detect the reference position without using an optical sensor.

(38) A fourteenth image stabilizer according to the present invention has a lens module that holds a lens and an imaging element, a frame structure that turnably supports the lens module on one or two or more turning axes, driving portion that turns the lens module relative to the frame structure, and a flexible cable that connects to the lens module. The flexible cable is disposed so that the cable surface of a portion that extends from the lens module is parallel with the turning axis.

This configuration is advantageous in that any constraint on the movement of the lens module caused by the flexible cable is reduced, thereby requiring less driving force to drive the lens module.

(39) The fourteenth image stabilizer preferably further includes a drive control portion that controls the driving portion, the drive control portion being built into an IC provided on the cable surface of the flexible cable. The routing of wiring is thereby simplified. A situation in which the movement of the lens module is constrained because of the thickness of the flexible cable also can be prevented.

(40) A fifteenth image stabilizer according to the present invention has a lens module that holds a lens and an imaging element, a frame structure that turnably supports the lens module, a shake detection means that detects shaking of the image stabilizer, a turn instructing portion that instructs that the lens module be turned in a direction that offsets the shaking, based on the shaking detected by the shake detection means, a position sensor that detects the turning position of the lens module relative to the frame structure, a comparison circuit that compares the turning position instructed by the turn instructing portion with the turning position detected by the position sensor and instructing that the lens module be turned in a direction which reduces the deviation between the turning positions, a filter circuit that filters the output of the comparison circuit, and a piezoelectric element that turns the lens module relative to the frame structure based on the output of the filter circuit. The filter circuit is a lead-lag filter.

This configuration enables any gain at the resonance point to be suppressed, and distortion of the drive signal caused by the harmonic component of the resonance point to be prevented.

(41) A sixteenth image stabilizer according to the present invention has a lens module that holds a lens and an imaging element, a frame structure that turnably supports the lens module, a piezoelectric element that turns the lens module relative to the frame structure, and a drive control circuit that controls the piezoelectric element. The drive control circuit drives the piezoelectric element with a BTL system.

This configuration enables the supply voltage to be suppressed.

(42) A seventeenth image stabilizer according to the present invention has a lens module that holds a lens and an imaging element, an inner frame that turnably supports the lens module about a first turning axis, an inner frame supporting body that turnably supports the inner frame about a second turning axis orthogonal to the first turning axis, a shake detection means that detects shaking of the image stabilizer, a first turn instructing portion that instructs that the lens module be turned about the first turning axis in a direction that offsets the shaking, based on the shaking detected by the shake detection means, a first driving portion that drives the lens module about the first turning axis in accordance with the instruction from the first turn instructing portion, a decoupling circuit that instructs that the inner frame be turned in a direction that prevents recoiling of the inner frame following the turning of the lens module about the first turning axis, a second turn instructing portion that instructs that the inner frame be turned in a direction that prevents recoiling about the second turning axis following the turning of the lens module around the first turning axis while offsetting the shaking about the second turning axis based on the shaking detected by the shake detection means and the instruction from the decoupling circuit, and a second driving portion that drives the inner frame about the second turning axis in accordance with the instruction from the second turn instructing portion.

This configuration enables recoiling about the second rotation axis following the turning of the lens module about the first turning axis to be prevented, while offsetting camera shake about the second turning axis.

(43) A camera of the present invention includes any one of the aforementioned image stabilizers. A camera reduced in size and profile can thereby be provided.

(44) An image stabilizer manufacturing method according to the present invention for an image stabilizer having a lens module that holds a lens and an imaging element, a frame structure that turnably supports the lens module on one or two or more turning axes, and driving portion that turns the lens module relative to the frame structure, with a pivot pin being provided in the lens module and a bearing being provided in the frame structure at one end of one of the turning axes, and a bearing being provided in the lens module and a hole being provided in the frame structure at the other end of the turning axis, the method including the steps of inserting the pivot pin of the lens module into the bearing of the frame structure, fixing one end of a fixing pivot pin to a biasing means, inserting the other end of the fixing pivot pin into the bearing of the lens module through the hole in the frame structure, and biasing the fixing pivot pin in the direction of the bearing of the lens module by fixing the biasing means to the frame structure.

According to this manufacturing method, the manufacturing of an image stabilizer having a frame structure that turnably holds a lens module can be facilitated using simplified procedures.

Embodiment 2

An embodiment 2 of the present invention will be described next. Note that in embodiment 2, the same reference numerals are associated with constituent elements that are similar to the aforementioned embodiment 1, and a detailed description of these elements will be omitted. The following description will focus on the differences from the configuration of embodiment 1.

1. Control of Digital Camera 1-1. Overall Operations

Figure 49:
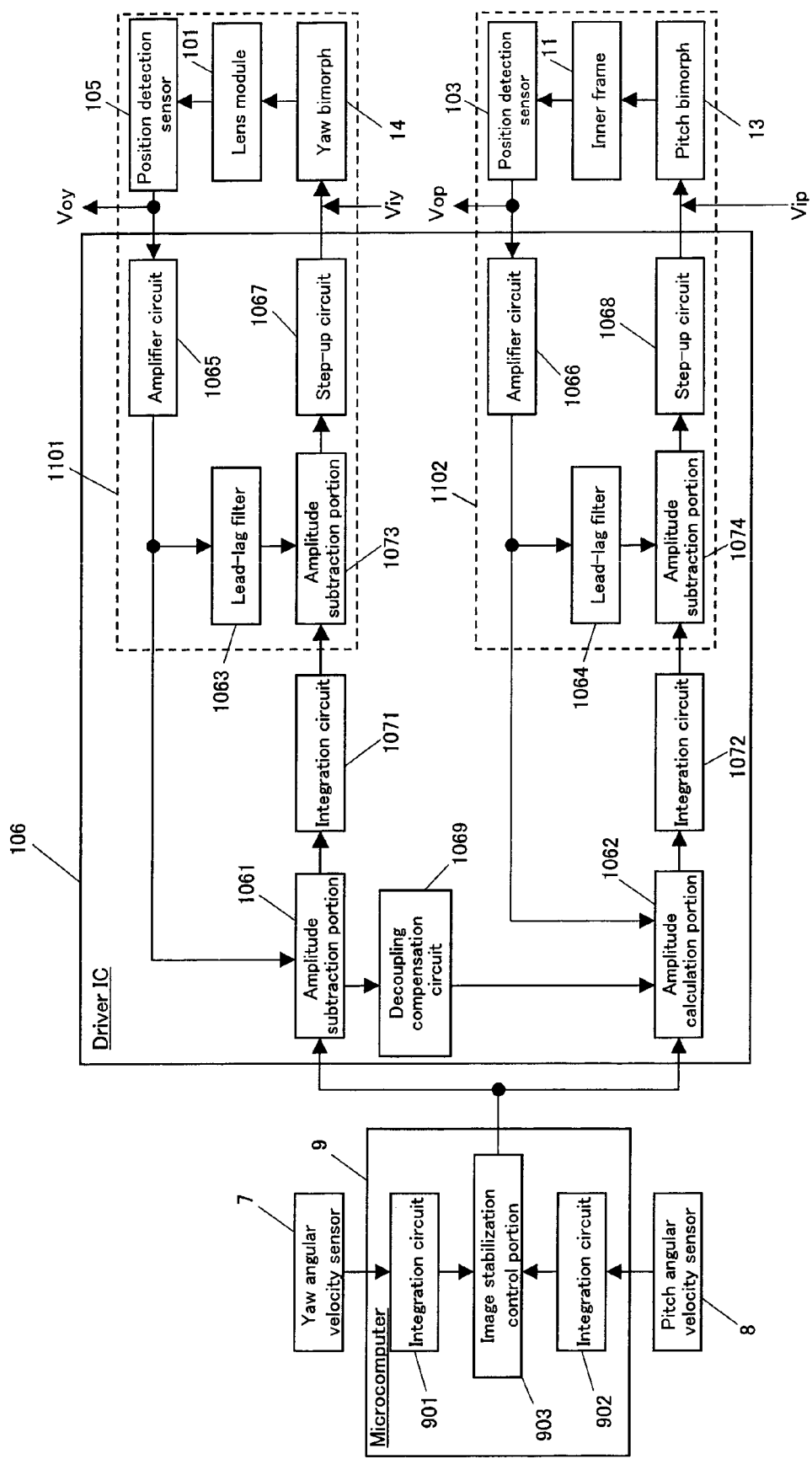
FIG. 49 is a block diagram showing a schematic configuration of the control system of a digital camera according to embodiment 2.

FIG. 49 is a block diagram showing a schematic configuration of the control system of a digital camera according to the present embodiment. As shown in FIG. 49, the drive control portion 106 of the OIS module 1 includes an amplitude subtraction portion 1061, an integration circuit 1071, an amplitude subtraction portion 1073, a lead lag filter 1063, an amplifier circuit 1065, and a step-up circuit 1067 for position control about the yaw turning axis Y, and an amplitude calculation portion 1062, an integration circuit 1072, an amplitude subtraction portion 1074, a lead lag filter 1064, an amplifier circuit 1066, and a step-up circuit 1068 for position control about the pitch turning axis P. A decoupling compensation circuit 1069 is disposed between the amplitude subtraction portion 1061 and the amplitude calculation portion 1062 in order to compensate for the effects caused by recoil on the inner frame 11 when the lens module 101 turns.

Figure 50A:
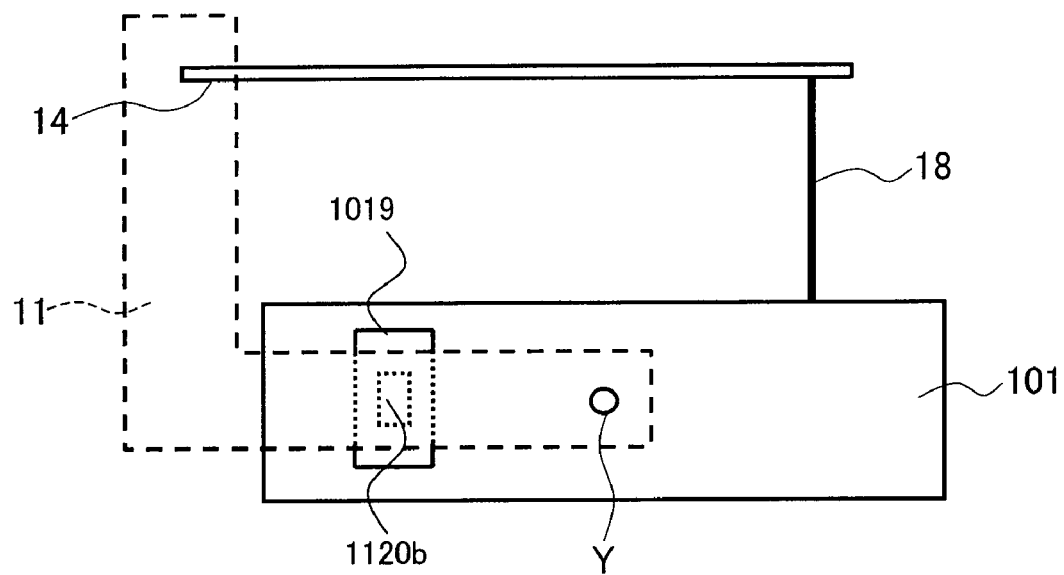
FIG. 50A is a schematic view showing the inner frame or the lens module having been rotated by the bimorph.
Figure 50B:
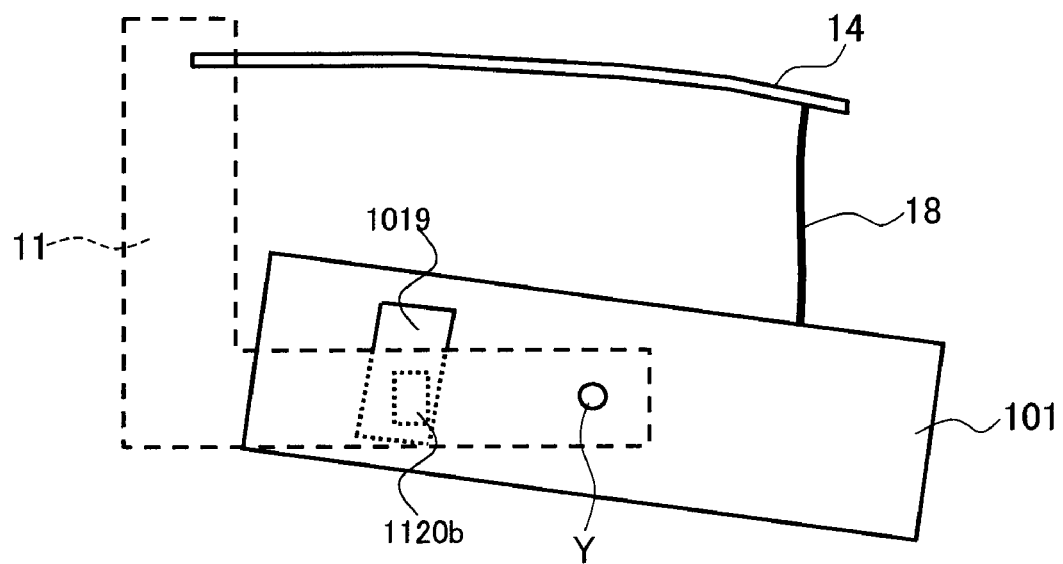
FIG. 50B is a schematic view showing the inner frame or the lens module having been rotated by the bimorph.

The detailed configuration of the position detection sensor 105 is shown in FIG. 50. As shown in FIGS. 50A and 50B, a magnet 1019 is disposed on the side of the lens module 101, and a hall element 1120b is disposed in a position substantially opposed to the magnet 1019 in the inner frame 11. Note that description of the position detection method will be omitted, having been described in embodiment 1. Thus, the hall element 1120b (or magnet) fixed to the inner frame 11 and the magnet 1019 (or hall element) fixed to the lens module 101 perform mutual position detection. Although not shown, a hall element (or magnet) fixed to the outer frame and a magnet (or hall element) fixed to the inner frame also perform mutual position detection.

The operations are described below.

The yaw angular velocity sensor 7 measures the angular velocity of the digital camera in the yaw rotational direction caused by camera shake, and outputs the result to the microcomputer 9. The integration circuit 901 of the microcomputer 9 integrates the angular velocity, and outputs the result to the image stabilization control portion 903. The pitch angular velocity sensor 8 measures the angular velocity of the digital camera in the pitch rotational direction caused by camera shake, and outputs the result to the microcomputer 9. The integration circuit 902 of the microcomputer 9 integrates the angular velocity and outputs the result to the image stabilization control portion 903. The image stabilization control portion 903 respectively calculates a correction target value in the yaw direction and a correction target value in the pitch direction based on the outputs from the integration circuits 901 and 902, and outputs the respective correction target values to the amplitude subtraction portion 1061 and the amplitude calculation portion 1062.

The yaw position sensor 105 detects the current position of the lens module 101 in the yaw direction, and outputs the result to the amplifier circuit 1065. The detected current position of the lens module 101 amplified by the amplifier circuit 1065 is provided to the amplitude subtraction portion 1061 and the lead-lag filter 1063. The amplitude subtraction portion 1061 compares the detected current position of the lens module 101 with the correction target value in the yaw direction provided from the image stabilization control portion 903 of the microcomputer 9, and outputs the comparison result to the amplitude subtraction portion 1073 via the integration circuit 1071. The amplitude subtraction portion 1061 and the integration circuit 1071 perform disturbance compensation. A detailed description of this operation will be given in later.

The amplitude subtraction portion 1073 compares the signal output from the integration circuit 1071 with the signal obtained by outputting the result of detecting the current position of the lens module 101 via the lead-lag filter 1063, and outputs the comparison result to the step-up circuit 1067. The step-up circuit 1067 turns the lens module 101 about the yaw turning axis Y by driving the yaw bimorph 14 with a voltage that depends on the comparison result.

Similarly, the pitch position sensor 103 detects the current position of the inner frame 11 in the pitch direction, and outputs the result to the amplifier circuit 1066. The detected current position of the inner frame 11 amplified by the amplifier circuit 1066 is provided to the amplitude calculation portion 1062 and the lead-lag filter 1064. The amplitude calculation portion 1062 compares the detected current position of the inner frame 11 with the correction target value in the pitch direction provided from the image stabilization control portion 903 of the microcomputer 9, and outputs the comparison result to the amplitude subtraction portion 1074 via the integration circuit 1072. The amplitude subtraction portion 1074 compares the signal output from the integration circuit 1072 with the signal obtained by outputting the result of detecting the current position of the inner frame 11 via the lead-lag filter 1064, and outputs the comparison result to the step-up circuit 1068. The step-up circuit 1068 turns the inner frame 11 about the pitch turning axis P by driving the pitch bimorph 13 with a voltage that depends on the comparison result.

Note that here the lead-lag filters 1063 and 1064 are inserted in order to reduce gain resonance particular to bimorphs.

1-2. Disturbance Compensation Control

Firstly, "disturbance" in the present description refers to an external load that acts on the lens module or the inner frame, and includes, for example, the wiring load resulting from the flexible substrate electrically connecting the lens module or the inner frame to a circuit board in the digital still camera, the load of the bearings on the turning portion, or variability in the drive characteristics of the bimorphs. In terms of the wiring load, the lens module and the inner frame are electrically connected by a flexible substrate to a circuit board in the digital still camera, as shown in embodiment 1, with the load in the vertical direction resulting from the weight of the flexible substrate and the load accompanying the elastic force that arises when the flexible substrate is flexed constantly acting on the lens module and the inner frame.

Disturbance compensation on the yaw side by the amplitude comparator 1061 and the integration circuit 1071 is described next.

Figure 51:
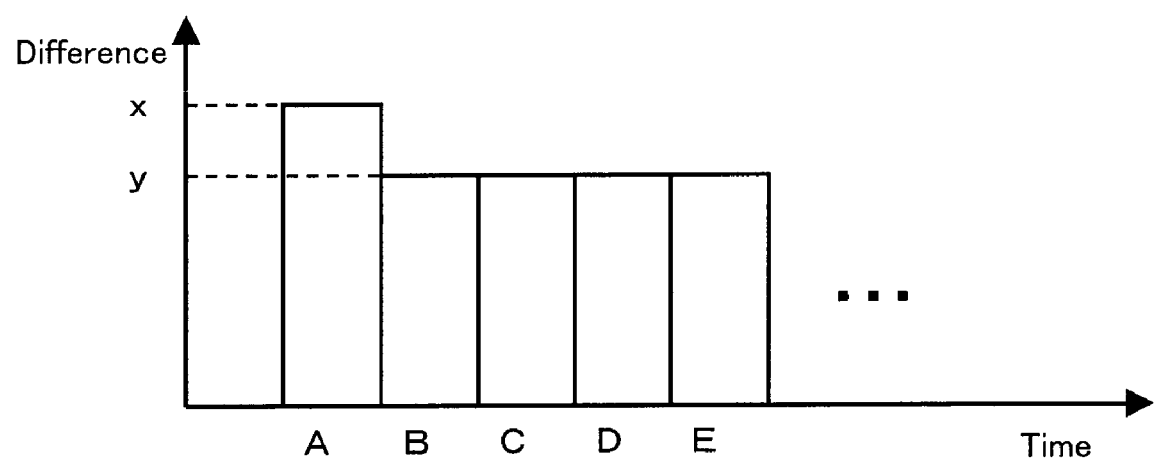
FIG. 51 is a characteristic diagram showing the shift in difference values output from an amplitude subtraction portion when an integration circuit is not provided.
Figure 52:
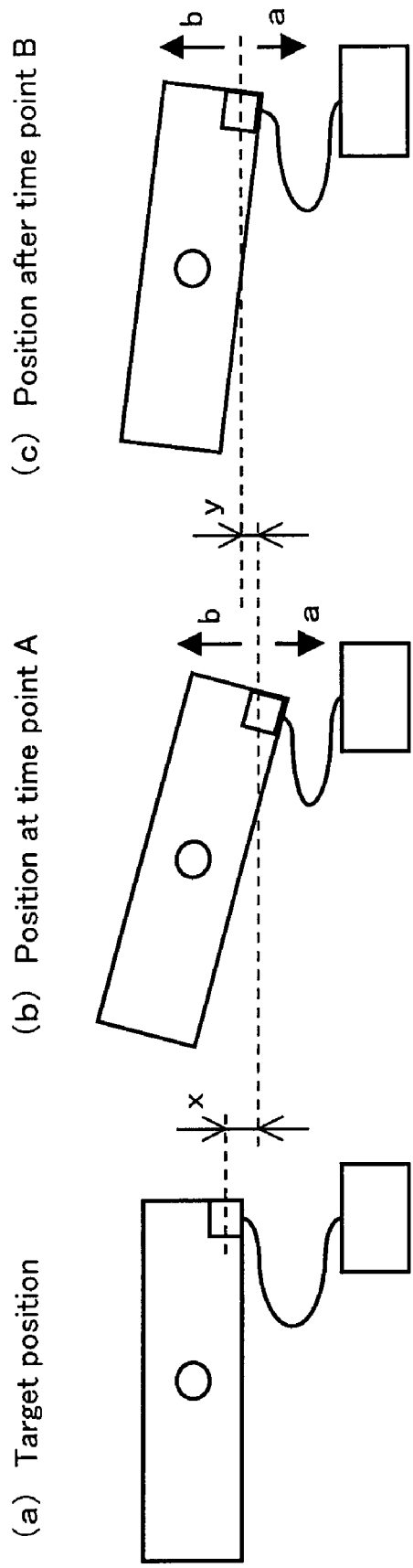
FIG. 52 is a schematic view showing the movement of the lens module.
Figure 53A:
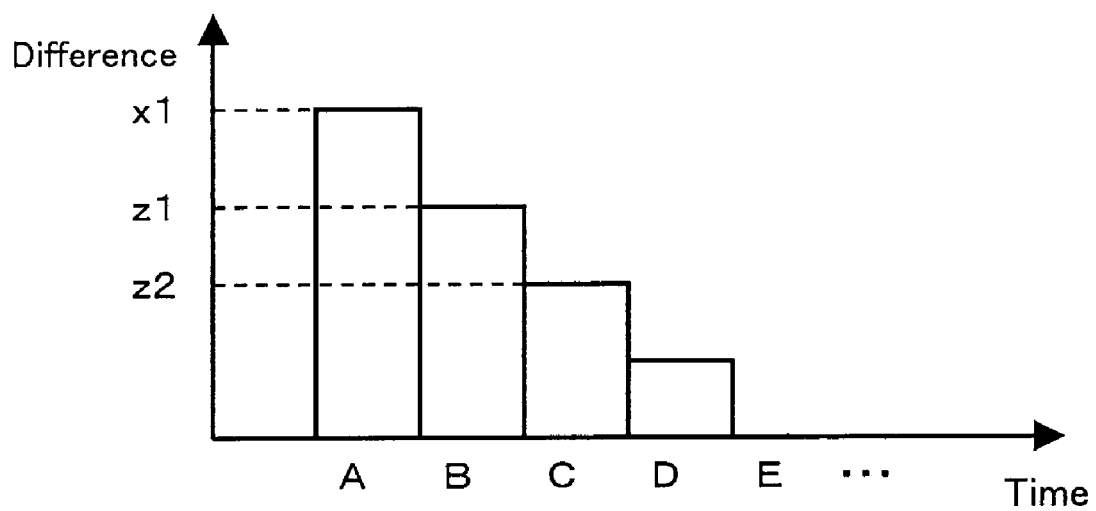
FIG. 53A is a characteristic diagram showing the shift in difference values output from the amplitude subtraction portion.
Figure 53B:
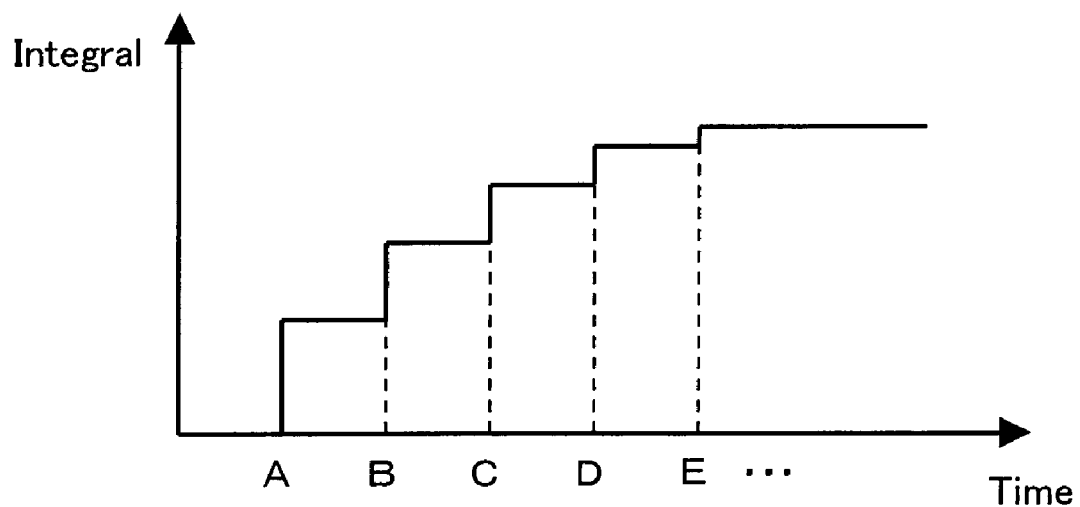
FIG. 53B is a characteristic diagram showing the shift in integral values output from the amplitude subtraction portion.
Figure 54A:
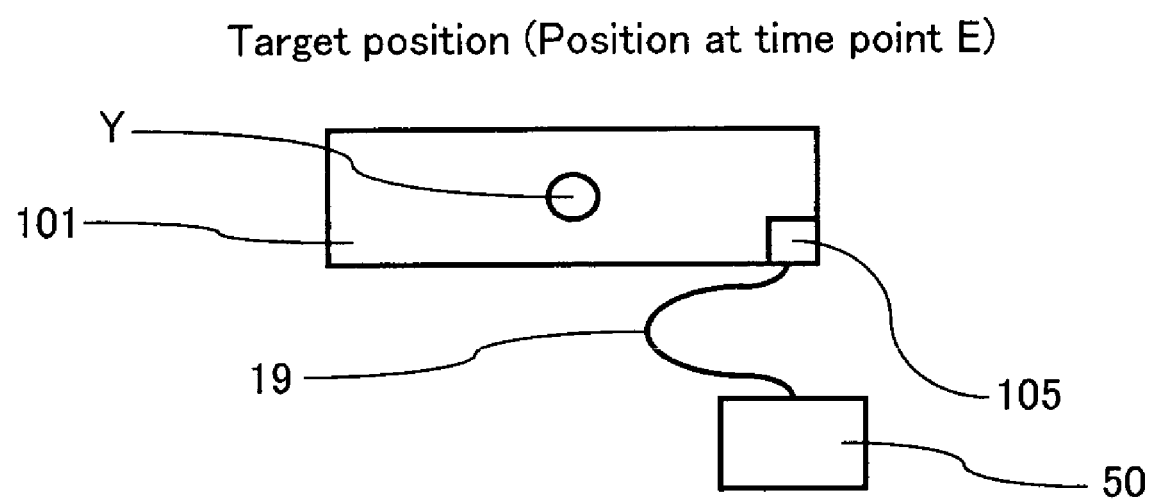
FIG. 54A is a schematic view showing the lens module in a reference position.
Figure 54B:
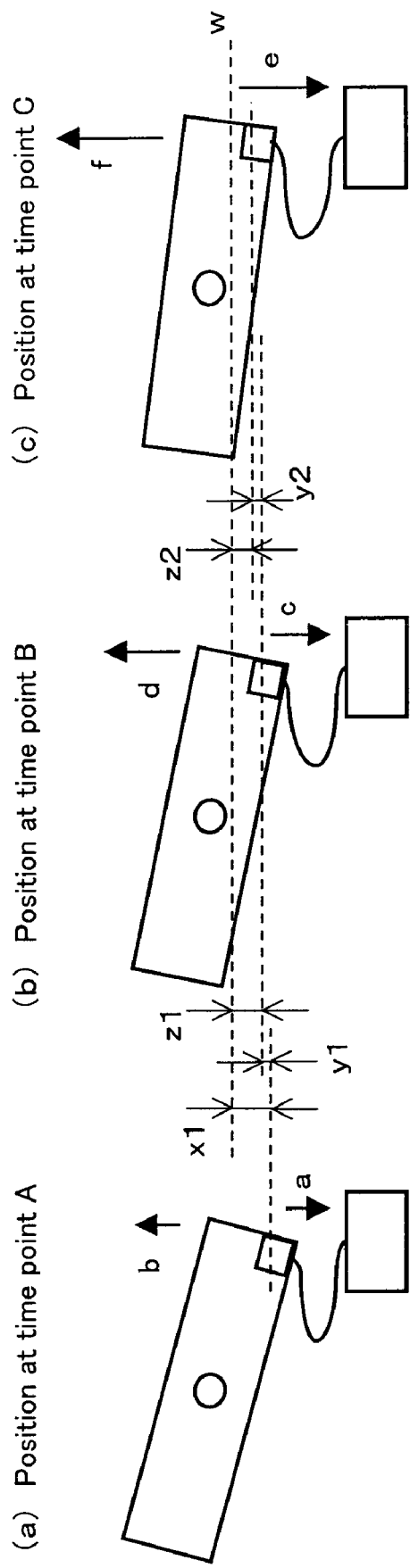
FIG. 54B is a schematic view illustrating disturbance compensation performed on the lens module.

FIG. 51 shows the change in difference values output from the amplitude subtraction portion 1061 when the integration circuit 1071 is not provided or not functioning. FIG. 52 is a schematic view illustrating disturbance compensation by the lens module. Note that while x and y in FIG. 51 are not necessarily the same value as x and y in FIG. 52, the same reference numerals are attached to facilitate description. FIG. 53A shows the change in the difference values output from the amplitude subtraction portion 1061 in the present embodiment. FIG. 53B is a graph showing the change in integral values in the integration circuit 1071. FIGS. 54A and 54B are schematic views illustrating disturbance compensation based on the integral values output from the integration circuit 1071. These figures schematically show the turning position of the lens module at the prescribed points in time A to E in FIG. 53B.

In FIGS. 52, 54A and 54B, the position detection sensor 105 is disposed in the inner frame 11. The position detection sensor 105 is electrically connected to the flexible substrate 19. The other end of the flexible substrate 19 is electrically connected to a circuit board 50, enabling signals to be transmitted between the position detection sensor 105 and the circuit board 50. The flexible substrate 19 is constituted by a flexible material, and is disposed between the position detection sensor 105 and the circuit board 50 in a slightly flexed state. The circuit board 50 is fixed to a frame or the like inside the digital still camera.

The operations are described below.

Firstly, the amplitude subtraction portion 1061 in FIG. 49 performs subtraction with the detection signal (voltage) detected by the position detection sensor 105 and amplified by the amplifier circuit 1065 and the correction target value (voltage) output from the image stabilization control portion 903, and calculates a difference value. At this time, the lens module 101 is biased in the direction of arrow a as a result of the wiring load caused by the flexible substrate 19, as shown in FIG. 52(b). The correction target value output from the image stabilization control portion 903 is for correcting the position of the lens module 101 to be in the reference position shown in FIG. 52(a). Thus, the difference value calculated by the amplitude subtraction portion 1061 equates to the positional difference x in FIG. 52 (value shown at time point A in FIG. 51).

1-2-1. Normal Disturbance Compensation

Here, in the case of a configuration (not shown) in which the integration circuit 1071 is not provided, the difference value output from the amplitude subtraction portion 1061 is output to the amplitude subtraction portion 1073. The amplitude subtraction portion 1073 performs subtraction with the signal output from the amplitude subtraction portion 1061 and the signal obtained by outputting the result of detecting the current position of the lens module 101 via the lead-lag filter 1063, and outputs the resultant difference value to the step-up circuit 1067. The step-up circuit 1067 turns the lens module 101 about the yaw turning axis Y by driving the yaw bimorph 14 with a voltage that depends on the difference value. Specifically, the lens module 101 is turned in the direction of arrow b in FIG. 52(b) against the wiring load of the flexible substrate 19 and attains the position shown in FIG. 52(c). Here, the rotation amount y of the lens module 101 is smaller than the rotation amount x equating to the correction target value as a result of the wiring load in the direction of arrow a of the flexible substrate 19. In the state shown in FIG. 52(c), the wiring load in the direction of arrow a is counterbalanced with the rotation amount of the lens module 101 in the direction of arrow b resulting from the yaw bimorph 14.

Next, the position detection sensor 105 detects the current position when the lens module 101 is in the position shown in FIG. 52(c), and the resultant detection signal is output to the amplitude subtraction portion 1061 via the amplifier circuit 1065. The amplitude subtraction portion 1061 performs subtraction with the current position detection signal and the correction target value output from the image stabilization control portion 903, and outputs the resultant difference value. The difference value at this time is shown by the time point B in FIG. 51. The difference value output from the amplitude subtraction portion 1061 is input to the amplitude subtraction portion 1073, and similar controls to those mentioned above are performed. Note that since disturbance compensation is not performed from time point B onwards, the reference position of the lens module 101 is set at the position shown in FIG. 52(c). Thus, as shown in FIG. 51, the difference value output from the amplitude subtraction portion 1061 is constant from time point B onwards.

With this disturbance compensation control, image stabilization control is performed with the inclined state shown in FIG. 52(c) as the reference position, since the lens module 101 cannot be turned as far as the reference position (target position) shown in FIG. 52(a), thereby making high precision image stabilization unrealizable.

1-2-2. Disturbance Compensation Based on Integral Values

In the present embodiment, the integration circuit 1071 (exemplary disturbance compensation means) is provided downstream of the amplitude subtraction portion 1061 (exemplary comparison circuit), as shown in FIG. 49. The integration circuit 1071 integrates the difference values calculated by the amplitude subtraction portion 1061, and performs disturbance compensation based on the integrated values (hereinafter integral values).

In FIG. 49, the difference value output from the amplitude subtraction portion 1061 is input to the integration circuit 1071. The integration circuit 1071 accumulates the input difference values and outputs the accumulated difference value to the amplitude subtraction portion 1073.

The operations will be described in detail below. Disturbance compensation on the yaw side will be described firstly.

Note that in the following description, the reference position of the lens module 101 is assumed to be the position shown in FIG. 54A.

Where a load acts on lens module 101 in the direction of the arrow a in FIG. 54B(a) due to the wiring load of the flexible substrate 19, the lens module 101 is pulled in the direction of the arrow a by the flexible substrate 19, and turned, as shown in FIG. 54B(a). A detection signal based on the current position detected by the position detection sensor 105 as a result of performing similar position detection to that described above in this state is input to the amplitude subtraction portion 1061.

Next, the amplitude subtraction portion 1061 performs subtraction with the detection signal input from the position detection sensor 105 via the amplifier circuit 1065 and the correction target value output from the image stabilization control portion 903, and outputs the resultant difference value to the integration circuit 1071. Here, the calculated difference value equates to the difference value x1 shown at time point A in FIG. 54B(a), and the difference of the physical turning position equating to the difference value x1 is shown by x1 in FIG. 54B. Note that the dashed line w in FIG. 54B hypothetically shows the position of the position detection sensor 105 when the lens module 101 is in the reference position shown in FIG. 54A.

Next, the difference value output from the amplitude subtraction portion 1061 is input to the integration circuit 1071. The integration circuit 1071 accumulates the input difference values x1. At this point in time, the difference values integrated in the integration circuit 1071 are only x1 since the difference values prior to time point A in FIG. 53A were zero (or a value approaching zero).

Next, the integral value output from the integration circuit 1071 is input to the amplitude subtraction portion 1073. The amplitude subtraction portion 1073 performs subtraction with the signal output from the integration circuit 1071 and the signal obtained by outputting the result of detecting the current position of the lens module 101 via the lead-lag filter 1063, and outputs the resultant difference value to the step-up circuit 1067. The step-up circuit 1067 turns the lens module 101 about the yaw turning axis Y by driving the yaw bimorph 14 with a voltage that depends on the difference value. Specifically, the lens module 101 is turned in the direction of arrow b in FIG. 54B(a) against the wiring load of the flexible substrate 19, and attains the position shown in FIG. 54B(b). Here, the rotation amount y1 of the lens module 101 is smaller than the rotation amount x1 equating to the correction target value, due to the wiring load of the flexible substrate 19 in the direction of arrow a.

Next, the current position is detected by the position detection sensor 105 when the lens module 101 is in the position shown in FIG. 54B(b), and the resultant detection signal is output to the amplitude subtraction portion 1061 via the amplifier circuit 1065. The amplitude subtraction portion 1061 performs subtraction with the current position detection signal and the correction target value output from the image stabilization control portion 903, and outputs the resultant difference value z1. The difference value z1 at this time equates to the value shown at time point B in FIG. 53A. The difference value z1 output from the amplitude subtraction portion 1061 is input to the integration circuit 1071.

Next, the integration circuit 1071 integrates the input difference value z1, and outputs the integral value shown at time point B in FIG. 53B to the amplitude subtraction portion 1073. Next, the amplitude subtraction portion 1073 and the step-up circuit 1067 perform similar control operations to those described above, and drive the yaw bimorph 14 to turn the lens module 101 in the direction of arrow d. The lens module 101 after having been turned is shown in FIG. 54B(c). In FIG. 54B(c), a wiring load acts on the lens module 101 in the direction of arrow e due to the flexible substrate 19, and a force that turns the lens module 101 in the direction of arrow f is applied with greater force than the wiring load.

Next, the position detection sensor 105 detects the current position when the lens module 101 is in the position shown in FIG. 54B(c), and the resultant detection signal is output to the amplitude subtraction portion 1061 via the amplifier circuit 1065. The amplitude subtraction portion 1061 performs subtraction with the current position detection signal and the correction target value output from the image stabilization control portion 903, and outputs the resultant difference value z2. The difference value z2 this time equates to the value shown at time point C in FIG. 53A. The difference value z2 output from the amplitude subtraction portion 1061 is input to the integration circuit 1071.

Thereinafter, similar feedback controls to those described above are performed, and rotation control is performed on the lens module 101. Specifically, the lens module 101 is turned a little at a time by repeating the aforementioned feedback controls.

Since the lens module 101 approaches the reference position shown in FIG. 54A when turned a little at a time, the difference value calculated by the amplitude subtraction portion 1061 gradually decreases, as shown in FIG. 53A. Consequently, the integral value output from the integration circuit 1071 gradually increases, as shown in FIG. 53B.

When the lens module 101 reaches the reference position shown in FIG. 54A, the difference value output from the amplitude subtraction portion 1061 will be zero (or a value approaching zero), as shown at time point E in FIG. 53A. Thus, the integral value output from the integration circuit 1071 will be constant from time point E onwards, as shown in FIG. 53B.

Thereinafter, the wiring load due to the flexible substrate 19 will be counterbalanced by the rotational biasing force of the yaw bimorph 14, with the state shown in FIG. 54A being maintained until such time as a load caused by a disturbance acts on the lens module 101.

Disturbance compensation on the pitch side will be described next.

The difference value calculated by the amplitude subtraction portion 1061 is also input to the decoupling compensation circuit 1069. The decoupling compensation circuit 1069 instructs the circuitry on the pitch side for driving the inner frame 11, based on the signal from the circuitry on the yaw side for driving the lens module 101. The instruction is to turn the inner frame 11 in a direction that prevents the inner frame 11 from recoiling about the pitch axis following the turning of the lens module 101 about the yaw axis. Consequently, the decoupling compensation circuit 1069 outputs a control signal that turns the inner frame 11 to the amplitude calculation portion 1062.

Apart from the control signal output from the decoupling compensation circuit 1069, the amplitude calculation portion 1062 receives as input the correction target value output from the image stabilization control portion 903 and the current position detection signal output from the position detection sensor 103 via the amplifier circuit 1066. The amplitude calculation portion 1062 performs the operation, $$d1 = (a1+b1) - e1$$

where a1 is the correction target value output from the image stabilization control portion 903, b1 is the control signal output from the decoupling compensation circuit 1069, and c1 the detection signal input from the position detection sensor 103 via the amplifier circuit 1066, and outputs the calculated value d1 to integration circuit 1072.

The integration circuit 1072 integrates the input calculated value d1, and outputs the resultant integral value to the amplitude subtraction portion 1074. Thereinafter, similar feedback controls to the aforementioned disturbance compensation on the yaw side are performed to correct the position of the inner frame 11. Disturbance compensation on the pitch side thus is performed. Note that description of the subsequent operations, which are similar to the aforementioned disturbance compensation on the yaw side, will be omitted.

Control characteristics of the turning position will be described next.

Figure 55A:
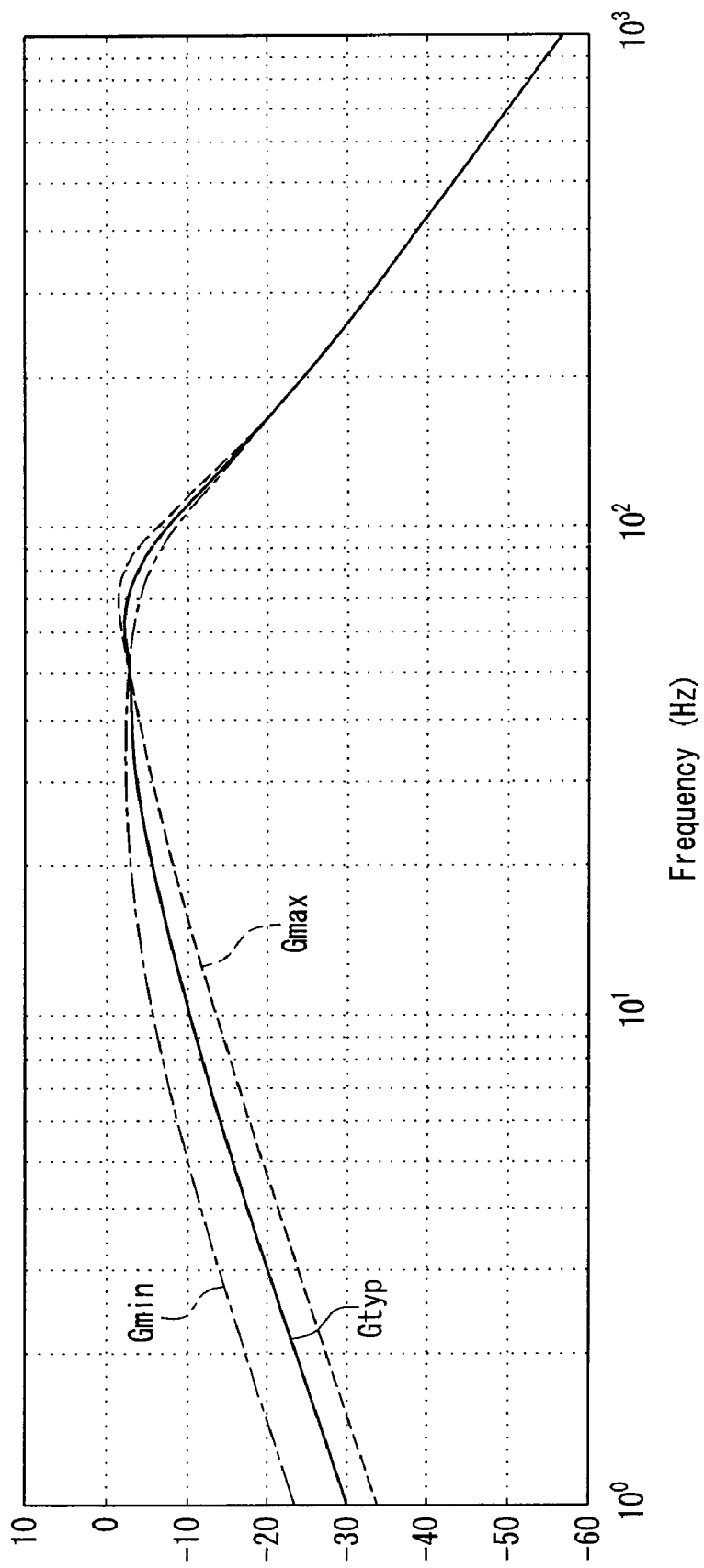
FIG. 55A is a Bode diagram showing the control characteristics of the turning position.
Figure 55B:
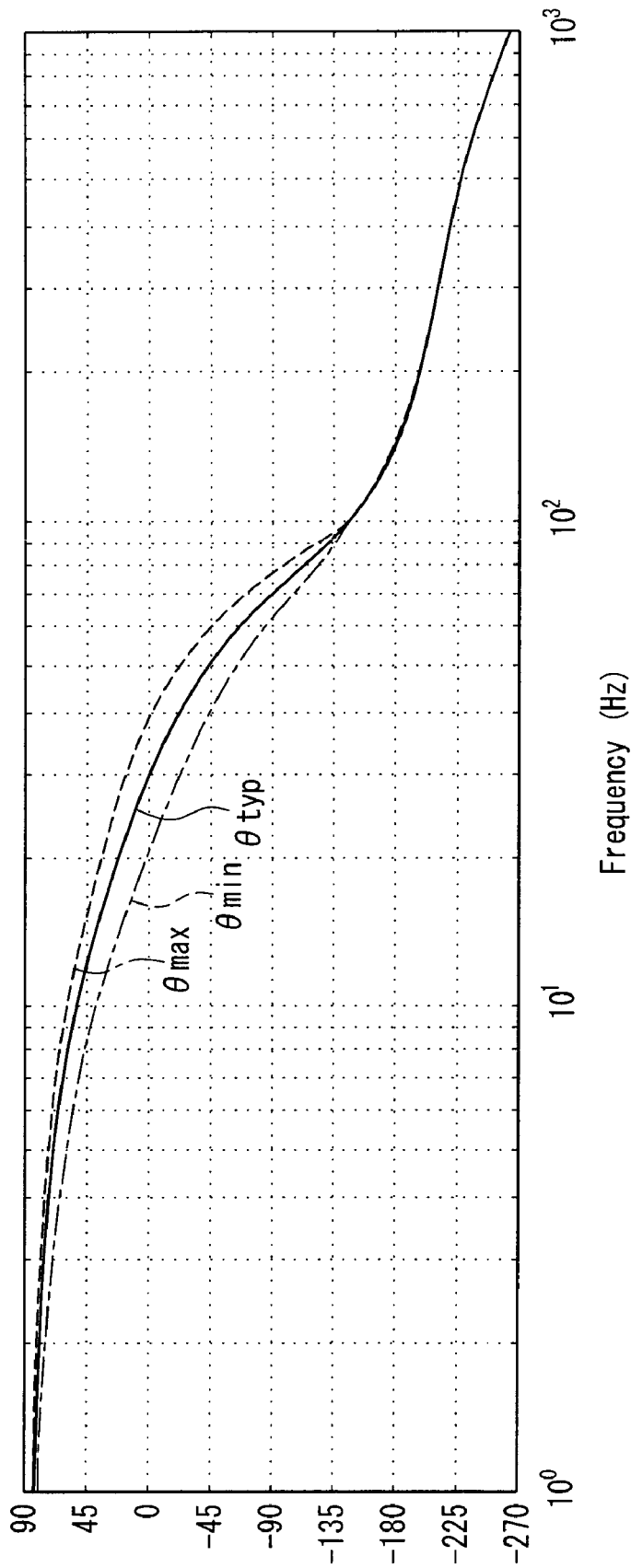
FIG. 55B is a Bode diagram showing the control characteristics of the turning position.

FIGS. 55A and 55B are Bode diagrams showing the control characteristics of the turning position. In FIG. 55A (gain Vo/Vi), the horizontal axis shows the frequency of a disturbance applied to the lens module or the inner frame, while the vertical axis shows the amplitude ratio of Vo to Vi, where Vi is the voltage for adding to the input portion of the yaw or pitch bimorph in FIG. 49, and Vo is the output voltage of the yaw or pitch position detection sensor. In FIG. 55B (phase∠Vo/Vi), the horizontal axis shows the frequency of a disturbance applied to the lens module or the inner frame, while the vertical axis shows the phase difference between Vo and Vi.

In FIGS. 55A and 55B, the characteristics of Gtyp and θtyp are based on the input/output gain of the integration circuit 1071 or 1072. The characteristics of Gmin and θmin are based on 0.5 times the input/output gain of the integration circuit 1071 or 1072. The characteristics of Gmax and θmax are based on 1.5 times the input/output gain of the integration circuit 1071 or 1072.

Firstly, as shown in FIG. 55A, it is clear that the lower the frequency of a disturbance applied to the lens module or the like, the smaller the gain, and the lower the positional correction effect on the lens module or the like. That is, when a low frequency disturbance is applied, the amount by which the lens module or the like is positionally corrected decreases.

Also, as shown in FIG. 55B, a phase difference occurs between Vo and Vi due to the integration circuit 1071 or 1072. Specifically, because the integration circuit 1071 is disposed downstream of the amplitude subtraction portion 1061 and the integration circuit 1072 is disposed downstream of the amplitude calculation portion 1062 in the present embodiment, the phases of Vo and Vi shift approximately 90 degrees, as shown in FIG. 55B, when a disturbance within a low frequency band (around 1 Hz or less) is applied, since time is needed to perform integration in the integration circuit 1071 or 1072.

Thus, the lower the frequency of the disturbance applied to the lens module or the like, the greater the effect on the movement of the lens module or the like. In other words, it is possible to verify the control characteristics of the turning position by adding the voltage Vi to the input portion of the yaw or pitch bimorph to sweep the frequency, and then measuring the output voltage Vo of the yaw or pitch position detection sensor.

It is thus possible to reduce greatly the effects caused by variability in the drive characteristics of the bimorphs or the load of the wiring connection or the bearings on turning portions, by integrating with the integration circuit the results of comparing the detected current position of the lens module or the inner frame with the correction target value, and outputting the current positional error relative to the correction target value.

Also, noise can be reduced by providing the amplifier circuits 1065 and 1066 for the yaw position sensor 105 and the pitch position sensor 103 in the drive control portion 106 disposed close to these sensors, rather than in the microcomputer 9.

Note that in the present embodiment an instruction is given to the circuitry on the pitch side based on the signal from the circuitry on the yaw side, although an instruction conversely may be given to the circuitry on the yaw side based on the signal from the circuitry on the pitch side. Also, an instruction may be given to the circuitry on the pitch side based on the signal from the circuitry on the yaw side, and an instruction may be given to the circuitry on the yaw side based on the signal from the circuitry on the pitch side.

Note that the configuration included in the content disclosed in the present embodiment may be constituted as follows. The actuators are an exemplary driving portion (drivers) of the present invention. The shake sensors are exemplary shake detection means (detectors) of the present invention. The integration circuits are exemplary disturbance compensation means (compensators) of the present invention.

(1) An image stabilizer according to the present invention preferably has a lens module that holds a lens and an imaging element, a frame structure that turnably supports the lens module, a shake detection means for detecting shaking of the image stabilizer, a turn instructing portion for instructing that the lens module be turned in a direction that offsets the shaking, based on the shaking detected by the shake detection means, a position sensor for detecting the turning position of the lens module relative to the frame structure, an arithmetic circuit for comparing the turning position instructed by the turn instructing portion with the turning position detected by the position sensor and outputting a signal instructing that the lens module be turned in a direction which reduces the deviation between the turning positions, a disturbance compensation means for outputting a signal instructing that the lens module be turned in a direction that reduces positional deviation caused by a disturbance, based on the signal output from the arithmetic circuit, and a piezoelectric element that turns the lens module relative to the frame structure, based on the output of the disturbance compensation means.

This configuration makes it possible to reduce greatly the effects caused by variability in the drive characteristics of the piezoelectric elements or the load of the wiring connection or the bearings on the lens module.

Embodiment 3

Connecting Piezoelectric Element to Drive Body (1)

Figure 56:
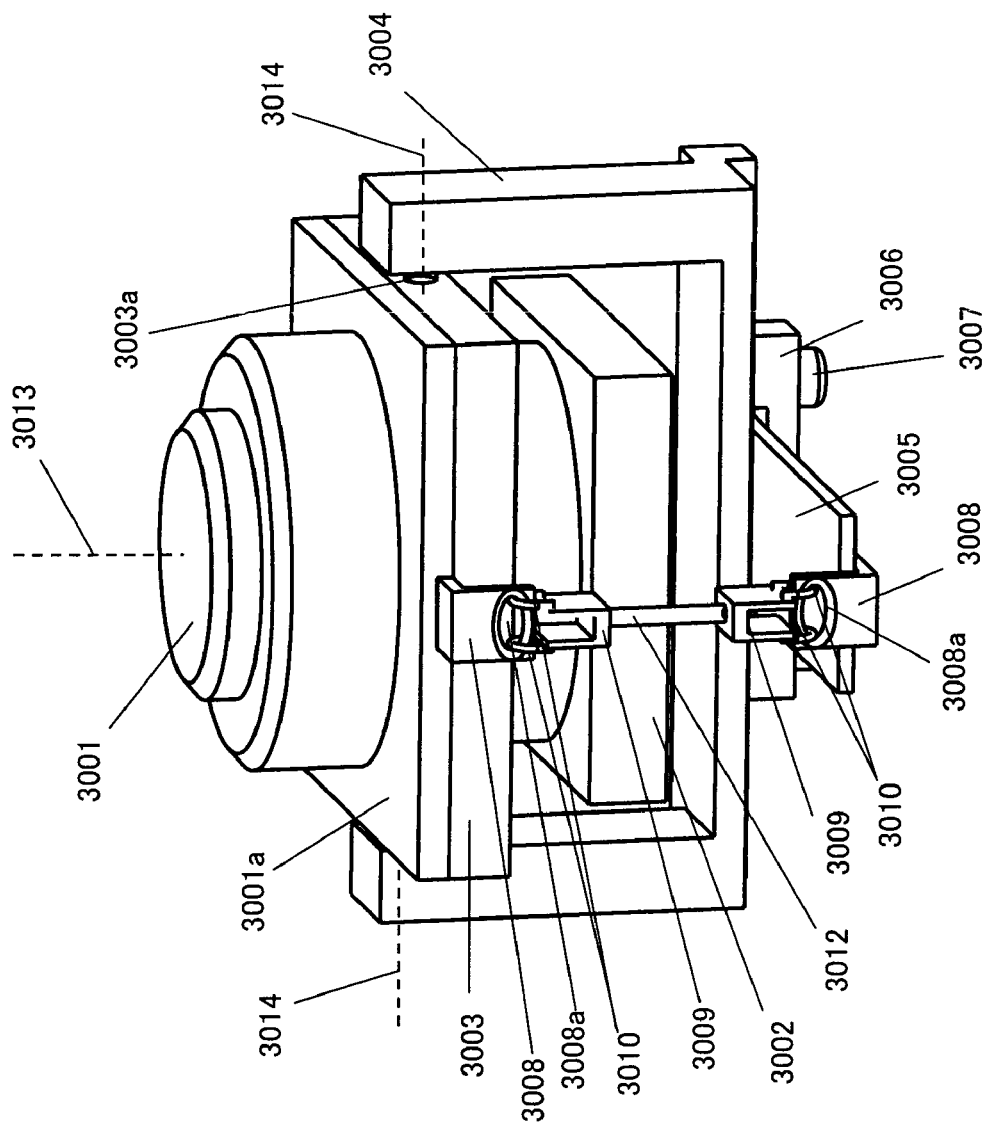
FIG. 56 is a perspective view of an image stabilizer with integrated lens barrel according to embodiment 3.
Figure 57:
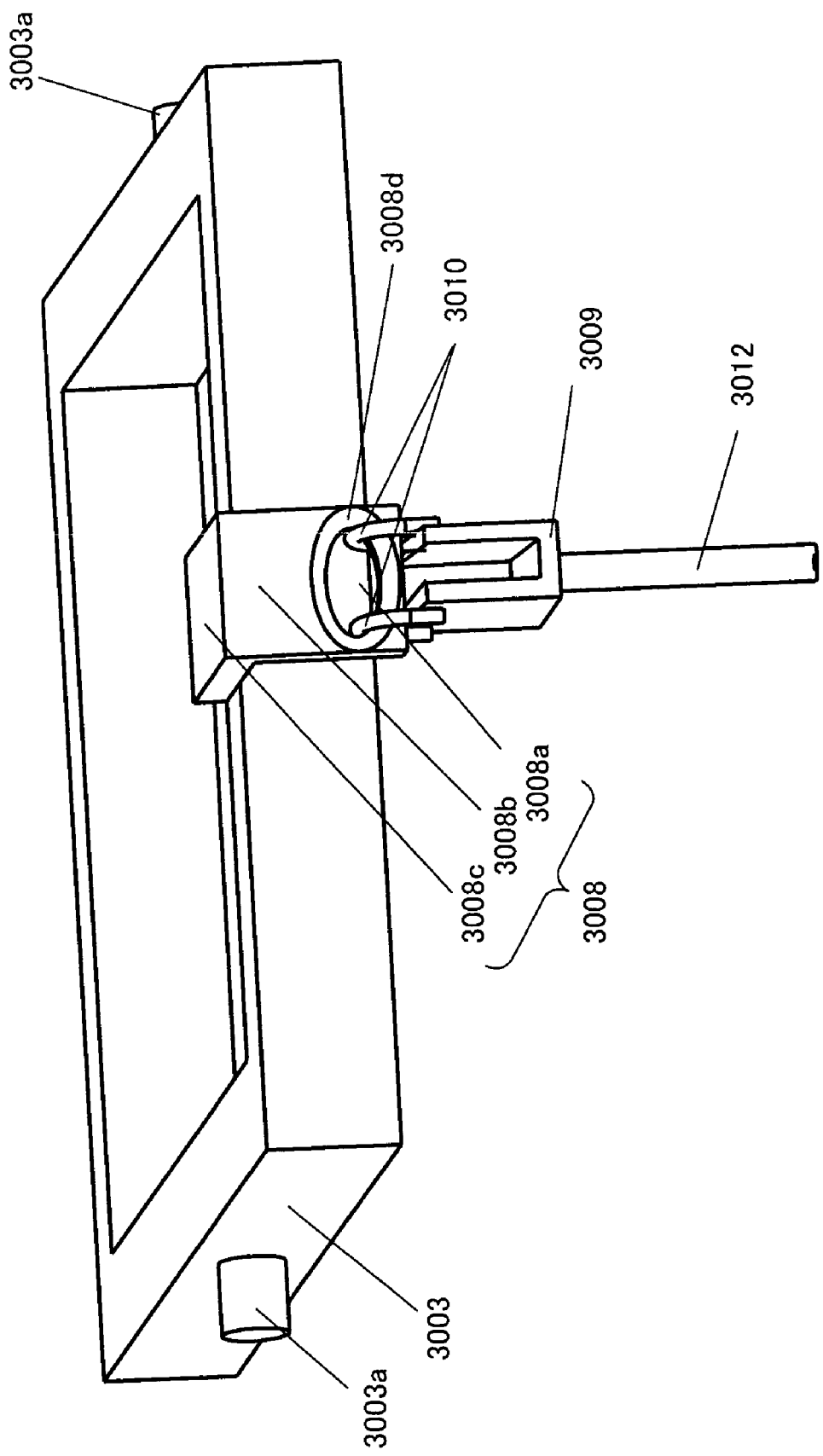
FIG. 57 is an enlarged view of a connecting portion for driving the entire imaging apparatus according to embodiment 3.
Figure 58:
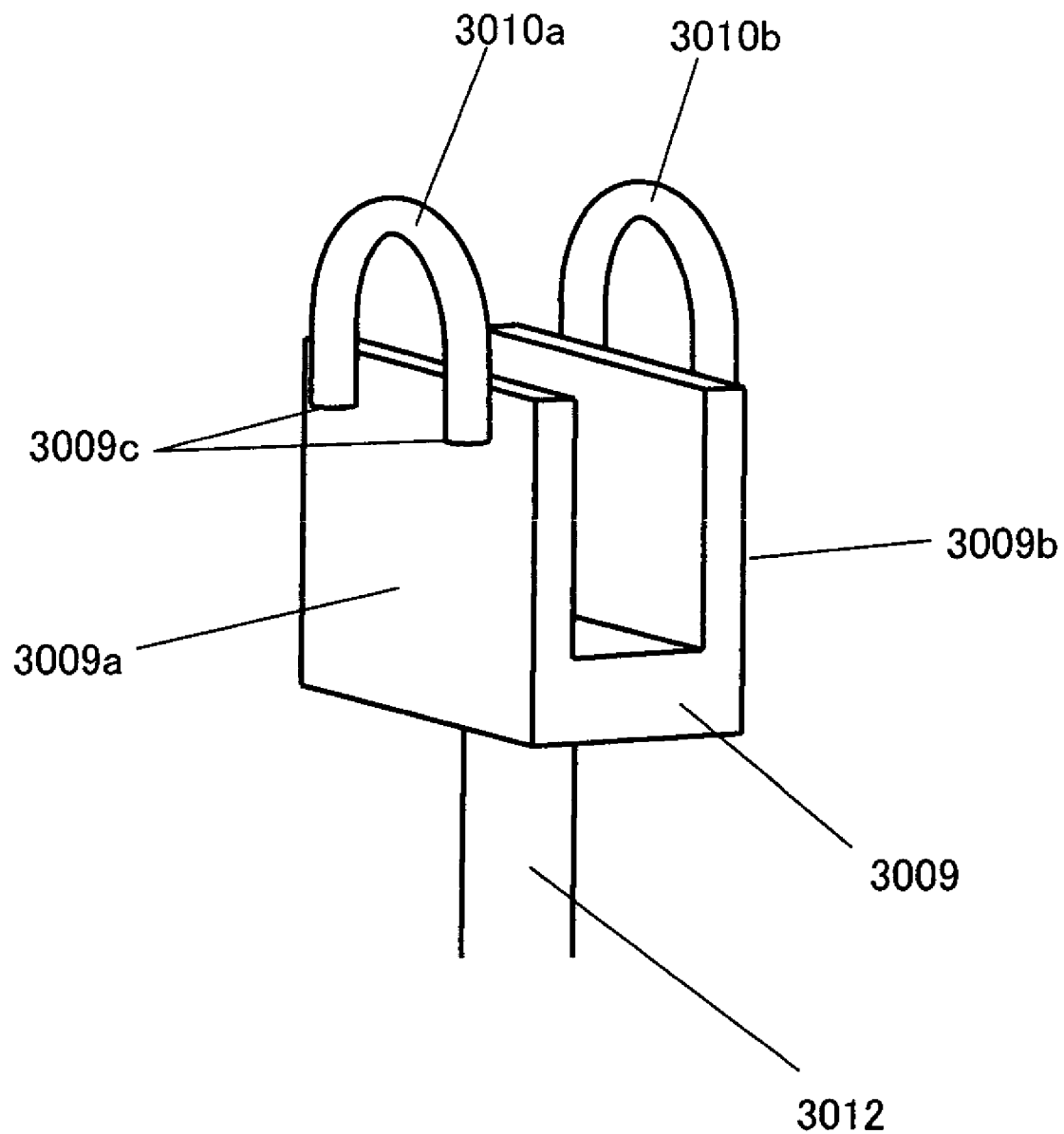
FIG. 58 is an enlarged view of the connecting portion illustrating the coupling with a drive body according to embodiment 3.

FIG. 56 is a perspective view of an assembly body for driving an entire lens barrel that includes an imaging element such as a CCD, illustrating the connection between a piezoelectric element and a drive body according to an embodiment of the present invention. FIGS. 57 and 58 are enlarged views illustrating in details the connecting portion between the piezoelectric element and the drive body and configuration thereof.

In FIG. 56, a lens barrel 3001 integrated with a lens barrel base 3001a is adhered to a drive frame 3003, and an imaging element 3002 such as a CCD is disposed below the lens barrel 3001. The drive frame 3003 is supported turnably on a turning axis 3014 by a fixing frame 3004 that has two bearings 3003a (one not shown) opposed at right angles to an optical axis 3013. A piezoelectric element 3005 (so-called bimorph) is attached below the fixing frame 3004, that is, below the imaging element 3002 with screws 3007 by a holding member 3006. L-shaped first connecting members 3008 having an elliptical through hole 3008a are adhered respectively to the piezoelectric element 3005 and the drive frame 3003. Two second connecting members 3010 having a circular cross-section and each attached to a connecting member 3009 are attached so as to oppose the first connecting members 3008, with the connecting members 3010 being connected to the through holes 3008a of the connecting members 3008. The long axis of the elliptical through holes 3008a in the L-shaped first connecting members 3008 is formed in the direction in which the drive frame 3003 is driven, that is, at right angles to the optical axis 3013, with the driving direction being the short axis. The two second connecting members 3010 are disposed so as to contact a rounded edge portion 3008d in the long axis direction of the through holes 3008a in the first connecting members 3008. Note that the C-shaped connecting members 3009 near the drive frame 3003 and the piezoelectric element 3005 are connected with a coupling member 3012. When power is fed from an external source to an electrode (not shown) of the piezoelectric element 3005, the piezoelectric element 3005 moves up and down in the direction of the optical axis 3013 with the portion held down by the holding member 3006 as the fulcrum, and the drive frame 3003 is turned by the connecting structures and the coupling member 3012, thereby causing the lens barrel 3001 to turn on the turning axis 3014.

With this apparatus, the structure of the coupling mechanism coupling the piezoelectric element 3005 and the drive frame 3003 is simplified by the inclusion of the rod-like coupling member 3012. Given an impact force of several thousand G resulting from a drop in the case of a mobile device, damage to or detachment of the connecting portions resulting from impact will not occur with this invention. Consequently, the invention is suitable for imaging apparatuses in mobile devices.

Note that the lens barrel 3001 is an exemplary lens module of the present invention. The drive frame 3003 and the fixing frame 3004 are exemplary frame structures of the present invention. The piezoelectric element 3005 is an exemplary driving portion of the present invention.

The connecting portions will be described in detail with reference to FIGS. 57 and 58.

An attachment portion 3008c of the L-shaped first connecting member 3008 is attached to a flat portion of the drive frame 3003, the elliptical through hole 3008a is provided in a connection extension portion 3008b that extends at right angles to the attachment portion 3008c, and the edge portion 3008d of the elliptical through hole 3008a is rounded. The edge surface of the through hole 3008a is a rounded convex surface. Consequently, the edge portion 3008d of the through hole 3008a partially contacts the connecting member 3010. The C-shaped second connecting members 3009 are made from metal and have flat portions 3009a and 3009b, and U-shaped connecting members 3010a and 3010b having a circular cross-section are attached respectively to the flat portions 3009a and 3009b. The connecting members are curved and need only engage the through hole 3008a. Attachment portions 3009c are desirably attached by bonding or welding, although any method of attachment is acceptable provided a reliable connection is made. The configuration shown in FIG. 58, with the connecting members connected to the through hole 3008a in the first connecting member 3008 as shown in FIG. 57, is perfectly acceptable.

Figure 59:
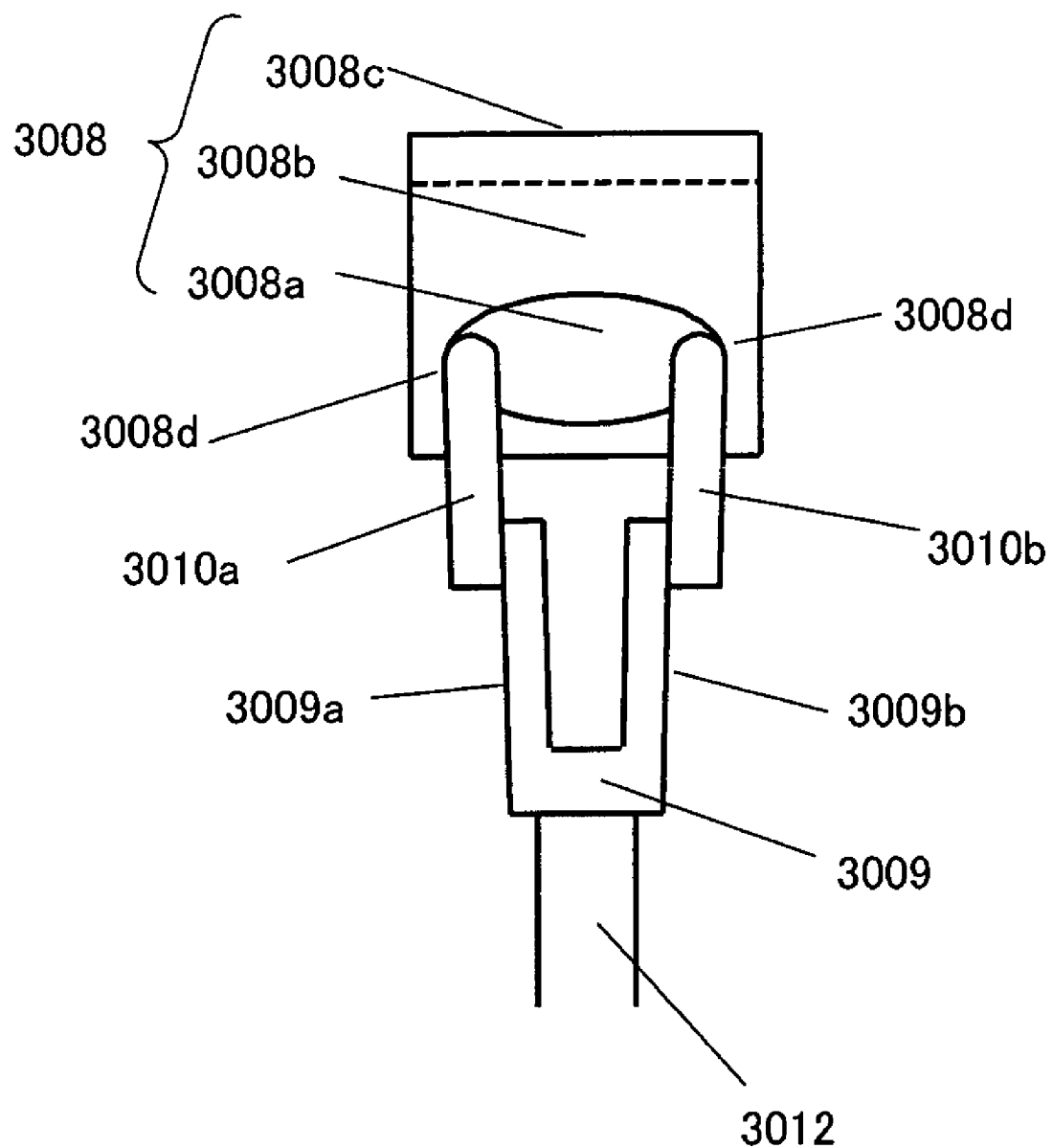
FIG. 59 is an illustrative diagram showing the positional relation of the connecting portion according to embodiment 3.

The positional relation of the second connecting members 3010a and 3010b with the through hole 3008a in the first connecting member 3008 will be described next, with reference to FIG. 59.

As aforementioned, the second connecting members 3010a and 3010b preferably are disposed so as to contact the edge surface of the edge portion 3008d in the long axis direction of the through hole 3008a in the first connecting member 3008. While the driving force exerted on the second connecting member 3010 when the piezoelectric element 3005 is driven up and down acts to deform the through holes 3008a in the short axis direction of the elliptical shape, this configuration allows the amount by which the piezoelectric element 3005 is driven to be transmitted precisely to the drive frame 3003, given that a large driving force is needed to deform the second connecting members 3010. That is, when the through hole 3008a is circular or the long axis direction of the elliptical shape is in the optical axis direction, the position of the second connecting member 3010 is readily changed by the driving force of the piezoelectric element 3005, and the driving force is not transmitted precisely. Note that, as illustrated in FIG. 59, R1 in the long axis direction of the elliptical shape desirably is greater than the radius of curvature r1 of the second connecting member 3010.

Similarly, the second connecting members 3010a and 3010b contacting the edge portion 3008d in the long axis direction of the elliptical through hole 3008a means that hardly any drive loss occurs even if the positional relation between the first connecting member 3008 and the second connecting member 3010 changes where contact is made, this being substantially point contact. This is shown in (a) to (d) in FIG. 60.

Figure 60:
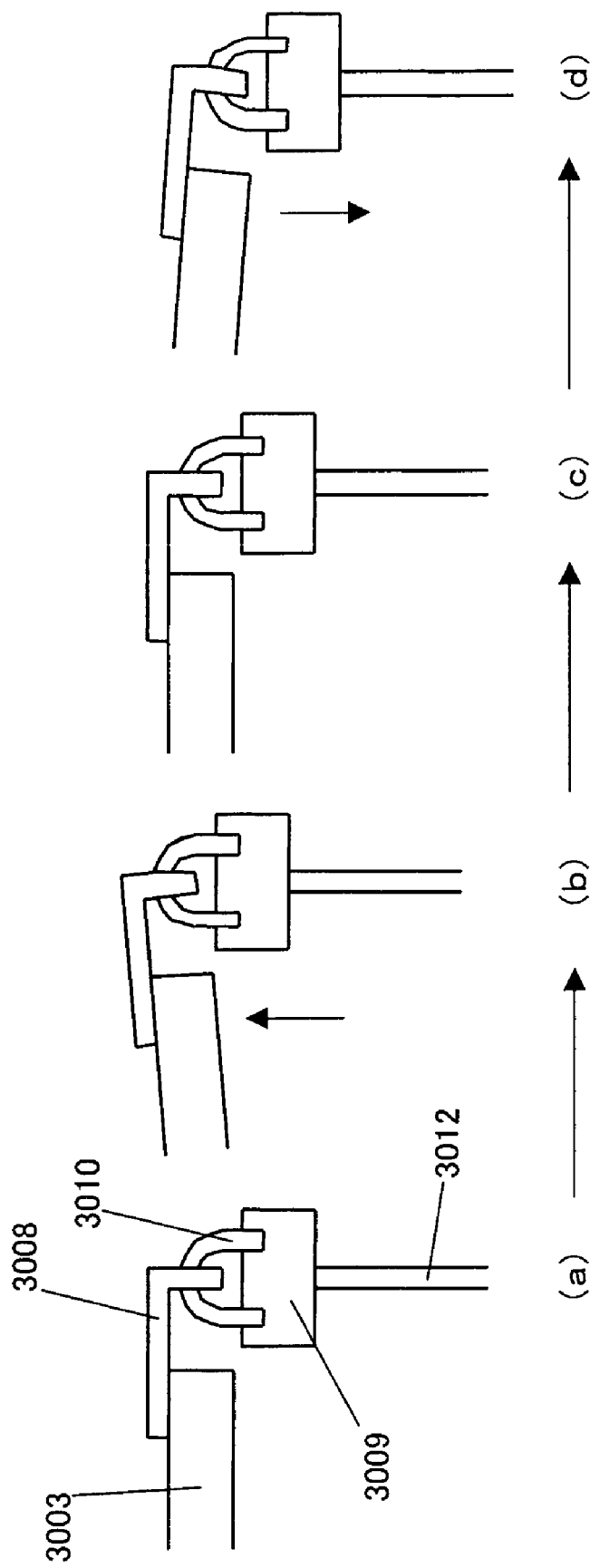
FIG. 60 is a schematic diagram illustrating the positional relation between the drive frame and the connecting members when driving a piezoelectric element according to embodiment 3.

In FIG. 60, (a) schematically shows the state prior to driving, (b) shows the drive frame 3003 having been lifted upward, (c) shows when the drive frame 3003 is shifted in a downward direction from the state of (b), and (d) shows the drive frame 3003 having been lowered. Thus, even if any tilt is caused in the drive frame 3003, since the second connecting member 9 turns relative to the drive frame 3, the positioning substantially is unchanged from the original positioning.

Incidentally, at the time of assembly using the members for connecting the drive frame 3003 and the piezoelectric element 3005, a slight gap opens up between the through hole 3008*a* and the second connecting members 3010*a* and 3010*b* as shown in FIG. 61. In this case, the driving amount is absorbed by the gap when the piezoelectric element 3005 is driven up and down, reducing the transmission efficiency to the first connecting member 3008. While it is possible to make the second connecting members 3010*a* and 3010*b* contact the long axis of the elliptical through hole 3008*a* by wedging another member into the C-shaped portion to spread the second connecting members 3010*a* and 3010*b* outwardly, it is extremely difficult to keep the contact state constant. That is, as aforementioned, the driving performance of the piezoelectric element 3005 cannot be kept constant as long as this drive loss in the connecting portion is not reduced, that is, as long as a means that does not cause an increase in the friction coefficient is not implemented.

The method of positioning the second connecting member 3010 and the first connecting member 3008 in the long axis direction of the elliptical portion will be described next with reference to FIGS. 62A and 62B.

Figure 62B:
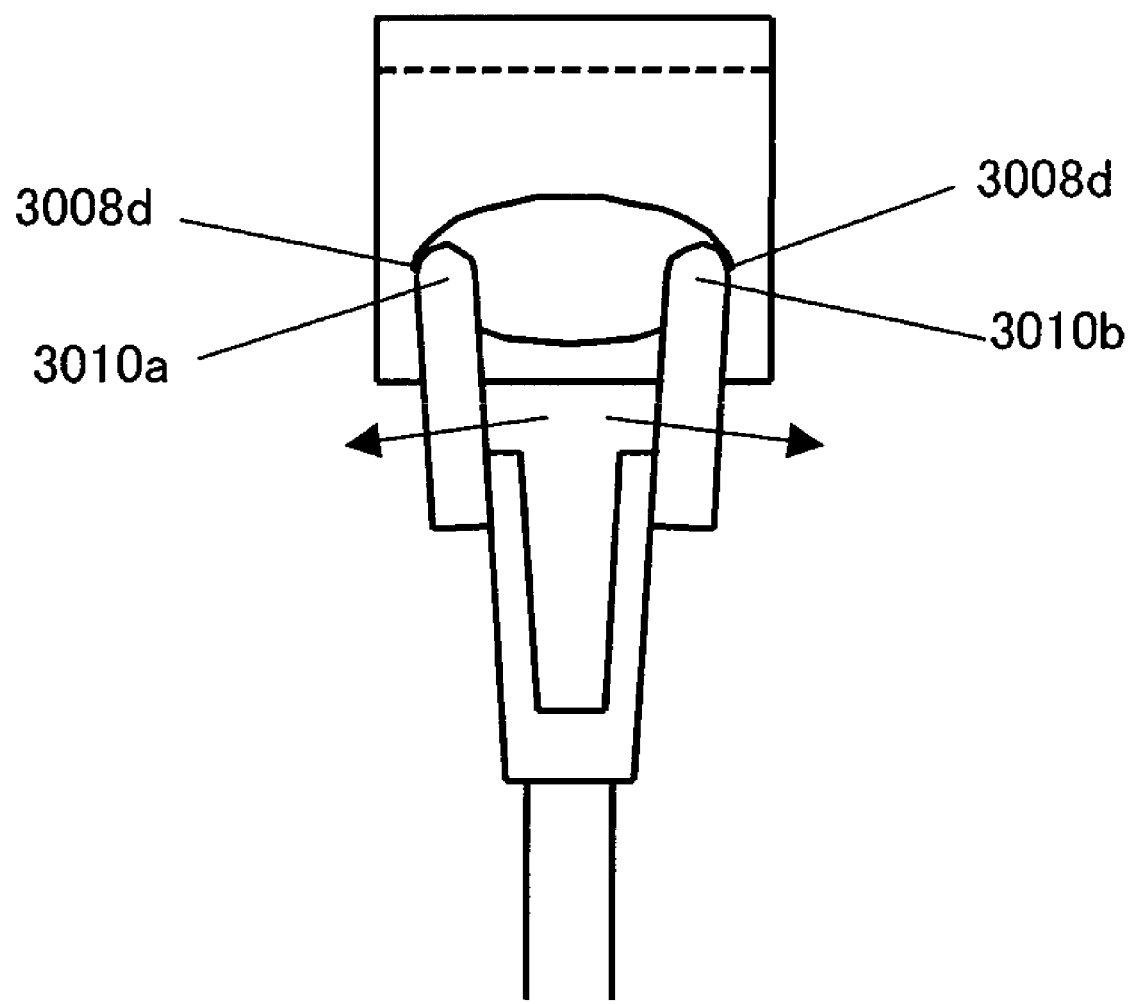
FIG. 62B is a schematic diagram illustrating a method of adjusting the connecting portion when assembling the connecting portion according to embodiment 3.

In FIG. 62A, when a laser light 3016 is irradiated onto the flat portion 3009*a* or the flat portion 3009*b* of the C-shaped connecting member 3009, the area in and around the portion irradiated with the laser light 3016 deforms toward the side of the laser light irradiation, that is, in the direction of the arrows in FIG. 62B. That is, by irradiating the laser light 3016, the second connecting member 3010 is held in contact with the edge portion 3008*d* in the long axis of the first connecting member 3008, thereby eliminating the gap. The condition of the gap readily can be assessed by microscope observation. This allows driving efficiency from the piezoelectric element 3005 to the drive frame 3003 to be maintained even if positioning of the piezoelectric element 3005 changes when the piezoelectric element 3005 is driven. Driving efficiency similarly is maintained even if the positioning of the connecting member 3009 and the drive frame 3003 changes. Note that the adjustment by laser light may be performed after increasing the amount by which the connecting member 3009 is deformed, although gradually approaching the edge portion in the long axis direction allows better control of the contact pressure between the elliptical through hole 3008*a* and the second connecting member 3010, enabling any sliding loss between the two to be controlled and mitigated. The advantage of this connection method is that it allows play between the connecting members to be eliminated and fine tuning of the contact state in the adjustment by laser light. The members involved in attaching the piezoelectric element 3005 to the drive frame 3003 can be formed as rigid bodies, enabling an increase in transmission efficiency from the piezoelectric element 3005 to the drive frame 3003, and an increase in resonance frequency including the piezoelectric element 3005 and the entire drive body, thereby making it possible to provide an assembly body with superior controllability.

Note that while only unidirectional rotation, in only the pitch direction, for example, relative to the optical axis is described in the working examples, a separate drive frame can be formed between the fixing frame 3004 and the drive frame 3003, and turned in the yaw direction. A similar connection method can also be used at this time. Also, while the first and second connecting members were provided on both the drive frame 3003 and the piezoelectric element 3005, provision on only one side is not problematic provided drivability can be ensured.

Figure 63:
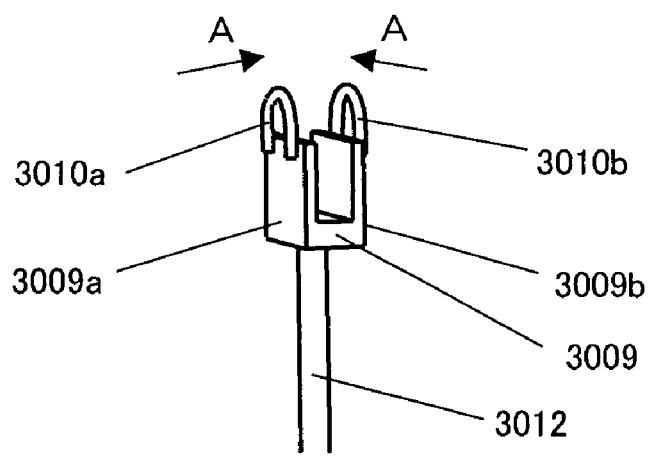
FIG. 63 is a schematic diagram illustrating another method of assembling the connecting portion according to embodiment 3.
Figure 64:
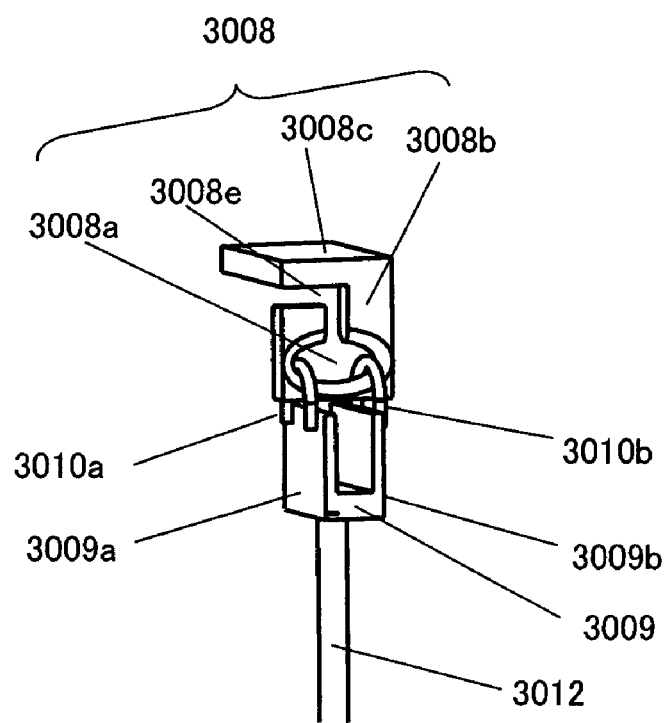
FIG. 64 is a schematic diagram illustrating another method of assembling the connecting portion according to embodiment 3.

Next, another method for positioning the second connecting members on the first connecting members will be described, with reference to FIGS. 63 and 64.

The connecting member 3009, which has the second connecting members 3010*a* and 3010*b*, has springiness, and the second connecting members 3010*a* and 3010*b* contact the edge portion in the long axis direction of the elliptical through hole 3008*a* in the first connecting member 3008 as a result of that springiness. In this case, the aforementioned adjustment by laser is not necessary. During assembly, stress is applied in the direction of arrow A to deform the connecting member 3009 elastically, and the second connecting members 3010*a* and 3010*b* are passed through a cutout portion 3008*e* of the L-shaped connecting member 3008 and attached in the elliptical through hole 3008*a* in the L-shaped connecting member 3008. This allows the positioning of the second connecting members on the edge portion of the first connecting members in the long axis direction to be facilitated, and greatly improves assemblability.

Connecting Piezoelectric Element to Drive Body (2)

A different method of connecting a piezoelectric element to a drive body will be described with reference to FIG. 65.

Figure 65:
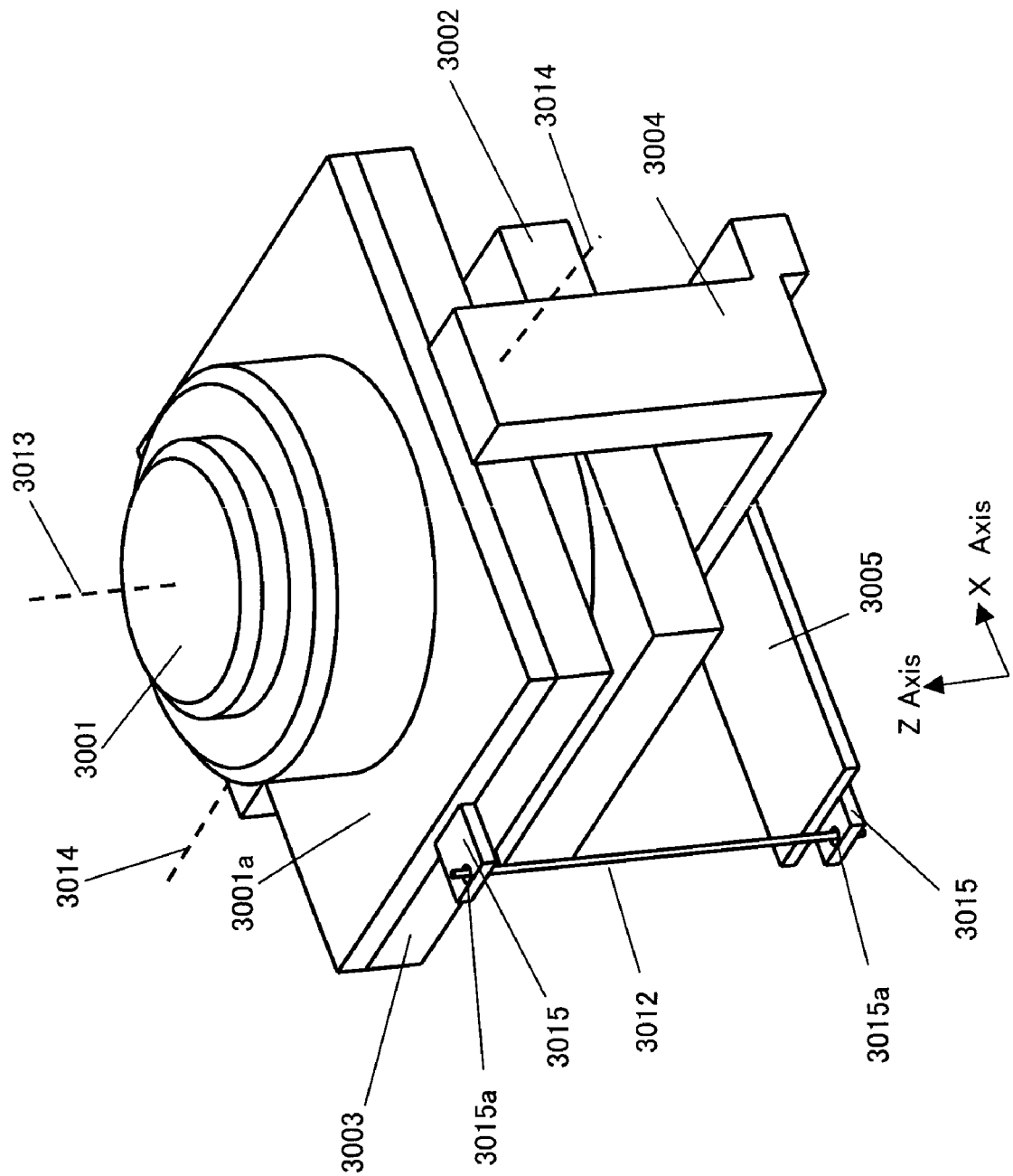
FIG. 65 is a perspective view of an image stabilizer with integrated lens barrel illustrating another connection method according to embodiment 3.

FIG. 65, similarly to FIG. 56, is a perspective view of an assembly body for driving an entire lens barrel that includes an imaging element such as a CCD, illustrating the connection between a piezoelectric element and a drive body according to an embodiment of the present invention.

In FIG. 65, a lens barrel 3001 integrated with a lens barrel base 3001*a* is adhered to a drive frame 3003, and an imaging element 3002 such as a CCD is disposed below the lens barrel 3001. The drive frame 3003 is turnably supported by a turning axis 3014 disposed at right angles to an optical axis 3013. A piezoelectric element 3005 (so-called bimorph) is attached below a fixing frame 3004, that is, below the imaging element 3002. Third connecting members 3015 having a through hole 3015*a* are adhered respectively to the piezoelectric element 3005 and the drive frame 3003. A low-rigidity metal coupling member 3012 is passed through the through holes 3015*a*, and connected by soldering or adhesive. When power is fed from an external source to an electrode (not shown) of the piezoelectric element 3005, the piezoelectric element 3005 moves up and down in the direction of the optical axis 3013 with the portion held down by a holding member (not shown) as the fulcrum, and the drive frame 3003 is turned by the third connecting members 3015 and the coupling member 3012, thereby causing the lens barrel 3001 to turn on the turning axis 3014. When the piezoelectric element 3005 deforms as a result of the voltage, the coordinates shift, albeit in microns in the X axis direction as well as the Z axis direction. The coordinates of the drive frame 3003, which also is driven on the turning axis 3014, shift along both the X and Z axes. That is, the coordinates, or in other words, the relative positional relation of the fixing portions of the coupling member 3012 near the piezoelectric element 3005 and near the drive frame constantly change as a result of driving the piezoelectric element 3005. Here, the coupling member 3012, when constituted by a high-rigidity material, does not allow the aforementioned change in coordinates, which means that the piezoelectric element 3005 does not deform when a voltage is applied, and the drive frame 3003 cannot be driven. That is, in order to drive the piezoelectric element 3005 and the drive frame 3003, the coupling member 3012 needs to deform slightly and absorb the aforementioned change in coordinates.

Here, consideration will be given to the rigidity of the coupling member 3012.

Generally, approximate 90% of camera shake during image capture is within ±0.5 degrees, and image stabilization can be 100% guaranteed if camera shake of ±1 degree can be corrected. Image stabilization is possible provided that the point at which pressure is applied to the lens barrel by the piezoelectric element, or in other words, the amplitude of the piezoelectric element determined by the distance from the turning axis, can be ensured. For example, given a correction angle of ±1 degree, the driving amount necessary will be 17 μm or more when the distance from the turning axis is 1 mm, 35 μm or more when 2 mm, and 52 μm or more when 3 mm (distance from turning axis*tan(1°)).

It is possible freely to set the displacement and generative force of the piezoelectric element basically by changing the thickness, length, width and applied voltage parameters of the piezoelectric element, although to ensure the above displacement, a force of around 15 g maximum is produced. Since the generative force acts on the coupling member, a material and dimensional shape that will not buckle under this force needs to be selected.

Generally, the buckling load on the coupling member can be expressed as follows.

$$F=4*\pi^2*E*I/L^2 \qquad (1)$$

(F: buckling load; E: Young's modulus; I: cross-sectional second moment; L: length)

Consequently, the necessary condition for the coupling member not buckling is:

$$15*10^{\wedge}(-3) \leq 4*\pi^2*E*I/L^2 \qquad (2)$$

Figure 66:
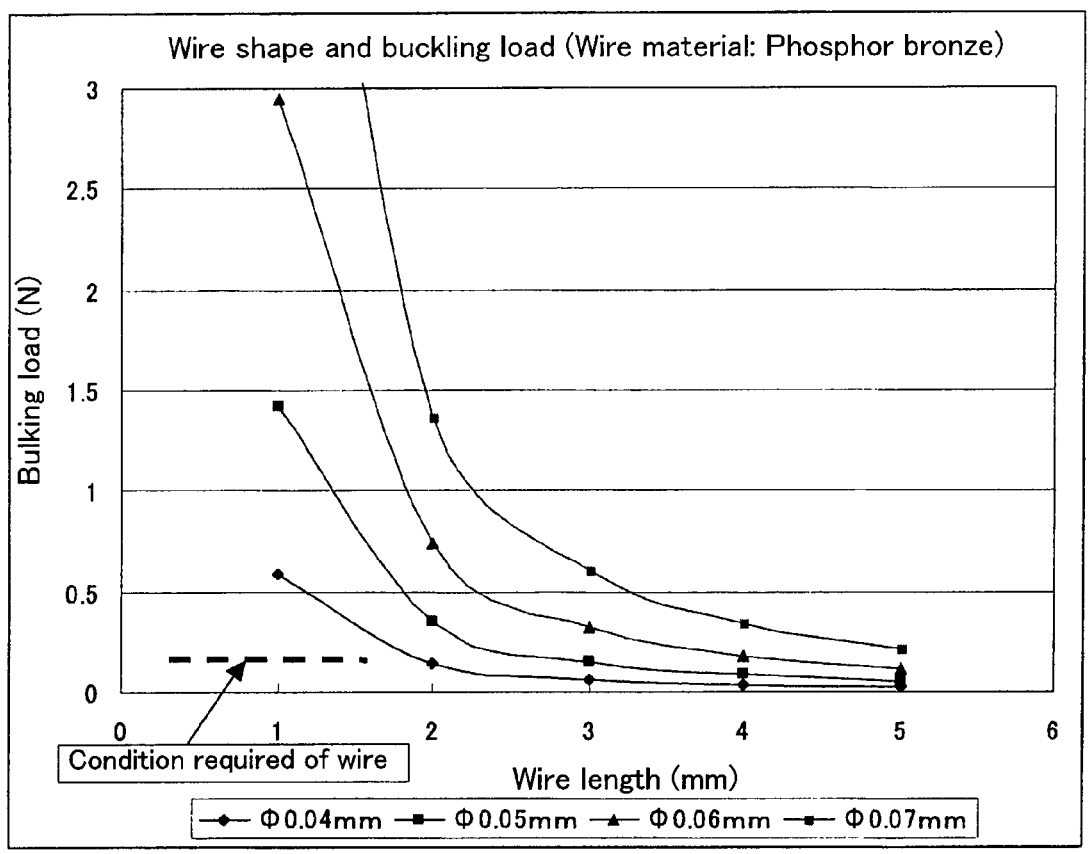
FIG. 66 is a graph showing the relation between coupling member shape and buckling load.

For example, if the coupling member 3012 is made of phosphor bronze, a minimum constraint as shown in FIG. 66 (length and wire diameter of coupling portion, which constitutes the buckling load, above dashed line in figure) is necessary.

Incidentally, the force that acts to deform the piezoelectric element is obstructed when the coupling member has high flexural rigidity, and driving characteristics decline markedly.

The situation at this time will be described with reference to FIG. 67.

The piezoelectric element and the drive body (lens barrel) are connected by a coupling member, and the respective connecting portions between the piezoelectric element and the coupling member and the drive body and the coupling member are maintained vertically. The coupling member goes into deformation mode in which the coupling member flexes in a vicinity of the center thereof. This shape is considered as a model in which simple cantilever beams such as shown in FIG. 68 are opposed to each other. That is, the flex angle at a central portion of the coupling member length is derived, as is the flex angle at the free end of the simple cantilever beam, and the two are compared. That is, the deformation amount resulting from the rigidity relative to the force acting to deform the coupling member is determined, and if this value has the required minimum deformation amount, the force transmitted to the coupling member is considered to have been transmitted to the drive body.

Figure 69:
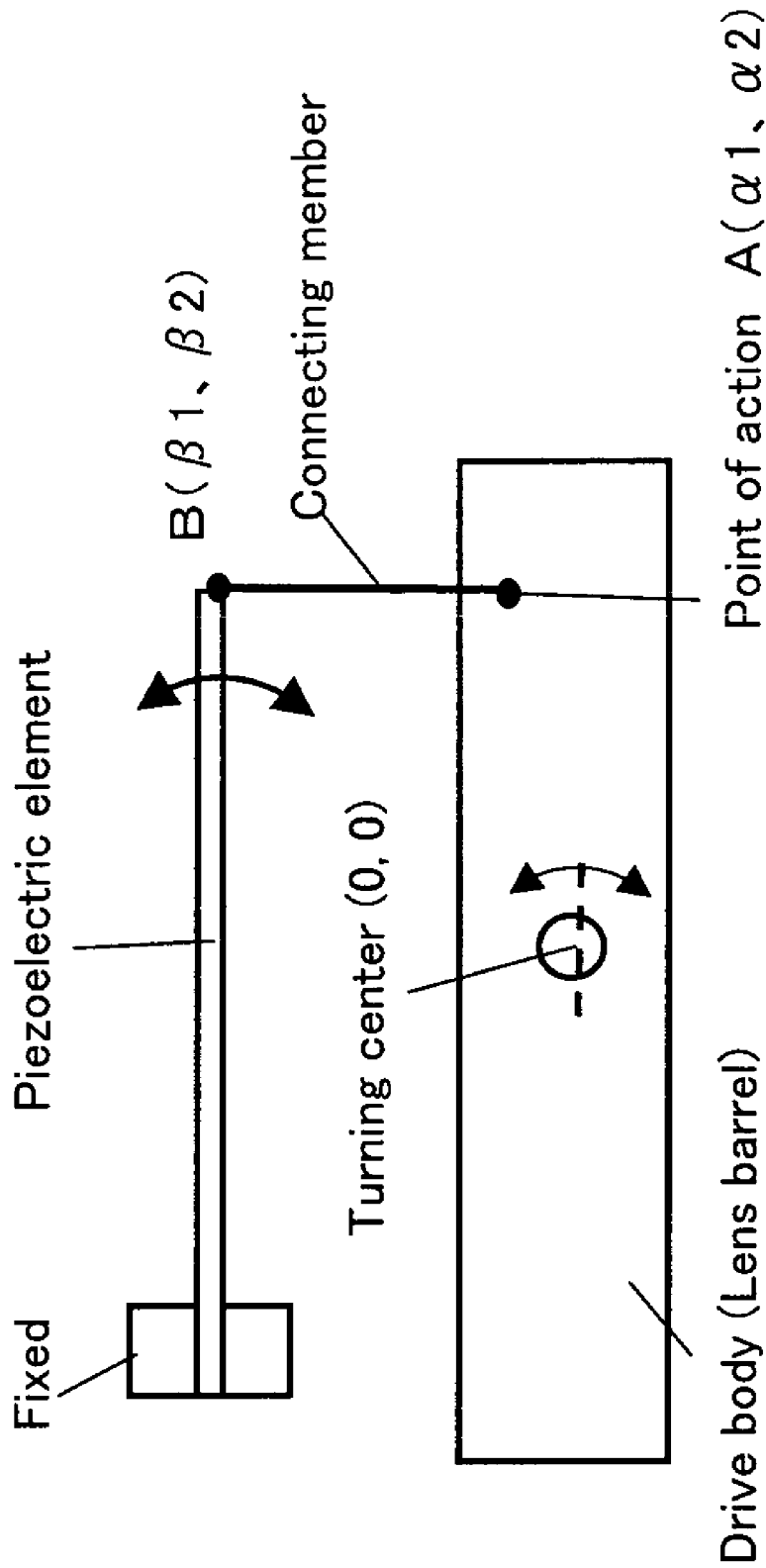
FIG. 69 is a model diagram for deriving the flex angle at the central portion of the coupling member in the longitudinal direction.

The model in FIG. 69 is considered here in order to derive the flex angle at a central portion of the coupling member in the longitudinal direction.

The rotational center of the drive body has the coordinates (0, 0), a coordinate A point of the connecting point between the drive body and the coupling member is ($\alpha 1$, $\alpha 2$), a coordinate B point of the connecting point between the piezoelectric element and the coupling member is ($\beta 1$, $\beta 2$), and the length of the coupling member is L1.

The coordinate of A point when the drive body has been driven to an angle θ will be ($\alpha 1*\cos \theta - \alpha 2*\sin \theta, \alpha 1*\sin \theta + \alpha 2*\cos \theta$).

Note that the voltage application causes the piezoelectric element to move up and down by ±δ1, but since there is virtually no change in the X coordinate, the coordinate of B point will be ($\alpha 1$, $\alpha 2+L1\pm\delta 1$). The coordinate at the middle point of the coupling member will be (($\alpha 1*\cos \theta - \alpha 2*\sin \theta + \alpha 1)/2$, ($\alpha 1*\sin \theta + \alpha 2*\cos \theta + \alpha 2 + L1 \pm \delta 1)/2$)

Figure 70:
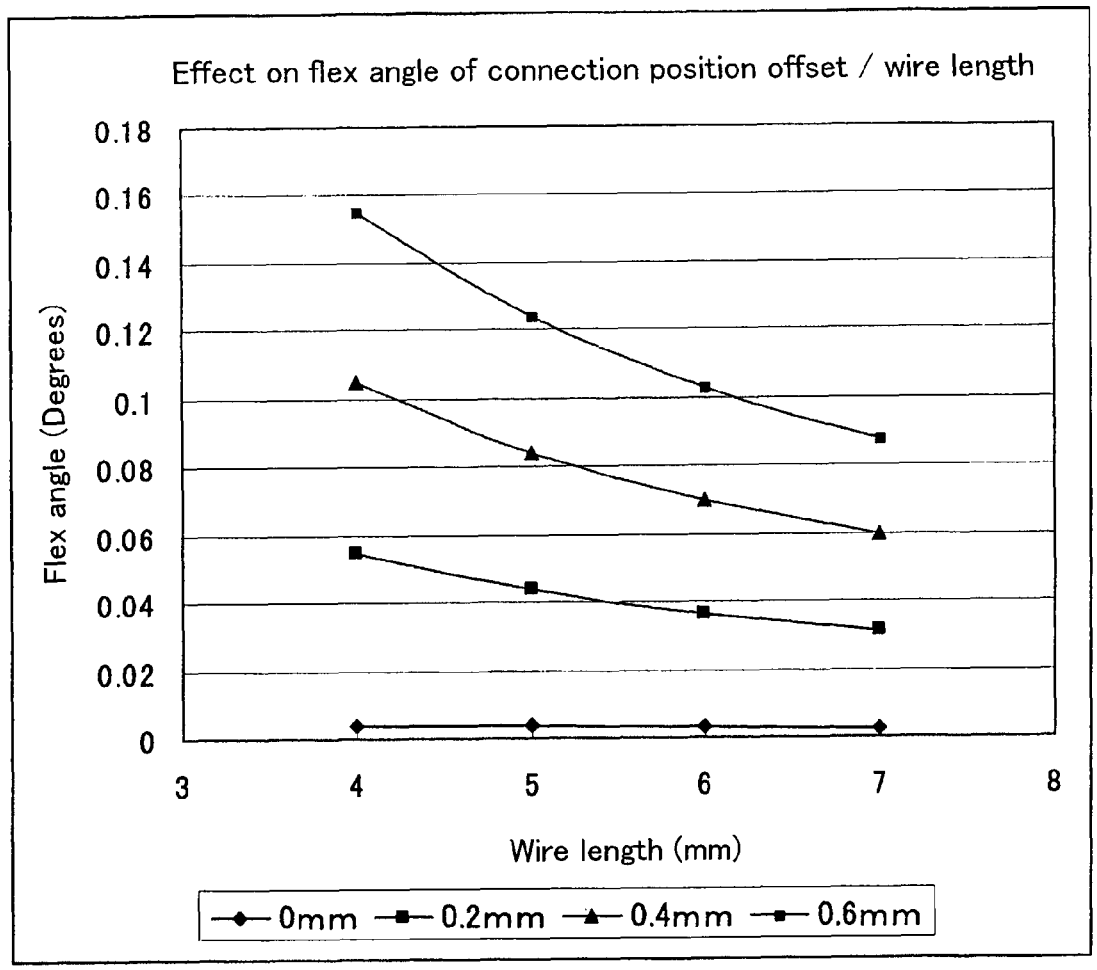
FIG. 70 is a graph showing the effects of connection position offset/wire length on the flex angle.

The flex angle at the central portion of the coupling member based on this coordinate can be expressed by $\theta_{tawami}=\operatorname{atan}((\alpha 1-(\alpha 1*\cos \theta - \alpha 2*\sin \theta + \alpha 1)/2)/(\alpha 2 + L1 + \delta 1 - (\alpha 1*\sin \theta + \alpha 2*\cos \theta + \alpha 2 + L1 \pm \delta 1)/2))$ Here, the situation when the length of the coupling member and the offset in the Y direction of the A point from the rotational center are made parameters is shown in FIG. 70.

As is clear from FIG. 70, the greater the offset of A connection point in the Y direction, the larger the flex angle, and the also the greater the dependency on the length of the coupling member. Thus it is clear that better efficiency is achieved if A point is not offset from the turning center, even if the fixing of the coupling member contains attachment error. Here, if the attachment error of the coupling member is assumed to be a maximum of 0.2 mm, the allowable limit of the flex angle will be 0.06 degrees.

Note that the component force in the traverse direction relative to the bend in the coupling member is calculated as 50 mg based on the flex angle.

$$0.06*\pi/180 \leq W*(L/2)^{\wedge}2/(2*E*I) \qquad (3)$$

W: component force in traverse direction; L beam length; E: Young's modulus; I: cross-sectional second moment.

Based on equation (1), (3):

$$3.8*10^{\wedge}(-4) \leq E*I/L^{\wedge}2 \leq 6.0*10^{\wedge}(-3) \qquad (4)$$

That is, setting the rigidity of the beam within the conditions of the equation (4) enables the deviation in movement between the lens barrel and the deformation of the piezoelectric element to be absorbed, while allowing transmission of the minimum driving force.

The embodiments are working examples of the present invention, and the present invention is not limited to these.

Note that the configuration included in the content disclosed in the present embodiment may be constituted as follows.

(1) An imaging apparatus with image stabilization function according to the present invention includes an imaging element, a rotatable lens barrel integrated with the imaging element, a piezoelectric element positioned on an opposite side of imaging element to the lens barrel, and a coupling mechanism having a rod-like coupling member that turns the lens barrel when driven by the piezoelectric element.

With this apparatus, the structure is simple, since the coupling mechanism coupling the piezoelectric element and the lens barrel has a rod-like coupling member.

(2) In the imaging apparatus with image stabilization function according to the present invention, preferably the coupling mechanism has a deviation absorbing function for absorbing deviation between the deformation of the piezoelectric element and the turning of the lens barrel. With this apparatus, the coupling member drives the lens barrel smoothly, since the coupling mechanism having the rod-like coupling member has a deviation absorbing function.

(3) The imaging apparatus with image stabilization function of the present invention ((2) above) preferably further includes a first connecting structure connecting the coupling member and a member at the lens barrel end, and a second connecting structure connecting the coupling member and a member at the piezoelectric element end, and at least one of the first connecting structure and the second connecting structure has a first connecting member having a through hole formed therein and a second connecting member having a curved engaging portion engaged in the through hole.

With this apparatus, one of the connecting members drives the other connecting member when the piezoelectric element deforms, with the engaging portion of the second connecting member engaged in the through hole of the first connecting member. At this time, deviation between the deformation of the piezoelectric element and the turning of the lens barrel is absorbed, since the engaging portion turns relative to the first connecting member.

(4) In the imaging apparatus with image stabilization function of the present invention ((3) above), preferably the through hole is long in the rotation central axis direction, and the engaging portion has two engaging portions respectively engaged in the edge portions of the through hole in the rotation central axis direction.

With this apparatus, the engaging portion is not readily deformed during the driving, since two engaging portions are engaged in the edge portions of the through hole in the rotation central axis direction. In other words, the engaging portion is able to transfer a large driving force, increasing the transmission efficiency of the driving force.

(5) In the imaging apparatus with image stabilization function of the present invention ((4) above), preferably the two engaging portions contact the edge portions of the through hole. With this apparatus, the engaging portion is not readily deformed during the driving, since two engaging portions contact the edge portions of the through hole in the rotation central axis direction. In other words, the engaging portion is able to transfer a large driving force, increasing the transmission efficiency of the driving force.

(6) In the imaging apparatus with image stabilization function of the present invention ((5) above), preferably the second connecting member further has C-shaped members to which the two engaging portions are fixed respectively, and the C-shaped members bias the two engaging portions to the edge portions of the through hole.

With this apparatus, driving efficiency from the piezoelectric element to the coupling member is maintained even if the piezoelectric element deforms, changing the positioning of the engaging portion relative to the through hole.

(7) In the imaging apparatus with image stabilization function of the present invention ((5) above), preferably the two engaging portions have springiness, and contact the edge portions of the through hole in an elastically deformed state. With this apparatus, driving efficiency from the piezoelectric element to the coupling member is maintained even if the piezoelectric element deforms, changing the positioning of the engaging portion relative to the through hole.

(8) In the imaging apparatus with image stabilization function of the present invention (any of (5) to (7) above), preferably the engaging portion is circular in cross-section. With this apparatus, the engaging portion moves smoothly in contact with the through hole.

(9) In the imaging apparatus with image stabilization function of the present invention ((8) above), preferably the engaging portion has a smaller radius of curvature than the edge portions of the through hole. With this apparatus, the engaging portion is not readily deformed during the driving. In other words, the engaging portion is able to transfer a large driving force, increasing the transmission efficiency of the driving force.

(10) In the imaging apparatus with image stabilization function of the present invention (any of (4) to (9) above), preferably the edge surface of the edge portions of the through hole are rounded. With this apparatus, the engaging portion moves smoothly in contact with the through hole, since the contact area between the engaging portion and the edge portions of the through hole is small.

(11) In the imaging apparatus with image stabilization function of the present invention ((2) above), preferably the coupling member, while being capable of transmitting load from the piezoelectric element, has a low rigidity capable of absorbing deviation between the deformation of the piezoelectric element and the turning of the lens barrel. With this apparatus, the coupling member absorbs any deviation between the deformation of the piezoelectric element and the turning of the lens barrel with a simple structure.

(12) In the imaging apparatus with image stabilization function of the present invention ((ii) above), preferably the coupling member has rigidity satisfying $3.8*10^{\wedge}(-4) \leqq E*I/L^{\wedge}2 \leqq 6.0*10(-3)$ (L: beam length; E: Young's modulus; I: cross-sectional second moment). With this apparatus, deviation in movement between the piezoelectric element and the lens barrel can be absorbed, while being able to transmit the minimum driving force.

(13) In the first imaging apparatus with image stabilization function of the present invention ((1) to (12) above), preferably the piezoelectric element is constituted by a bimorph.

(14) In an imaging apparatus with image stabilization function that includes an imaging element, a rotatable lens barrel integrated with the imaging element, a piezoelectric element positioned on an opposite side of imaging element to the lens barrel, and a coupling mechanism that turns the lens barrel when driven by the piezoelectric element, a connecting structure according to the present invention has a first connecting member having a through hole formed therein and a second connecting member having a curved engaging portion engaged in the through hole. The first connecting member and engaging portion are engaged so as to absorb deviation between the deformation of the piezoelectric element and the turning of the lens barrel.

With this structure, one of the connecting members drives the other connecting member when the piezoelectric element deforms, with the engaging portion of the second connecting member engaged in the through hole of the first connecting member. At this time, deviation between the deformation of the piezoelectric element and the turning of the lens barrel is absorbed, since the engaging portion turns relative to the first connecting member.

(15) In the connecting structure of the present invention ((14) above), preferably the through hole is long in the rotation central axis direction, and the engaging portion has two engaging portions respectively engaged in the edge portions of the through hole in the rotation central axis direction.

With this structure, the engaging portion is not readily deformed during the driving, since two engaging portions are engaged in the edge portions of the through hole in the rotation central axis direction. In other words, the engaging portion is able to transfer a large driving force, increasing the transmission efficiency of the driving force.

(16) In the connecting structure of the present invention ((15) above), preferably the two engaging portions contact the edge portions of the through hole. With this structure, the engaging portion is not readily deformed during the driving, since two engaging portions contact the edge portions of the through hole in the rotation central axis direction. In other words, the engaging portion is able to transfer a large driving force, increasing the transmission efficiency of the driving force.

(17) In the connecting structure of the present invention ((16) above), preferably the second connecting member further has C-shaped members to which the two engaging portions are respectively fixed, and the C-shaped members bias the two engaging portions to the edge portions of the through hole.

With this structure, driving efficiency from the piezoelectric element to the coupling member is maintained even if the piezoelectric element deforms, changing the positioning of the engaging portion relative to the through hole.

(18) In the connecting structure of the present invention ((16) above), preferably the two engaging portions have springiness, and contact the edge portions of the through hole in an elastically deformed state. With this structure, driving efficiency from the piezoelectric element to the coupling member is maintained even if the piezoelectric element deforms, changing the positioning of the engaging portion relative to the through hole.

(19) In the connecting structure of the present invention (any of (16) to (18) above), preferably the engaging portion is circular in cross-section. With this apparatus, the engaging portion moves smoothly in contact with the through hole.

(20) In the connecting structure of the present invention ((19) above), preferably the engaging portion has a smaller radius of curvature than the edge portions of the through hole. With this structure, the engaging portion is not readily deformed during the driving. In other words, the engaging portion is able to transfer a large driving force, increasing the transmission efficiency of the driving force.

(21) In the connecting structure of the present invention (any of (15) to (20) above), preferably the edge surface of the edge portions of the through hole are rounded. With this structure, the engaging portion turns smoothly in contact with the through hole, since the contact area between the engaging portion and the edge portions of the through hole is small.

(22) In the connecting structure of the present invention (any of (14) to (20) above), preferably the piezoelectric element is constituted by a bimorph.

With the imaging apparatus with image stabilization function and the connecting structure thereof according to the present invention, the coupling structure between the piezoelectric element and the drive body is simple. Further, deviation in movement between the piezoelectric element and the turning of the lens barrel can be absorbed without drastically reducing the transmission efficiency of the driving force.

Embodiment 4

Image Stabilizer (1)

Figure 71:
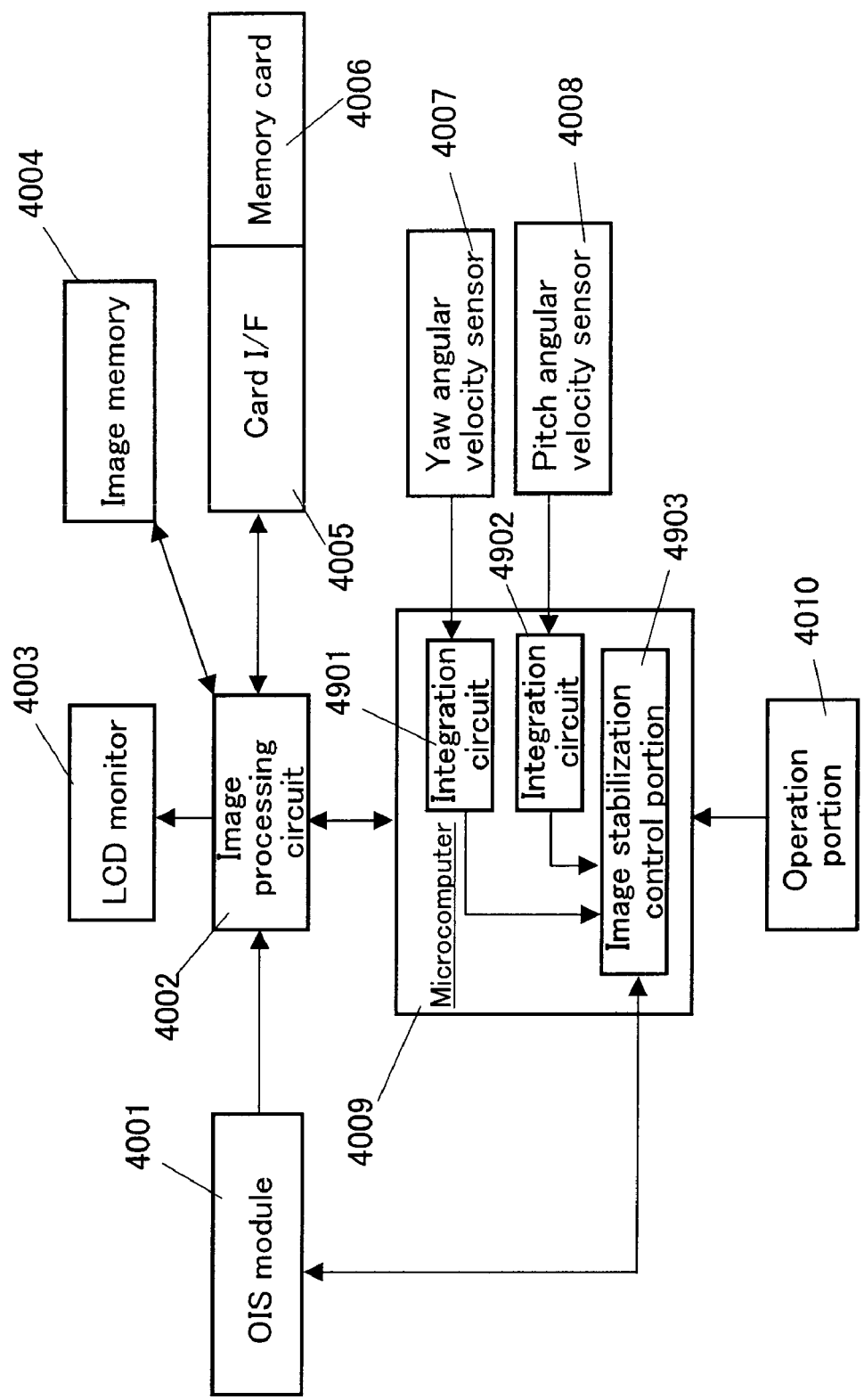
FIG. 71 is a block diagram showing the configuration of a digital camera according to embodiment 4.

FIG. 71 is a block diagram showing the configuration of a digital camera according to the present embodiment. The digital camera of the present embodiment includes an OIS (optical image stabilizer) module 4001, an image processing circuit 4002, a LCD (liquid crystal display) monitor 4003, an image memory 4004, a card interface 4005, a memory card 4006, a yaw angular velocity sensor 4007, a pitch angular velocity sensor 4008, a microcomputer 4009, and an operation portion 4010.

The OIS module 4001 includes a CCD image sensor (described later). The image processing circuit 4002 performs image processing such YC conversion, resolution conversion, and compression conversion on image data generated by the CCD image sensor. The LCD monitor 4003 displays image data processed by the image processing circuit 4002. The image memory 4004 functions as a buffer memory during image processing by the image processing circuit 4002. The card interface 4005 allows removable insertion of the memory card 4006. The memory card 4006 records image data processed by the image processing circuit 4002 and outputs image data stores therein to the image processing circuit 4002 via the card interface 4005.

The yaw angular velocity sensor 4007 and the pitch angular velocity sensor 4008, which are gyro sensors, for example, respectively measure the angular velocity in the yaw and pitch rotational directions of the digital camera. The yaw rotational direction of the digital camera is in the horizontal plane of the digital camera, while the pitch rotational direction of the digital camera is in the vertical plane of the digital camera.

The microcomputer 4009 controls the overall operations of the digital camera including the OIS module 4001. The microcomputer 4009 includes integration circuits 4901 and 4902. The integration circuits 4901 and 4902 integrate the AC component of the angular velocity data measured respectively by the yaw angular velocity sensor 4007 and the pitch angular velocity sensor 4008. The microcomputer 4009 thereby recognizes the output of the integration circuits 4901 and 4902 as the angle by which the digital camera has moved. This movement angle equates to the amount of camera shake. An image stabilization control portion 4903 controls the OIS module 4001, based on the output of the integration circuits 4901 and 4902.

Specifically, the image stabilization control portion 4903 controls the OIS module 4001 to rotate in the opposite direction so as to cancel out the angle by which the digital camera has moved. The distortion of light rays from the subject incident on the OIS module 4001 can thereby be controlled even if there is camera shake, since the OIS module 4001 rotates to cancel out the camera shake. Blurring of images captured by the OIS module 4001 can thus be reduced. The operation portion 4010 is an interface that receives instructions given to the digital camera from a user.

The configuration of the OIS module 4001 will be described next.

Figure 72:
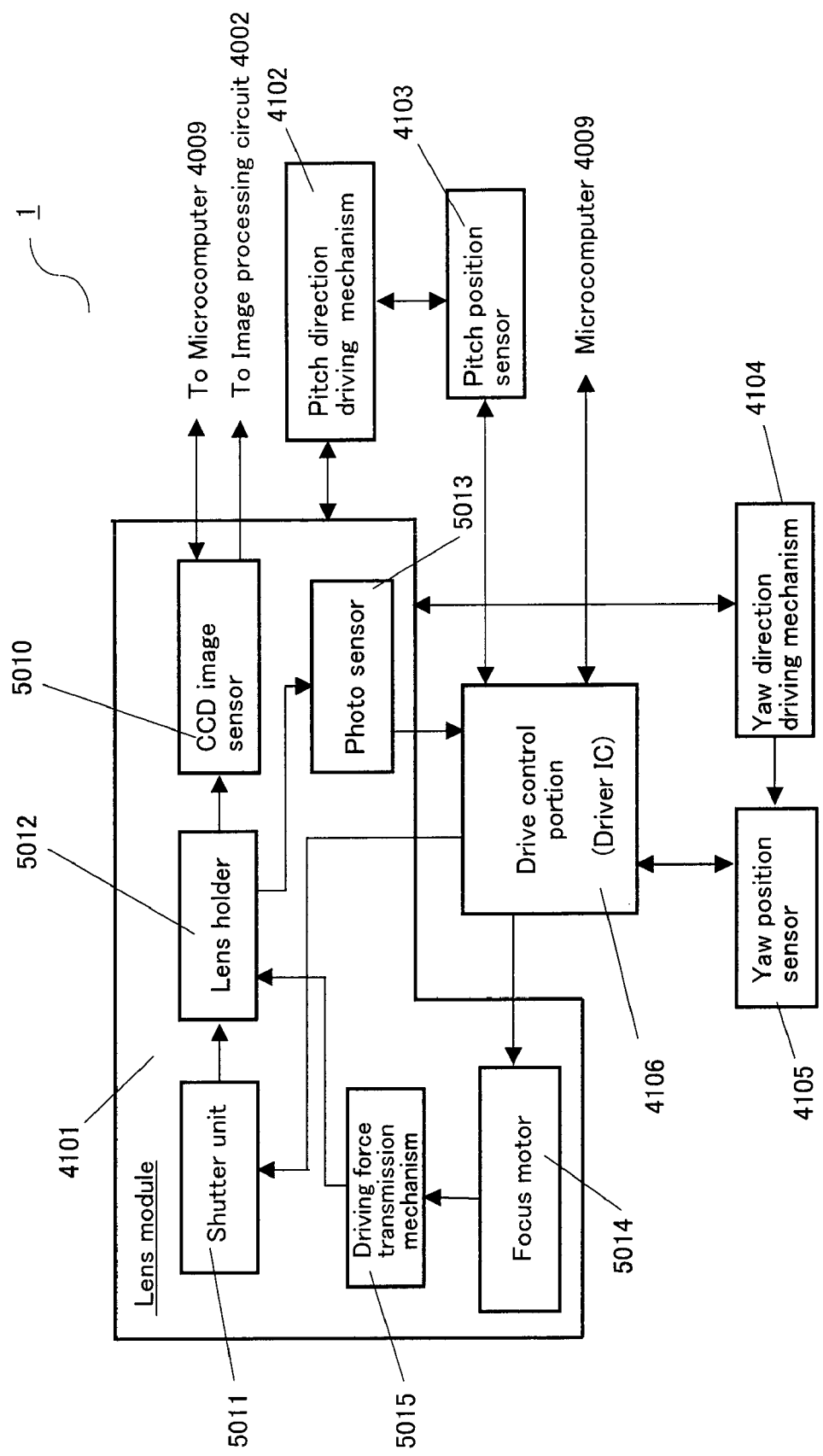
FIG. 72 is a block diagram showing the configuration of an OIS module provided in a digital camera according to embodiment 4.

FIG. 72 is a block diagram showing the configuration of the OIS module 4001. The OIS module 4001 includes a lens module 4101, a pitch direction driving mechanism 4102 for rotating the lens module 4101 in the pitch direction, a pitch position sensor 4103 for detecting the position in the pitch direction of an inner frame (described later) that supports the lens module 4101, a yaw direction driving mechanism 4104 for rotating the lens module 4101 in the yaw direction, a yaw position sensor 4105 for detecting the position of the lens module 4101 in the yaw direction, and a drive control portion 106 for controlling the operations of the OIS module 4001.

The lens module 4101 includes a CCD image sensor 5010, a shutter unit 5011, a lens holder 5012, a photo sensor 5013, a focus motor 5014, and a driving force transmission mechanism 5015. These constituent elements are integrated as the lens module 4101, which is rotatable in the pitch and yaw directions.

The shutter unit 5011 includes a mechanical-shutter, and opens/closes the shutter under the control of the drive control portion 4106. The lens holder 5012 holds the lens. An optical signal from the subject incident via the shutter unit 5011 is collected on the CCD image sensor 5010 by the lens held by the lens holder 5012. The CCD image sensor 5010 converts the optical signal from the subject collected by the lens to an electrical signal, and generates image data. The focus motor 5014 moves the lens holder 5012 in the optical axis direction via the driving force transmission mechanism 5015. The distance between the CCD image sensor 5010 and the lens held by the lens holder 5012 thereby can be adjusted, enabling the optical signal collected on the CCD image sensor 5010 to be focused. The photo sensor 5013 detects whether the lens holder 5012 is in a reference position in the optical axis direction, and notifies the drive control portion 4106.

The pitch direction driving mechanism 4102 includes a holding mechanism that holds the lens module 4101, and an actuator for driving the holding mechanism in order to rotate the lens module 4101 in the pitch direction. The yaw direction driving mechanism 4104 includes a holding mechanism that holds the lens module 4101, and an actuator for driving the holding mechanism in order to rotate the lens module 4101 in the yaw direction.

The drive control portion 4106 controls the electronic components in the lens module 4101 other than the CCD image sensor 5010 by receiving control signals from the microcomputer 4009, and receives data from these electronic components and transmits the received data to the microcomputer 4009. Note that the drive control portion 4106 can be realized as an IC chip, and preferably is provided externally to the lens module 4101, such as on the surface of a flexible cable (described later) that connects the lens module 4101 with the microcomputer 4009, for example.

Note that while a digital camera that includes a shutter unit and a focus motor is illustrated in FIG. 72, there are cases with mobile telephones with built-in camera, for example, in which the shutter unit and the focus motor are not required. A configuration without the shutter unit and the focus motor is described in the present embodiment.

An image stabilizer as an embodiment of the present invention will be described below with reference to the drawings.

Figure 73:
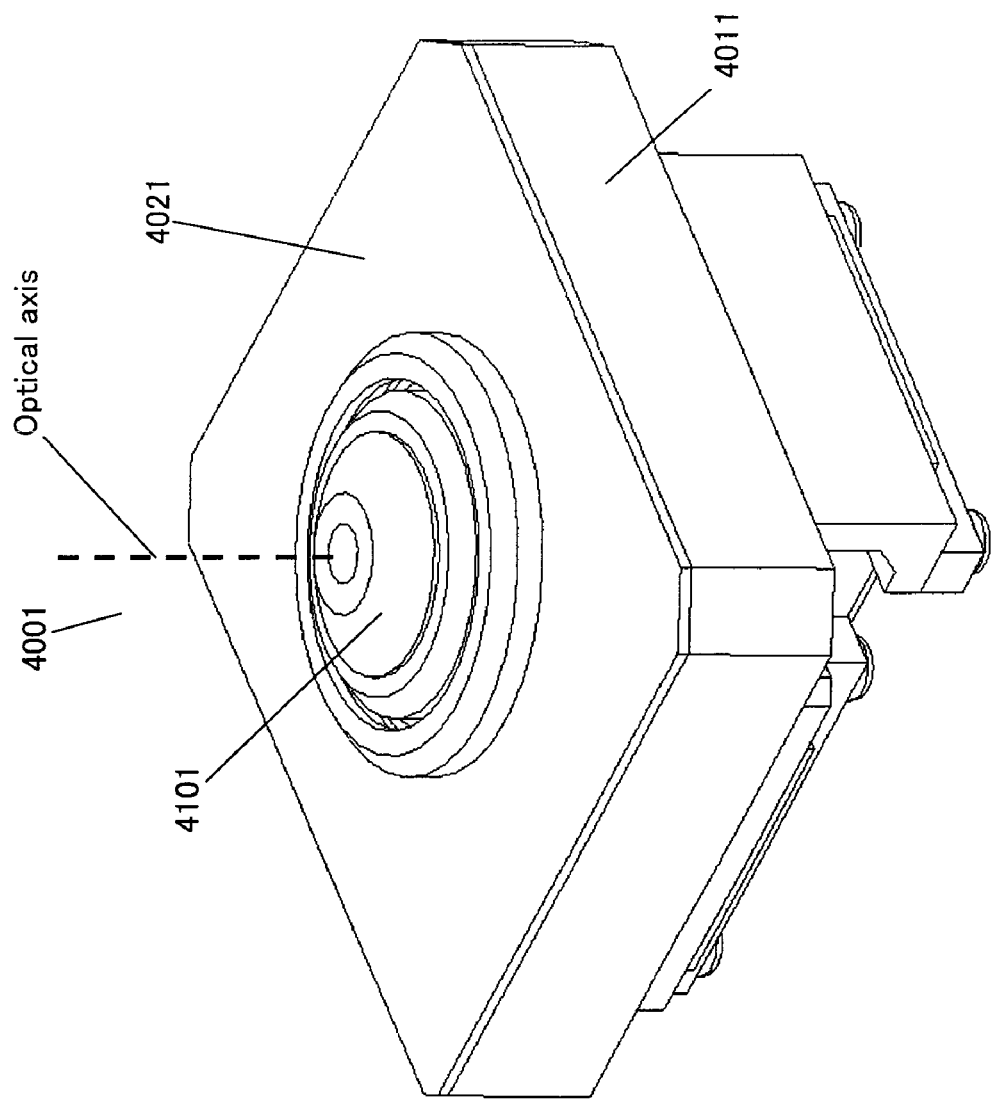
FIG. 73 is a perspective view showing the external appearance of the OIS module.
Figure 74:
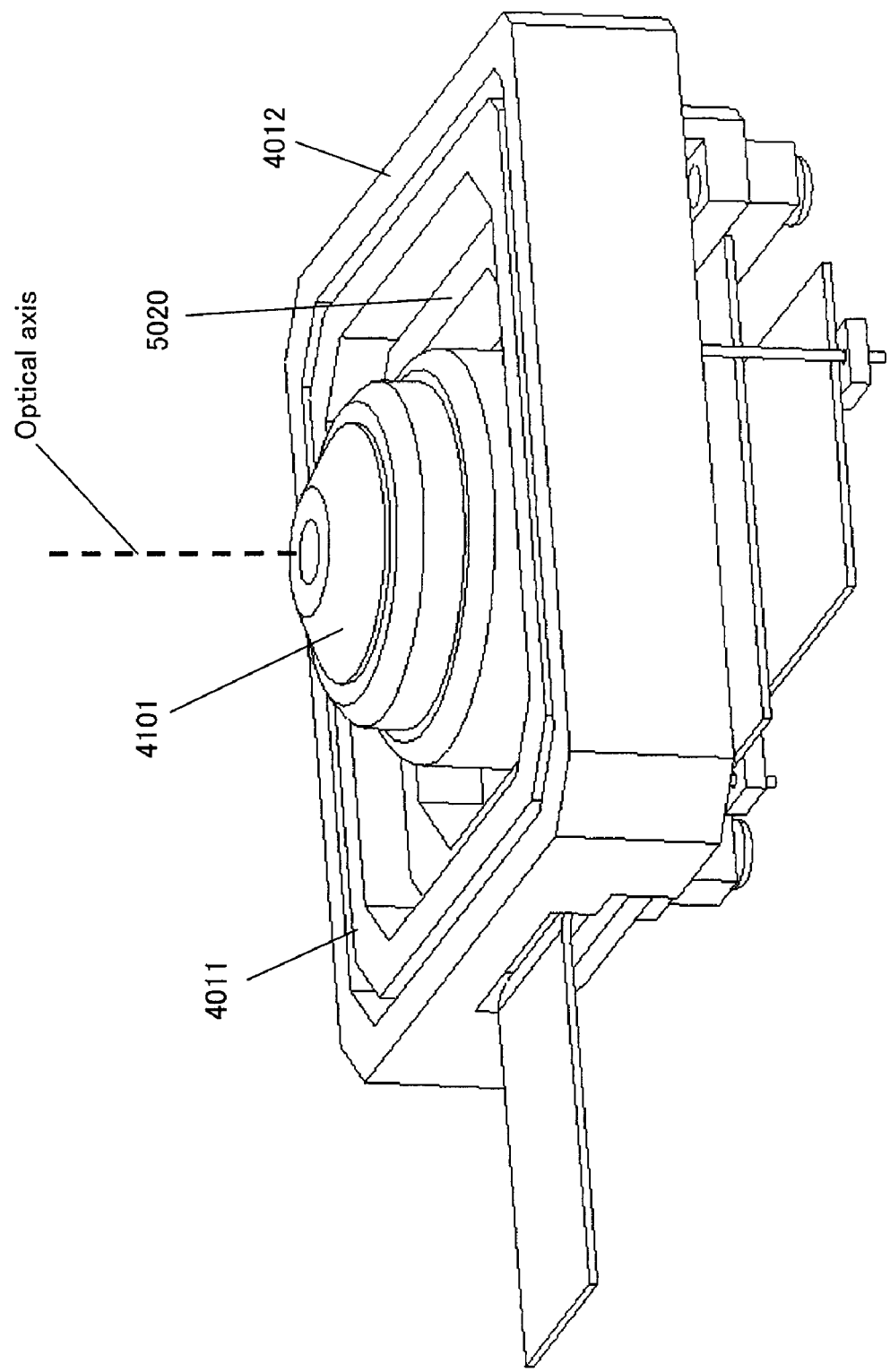
FIG. 74 is a perspective view showing the external appearance of the OIS module with a lens barrel cover removed.
Figure 75:
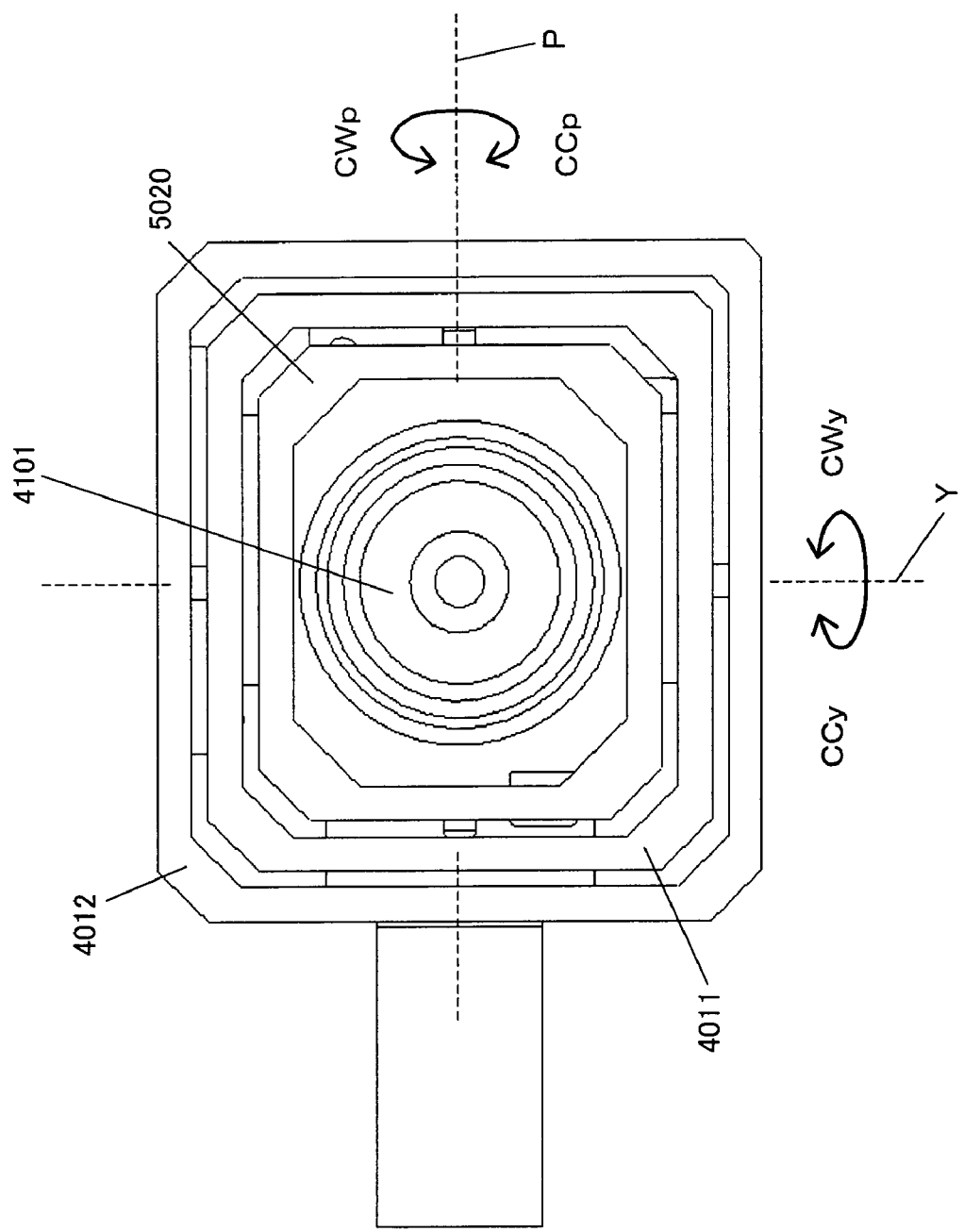
FIG. 75 is a plan view of the OIS module as seen from above the optical axis.

FIG. 73 is an external perspective view of the OIS module 4001 as seen from the subject. FIG. 74 is an external perspective view when a lens barrel cover 402 on lens module 4101 has been removed. FIG. 75 is a plan view of the OIS module 1.

The lens module 4101 is held in an inner frame 4011 so as to be rotatable in the pitch rotational direction. That is, the inner frame 4011 is a frame body having a larger opening than the outer shape of the lens module 4101 which is pivotally supported turnably within the opening in the inner frame 4011. The inner frame 4011 is held in an outer frame 4012 so as to be rotatable in the yaw rotational direction. The outer frame 4012 is a frame body whose outer shape is larger than the inner frame 4011, and is disposed outwardly of the inner frame 4011. The outer frame 4012 is fixed to the casing of the digital camera. The inner frame 4011 constitutes part of the pitch direction driving mechanism 4102, and the outer frame 4012 constitutes part of the yaw direction driving mechanism 4104. The OIS module 4001 is fixed so that the yaw axis is aligned with the vertical axis of the camera and the pitch axis is aligned with the horizontal axis of the camera. Note that the center of gravity of the lens module 4101 substantially is aligned with the center of a first turning axis in the inner frame 4011 that turnably supports the lens module 4101. Also, the center of gravity of the lens module 4101 and the inner frame 4011, which form an inner frame supporting body, substantially is aligned with the center of a second turning axis that turnably supports the inner frame supporting body. This is to enable driving to be performed with the minimum driving force by substantially aligning the center of gravity with the center of the rotational axes, since driving force increases when the center of gravity of a turnably supported object deviates from the turning center. Note that the first turning axis is orthogonal to the second turning axis.

Figure 76:
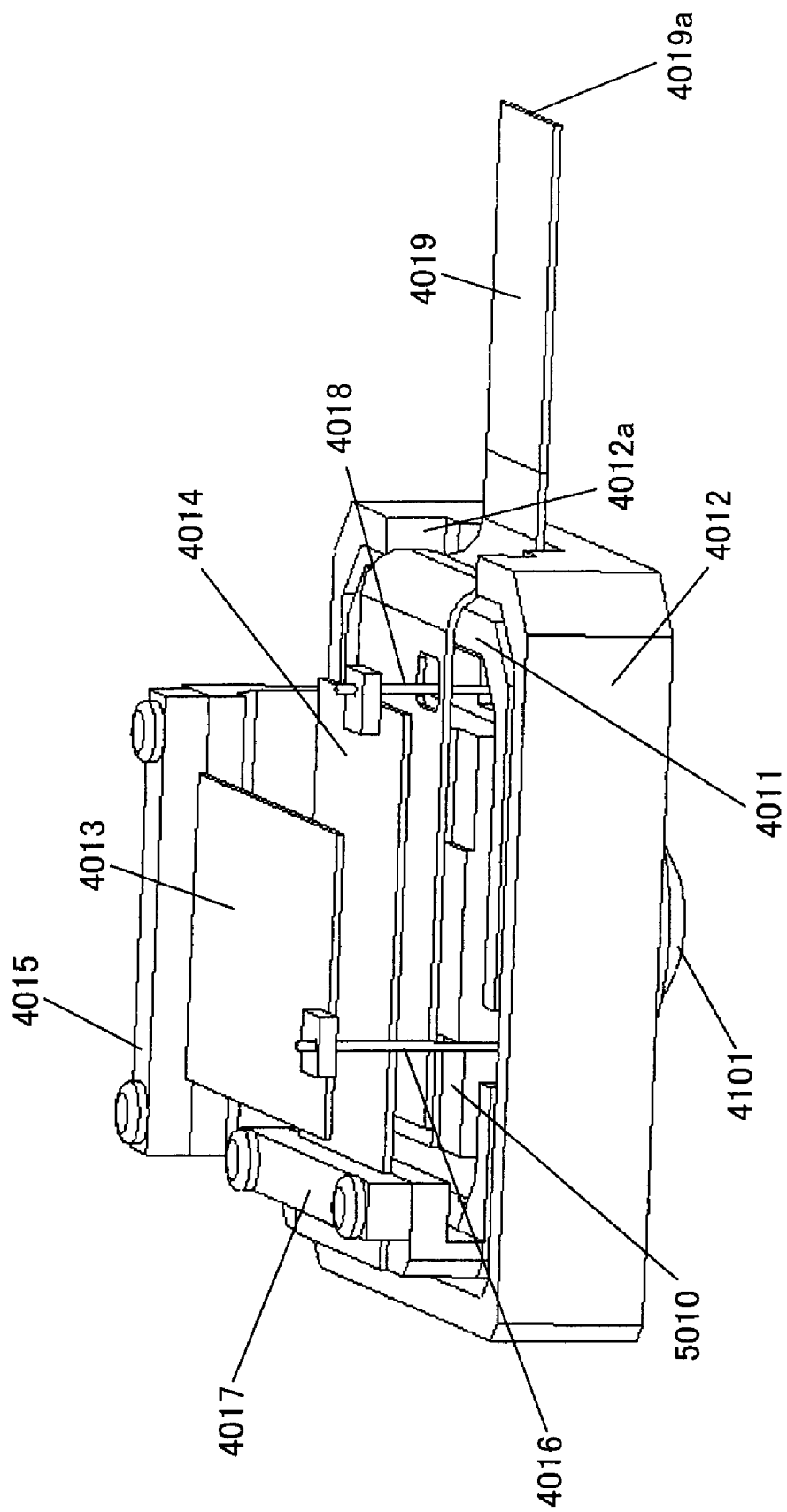
FIG. 76 is a perspective view of the OIS module as seen from the rear.
Figure 77:
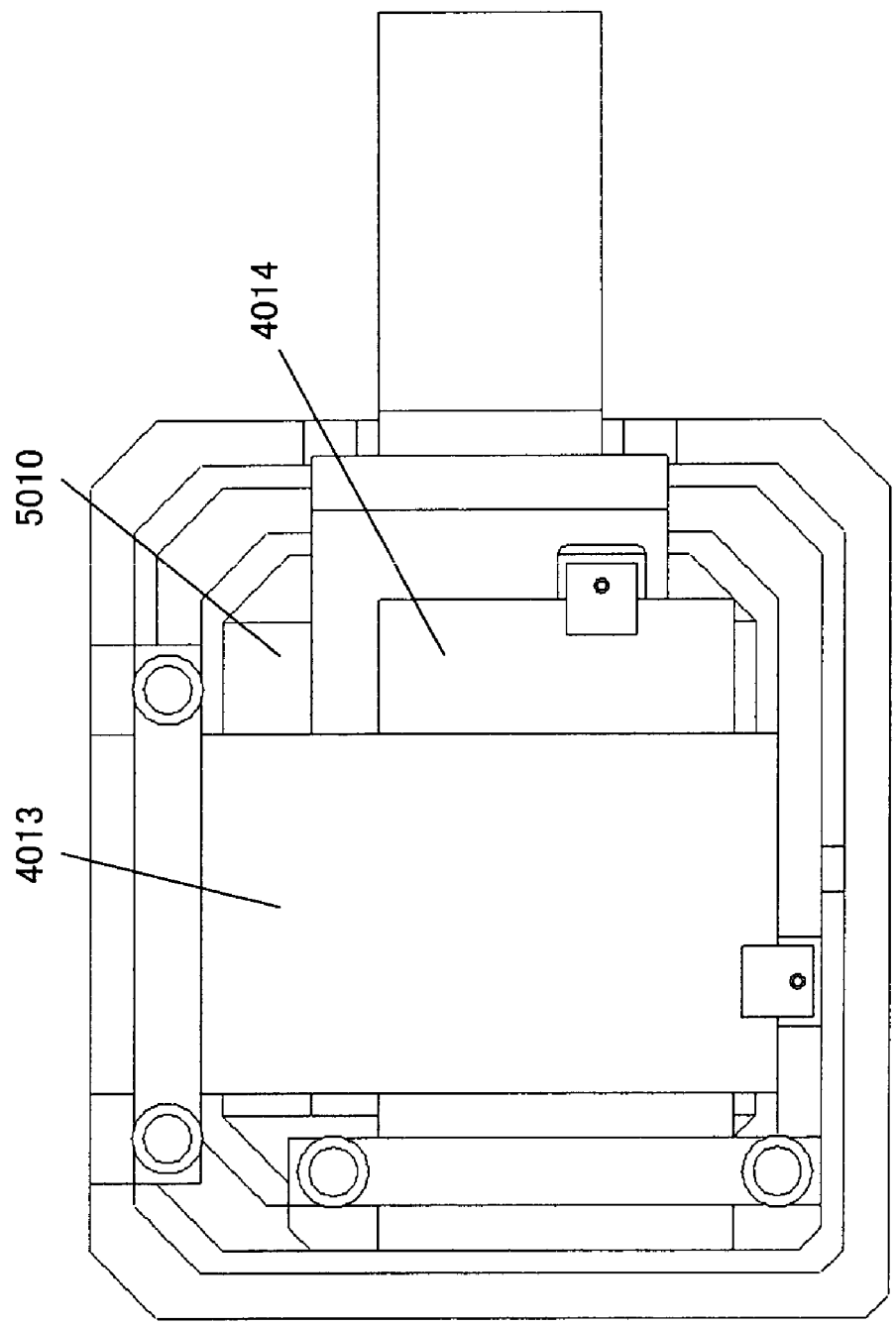
FIG. 77 is a plan view of the OIS module as seen from the rear.

FIG. 76 is an external perspective view of the OIS module 4001 as seen from the rear, while FIG. 77 is a rear view of the OIS module 4001 as seen from the rear. The OIS module 4001 includes a yaw bimorph 4013 that together with the outer frame 4012 constitutes the yaw direction driving mechanism 4104, and a pitch bimorph 4014 that together with the inner frame 4011 constitutes the pitch direction driving mechanism 4102. Note that the CCD image sensor 5010 is the most rearwardly positioned component in the lens module 4101, and is disposed inwardly of the yaw bimorph 4013 and the pitch bimorph 4014 (see FIGS. 76, 77).

The yaw bimorph 4013 is fixed to the outer frame 4012 by a fixing plate 4015 on one side, and coupled to the inner frame 4012 via a connecting wire 4016 on the opposite side. A driving force can thereby be applied that rotates the inner frame 4011 in the yaw direction relative to the outer frame 4012.

In contrast, the pitch bimorph 4014 is fixed to the inner frame 4011 by a fixing plate 4017 on one side, and coupled to a lens module base 5020 on which the lens module 4101 is mounted via a connecting wire 4018 on the opposite side. A driving force can thereby be applied for rotating the lens module 4101 in the pitch direction relative to the outer frame 4012 and the inner frame 4011.

The method of routing the flexible cable 4019 will be described next with reference to FIGS. 76, 78, 79 and 80.

Figure 78:
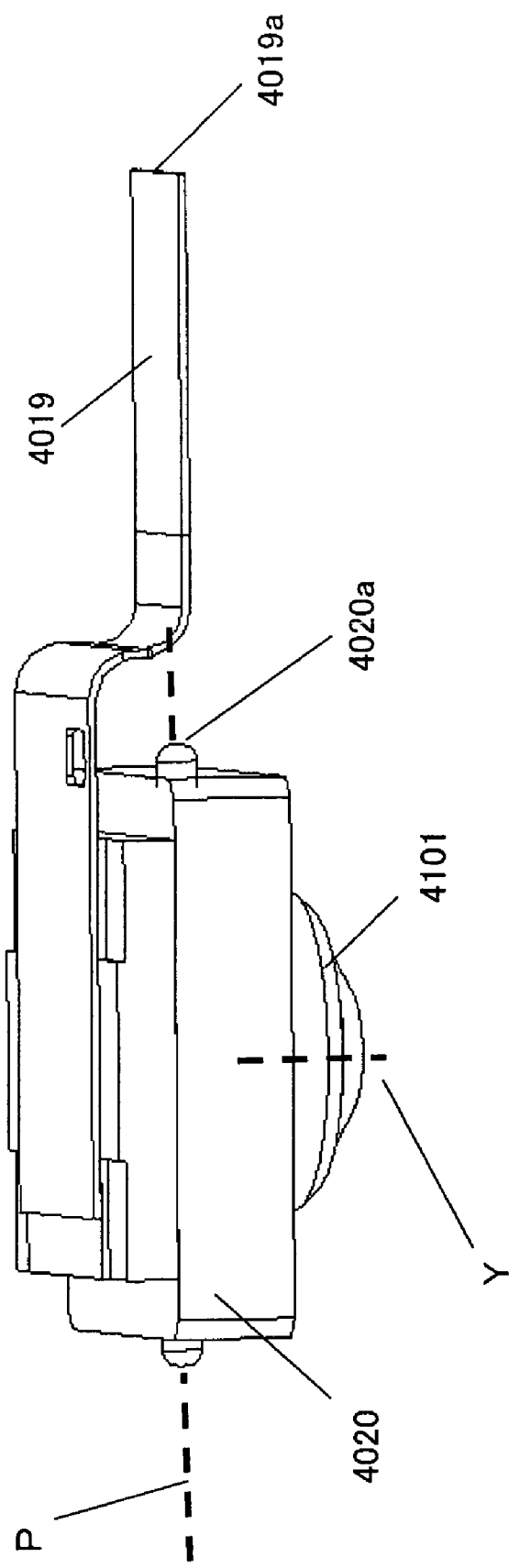
FIG. 78 is a perspective view showing a flexible cable when attached.
Figure 79:
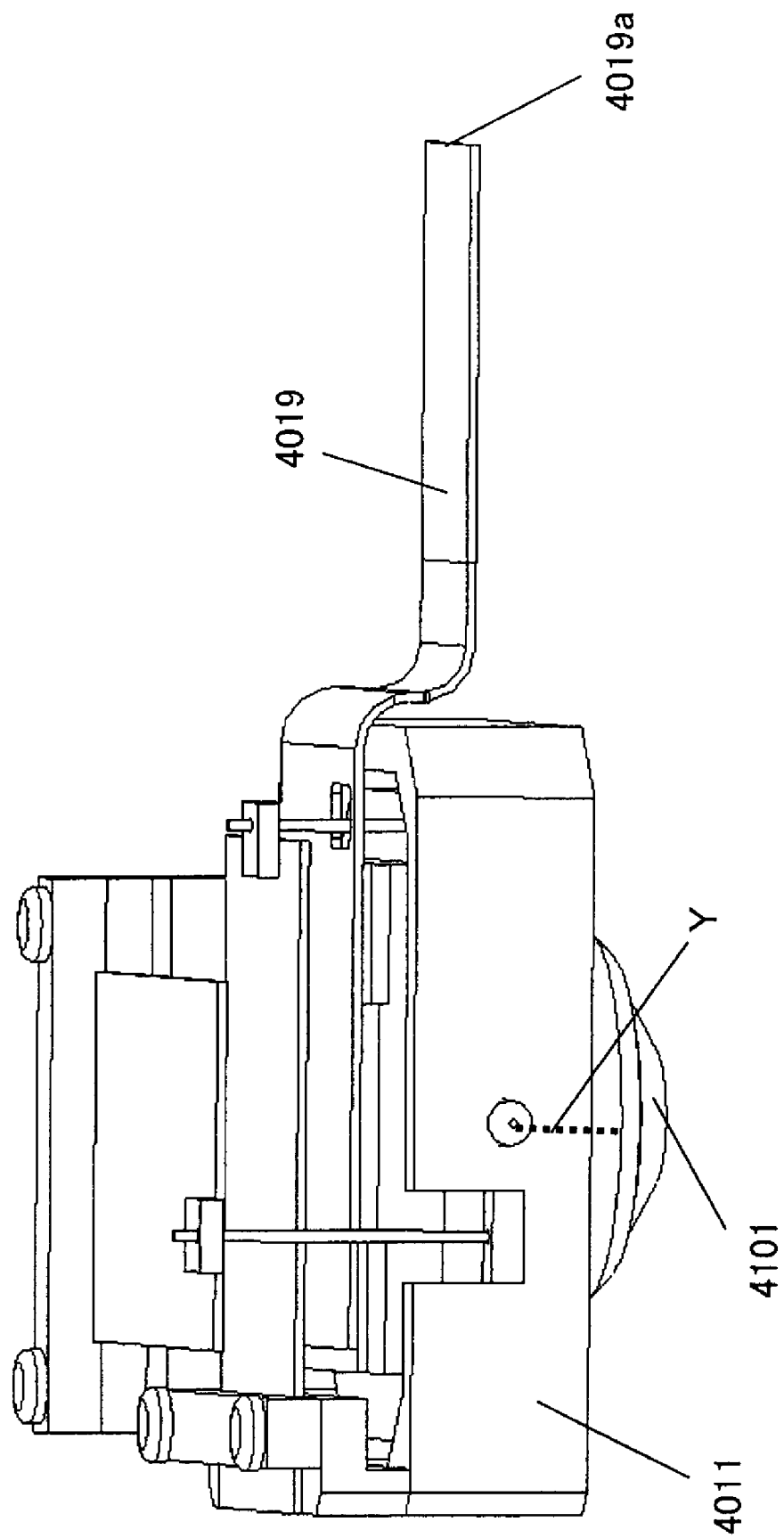
FIG. 79 is a perspective view showing the flexible cable when attached.
Figure 80:
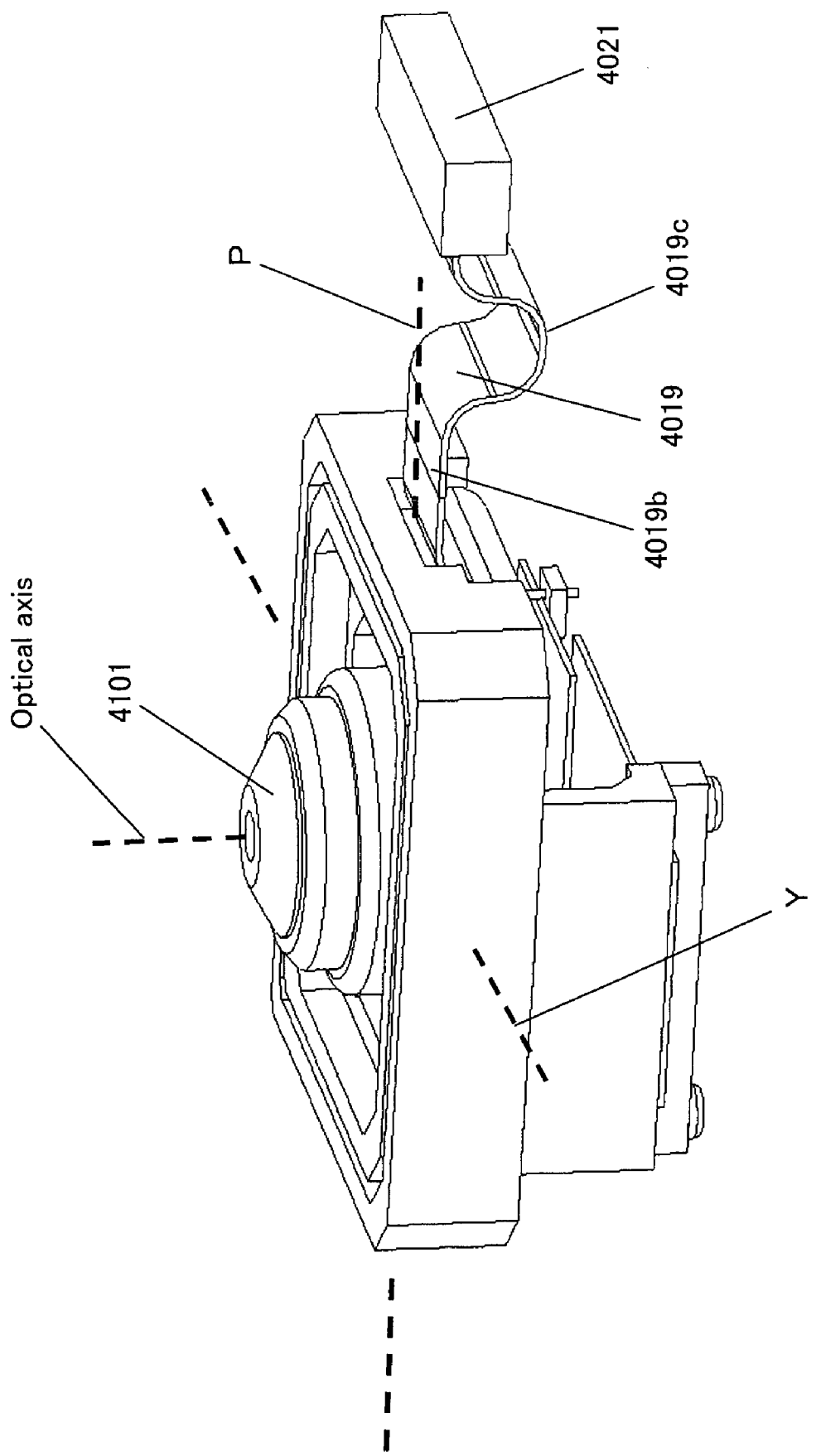
FIG. 80 is a perspective view showing the flexible cable connected to a connector.

FIG. 78 shows a flexible cable or flexible substrate 4019 run from a bottom portion of the lens module 4101 and the lens module base 4020, without depicted the inner frame 4011, and FIG. 79 shows a state in which the outer frame 4012 is not depicted. FIG. 80 shows the flexible cable 4019 connected to a connector 4031.

The flexible cable 4019 is run from a bottom portion of the OIS module 4001, bent outwardly of the inner frame 4011, fixed (fixing portion not shown) to the inner frame 4011 in proximity to a bearing 4020a that supports the lens module 4101, folded where there is a cutout portion 4012a in the outer frame 4012, and then further run externally. In short, it is important that the flexible cable 4019 is bent and run externally at substantially the same height as the center of the yaw axis orthogonal to the direction in which the flexible cable 4019 is run. While an end portion 4019a of the flexible cable 4019 is connected to a connector, the flexible cable 4019 is not connected to the connector in a linear state, and is necessarily flexed to a certain extent, as shown in FIG. 76, in order to drive the inner frame 4011 and the outer frame 4012 with precision.

The structure of the flexible cable 4019 will now be described in detail.

The flexible cable 4019 is a plate-like member that is narrower than the inner frame 4011, extends in a direction orthogonal to the optical axis direction, and has a principal surface facing in the optical axis direction. That is, the thickness direction of the flexible cable 4019 is along the optical axis direction. The flexible cable 4019 has a flexed or rounded portion 4019c following on from a flat portion 4019b. The flexed portion 4019c is curved in a convex manner at the bottom of FIG. 80, and the center of curvature is positioned in the optical axis direction relative to the flexible cable 4019. As aforementioned, the overall size of the apparatus can reduced in the optical axis direction since the flexible cable 4019 does not take up space in the optical axis direction. That is, the image stabilizer and the imaging apparatus in which the image stabilizer is installed can be reduced in size and profile.

Figure 81:
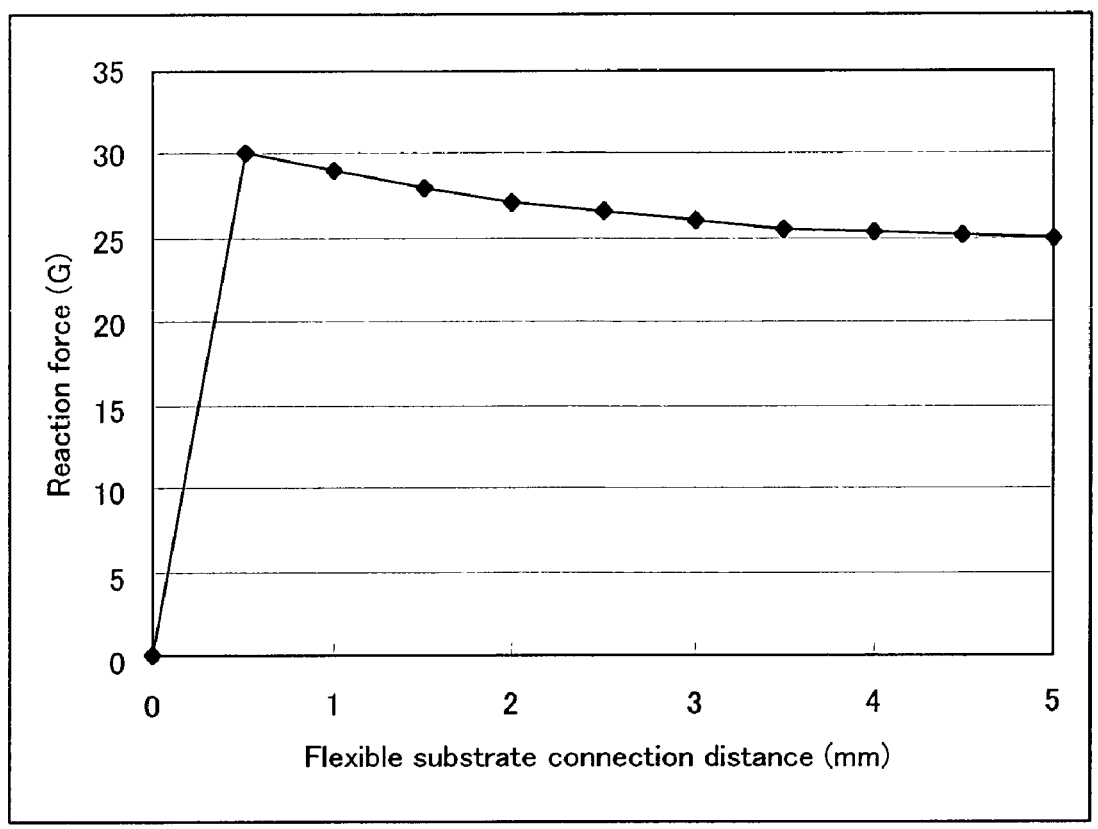
FIG. 81 is a graph showing an exemplary reaction force of the flexible cable that acts depending on the distance between the OIS module and the connector.
Figure 82:
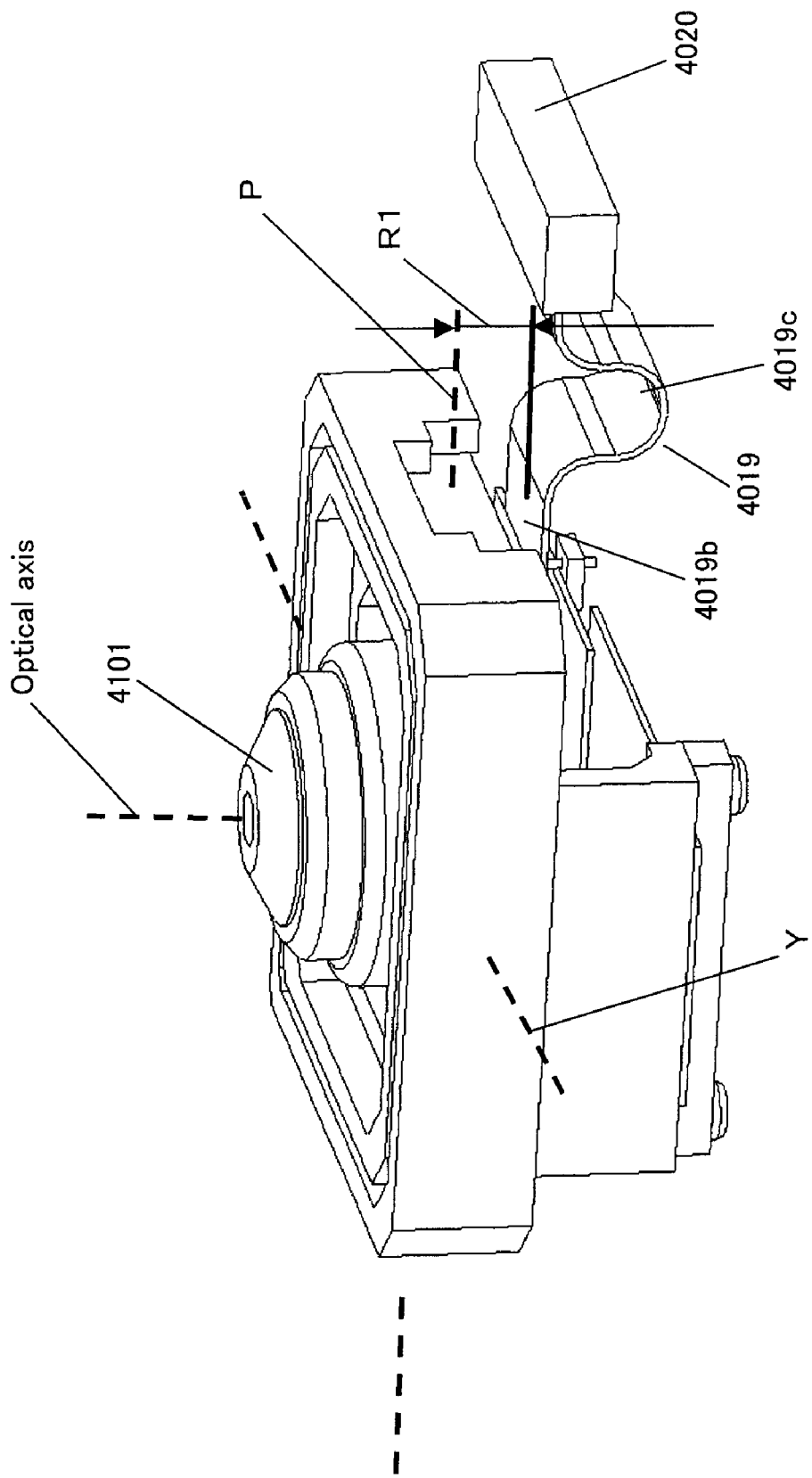
FIG. 82 is a perspective view showing the flexible cable when attached.
Figure 83:
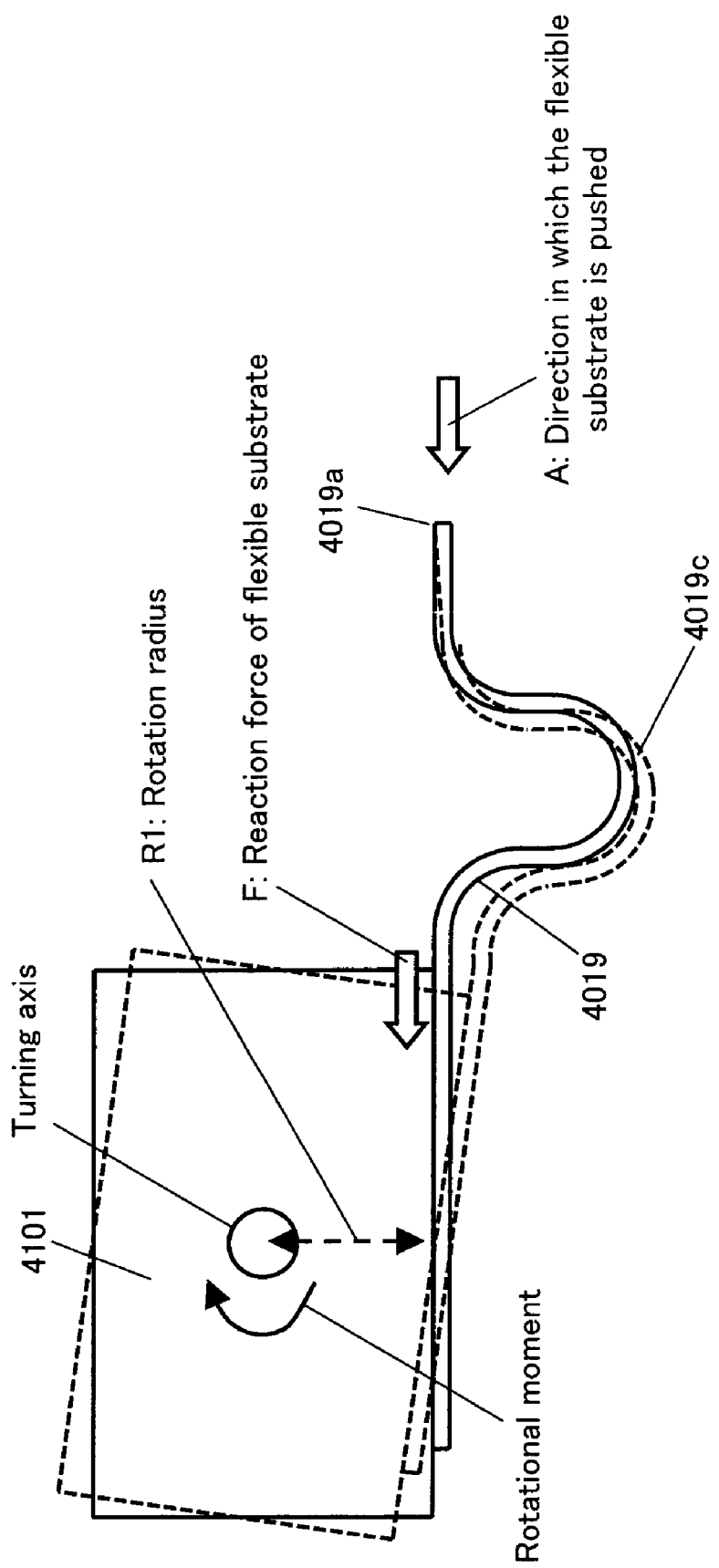
FIG. 83 is a conceptual diagram showing the lens barrel rotated by a moment resulting from the reaction force of the flexible cable.

The reasons for providing the flexed portion 4019c in the flexible cable 4019 will be described with reference to FIGS. 81, 82 and 83. FIG. 81 shows the reaction force produced at the end portion of the flexible cable 4019 when the flexible cable 4019 is bent from the free length. FIG. 82 shows the flexible cable 4019 connected to the connector 4020 after having been run from a place that is removed a prescribed distance R1 from the turning axis. FIG. 83 is a conceptual diagram showing the lens module 4101 tilted in the rotational direction by the reaction force produced when the flexible cable 4019 is attached to the connector 4020 in the state shown in FIG. 82.

By bending the flexible cable 4019 as shown in FIG. 80, a reaction force that acts to return the flexible cable 4019 attached to the lens module 4101 to its original state is produced and transmitted to the lens module 4101. With a flexible cable that is 100 μm thick and 6 mm wide, for example, as shown in FIG. 81, the maximum reaction force is exhibited when the connection position of the flexible cable 4019 to the connector with respect to the free length approaches 0.5 mm, at which point the reaction force reaches 30 g. Further, the reaction force tapers off when the connector is positioned closer, although never reaching zero. That is, the inner frame 4011 and the outer frame 4012 supporting the lens module 4101 do not tilt if the reaction force of the flexible cable 4019 acts at a certain height of the turning axis. However, if the point at which the reaction force F of the flexible cable 4019 acts on the turning axis deviates by an amount R1 from the turning axis, as shown in FIG. 82, a moment (F×R1) works about the turning axis, and attaching the flexible cable 4019 causes the lens module 4101 to tilt, as shown in FIG. 83. To prevent this, the position at which the flexible cable substrate is attached preferably is in proximity to the center of the turning axis. If the flexible cable 4019 is run to substantially the same height in the optical axis direction as the turning axis orthogonal thereto, the moment does not readily act on the turning axis. Consequently, the lens module 4101 does not readily tilt, allowing a strong image stabilization effect to be obtained.

Image Stabilizer (2)

The image stabilizer described above uses a flexible plate that freely extends linearly. Next, an image stabilizer will be described that uses a flexible plate that bends freely (i.e., has a rounded portion). Since the flexible cable substrate in this embodiment is flexed from the start, the reaction force caused by the flexing of the flexible cable substrate does not act on the lens module 4101. Consequently, a rotational moment is not generated in the lens module 4101 even if the position of the flexible cable run from the lens module 4101 is removed from turning center.

In recent times, remarkable progress has been made in flexible cable technology, and flexible substrates containing conductive copper and having a thickness of 50 μm or less now are being used extensively. In the case of these thin flexible cables, the lens module 4101 tilts slightly (≦1°), even though a large reaction force is not generated because of the low rigidity. Consequently, if the flexible cable is locally deformed, excess reaction force is not exerted on the lens module 4101, and information can be exchanged electrically.

Figure 84:
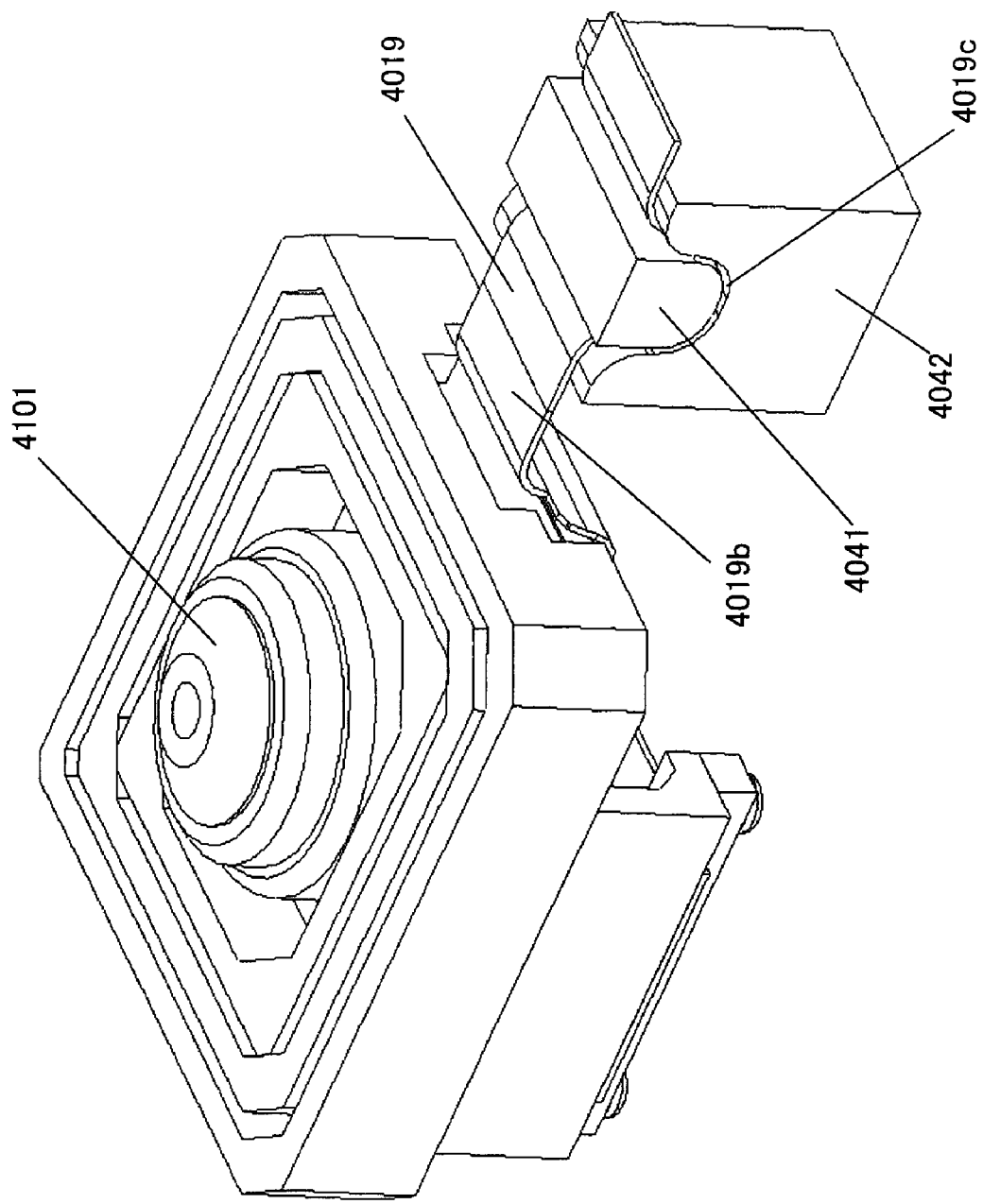
FIG. 84 is an example showing a jig and method for forming the flexible cable.

The method of forming the flexible cable is described below with reference to FIG. 84.

A straight flexible cable 4019 is attached to a bottom portion of the lens module 4101, and the inner frame 4011 and the outer frame 4012 are installed. After everything including the drive body has been installed, the flexible cable with the lens module 4101 attached is placed in a clamping jig B4042 as shown in FIG. 84. The flexible cable can be made into the shape of the jig simply by placing a jig A4041 that acts as a weight on top of the flexible cable for a certain period of time. That is, the flexed portion 4019c is formed in the flexible cable 4019. This is a result of being readily able to not only elastically deform but also plastically deform the flexible cable 4019, due to the reduced thickness of the flexible cable 4019.

Simply by forming the flexible cable 4019 into a prescribed shape, it is thus possible to reduce the reaction force dramatically. Consequently, the lens module 4101 does not readily tilt, allowing a good strong image stabilization effect to be obtained.

Also, with the locally deformed flexible cable 4019, it is known that hardly any reaction force is produced even if the shape of the original flexible cable varies slightly due to slight errors in dimensional shape or assembly. In short, a large reaction force works as a result of flexing the flexible cable 4019 from the linear state in which a reaction force is not applied, and there is hardly any effect due to a reaction force even if the flexible cable 4019 is different in the long direction from an originally flexed flexible cable by an error (e.g., around 1 to 2 mm).

Note that in embodiment 1 in which the flexible cable 4019 is run to substantially the same height in the optical axis direction as the turning axis orthogonal thereto, the flexible cable may be flexed in advance as in embodiment 2.

Image Stabilizer (3)

The case where electromagnetic motors are employed in the yaw direction driving mechanism and the pitch direction driving mechanism of the OIS module 4001 will be described.

Figure 85:
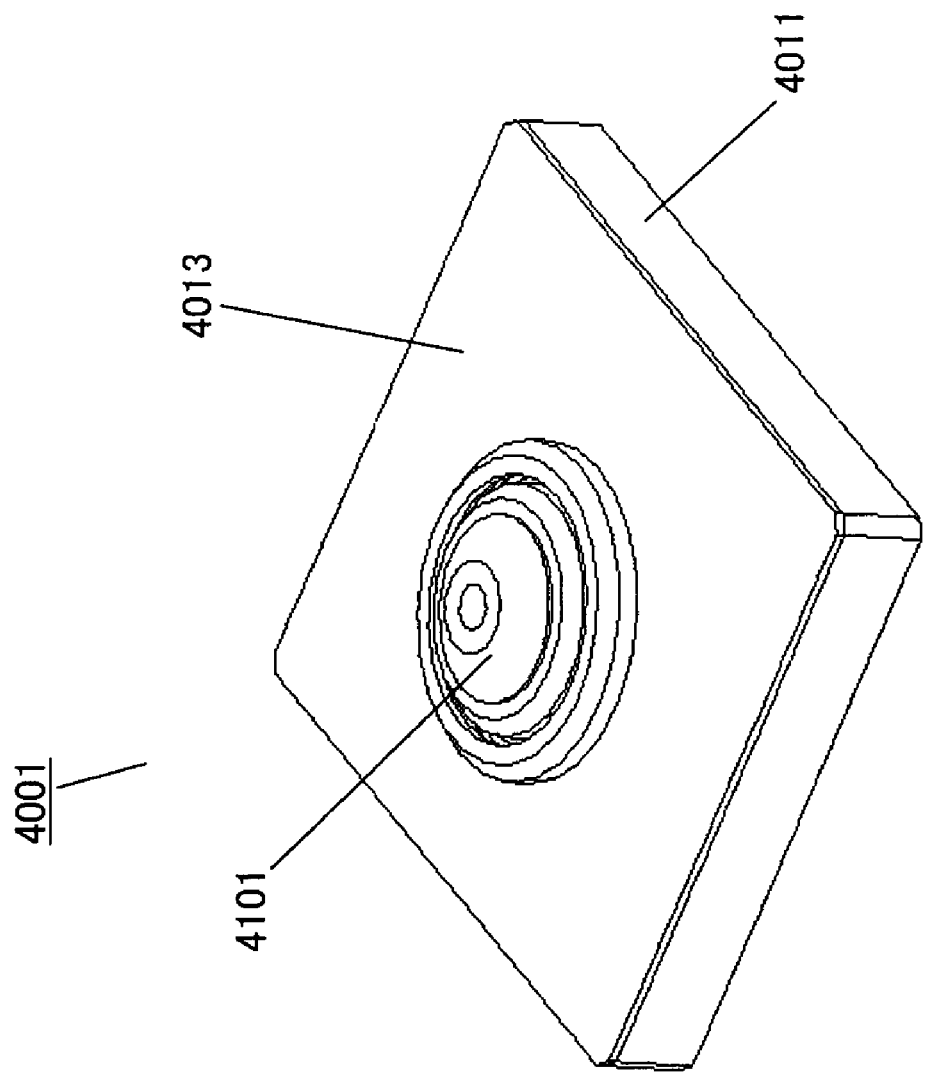
FIG. 85 is a perspective view showing the external appearance of the OIS module.
Figure 86:
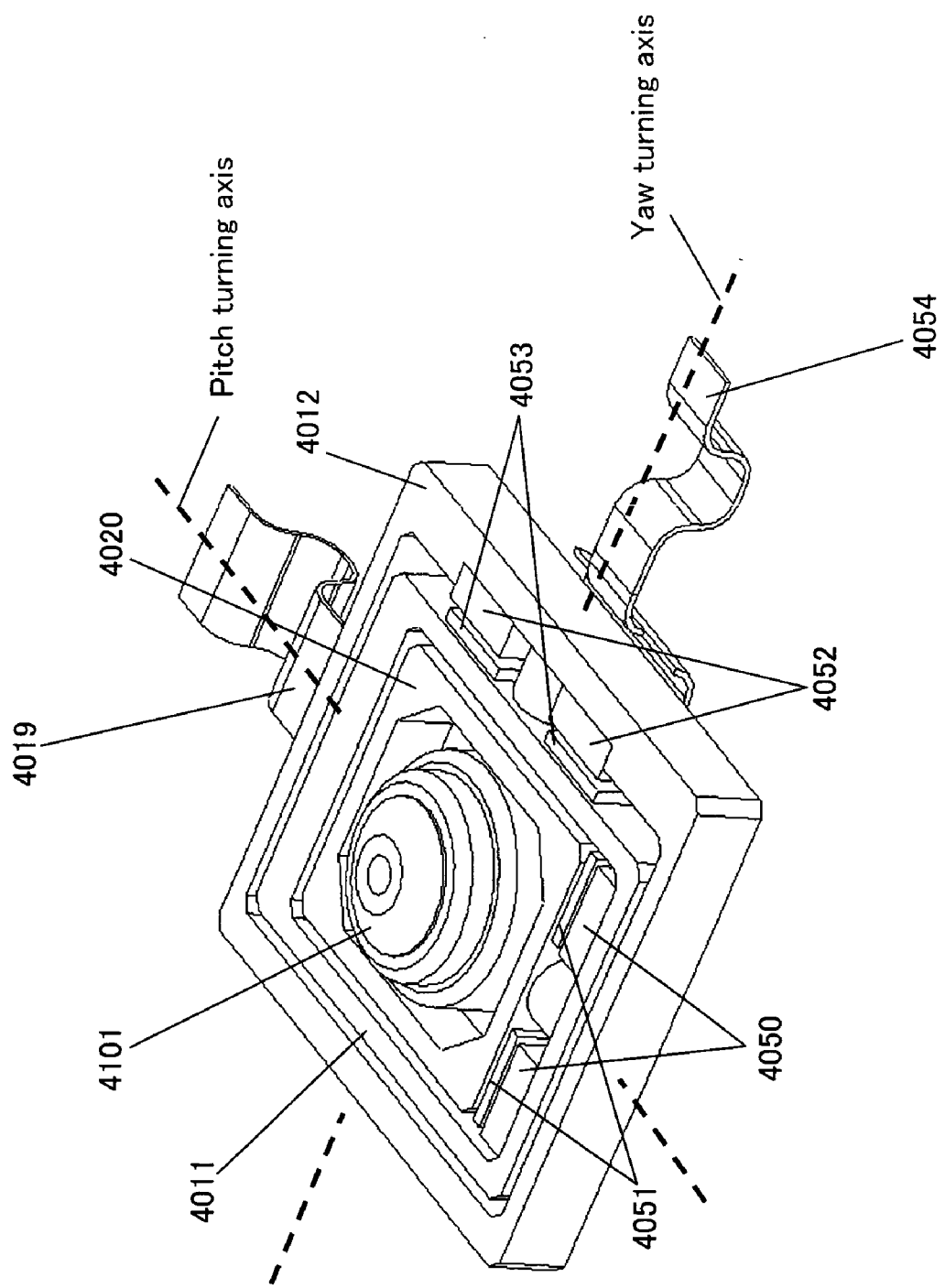
FIG. 86 is a perspective view showing the external appearance of the OIS module with a lens barrel cover removed.
Figure 87:
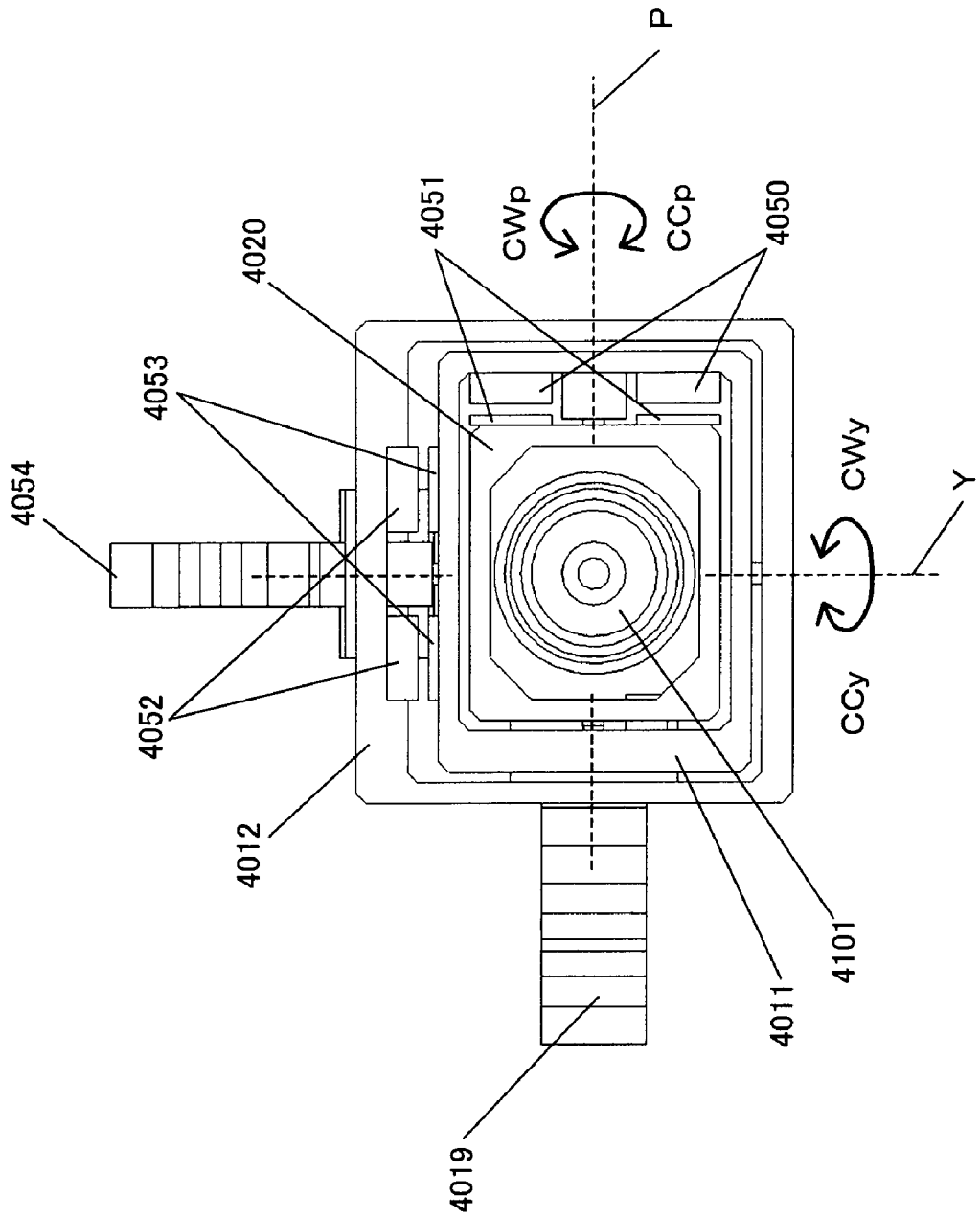
FIG. 87 is a plan view of the OIS module as seen from above the optical axis.

FIG. 85 is an external perspective view of the OIS module 4001 as seen from the subject. FIG. 86 is an external perspective view of when a lens barrel cover 4013 on the lens module 4101 has been removed. FIG. 87 is a plan view of the lens module 4101.

The lens module 4101 is held in the inner frame 4011 so as to be rotatable in the pitch rotational direction. That is, the inner frame 4011 is a frame body that has a large opening that the outer shape of the lens module 4101, which is pivotally supported turnably within the opening in the inner frame 4011. The inner frame 4011 is held in an outer frame 4012 so as to be rotatable in the yaw rotational direction. The outer frame 4012 is a frame structure whose outer shape in larger than the inner frame 4011, and is disposed outwardly of the inner frame 4011. The outer frame 4012 is fixed to the casing of the digital camera. The inner frame 4011 constitutes part of the pitch direction driving mechanism 4102, and the outer frame 4012 constitutes part of the yaw direction driving mechanism 104. The OIS module 4001 is fixed so that the yaw axis is aligned with the vertical axis of the camera, and the pitch axis is aligned with the horizontal axis of the camera.

Note that similarly to the OIS of the bimorph type, the center of gravity of the lens module 4101 is substantially aligned with the center of a first turning axis in the inner frame 4011 that turnably supports the lens module 4101. The center of gravity of the lens module 4101 and the inner frame 4011, which form an inner frame supporting body, is substantially aligned with the center of a second turning axis that turnably supports the inner frame supporting body. Note that the first turning axis is orthogonal to the second turning axis.

Pitch driving coil substrates 4051 are disposed on a side surface of the lens module base 5020 with the pitch axis sandwiched therebetween, and pitch driving magnets 4050 are disposed on the inner frame 4011 so as to oppose the pitch driving coil substrates 4051 with a prescribed gap provided therebetween. Yaw driving coil substrates 4053 are disposed with the yaw axis sandwiched therebetween, and yaw driving magnets 4052 are disposed on the outer frame 4012 so as to oppose the yaw driving coil substrates 4053 with a prescribed gap provided therebetween. Note that while a detailed description has been omitted, the magnets and the coils are configured so that thrust is produced in the orbital direction of the pitch and yaw axes.

Figure 88:
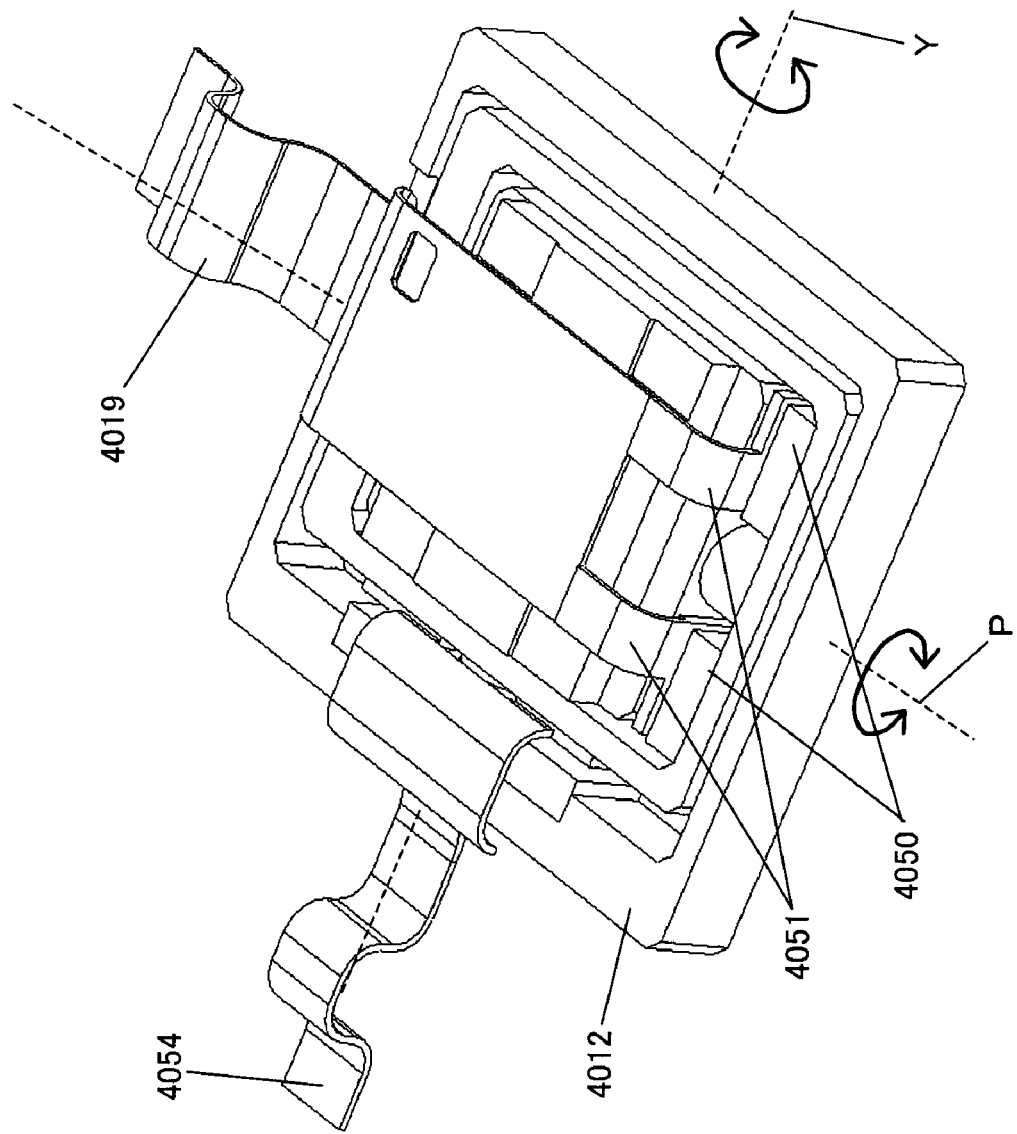
FIG. 88 is a perspective view of the OIS module as seen from the rear.
Figure 89:
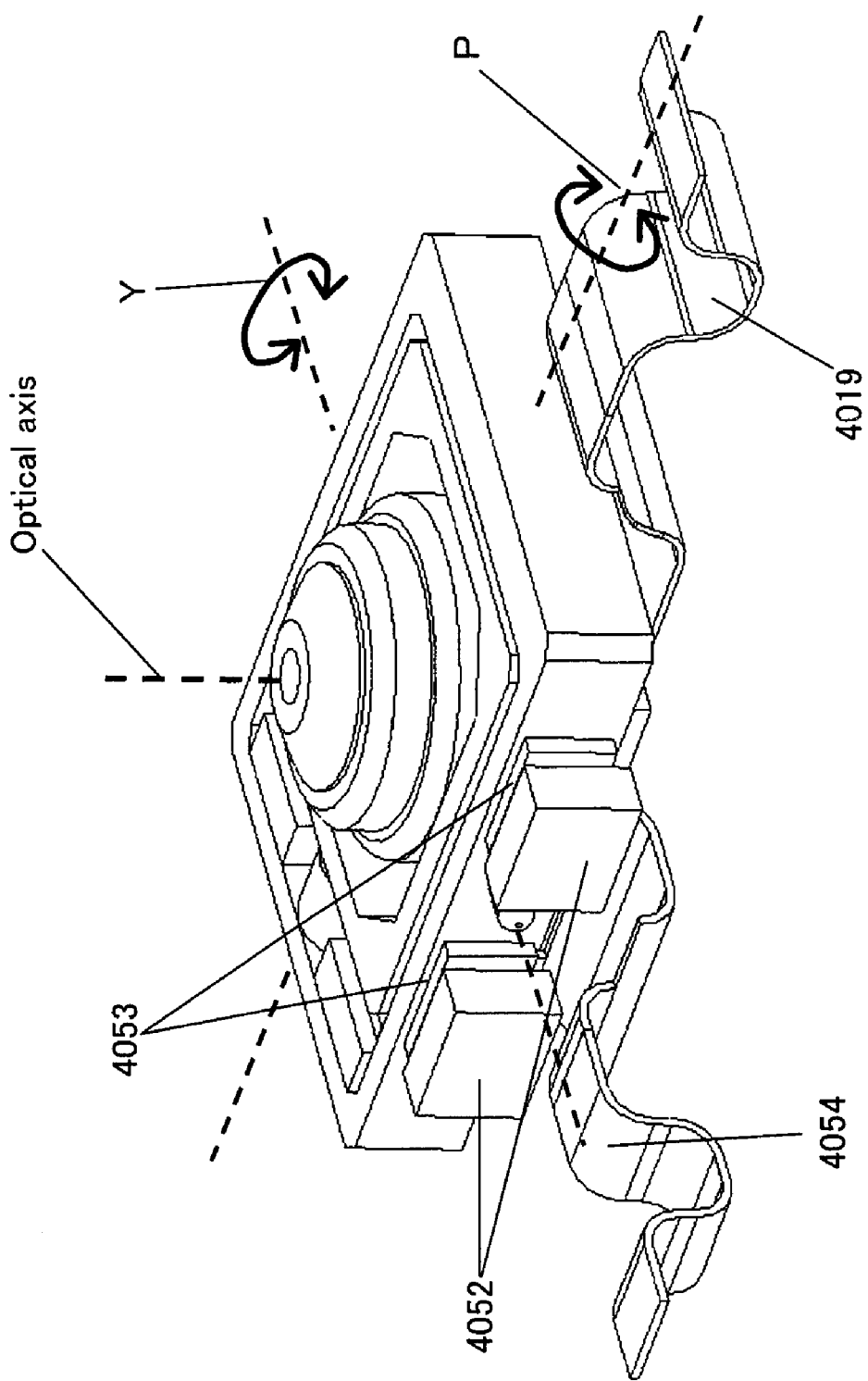
FIG. 89 is a perspective view showing the flexible cable when attached.
Figure 90:
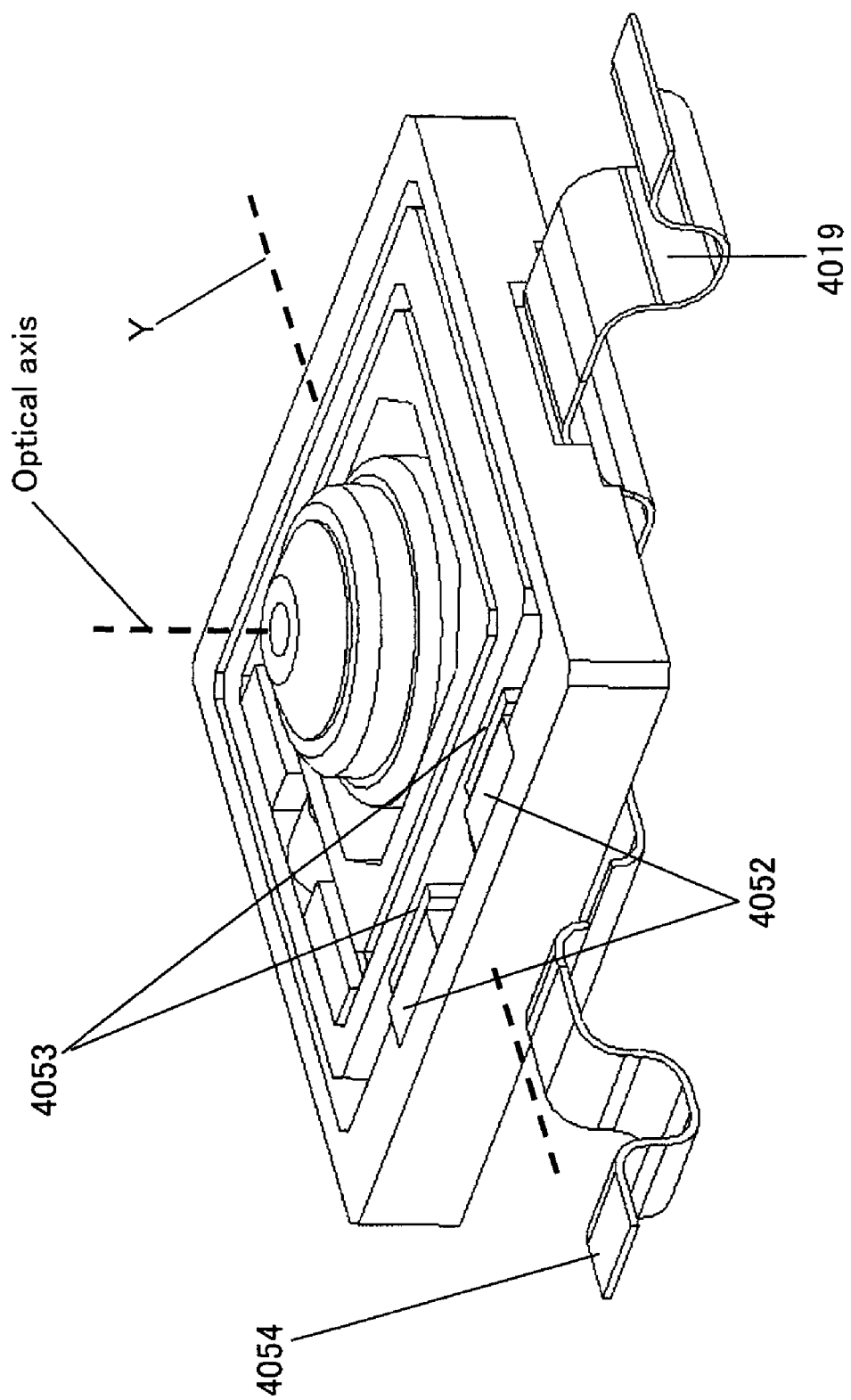
FIG. 90 is a perspective view showing the flexible cable when attached.

The method of routing the flexible cable will be described next with reference to FIGS. 88, 89, and 90. FIG. 88 is a perspective view of the lens module 4101 as seen from the rear. FIG. 89 is an external perspective view in which the outer frame 4012 is omitted, and FIG. 90 is an external perspective view showing the overall configuration.

The yaw driving coil substrates 4053 are soldered (not shown) to a yaw driving flexible cable 4054, which extends outwardly. The pitch driving coil substrates 4051 are soldered (not shown) to a CCD flexible cable 4019, and sharable with the CCD flexible cable 4019. The routing method, as illustrated in FIGS. 76, 78, and 79, involves the CCD flexible cable 4019 being run to substantially the same height in the optical axis direction as the yaw axis orthogonal to the routing direction of the CCD flexible cable 4019. Similarly, the yaw driving flexible cable 4054 connected to the yaw driving coil substrates 4053 disposed on the inner frame 4011 is run outwardly of the outer frame 4012, and fixed at substantially the same height in the optical axis direction as the orthogonal pitch axis (fixing portion not shown).

Note that in the depicted configuration, there are both cases in which forming (plastic deformation of flexed portions 4019c, 4054c) is and is not performed on the CCD flexible cable 4019 and the yaw driving flexible cable 4054.

As aforementioned, by disposing a flexible cable or preserving a prescribed shape, an image stabilization effect of driving the lens barrel as a whole can be obtained, while maintaining the performance originally possessed by the actuators.

Note that the configuration included in the content disclosed in the present embodiment may be constituted as follows. The actuators are exemplary driving portion of the present invention.

(1) A first image stabilizer according to the present invention has a lens module that holds a lens and an imaging element, a frame body that has an inner frame that turnably supports the lens module about a first turning axis and an outer frame that turnably supports the inner frame about a second turning axis orthogonal to the first turning axis, driving portion that turns the lens module relative to the inner frame and turning the inner frame relative to the outer frame, and a flexible cable run from the lens module. The center of gravity of the lens module is substantially aligned with the turning center of the first turning axis, and the center of gravity of an inner frame supporting body composed of the lens module and the inner frame is substantially aligned with the turning center of the second turning axis. The flexible cable is formed so as to have a rounded portion.

With this apparatus, a reaction force does not act readily on the lens module from the flexible cable, since forming is performed so that the flexible cable has a rounded portion. Consequently, the lens module does not tilt readily, allowing a strong image stabilization effect to be obtained.

(2) In the first image stabilizer of the present invention ((1) above), preferably the flexible cable extends so that the primary surface faces in the optical axis direction. With this apparatus, the overall size of the apparatus in the optical axis direction can be reduced.

(3) In the first image stabilizer of the present invention ((2) above), preferably the flexible cable extends in a direction orthogonal to the optical axis direction. With this apparatus, the overall size of the apparatus in the optical axis direction can be reduced.

(4) In the first image stabilizer of the present invention ((2) or (3) above), preferably the center of curvature of the rounded portion is positioned in the optical axis direction relative to the flexible cable. With this apparatus, the overall size of the apparatus in the optical axis direction can be reduced.

(5) In the first image stabilizer of the present invention (any of (1) to (4) above), preferably the flexible cable extends in a direction orthogonal to one of the first turning axis and the second turning axis, and is run to substantially the same height in the optical axis direction as the turning axis orthogonal thereto.

With this apparatus, a moment does not act readily on the orthogonal turning axis even if a reaction force from the flexible cable acts on the turning axis. Consequently, the lens module does not readily tilt, allowing a strong image stabilization effect to be obtained.

(6) A second image stabilizer according to the present invention has a lens module that holds a lens and an imaging element, a frame body that has an inner frame that turnably supports the lens module about a first turning axis and an outer frame that turnably supports the inner frame about a second turning axis orthogonal to the first turning axis, driving portion that turns the lens module relative to the inner frame and turning the inner frame relative to the outer frame, and a flexible cable run from the lens module. The center of gravity of the lens module is substantially aligned with the turning center of the first turning axis, and the center of gravity of an inner frame supporting body composed of the lens module and the inner frame is substantially aligned with the turning center of the second turning axis. The flexible cable extends in a direction orthogonal to one of the first turning axis and the second turning axis, and is run to substantially the same height in the optical axis direction as the turning axis orthogonal thereto.

With this apparatus, a moment does not act readily on the orthogonal turning axis even if a reaction force from the flexible cable acts on the turning axis. Consequently, the lens module does not tilt readily, allowing a strong image stabilization effect to be obtained.

(7) A third image stabilizer according to the present invention has a lens module that holds a lens and an imaging element, a frame body that has an inner frame that turnably supports the lens module about a first turning axis and an outer frame that turnably supports the inner frame about a second turning axis orthogonal to the first turning axis, driving portion that turns the lens module relative to the inner frame and turning the inner frame relative to the outer frame, and first and second flexible cables run from the lens module. The center of gravity of the lens module is substantially aligned with the turning center of the first turning axis, and the center of gravity of an inner frame supporting body composed of the lens module and the inner frame is substantially aligned with the turning center of the second turning axis. The first flexible cable extends in a direction orthogonal to the first turning axis, and is run to substantially the same height in the optical axis direction as the first turning axis. The second flexible cable extends in a direction orthogonal to the second turning axis and is run to substantially the same height in the optical axis direction as the second turning axis.

With this apparatus, a moment does not act readily on the first turning axis even if a reaction force from the first flexible cable acts on the first turning axis. Also, a moment does not act readily on the second turning axis even if a reaction force from the second flexible cable acts on the second turning axis. Consequently, the lens module does not tilt readily, allowing a strong image stabilization effect to be obtained.

(8) In the first to third image stabilizers of the present invention, preferably the driving portion is an electromagnetic motor or a motor that uses piezoelectric ceramics.

According to the present invention as described above, an image stabilizer having a strong image stabilization effect is obtained that enables the overall size and profile of an imaging apparatus to be reduced.

INDUSTRIAL APPLICABILITY

The present invention is useful in devices equipped with an optical image stabilization system. The application scope of the present invention extends to devices equipped with imaging means, such as still cameras, video cameras, mobile telephones with built-in camera, and PDAs.

The invention claimed is:

1. An image stabilizer comprising:
a lens module that holds at least a lens and an imaging element;
a frame structure that turnably supports the lens module, and
a driving portion that turns the lens module relative to the frame structure, wherein
the driving portion including first and second piezoelectric elements that are disposed rearwardly of the imaging element, the first piezoelectric element is connected to the lens module and applies a driving force to the lens module in an optical axis direction, and the second piezoelectric element is connected to the frame structure and applies a driving force to the frame structure in the optical axis direction.

2. The image stabilizer according to claim 1, wherein
the frame structure includes an inner frame that turnably supports the lens module about a first turning axis, and an inner frame supporting body that turnably supports the inner frame about a second turning axis orthogonal to the first turning axis,
the first piezoelectric element turns the lens module about the first turning axis, and the second piezoelectric element is connected to the inner frame to turn the inner frame about the second turning axis, and
the first and second piezoelectric elements are disposed so as to at least partially overlap when viewed in the optical axis direction.

3. The image stabilizer according to claim 1, wherein the first and second piezoelectric elements are rectangular in shape.

4. The image stabilizer according to claim 1, wherein the first and second piezoelectric elements are of the same shape.

5. The image stabilizer according to claim 1, wherein the first and second piezoelectric elements each comprise at least one ceramic plate attached to an electrode plate that is longer than the at least one ceramic plate.

6. The image stabilizer according to claim 1, wherein the first and second piezoelectric elements each comprise two ceramic plates sandwiching an electrode plate, and the ceramic plates are of different lengths.

7. The image stabilizer according to claim 1, wherein the first and second piezoelectric elements each apply the driving force via a wire-like coupling member.

8. The image stabilizer according to claim 7, wherein the first and second piezoelectric elements each have a hole or a cutout portion that connects the coupling member.

9. The image stabilizer according to claim 7, wherein the coupling member is flexible.

10. The image stabilizer according to claim 7, wherein each coupling member is fixed to the respective first and second piezoelectric element by soldering.

11. The image stabilizer according to claim 7, wherein the first and second piezoelectric elements each include stainless steel or a material whose base material has had one of solder plating, gold plating and silver plating performed thereon.

12. The image stabilizer according to claim 7, wherein the coupling member of the first piezoelectric element is fixed in proximity to a turning axis of the lens module.

13. The image stabilizer according to claim 7, wherein
the lens module has a substantially rectangular parallelepiped body, and is supported pivotally on two opposing surfaces by the frame structure, and
the coupling member of the first piezoelectric element is fixed to a rear surface of the lens module on a side adjacent to the pivotally supported surfaces or in proximity thereto.

14. The image stabilizer according to claim 1, wherein one side of one of the first and second piezoelectric elements is fixed to the frame structure by a rod-like fixing member.

15. The image stabilizer according to claim 14, wherein the fixing member has a depressed portion that is longer than a width of the one piezoelectric element and shallower than a thickness of the one piezoelectric element, and fixes the one piezoelectric element by pressing down thereon using the depressed portion.

16. The image stabilizer according to claim 1, wherein each of the first and second piezoelectric elements is a bimorph.

* * * * *